United States Patent
Anzures et al.

(10) Patent No.: US 9,772,751 B2
(45) Date of Patent: Sep. 26, 2017

(54) USING GESTURES TO SLIDE BETWEEN USER INTERFACES

(75) Inventors: Freddy Allen Anzures, San Francisco, CA (US); Marcel Van Os, San Francisco, CA (US); Imran Chaudhri, San Francisco, CA (US); Michael Matas, San Francisco, CA (US); Stephen O. Lemay, San Francisco, CA (US); Scott Herz, San Jose, CA (US)

(73) Assignee: APPLE INC., Cupertino, CA (US)

( * ) Notice: Subject to any disclaimer, the term of this patent is extended or adjusted under 35 U.S.C. 154(b) by 494 days.

(21) Appl. No.: 12/217,029

(22) Filed: Jun. 30, 2008

(65) Prior Publication Data

US 2009/0007017 A1 Jan. 1, 2009

Related U.S. Application Data

(60) Provisional application No. 61/019,841, filed on Jan. 8, 2008, provisional application No. 61/010,208, filed
(Continued)

(51) Int. Cl.
*G06F 3/0483* (2013.01)
*G06F 3/0482* (2013.01)
(Continued)

(52) U.S. Cl.
CPC .......... *G06F 3/0483* (2013.01); *G06F 3/0482* (2013.01); *G06F 3/04883* (2013.01);
(Continued)

(58) Field of Classification Search
CPC .... G06F 3/0487; G06F 3/0482; G06F 3/0483; H04N 21/4438; G06T 13/00; G06T 2213/00; G05B 2219/23129
(Continued)

(56) References Cited

U.S. PATENT DOCUMENTS

| 5,051,736 A | 9/1991 | Bennett et al. |
| 5,146,556 A | 9/1992 | Hullot et al. ................. 395/159 |

(Continued)

FOREIGN PATENT DOCUMENTS

| AU | 2006338183 A1 | 8/2007 |
| AU | 2012202140 A1 | 5/2012 |

(Continued)

OTHER PUBLICATIONS

"Transition Effects," RealNetworks Inc., 2001, http://web.archive.org/web/20011214191845/http://service.real.com/help/library/guides/realone/ProductionGuide/HTML/htmfiles/transit.htm.*

(Continued)

*Primary Examiner* — Eric Wiener
(74) *Attorney, Agent, or Firm* — Morrison & Foerster LLP

(57) ABSTRACT

A first user interface is displayed without concurrently displaying a second user interface that is distinct from the first user interface. A gesture to select the second user interface is detected on the touch screen display. In response to detecting the gesture, an animation is displayed of a transition from display of the first user interface to display of the second user interface. The animation comprises sliding a first element of the second user interface onto the display from a first side of the display while simultaneously sliding a second element of the second user interface that contacts the first element horizontally across the top of the first element. The first element of the second user interface is distinct from the second element of the second user interface.

27 Claims, 113 Drawing Sheets

Related U.S. Application Data on Jan. 6, 2008, provisional application No. 60/937,993, filed on Jun. 29, 2007.

(51) Int. Cl.

| | |
|---|---|
| *G06F 3/0488* | (2013.01) |
| *H04M 1/725* | (2006.01) |
| *H04N 21/443* | (2011.01) |
| *G06T 13/00* | (2011.01) |
| *H04M 1/2745* | (2006.01) |

(52) U.S. Cl.
CPC ... *H04M 1/72522* (2013.01); *H04M 1/72583* (2013.01); *G06T 13/00* (2013.01); *H04M 1/274525* (2013.01); *H04M 1/72544* (2013.01); *H04M 1/72552* (2013.01); *H04M 1/72561* (2013.01); *H04M 2250/12* (2013.01); *H04M 2250/22* (2013.01); *H04N 21/4438* (2013.01)

(58) Field of Classification Search
USPC ....... 715/726, 767, 778, 802, 810, 835, 837, 715/838, 840, 863
See application file for complete search history.

(56) References Cited

U.S. PATENT DOCUMENTS

| | | | |
|---|---|---|---|
| 5,196,838 A | 3/1993 | Meier et al. | |
| 5,491,778 A * | 2/1996 | Gordon et al. | 345/640 |
| 5,598,524 A | 1/1997 | Johnston, Jr. et al. | |
| 5,610,653 A | 3/1997 | Abecassis | |
| 5,612,719 A | 3/1997 | Beernink et al. | |
| 5,642,490 A | 6/1997 | Morgan et al. | 395/342 |
| 5,644,739 A | 7/1997 | Moursund | 395/354 |
| 5,657,049 A | 8/1997 | Ludolph et al. | |
| 5,726,687 A | 3/1998 | Belfiore et al. | 345/341 |
| 5,745,096 A | 4/1998 | Ludolph et al. | |
| 5,745,116 A | 4/1998 | Pisutha-Arnond | |
| 5,745,910 A * | 4/1998 | Piersol et al. | 715/210 |
| 5,754,179 A * | 5/1998 | Hocker et al. | 715/835 |
| 5,757,371 A | 5/1998 | Oran et al. | 345/348 |
| 5,760,773 A | 6/1998 | Berman et al. | 345/347 |
| 5,774,119 A | 6/1998 | Alimpich et al. | |
| 5,796,401 A * | 8/1998 | Winer | 345/619 |
| 5,812,862 A * | 9/1998 | Smith et al. | 715/209 |
| 5,825,349 A | 10/1998 | Meier et al. | |
| 5,825,357 A | 10/1998 | Malamud et al. | 345/340 |
| 5,870,683 A * | 2/1999 | Wells et al. | 455/566 |
| 5,877,765 A | 3/1999 | Dickman et al. | 345/349 |
| 5,914,716 A * | 6/1999 | Rubin et al. | 715/779 |
| 5,914,717 A * | 6/1999 | Kleewein et al. | 715/843 |
| 5,923,327 A * | 7/1999 | Smith et al. | 715/784 |
| 5,934,707 A | 8/1999 | Johnson | |
| 5,995,106 A | 11/1999 | Naughton et al. | 345/357 |
| 6,025,842 A | 2/2000 | Filetto et al. | |
| 6,043,818 A * | 3/2000 | Nakano et al. | 715/851 |
| 6,049,336 A * | 4/2000 | Liu et al. | 715/830 |
| 6,069,626 A | 5/2000 | Cline et al. | |
| 6,072,486 A | 6/2000 | Sheldon et al. | 345/339 |
| 6,073,036 A | 6/2000 | Heikkinen et al. | |
| 6,111,573 A * | 8/2000 | McComb et al. | 715/763 |
| 6,133,914 A * | 10/2000 | Rogers et al. | 345/661 |
| 6,144,863 A | 11/2000 | Charron | 455/566 |
| 6,145,083 A | 11/2000 | Shaffer et al. | |
| 6,177,936 B1 | 1/2001 | Cragun | |
| 6,195,094 B1 * | 2/2001 | Celebiler | 715/764 |
| 6,199,082 B1 | 3/2001 | Ferrel et al. | |
| 6,229,542 B1 * | 5/2001 | Miller | 715/782 |
| 6,243,080 B1 | 6/2001 | Molne | |
| 6,256,008 B1 | 7/2001 | Sparks et al. | |
| 6,262,732 B1 | 7/2001 | Coleman et al. | |
| 6,262,735 B1 | 7/2001 | Etelaperä | |
| 6,271,841 B1 | 8/2001 | Tsujimoto | |
| 6,275,935 B1 | 8/2001 | Barlow et al. | 713/182 |
| 6,278,454 B1 | 8/2001 | Krishnan | 345/349 |
| 6,297,795 B1 | 10/2001 | Kato et al. | |
| 6,313,853 B1 | 11/2001 | Lamontagne et al. | |
| 6,313,855 B1 | 11/2001 | Shuping et al. | |
| 6,317,140 B1 | 11/2001 | Livingston et al. | |
| 6,323,846 B1 | 11/2001 | Westerman et al. | 345/173 |
| 6,326,970 B1 | 12/2001 | Mott et al. | |
| 6,349,410 B1 | 2/2002 | Lortz | |
| 6,353,451 B1 * | 3/2002 | Teibel et al. | 715/803 |
| 6,359,615 B1 | 3/2002 | Singh | |
| 6,377,698 B1 | 4/2002 | Cumoli et al. | |
| 6,396,520 B1 * | 5/2002 | Ording | 715/798 |
| 6,407,757 B1 * | 6/2002 | Ho | G06F 3/03547 |
| | | | 715/702 |
| 6,411,283 B1 | 6/2002 | Murphy | |
| 6,433,801 B1 | 8/2002 | Moon et al. | 345/840 |
| 6,466,198 B1 | 10/2002 | Feinstein | |
| 6,466,203 B2 | 10/2002 | Van Ee | |
| 6,486,895 B1 | 11/2002 | Robertson et al. | |
| 6,489,975 B1 | 12/2002 | Patil et al. | |
| 6,496,182 B1 | 12/2002 | Wong et al. | |
| 6,545,669 B1 | 4/2003 | Kinawi et al. | 345/173 |
| 6,570,557 B1 | 5/2003 | Westerman et al. | 345/173 |
| 6,570,583 B1 | 5/2003 | Kung et al. | |
| 6,590,568 B1 | 7/2003 | Astala et al. | 345/173 |
| 6,597,391 B2 * | 7/2003 | Hudson | G08B 13/19641 |
| | | | 340/3.1 |
| 6,613,100 B2 | 9/2003 | Miller | |
| 6,621,768 B1 | 9/2003 | Keller et al. | |
| 6,628,309 B1 | 9/2003 | Dodson et al. | |
| 6,629,793 B1 | 10/2003 | Miller | |
| 6,639,584 B1 | 10/2003 | Li | |
| 6,677,932 B1 | 1/2004 | Westerman | 345/173 |
| 6,683,628 B1 * | 1/2004 | Nakagawa | G06F 3/0485 |
| | | | 345/672 |
| 6,700,612 B1 | 3/2004 | Anderson et al. | |
| 6,710,788 B1 | 3/2004 | Freach et al. | |
| 6,714,222 B1 | 3/2004 | Bjorn et al. | |
| 6,727,916 B1 | 4/2004 | Ballard | |
| 6,763,388 B1 | 7/2004 | Tsimelzon | 709/228 |
| 6,771,250 B1 | 8/2004 | Oh | |
| 6,781,575 B1 | 8/2004 | Hawkins et al. | 345/173 |
| 6,820,111 B1 | 11/2004 | Rubin et al. | |
| 6,915,294 B1 | 7/2005 | Singh et al. | |
| 6,915,490 B1 | 7/2005 | Ewing et al. | |
| 6,928,461 B2 | 8/2005 | Tuli | |
| 6,931,601 B2 | 8/2005 | Vronay et al. | 715/767 |
| 6,934,911 B2 | 8/2005 | Salmimaa et al. | |
| 6,950,949 B1 * | 9/2005 | Gilchrist | G06F 21/36 |
| | | | 726/19 |
| 6,956,564 B1 | 10/2005 | Williams | |
| 6,970,749 B1 * | 11/2005 | Chinn et al. | 700/12 |
| 6,976,210 B1 * | 12/2005 | Silva et al. | 715/205 |
| 6,978,127 B1 | 12/2005 | Bulthuis et al. | 455/412.1 |
| 6,987,991 B2 | 1/2006 | Nelson | |
| 6,990,452 B1 | 1/2006 | Ostermann et al. | |
| 7,007,239 B1 | 2/2006 | Hawkins et al. | |
| 7,017,118 B1 | 3/2006 | Carroll et al. | |
| 7,030,861 B1 | 4/2006 | Westerman et al. | |
| 7,054,965 B2 | 5/2006 | Bell et al. | |
| 7,071,943 B2 * | 7/2006 | Adler | 345/473 |
| 7,075,512 B1 | 7/2006 | Fabre et al. | |
| 7,085,590 B2 | 8/2006 | Kennedy et al. | |
| 7,093,201 B2 | 8/2006 | Duarte | |
| 7,134,095 B1 | 11/2006 | Smith et al. | 715/860 |
| 7,149,549 B1 | 12/2006 | Ortiz et al. | |
| 7,166,791 B2 | 1/2007 | Robbin et al. | |
| 7,167,731 B2 | 1/2007 | Nelson | |
| 7,171,625 B1 | 1/2007 | Sacchi | |
| 7,221,933 B2 | 5/2007 | Sauer et al. | |
| 7,231,229 B1 | 6/2007 | Hawkins et al. | 455/564 |
| 7,283,845 B2 | 10/2007 | De Bast | 455/566 |
| 7,310,636 B2 | 12/2007 | Bodin et al. | |
| 7,346,855 B2 | 3/2008 | Hellyar et al. | |
| 7,355,593 B2 | 4/2008 | Hill et al. | 345/173 |
| 7,360,166 B1 | 4/2008 | Krzanowski | |
| 7,362,331 B2 * | 4/2008 | Ording | 345/473 |
| 7,432,928 B2 * | 10/2008 | Shaw et al. | 345/473 |
| 7,434,177 B1 * | 10/2008 | Ording et al. | 715/862 |
| 7,437,005 B2 | 10/2008 | Drucker et al. | |

(56) References Cited

U.S. PATENT DOCUMENTS

| | | | |
|---|---|---|---|
| 7,461,353 B2 | 12/2008 | Rohrabaugh et al. | |
| 7,480,870 B2 | 1/2009 | Anzures et al. | |
| 7,487,467 B1* | 2/2009 | Kawahara et al. | 715/810 |
| 7,490,295 B2* | 2/2009 | Chaudhri et al. | 715/764 |
| 7,493,573 B2* | 2/2009 | Wagner | 715/864 |
| 7,506,268 B2* | 3/2009 | Jennings et al. | 715/786 |
| 7,509,588 B2 | 3/2009 | van Os et al. | 715/835 |
| 7,512,898 B2* | 3/2009 | Jennings et al. | 715/822 |
| 7,526,738 B2* | 4/2009 | Ording et al. | 715/862 |
| 7,546,548 B2* | 6/2009 | Chew et al. | 715/810 |
| 7,546,554 B2* | 6/2009 | Chiu et al. | 715/864 |
| 7,561,874 B2* | 7/2009 | Wang et al. | 455/418 |
| 7,587,671 B2 | 9/2009 | Saft et al. | |
| 7,587,683 B2 | 9/2009 | Ito et al. | |
| 7,603,105 B2 | 10/2009 | Bocking et al. | |
| 7,614,008 B2 | 11/2009 | Ording | |
| 7,624,357 B2 | 11/2009 | De Bast | 715/828 |
| 7,633,076 B2 | 12/2009 | Huppi et al. | |
| 7,642,934 B2* | 1/2010 | Scott | 341/23 |
| 7,650,137 B2 | 1/2010 | Jobs et al. | |
| 7,653,883 B2 | 1/2010 | Hotelling et al. | |
| 7,657,252 B2 | 2/2010 | Futami | |
| 7,657,849 B2 | 2/2010 | Chaudhri et al. | |
| 7,663,607 B2 | 2/2010 | Hotelling et al. | |
| 7,669,135 B2 | 2/2010 | Cunningham et al. | |
| 7,683,889 B2 | 3/2010 | Rimas Ribikauskas et al. | |
| 7,694,231 B2 | 4/2010 | Kocienda et al. | |
| 7,719,542 B1* | 5/2010 | Gough et al. | 345/581 |
| 7,720,893 B2 | 5/2010 | Boudreau et al. | |
| 7,730,401 B2 | 6/2010 | Gillespie et al. | |
| 7,735,021 B2 | 6/2010 | Padawer et al. | |
| 7,739,271 B2 | 6/2010 | Cook et al. | |
| 7,739,604 B1 | 6/2010 | Lyons et al. | |
| 7,747,289 B2* | 6/2010 | Wang et al. | 455/566 |
| 7,783,583 B2 | 8/2010 | Sendhoff et al. | |
| 7,783,990 B2* | 8/2010 | Amadio et al. | 715/809 |
| 7,788,583 B1 | 8/2010 | Amzallag et al. | |
| 7,805,684 B2* | 9/2010 | Arvilommi | 715/829 |
| 7,810,038 B2 | 10/2010 | Matsa et al. | 715/765 |
| 7,831,926 B2 | 11/2010 | Rohrabaugh et al. | |
| 7,835,729 B2 | 11/2010 | Hyon | |
| 7,840,901 B2 | 11/2010 | Lacey et al. | |
| 7,844,889 B2 | 11/2010 | Rohrabaugh et al. | |
| 7,844,914 B2 | 11/2010 | Andre et al. | |
| 7,853,972 B2* | 12/2010 | Brodersen et al. | 725/40 |
| 7,856,602 B2* | 12/2010 | Armstrong | 715/830 |
| 7,917,846 B2 | 3/2011 | Decker et al. | |
| 7,934,152 B2 | 4/2011 | Krishnamurthy et al. | |
| 7,940,250 B2 | 5/2011 | Forstall | |
| 7,957,762 B2 | 6/2011 | Herz et al. | |
| 7,958,457 B1 | 6/2011 | Brandenberg et al. | |
| 7,996,789 B2 | 8/2011 | Louch et al. | |
| 8,006,002 B2 | 8/2011 | Kalayjian et al. | |
| 8,239,784 B2 | 8/2012 | Hotelling et al. | |
| 8,279,180 B2 | 10/2012 | Hotelling et al. | |
| 8,365,084 B1 | 1/2013 | Lin et al. | |
| 8,381,135 B2 | 2/2013 | Hotelling et al. | |
| 8,446,371 B2 | 5/2013 | Fyke et al. | |
| 8,479,122 B2 | 7/2013 | Hotelling et al. | |
| 8,519,964 B2 | 8/2013 | Platzer et al. | |
| 8,519,972 B2 | 8/2013 | Forstall et al. | |
| 8,558,808 B2 | 10/2013 | Forstall et al. | |
| 8,601,370 B2 | 12/2013 | Chiang et al. | |
| 8,619,038 B2 | 12/2013 | Chaudhri et al. | |
| 8,788,954 B2 | 7/2014 | Lemay et al. | |
| 2001/0024195 A1 | 9/2001 | Hayakawa | 345/173 |
| 2001/0024212 A1 | 9/2001 | Ohnishi | 345/769 |
| 2002/0015024 A1 | 2/2002 | Westerman et al. | 345/173 |
| 2002/0015042 A1 | 2/2002 | Robotham et al. | 345/581 |
| 2002/0015064 A1 | 2/2002 | Robotham et al. | |
| 2002/0024540 A1* | 2/2002 | McCarthy | 345/844 |
| 2002/0038299 A1 | 3/2002 | Zernik et al. | |
| 2002/0054090 A1 | 5/2002 | Silva et al. | 345/747 |
| 2002/0085037 A1 | 7/2002 | Leavitt et al. | 345/765 |
| 2002/0093531 A1 | 7/2002 | Barile | |
| 2002/0104096 A1 | 8/2002 | Cramer et al. | |
| 2002/0152283 A1 | 10/2002 | Dutta et al. | |
| 2002/0188948 A1 | 12/2002 | Florence | |
| 2002/0191029 A1 | 12/2002 | Gillespie et al. | 345/810 |
| 2003/0007012 A1 | 1/2003 | Bate | |
| 2003/0013483 A1 | 1/2003 | Ausems et al. | |
| 2003/0014415 A1 | 1/2003 | Weiss et al. | |
| 2003/0016241 A1 | 1/2003 | Burke | 345/753 |
| 2003/0025676 A1 | 2/2003 | Cappendijk | |
| 2003/0030664 A1 | 2/2003 | Parry | |
| 2003/0033331 A1 | 2/2003 | Sena et al. | |
| 2003/0048295 A1* | 3/2003 | Lilleness et al. | 345/738 |
| 2003/0063125 A1 | 4/2003 | Miyajima et al. | |
| 2003/0081135 A1 | 5/2003 | Boll | |
| 2003/0090572 A1* | 5/2003 | Belz et al. | 348/207.1 |
| 2003/0095135 A1 | 5/2003 | Kaasila et al. | |
| 2003/0095155 A1 | 5/2003 | Johnson | |
| 2003/0117427 A1 | 6/2003 | Haughawout et al. | |
| 2003/0117440 A1 | 6/2003 | Hellyar et al. | |
| 2003/0132938 A1* | 7/2003 | Shibao | G06T 13/00 345/473 |
| 2003/0164861 A1 | 9/2003 | Barbanson et al. | |
| 2003/0169298 A1* | 9/2003 | Ording | 345/810 |
| 2003/0174172 A1 | 9/2003 | Conrad et al. | |
| 2003/0184552 A1* | 10/2003 | Chadha | 345/581 |
| 2003/0184587 A1 | 10/2003 | Ording et al. | 345/769 |
| 2003/0193524 A1 | 10/2003 | Bates et al. | |
| 2003/0200289 A1 | 10/2003 | Kemp et al. | 709/221 |
| 2003/0206195 A1 | 11/2003 | Matsa et al. | 345/744 |
| 2003/0206197 A1* | 11/2003 | McInerney | 345/764 |
| 2003/0210280 A1 | 11/2003 | Baker et al. | |
| 2003/0225811 A1* | 12/2003 | Ali | G06F 8/10 718/101 |
| 2004/0021643 A1 | 2/2004 | Hoshino et al. | |
| 2004/0041849 A1 | 3/2004 | Mock et al. | |
| 2004/0056839 A1 | 3/2004 | Yoshihara | |
| 2004/0093582 A1 | 5/2004 | Segura | |
| 2004/0103156 A1 | 5/2004 | Quillen et al. | 709/206 |
| 2004/0103371 A1 | 5/2004 | Chen et al. | |
| 2004/0109025 A1 | 6/2004 | Hullot et al. | |
| 2004/0121823 A1* | 6/2004 | Noesgaard et al. | 455/575.1 |
| 2004/0138569 A1 | 7/2004 | Grunwald et al. | |
| 2004/0141011 A1 | 7/2004 | Smethers et al. | |
| 2004/0143796 A1 | 7/2004 | Lerner et al. | |
| 2004/0155909 A1* | 8/2004 | Wagner | 345/854 |
| 2004/0169674 A1 | 9/2004 | Linjama | |
| 2004/0177148 A1 | 9/2004 | Tsimelzon, Jr. | 709/227 |
| 2004/0201595 A1 | 10/2004 | Manchester | |
| 2004/0205492 A1 | 10/2004 | Newsome | |
| 2004/0205496 A1 | 10/2004 | Dutta et al. | |
| 2004/0215719 A1* | 10/2004 | Altshuler | 709/204 |
| 2004/0221006 A1 | 11/2004 | Gopalan et al. | |
| 2004/0222975 A1* | 11/2004 | Nakano et al. | 345/173 |
| 2004/0268400 A1 | 12/2004 | Barde et al. | |
| 2005/0005246 A1 | 1/2005 | Card et al. | 715/776 |
| 2005/0005248 A1 | 1/2005 | Rockey et al. | |
| 2005/0020317 A1 | 1/2005 | Koyama | |
| 2005/0024341 A1 | 2/2005 | Gillespie et al. | |
| 2005/0026644 A1 | 2/2005 | Lien | 455/550.1 |
| 2005/0039134 A1 | 2/2005 | Wiggeshoff et al. | |
| 2005/0044509 A1 | 2/2005 | Hunleth et al. | |
| 2005/0057524 A1 | 3/2005 | Hill et al. | 345/173 |
| 2005/0057548 A1 | 3/2005 | Kim | 345/204 |
| 2005/0060653 A1 | 3/2005 | Fukase et al. | |
| 2005/0060664 A1* | 3/2005 | Rogers | 715/810 |
| 2005/0060665 A1 | 3/2005 | Rekimoto | 715/810 |
| 2005/0066286 A1 | 3/2005 | Makela | |
| 2005/0071364 A1 | 3/2005 | Xie et al. | |
| 2005/0071736 A1 | 3/2005 | Schneider et al. | |
| 2005/0071778 A1 | 3/2005 | Tokkonen | |
| 2005/0078804 A1 | 4/2005 | Yomoda | |
| 2005/0079896 A1 | 4/2005 | Kokko et al. | |
| 2005/0091609 A1 | 4/2005 | Matthews et al. | 715/804 |
| 2005/0093826 A1 | 5/2005 | Huh | |
| 2005/0097089 A1* | 5/2005 | Nielsen et al. | 707/3 |
| 2005/0108657 A1* | 5/2005 | Han | G06F 3/04817 715/827 |
| 2005/0114788 A1 | 5/2005 | Fabritius | |
| 2005/0120142 A1 | 6/2005 | Hall | |

(56) References Cited

U.S. PATENT DOCUMENTS

| | | |
|---|---|---|
| 2005/0134578 A1 | 6/2005 | Chambers et al. ............ 345/184 |
| 2005/0154798 A1 | 7/2005 | Nurmi |
| 2005/0156873 A1 | 7/2005 | Walter et al. |
| 2005/0166232 A1 | 7/2005 | Lamkin et al. |
| 2005/0169527 A1 | 8/2005 | Longe et al. |
| 2005/0177783 A1 | 8/2005 | Agrawala et al. |
| 2005/0183017 A1 | 8/2005 | Cain |
| 2005/0190059 A1 | 9/2005 | Wehrenberg |
| 2005/0192924 A1 | 9/2005 | Drucker et al. |
| 2005/0204385 A1 | 9/2005 | Sull et al. |
| 2005/0210018 A1 | 9/2005 | Singh et al. |
| 2005/0210369 A1* | 9/2005 | Damm, Jr. ............ G06F 17/246 715/213 |
| 2005/0210403 A1* | 9/2005 | Satanek ............ G06F 3/04855 715/786 |
| 2005/0229102 A1 | 10/2005 | Watson et al. ............ 715/739 |
| 2005/0229118 A1 | 10/2005 | Chiu et al. |
| 2005/0250438 A1 | 11/2005 | Makipaa et al. ............ 455/3.06 |
| 2005/0251755 A1 | 11/2005 | Mullins, II et al. ............ 715/779 |
| 2005/0253817 A1* | 11/2005 | Rytivaara ............ G06F 3/04883 345/173 |
| 2005/0262448 A1 | 11/2005 | Vronay et al. ............ 715/767 |
| 2005/0267869 A1 | 12/2005 | Horvitz et al. |
| 2005/0275636 A1 | 12/2005 | Dehlin et al. ............ 345/173 |
| 2005/0285880 A1 | 12/2005 | Lai et al. |
| 2005/0289458 A1 | 12/2005 | Kylmanen ............ 715/513 |
| 2005/0289476 A1 | 12/2005 | Tokkonen |
| 2006/0005207 A1 | 1/2006 | Louch et al. |
| 2006/0007182 A1 | 1/2006 | Sato et al. |
| 2006/0017692 A1 | 1/2006 | Wehrenberg et al. |
| 2006/0025110 A1* | 2/2006 | Liu ............ 455/411 |
| 2006/0026170 A1 | 2/2006 | Kreitler et al. |
| 2006/0026521 A1 | 2/2006 | Hotelling et al. |
| 2006/0026536 A1* | 2/2006 | Hotelling et al. ............ 715/863 |
| 2006/0033724 A1 | 2/2006 | Chaudhri et al. |
| 2006/0033751 A1 | 2/2006 | Keely et al. |
| 2006/0033761 A1 | 2/2006 | Suen et al. |
| 2006/0036944 A1 | 2/2006 | Wilson |
| 2006/0051073 A1* | 3/2006 | Jung et al. ............ 386/125 |
| 2006/0053386 A1 | 3/2006 | Kuhl et al. |
| 2006/0053387 A1 | 3/2006 | Ording |
| 2006/0055662 A1 | 3/2006 | Rimas-Ribikauskas et al. |
| 2006/0055700 A1 | 3/2006 | Niles et al. |
| 2006/0064647 A1 | 3/2006 | Tapuska et al. |
| 2006/0075355 A1 | 4/2006 | Shiono et al. ............ 715/778 |
| 2006/0080616 A1 | 4/2006 | Vogel et al. ............ 715/769 |
| 2006/0085743 A1 | 4/2006 | Baudisch et al. |
| 2006/0085763 A1 | 4/2006 | Leavitt et al. |
| 2006/0097991 A1 | 5/2006 | Hotelling et al. |
| 2006/0101354 A1 | 5/2006 | Hashimoto et al. |
| 2006/0105814 A1 | 5/2006 | Monden et al. |
| 2006/0112335 A1 | 5/2006 | Hofmeister et al. ............ 715/701 |
| 2006/0116578 A1 | 6/2006 | Grunwald et al. |
| 2006/0117197 A1 | 6/2006 | Nurmi |
| 2006/0123360 A1* | 6/2006 | Anwar et al. ............ 715/810 |
| 2006/0125799 A1 | 6/2006 | Hillis et al. |
| 2006/0129647 A1 | 6/2006 | Kaghazian |
| 2006/0143574 A1 | 6/2006 | Ito et al. |
| 2006/0146016 A1 | 7/2006 | Chan et al. |
| 2006/0146038 A1 | 7/2006 | Park et al. |
| 2006/0148526 A1 | 7/2006 | Kamiya et al. |
| 2006/0153531 A1 | 7/2006 | Kanegae et al. |
| 2006/0161871 A1 | 7/2006 | Hotelling et al. |
| 2006/0168510 A1 | 7/2006 | Bryar et al. |
| 2006/0174211 A1 | 8/2006 | Hoellerer et al. |
| 2006/0179415 A1 | 8/2006 | Cadiz et al. |
| 2006/0190833 A1 | 8/2006 | Sangiovanni et al. |
| 2006/0197753 A1 | 9/2006 | Hotelling ............ 345/173 |
| 2006/0209035 A1 | 9/2006 | Jenkins et al. |
| 2006/0224997 A1 | 10/2006 | Wong et al. |
| 2006/0236266 A1* | 10/2006 | Majava ............ 715/810 |
| 2006/0238625 A1 | 10/2006 | Sasaki et al. |
| 2006/0242145 A1 | 10/2006 | Krishnamurthy et al. |
| 2006/0242596 A1* | 10/2006 | Armstrong ............ 715/786 |
| 2006/0242604 A1 | 10/2006 | Wong et al. |
| 2006/0242607 A1* | 10/2006 | Hudson ............ 715/863 |
| 2006/0265643 A1 | 11/2006 | Saft et al. |
| 2006/0271864 A1 | 11/2006 | Satterfield et al. |
| 2006/0271867 A1 | 11/2006 | Wang et al. |
| 2006/0271874 A1 | 11/2006 | Raiz et al. ............ 715/767 |
| 2006/0277460 A1 | 12/2006 | Forstall et al. ............ 715/513 |
| 2006/0277588 A1 | 12/2006 | Harrington et al. |
| 2006/0278692 A1 | 12/2006 | Matsumoto et al. ............ 235/375 |
| 2006/0282786 A1* | 12/2006 | Shaw et al. ............ 715/762 |
| 2006/0282790 A1 | 12/2006 | Matthews et al. |
| 2006/0284852 A1 | 12/2006 | Hofmeister et al. ............ 345/173 |
| 2006/0290661 A1* | 12/2006 | Innanen et al. ............ 345/156 |
| 2007/0004451 A1 | 1/2007 | Anderson |
| 2007/0013665 A1 | 1/2007 | Vetelainen et al. ............ 345/169 |
| 2007/0022386 A1 | 1/2007 | Boss et al. |
| 2007/0024646 A1 | 2/2007 | Saarinen et al. |
| 2007/0028269 A1 | 2/2007 | Nezu et al. ............ 725/52 |
| 2007/0030362 A1* | 2/2007 | Ota et al. ............ 348/239 |
| 2007/0038612 A1 | 2/2007 | Sull et al. |
| 2007/0055947 A1 | 3/2007 | Ostojic et al. ............ 715/800 |
| 2007/0067272 A1* | 3/2007 | Flynt et al. ............ 707/3 |
| 2007/0067738 A1 | 3/2007 | Flynt et al. |
| 2007/0083827 A1 | 4/2007 | Scott et al. |
| 2007/0083911 A1* | 4/2007 | Madden et al. ............ 725/135 |
| 2007/0101292 A1 | 5/2007 | Kupka |
| 2007/0101297 A1* | 5/2007 | Forstall et al. ............ 715/841 |
| 2007/0106952 A1 | 5/2007 | Matas et al. |
| 2007/0124677 A1 | 5/2007 | de los Reyes et al. ........ 715/705 |
| 2007/0132789 A1 | 6/2007 | Ording et al. |
| 2007/0150810 A1 | 6/2007 | Katz et al. |
| 2007/0150830 A1 | 6/2007 | Ording et al. |
| 2007/0152980 A1 | 7/2007 | Kocienda et al. |
| 2007/0152984 A1 | 7/2007 | Ording et al. |
| 2007/0155434 A1 | 7/2007 | Jobs et al. |
| 2007/0156697 A1 | 7/2007 | Tsarkova ............ 707/9 |
| 2007/0157089 A1* | 7/2007 | Van Os et al. ............ 715/702 |
| 2007/0157228 A1 | 7/2007 | Bayer et al. |
| 2007/0177803 A1 | 8/2007 | Elias et al. ............ 382/188 |
| 2007/0177804 A1 | 8/2007 | Elias et al. |
| 2007/0180395 A1 | 8/2007 | Yamashita et al. ............ 715/778 |
| 2007/0189737 A1* | 8/2007 | Chaudhri et al. ............ 386/125 |
| 2007/0192741 A1* | 8/2007 | Yoritate et al. ............ 715/828 |
| 2007/0200713 A1 | 8/2007 | Weber et al. |
| 2007/0204218 A1 | 8/2007 | Weber et al. |
| 2007/0233695 A1 | 10/2007 | Boudreau et al. |
| 2007/0240079 A1* | 10/2007 | Flynt et al. ............ 715/810 |
| 2007/0243862 A1* | 10/2007 | Coskun et al. ............ 455/418 |
| 2007/0245250 A1* | 10/2007 | Schechter et al. ............ 715/760 |
| 2007/0250768 A1 | 10/2007 | Funakami et al. |
| 2007/0254722 A1* | 11/2007 | Kim ............ G06F 3/0485 455/566 |
| 2007/0260999 A1 | 11/2007 | Amadio et al. |
| 2007/0263176 A1 | 11/2007 | Nozaki et al. |
| 2007/0266011 A1 | 11/2007 | Rohrs et al. |
| 2007/0266342 A1 | 11/2007 | Chang et al. |
| 2007/0288860 A1 | 12/2007 | Ording et al. ............ 715/779 |
| 2007/0288862 A1* | 12/2007 | Ording ............ 715/788 |
| 2007/0288868 A1 | 12/2007 | Rhee et al. |
| 2007/0300160 A1 | 12/2007 | Ferrel et al. |
| 2008/0001924 A1* | 1/2008 | de los Reyes et al. ........ 345/173 |
| 2008/0005703 A1* | 1/2008 | Radivojevic et al. ........ 715/863 |
| 2008/0034309 A1* | 2/2008 | Louch et al. ............ 715/766 |
| 2008/0042984 A1 | 2/2008 | Lim et al. |
| 2008/0059906 A1 | 3/2008 | Toki |
| 2008/0062137 A1 | 3/2008 | Brodersen et al. |
| 2008/0082930 A1 | 4/2008 | Omernick et al. |
| 2008/0104515 A1 | 5/2008 | Dumitru et al. |
| 2008/0122796 A1 | 5/2008 | Jobs et al. ............ 345/173 |
| 2008/0125180 A1* | 5/2008 | Hoffman et al. ............ 455/566 |
| 2008/0132252 A1 | 6/2008 | Altman et al. |
| 2008/0139176 A1 | 6/2008 | Kim |
| 2008/0161045 A1* | 7/2008 | Vuorenmaa ............ 455/556.1 |
| 2008/0168075 A1 | 7/2008 | Kamiyabu |
| 2008/0168367 A1 | 7/2008 | Chaudhri et al. ............ 715/764 |
| 2008/0168401 A1* | 7/2008 | Boule et al. ............ 715/863 |
| 2008/0168478 A1 | 7/2008 | Platzer et al. |
| 2008/0171555 A1 | 7/2008 | Oh et al. |
| 2008/0174562 A1* | 7/2008 | Kim ............ G06F 3/04886 345/173 |

(56) References Cited

U.S. PATENT DOCUMENTS

| | | | |
|---|---|---|---|
| 2008/0182598 A1 | 7/2008 | Bowman | |
| 2008/0182628 A1* | 7/2008 | Lee et al. | 455/566 |
| 2008/0184052 A1 | 7/2008 | Itoh et al. | |
| 2008/0184112 A1* | 7/2008 | Chiang et al. | 715/700 |
| 2008/0189108 A1 | 8/2008 | Atar | |
| 2008/0201452 A1 | 8/2008 | Athas et al. | |
| 2008/0216017 A1* | 9/2008 | Kurtenbach et al. | 715/823 |
| 2008/0231610 A1 | 9/2008 | Hotelling et al. | |
| 2008/0259045 A1* | 10/2008 | Kim et al. | 345/173 |
| 2008/0268882 A1 | 10/2008 | Moloney | |
| 2008/0300055 A1 | 12/2008 | Lutnick et al. | |
| 2008/0300572 A1 | 12/2008 | Rankers et al. | |
| 2008/0310602 A1 | 12/2008 | Bhupati | |
| 2009/0002324 A1* | 1/2009 | Harbeson | G06F 3/0485 345/173 |
| 2009/0006991 A1* | 1/2009 | Lindberg | G06F 3/04817 715/763 |
| 2009/0007017 A1 | 1/2009 | Anzures et al. | 715/835 |
| 2009/0058821 A1 | 3/2009 | Chaudhri et al. | |
| 2009/0064055 A1 | 3/2009 | Chaudhri et al. | 715/863 |
| 2009/0128581 A1 | 5/2009 | Brid et al. | |
| 2009/0138827 A1 | 5/2009 | Van Os et al. | |
| 2009/0163193 A1 | 6/2009 | Fyke et al. | |
| 2009/0178008 A1 | 7/2009 | Herz et al. | |
| 2009/0199128 A1* | 8/2009 | Matthews et al. | 715/799 |
| 2009/0222765 A1 | 9/2009 | Ekstrand | |
| 2009/0249252 A1 | 10/2009 | Lundy et al. | |
| 2009/0254799 A1 | 10/2009 | Unger | |
| 2009/0288032 A1 | 11/2009 | Chang et al. | |
| 2009/0295753 A1 | 12/2009 | King et al. | |
| 2010/0095238 A1* | 4/2010 | Baudet | 715/784 |
| 2010/0105454 A1* | 4/2010 | Weber et al. | 463/1 |
| 2010/0169357 A1 | 7/2010 | Ingrassia et al. | |
| 2010/0179991 A1 | 7/2010 | Lorch et al. | |
| 2010/0283743 A1 | 11/2010 | Coddington | |
| 2010/0318709 A1 | 12/2010 | Bell et al. | |
| 2011/0007009 A1 | 1/2011 | Ishihara et al. | |
| 2011/0252373 A1 | 10/2011 | Chaudhri | |
| 2014/0068483 A1 | 3/2014 | Platzer et al. | |
| 2014/0237360 A1 | 8/2014 | Chaudhri et al. | |
| 2015/0012853 A1 | 1/2015 | Chaudhri et al. | |

FOREIGN PATENT DOCUMENTS

| | | | | |
|---|---|---|---|---|
| CA | 2349649 | A1 | 1/2002 | |
| CN | 1257247 | A | 6/2000 | |
| CN | 1818843 | A | 8/2006 | |
| CN | 1940833 | A | 4/2007 | |
| EP | 0 322 332 | A2 | 6/1989 | G06F 3/023 |
| EP | 0476972 | A2 | 3/1992 | |
| EP | 0 626 635 | A2 | 11/1994 | G06F 3/00 |
| EP | 0651544 | A2 | 5/1995 | |
| EP | 0 689 134 | A1 | 12/1995 | G06F 9/44 |
| EP | 0701220 | A1 | 3/1996 | |
| EP | 0 844 553 | A1 | 5/1998 | G06F 3/023 |
| EP | 0880090 | A2 | 11/1998 | |
| EP | 1049305 | A1 | 11/2000 | |
| EP | 1 143 334 | A2 | 10/2001 | G06F 9/44 |
| EP | 1 231 763 | A1 | 8/2002 | H04M 1/725 |
| EP | 1 517 228 | A1 | 3/2005 | G06F 3/033 |
| EP | 1632874 | A2 | 3/2006 | |
| EP | 1 744 242 | A2 | 1/2007 | |
| EP | 1752880 | A1 | 2/2007 | |
| EP | 1964022 | B1 | 3/2010 | |
| FR | 2 819 675 | A1 | 7/2002 | H04Q 7/32 |
| GB | 2301217 | A | 11/1996 | |
| GB | 2 329 813 | A | 3/1999 | G06F 3/033 |
| JP | 5-225302 | A | 9/1993 | |
| JP | 6-51930 | A | 2/1994 | |
| JP | 7-225829 | A | 8/1995 | |
| JP | 8-221203 | A | 8/1996 | |
| JP | 09 073381 | | 3/1997 | |
| JP | 9-97162 | A | 4/1997 | |
| JP | 9-101874 | A | 4/1997 | |
| JP | 9-138745 | A | 5/1997 | |
| JP | 9-258971 | A | 10/1997 | |
| JP | 10-96648 | A | 4/1998 | |
| JP | 11-143604 | A | 5/1999 | |
| JP | 11-242539 | A | 9/1999 | |
| JP | 11-327433 | A | 11/1999 | |
| JP | 2000-10702 | A | 1/2000 | |
| JP | 2000-105772 | A | 4/2000 | |
| JP | 2000 163031 | | 6/2000 | |
| JP | 2000 163193 | | 6/2000 | |
| JP | 2000-163444 | A | 6/2000 | |
| JP | 2000-181436 | A | 6/2000 | |
| JP | 2000-242390 | A | 9/2000 | |
| JP | 2001-142604 | A | 5/2001 | |
| JP | 2001-175386 | A | 6/2001 | |
| JP | 2001-265481 | A | 9/2001 | |
| JP | 2001-312347 | A | 11/2001 | |
| JP | 2002-41206 | A | 2/2002 | |
| JP | 2002 062966 | | 2/2002 | |
| JP | 2002062966 | A * | 2/2002 | |
| JP | 2002-099370 | A | 4/2002 | |
| JP | 2002-149312 | A | 5/2002 | |
| JP | 2002 149616 | | 5/2002 | |
| JP | 2002-189567 | A | 7/2002 | |
| JP | 2002-244635 | A | 8/2002 | |
| JP | 2002-525705 | A | 8/2002 | |
| JP | 2002-323850 | A | 11/2002 | |
| JP | 2003-066941 | A | 3/2003 | |
| JP | 2003-139546 | A | 5/2003 | |
| JP | 2003-162356 | A | 6/2003 | |
| JP | 2003-248538 | A | 9/2003 | |
| JP | 2003-256142 | A | 9/2003 | |
| JP | 2003-271310 | A | 9/2003 | |
| JP | 2004-38310 | A | 2/2004 | |
| JP | 2004-062645 | A | 2/2004 | |
| JP | 2004 070492 | A | 3/2004 | |
| JP | 2004-118478 | A | 4/2004 | |
| JP | 2004-132741 | A | 4/2004 | |
| JP | 2004 164242 | A | 6/2004 | |
| JP | 2004-206230 | A | 7/2004 | |
| JP | 2004-227393 | A | 8/2004 | |
| JP | 2004-288208 | A | 10/2004 | |
| JP | 2004-318505 | A | 11/2004 | |
| JP | 2004 341886 | | 12/2004 | |
| JP | 2004-343662 | A | 12/2004 | |
| JP | 2005-004396 | A | 1/2005 | |
| JP | 2005-018229 | A | 1/2005 | |
| JP | 2005 115896 | | 4/2005 | |
| JP | 2005-515530 | A | 5/2005 | |
| JP | 2005-228088 | A | 8/2005 | |
| JP | 2005-234291 | A | 9/2005 | |
| JP | 2005-242669 | A | 9/2005 | |
| JP | 2005-267049 | A | 9/2005 | |
| JP | 2005309933 | A * | 11/2005 | G06F 3/00 |
| JP | 2005 352924 | A | 12/2005 | |
| JP | 2005 352943 | | 12/2005 | |
| JP | 2006-18645 | A | 1/2006 | |
| JP | 2006-099733 | A | 4/2006 | |
| JP | 2007-132676 | A | 5/2007 | |
| JP | 2008-123553 | A | 5/2008 | |
| JP | 2008-518330 | A | 5/2008 | |
| JP | 2009-51921 | A | 3/2009 | |
| JP | 2009-522666 | A | 6/2009 | |
| JP | 2009-151821 | A | 7/2009 | |
| JP | 2010-538394 | A | 12/2010 | |
| JP | 2013-211055 | A | 10/2013 | |
| KR | 2002-0010863 | | 2/2002 | |
| KR | 10-2006-0085850 | A | 7/2006 | |
| WO | WO 99/28815 | A1 | 6/1999 | |
| WO | WO 99/38149 | A1 | 7/1999 | G09G 5/00 |
| WO | 99/54807 | A1 | 10/1999 | |
| WO | WO 00/08757 | A | 2/2000 | H03J 1/00 |
| WO | WO 01/16690 | A2 | 3/2001 | G06F 3/033 |
| WO | WO 01/57716 | A2 | 8/2001 | G06F 17/00 |
| WO | WO 02/08881 | A2 | 1/2002 | |
| WO | WO 02/13176 | A2 | 2/2002 | |
| WO | 02/46903 | A1 | 6/2002 | |
| WO | 02/082418 | A2 | 10/2002 | |
| WO | 02/093542 | A1 | 11/2002 | |

(56) References Cited

FOREIGN PATENT DOCUMENTS

| | | | |
|---|---|---|---|
| WO | 03/052626 A1 | 6/2003 | |
| WO | 03/060622 A2 | 7/2003 | |
| WO | WO 03/107168 A1 | 12/2003 | ............. G06F 3/023 |
| WO | 2004/021166 A1 | 3/2004 | |
| WO | 2004/040481 A1 | 5/2004 | |
| WO | WO 2004/063862 A2 | 7/2004 | |
| WO | 2005/036416 A2 | 4/2005 | |
| WO | WO 2005/041020 | 5/2005 | ............. G06F 3/033 |
| WO | 2005/074268 A1 | 8/2005 | |
| WO | 2005/106684 A1 | 11/2005 | |
| WO | 2006/003591 A2 | 1/2006 | |
| WO | WO 2006/019639 | 2/2006 | |
| WO | WO 2006/020304 A2 | 2/2006 | |
| WO | WO 2006/020305 A2 | 2/2006 | |
| WO | WO 2006/036069 A1 | 4/2006 | |
| WO | WO 2006/037545 A2 | 4/2006 | |
| WO | WO 2007/031816 A1 | 3/2007 | |
| WO | WO 2007/032972 A1 | 3/2007 | |
| WO | WO 2007/069835 A1 | 6/2007 | ............. G06F 3/041 |
| WO | 2007/080559 A2 | 7/2007 | |
| WO | WO 2007/094894 A2 | 8/2007 | |
| WO | 2008/030874 A1 | 3/2008 | |
| WO | 2008/030976 A2 | 3/2008 | |
| WO | 2008/086303 A1 | 7/2008 | |
| WO | 2009/089222 A2 | 7/2009 | |

OTHER PUBLICATIONS

Anonymous, "Asus Eee PC Easy Mode Internet Tab Options," asuseeehacks.blogspot.com, Nov. 10, 2007, 33 pages, http://asuseeehacks.blogspot.com/2007/11/asus-eee-pc-user-interface-tour.html.

Invitation to Pay Additional Fees dated Nov. 16, 2009, received in International Patent Application No. PCT/US2009/030225, which corresponds to U.S. Appl. No. 12/242,851.

Agarawala et al. "Database Compendex/EI," Engineering Information, Inc., Apr. 27, 2006, 1 page.

Agarawala et al., "Keepin' it Real: Pushing the Desktop Metaphor with Physics, Piles and the Pen," CHI Proceedings 2006, Apr. 22-27, 2006, Montréal, Québec, Canada, pp. 1283-1292.

Anonymous, "Desktop Icon Toy—History," Oct. 8, 2009, 2 pages, http://www.idesksoft.com/history.html.

Berka, J., "iFuntastic 3 Opens Up New iPhone Functionality," ars technica, Aug. 30, 2007, http://arstechnica.com/journals/apple.ars/2007/08/30/ifuntastic-3-opens-up-new-iphone-functionality.

Chartier, D., "iPhone 1.1.3 Video Brings the Proof," ars technica, Dec. 30, 2007, http://arstechnica.com/journals/apple.are/2007/12/30/iphone-1-1-3-video-brings-the-proof.

Domshlak, C., et al. "Preference-Based Configuration of Web Page Content," Proceedings of the 17th Int'l Joint Conf. on Artificial Intelligence (IJCAI), pp. 1451-1456, Seattle, WA.

Edwards, A., "iPhone 1.1.3 Firmware Feature Gallery," Gear Live, Dec. 28, 2007, http://www.gearlive.com/news/article/q407-iphone-113-firmware-feature-gallery/.

iPhone Dev Wiki, "IPhone Customization," http://iphone.fiveforty.net/wiki/index.php/Iphone_Customization.

iPhone Hacks, "iPhone Firmware 1.1.1: Multi-Page SpringBoard Hack," Oct. 10, 2007, 4 pages, http://www.iphonehacks.com/2007/10/springboardhack.html.

iPhone Hacks, "SummerBoard for iPhone OS v1.1.1: iPhone Hack Enables Scrolling of iPhone's Home Screen," http://www.iphonehacks.com/2007/10/summerboard-v3.html.

iPhone Info, "Modifying the iPhone SpringBoard," http://iphoneinfo.ca/modifying-the-iphone-springboard.

Jazzmutant, "Jazzmutant Lemur," printed Nov. 16, 2005, 3 pages, http://64.233.167.104/search?q=cache:3g4wFSaZiXIJ:www.nuloop.c.

Jazzmutant, "The Lemur: Multitouch Control Surface", printed Nov. 16, 2005, 3 pages http://64233.167.104/search?q=cache:j0_nEbNVzOcJ:www.cycling7.

Microsoft, "Right-Clicking with a Pen," microsoft.com, Nov. 7, 2002, 3 pages, http://www.microsoft.com/windowsxp/using/tabletpc/learnmore/rightclick.mspx.

MountFocus Information Systems, "An Onscreen Virtual Keyboard: touchscreen, kiosk and Windows compatible," printed Dec. 19, 2007, 3 pages, http://www.virtual-keyboard.com.

Sadun, E., "Erica's Documentation: Applications and Utilities for the iPhone and iPod Touch," Copyright 2007, http://ericasadun.com/ftp/Deprecated/Documentation/Manual-0.04.pdf.

Vrba, J., "iPhone Customizations and Applications," Ezine Articles, http://ezinearticles.com?iPhone-Customizations-and-Applications&id=815807&opt=print.

Wildarya, "iDesksoft Desktop Icon Toy v2.9," Oct. 16, 2007, 4 pages, http://www.d14all.com/2007/10/16/idesksoft_desktop_icon_toy_v2.9.html.

International Search Report and Written Opinion dated Feb. 25, 2010, received in International Application No. PCT/US2009/030225, which corresponds to U.S. Appl. No. 12/242,851.

Office Action dated Sep. 14, 2009, received in Australian Patent Application 2009100812, which corresponds to U.S. Appl. No. 11/459,602.

Office Action dated Sep. 14, 2009, received in Australian Patent Application No. 2009100813, which corresponds to U.S. Appl. No. 11/459,602.

Office Action dated Dec. 10, 2009, received in Canadian Application No. 2,633,759, which corresponds to U.S. Appl. No. 11/459,602.

Office Action dated Oct. 27, 2009, received in German Patent Application No. 11 2006 003 600.9, which corresponds to U.S. Appl. No. 11/459,602.

Office Action dated Oct. 13, 2008, received in European Application No. 06 846 840.4, which corresponds to U.S. Appl. No. 11/459,602.

Thomas et al., "Applying Cartoon Animation Techniques to Graphical User Interfaces," ACM Transactions on Computer-Human Interaction, vol. 8, No. 3, Sep. 2001, pp. 198-222.

tuaw.com, "Springboard Scrolling," new page dot feature, Oct. 9, 2007, http://www.tuaw.com/gallery/springboard-scrolling/431347/.

tuaw.com, "Springboard Scrolling," mid-scroll, Oct. 9, 2007, http://www.tuaw.com/photos/springboard-scrolling/731348/.

tuaw.com. "Springboard Scrolling," mostly unpopulated page, Oct. 9, 2007. http://www.tuaw.com/photos/springboard-scrolling/431349/.

tuaw.com, "TUAW Hack: Mess with Your iPhone Settings," Dec. 18, 2007, http://www/tuaw.com/tag/SpringBoard/.

tuaw.com, "1.1.1 iPhone Multipage Springboard Hack," posted Oct. 9, 2007, http://www.tuaw.com/2007/10/09/1-1-1-iphone-multipage-springboard-hack/.

International Preliminary Report on Patentability dated Jul. 15, 2010, received in International Application No. PCT/US2009/030225, which corresponds to U.S. Appl. No. 12/242,851.

International Preliminary Report on Patentability dated Mar. 18, 2010, received in International Application No. PCT/US2008/074625, which corresponds to U.S. Appl. No. 11/849,938, 7 pages.

Office Action dated Mar. 30, 2010, received in Chinese Application for Invention No. 200680053441.1, which corresponds to U.S. Appl. No. 11/459,602, 5 pages.

Examiner's Report dated Apr. 20, 2010, received in Australian Patent Application No. 2009204252, which corresponds to U.S. Appl. No. 12/242,851.

Final Office Action dated May 5, 2010, received in U.S. Appl. No. 12/364,470.

Office Action dated Aug. 11, 2010, received in U.S. Appl. No. 11/850,011.

Andrew's Widgets, "Developing Dashboard Widgets—What the Heck is a Widget," http://andrew.hedges.name/widgets/dev/, printed Jan. 25, 2008, 9 pages.

Designing Interfaces.com, "Animated Transition," http://designinginterfaces.com/Animated_Transition, printed Oct. 16, 2006, 2 pages.

Apple.com, "Tiger Developer Overview Series—Developing Dashboard Widgets," http://developer.apple.com/macosx/dashboard.html, printed Jun. 23, 2006, 9 pages.

(56) References Cited

OTHER PUBLICATIONS

Apple Computer, Inc., "Dashboard Tutorial," Apple Computer, Inc. © 2004,2006, 24 pages.

Hesseldahl, A., "An App the Mac can Brag About," Forbes.com, http://www.forbes.com/2003/12/15/cx_ah_1215tentech_print.html, Dec. 15, 2003, 2 pages.

Mello, Jr., J.,"Tiger's Dashboard Brings Widgets to New Dimension," http://www.nacnewsworld.com/story/42630.html, Mac New World, printed Jun. 23, 2006, 3 pages.

International Search Report and Written Opinion for International Application No. PCT/US2007/077643, dated May 8, 2008.

International Search Report and Written Opinion for International Application No. PCT/US2008/050431, dated Jun. 17, 2008.

CNET, "Video: Create custom widgets with Web Clip," CNET News, Aug. 8, 2006, 3 pages, http://news.cnet.com/1606-2-6103525.html.

FondantFancies, "Dash Clipping: Don't wait for Mac OS X 10.5 Leopard," fondantfancies.com, Aug. 8, 2006, 9 pages, http://www.fondantfancies.com/blog/3001239/.

Macworld, "Whip up a widget," Macworld.com., Sep. 23, 2005, 5 pages, http://www.macworld.com/artiele/46622/2005/09/octgeekfactor.html.

Macworld, "First Look: Leopard first looks: Dashboard," Aug. 9, 2006, 3 pages, http://www.macworld.com/article/52297/2005/08/leodash.html.

Opera Software, "Welcome to Widgetize," Copyright © 2006 Opera Software ASA, 1 page, http://widgets.opera.com/widgetize.

Examiner's Report dated Apr. 2, 2009, received in the Canadian patent application which corresponds to U.S. Appl. No. 11/459,602.

Office Action dated Aug. 12, 2010, received in Canadian Application No. 2633759, which corresponds to U.S. Appl. No. 11/459,602.

Office Action dated Sep. 2, 2010, received in U.S. Appl. No. 12/364,470.

Office Action dated Oct. 12, 2010, received in U.S. Appl. No. 11/849,938.

Office Action dated Oct. 15, 2010, received in European Application No. 08 829 660.3, which corresponds to U.S. Appl. No. 11/849,938.

Final Office Action dated Oct. 19, 2011, received in U.S. Appl. No. 12/364,470 (van Os).

Final Office Action dated Jul. 14, 2011, received in U.S. Appl. No. 11/969,809.

Office Action dated Jun. 10, 2011, received in European Patent Application No. 09 700 333.9, which corresponds to U.S. Appl. No. 12/242,851.

Office Action dated Aug. 24, 2011, received in Chinese Patent Application No. 200880112570.2, which corresponds to U.S. Appl. No. 11/849,938.

Office Action dated Aug. 8, 2011, received in Korean Patent Application No. 10-2010-7007258, which corresponds to U.S. Appl. No. 11/849,938.

Invitation to Pay Additional Fees dated Jun. 27, 2008, received in International Application No. PCT/US2008/050430, which corresponds to U.S. Appl. No. 11/969,809.

International Search Report and Written Opinion dated Sep. 1, 2008, received in International Application No. PCT/US2008/050430, which corresponds to U.S. Appl. No. 11/969,809.

Final Office Action dated Dec. 1, 2010, received in U.S. Appl. No. 11/850,011.

Notice of Allowance dated Feb. 18, 2011, received in U.S. Appl. No. 11/850,011.

Office Action dated Mar. 4, 2011, received in European Application No. 07 814 689.1, which corresponds to U.S. Appl. No. 11/850,638.

Office Action dated Mar. 14, 2011, received in U.S. Appl. No. 11/969,809.

Office Action dated Apr. 13, 2011, received in U.S. Appl. No. 11/969,912.

Office Action dated Apr. 15, 2011, received in U.S. Appl. No. 12/242,851.

Examiner's Report dated May 18, 2011, received in Australian Patent Application No. 2009204252, which corresponds to U.S. Appl. No. 12/242,851.

Office Action dated Nov. 26, 2010, received in European Patent Application No. 09 700 333.9, which corresponds to U.S. Appl. No. 12/242,851.

Office Action dated Nov. 13, 2009 received in U.S. Appl. No. 12/364,470.

Office Action dated Mar. 4, 2011, received in U.S. Appl. No. 12/364,470.

Final Office Action dated May 27, 2011, received in U.S. Appl. No. 11/849,938.

Office Action dated Oct. 29, 2010, received in Australian Patent Application No. 2008296445, which corresponds to U.S. Appl. No. 11/849,938.

Chang et al., "Animation: From Cartoons to the User Interface," UIST '93 Conference Proceedings, Atlanta, GA, Nov. 1993, 12 pages.

Apple, "Welcome to Tiger," copyright © 2005 Apple Computer, Inc., 32 pages, http://manuals.info.apple.com/en/Welcome_to_Mac_OS_X_v10.4_Tiger.pdf.

Delltech, "Working with Graphics," Windows XP: The Complete Reference, Chapter 18, Apr. 5, 2005, 4 pages.

Dodge et al., "Microsoft Office Excel 2003 Office Manual," Microsoft Press, Jul. 12, 2004, vol. 1, p. 66-68, Unable to Locate English Translation.

Widgipedia, "I Need a Bog and a Forum Please?" 2 pages, printed Oct. 19, 2006, http://www.widgipedia.com/widgets/details/adni18/hyalo-weather_27.html.

International Search Report and Written Opinion dated Jul. 8, 2008 for International Application No. PCT/US2007/077639, which corresponds to U.S. Appl. No. 11/850,010, 11 pages (Omernick).

International Search Report and Written Opinion dated Nov. 27, 2009, received in International Application No. PCT/US2008/074341, which corresponds to U.S. Appl. No. 11/850,005, 25 pages (Chaudhri).

Office Action dated May 2, 2011, received in U.S. Appl. No. 11/850,010, 12 pages (Omernick).

Final Office Action dated Oct. 17, 2011, received in U.S. Appl. No. 11/850,010, 11 pages (Omernick).

Office Action dated May 16, 2012, received in U.S. Appl. No. 11/850,010, 12 pages (Omenick).

Office Action dated Jan. 18, 2012, received in Chinese Patent Application No. 200780041309.3, which corresponds to U.S. Appl. No. 11/850,011, 15 pages (Forstall).

Summons to attend oral proceedings dated Dec. 1, 2011, received in European Patent Application No. 07814689.1, which corresponds to U.S. Appl. No. 11/850,011, 6 pages (Forstall).

Final Office Action dated Oct. 31, 2011, received in U.S. Appl. No. 11/969,912, 14 pages (Lemay).

Final Office Action dated Dec. 12, 2011, received in U.S. Appl. No. 12/242,851, 17 pages (Herz).

Notification of Acceptance dated Oct. 17, 2011, received in Australian Patent Application No. 2009204252, which corresponds to U.S. Appl. No. 12/242,851, 3 pages (Herz).

Office Action dated Oct. 21, 2011, received in Australian Patent Application No. 2011101194, which corresponds to U.S. Appl. No. 12/242,851, 2 pages (Herz).

Certification of Australian Innovation Patent No. 2011101194 dated Mar. 2, 2012, which corresponds to U.S. Appl. No. 12/242,851, 4 pages (Herz).

Office Action dated Nov. 30, 2011, received in Chinese Patent Application No. 200980000229.2, which corresponds to U.S. Appl. No. 12/242,851, 24 pages (Herz).

Office Action dated Dec. 14, 2011, received in U.S. Appl. No. 11/849,938, 30 pages (Chaudhri).

Notice of Acceptance dated Dec. 14, 2011, received in Australian Patent Application No. 2008296445, which corresponds to U.S. Appl. No. 11/849,938, 3 pages (Chaudhri).

Office Action dated Feb. 13, 2012, received in Japanese Patent Application No. 2010-524102, which corresponds to U.S. Appl. No. 11/849,938, 2 pages (Chaudhri).

Apple, iPhone User's Guide, Jun. 2007, Apple Inc., 137 pages.

(56) References Cited

OTHER PUBLICATIONS

Cerulean Studios, "Trillian Online User Manual," 2006, http://www.ceruleanstudios.com/support/manual.php?hchap=4&hsub=1&hsect=5.
CNET, "bounding box," cnet.com, downloaded Dec. 29, 2008, 1 page, http://www.cnet.com/Resources/Info/Glossary/Terms/boundingbox.html.
Dearman et al., "Rendezvousing with Location-Aware Devices: Enhancing Social Coordination," Interacting with Computers, vol. 17, Issue 5, Sep. 2005, http://www.dgp.toronto.edu/~dearman/publications/dearman_IWC05.pdf, pp. 542-566.
Emesene forum, "Autocomplete plugin," Jun. 20, 2008, http://emeseme.org/smf/index.php?topic=1276.0, 5 pages.
Foxit, "Foxit Reader v. 1.3 Feature Description," Foxit Software Company, 2008, http://www.foxitsoftware.com/pdf/reader_2/verhistory.htm, 4 pages.
InfoWorld, "Two Geeks and an iPhone: Part 3," InfoWorld Video, Dec. 18, 2007, http://web.archive.org/web/20080124065641/http://www.infoworld.com/video/Interviews/Mobile-Tech-Apple-iPhone/Two-Geeks-and-an-iPhone-Part-3/video_1966.html, 2 pages.
PocketGear.com, "Software Keyboards: Effy-Japanese (Eng/Jp) 4.0," updated Sep. 23, 2008, http://classic.pocketgear.com/software_detail.asp?id=9115.
Potter, "Graffiti Smilies," PalmInfocenter Forums, Feb. 9, 2003, 6 pages, 2005, http://www.palminfocenter.com/forum/viewtopic.php?t=11307.
Sadun, E., "Found Footage: Scrolling iPhone dock smashes through 16-icon home screen limit," TUAW, Aug. 30, 2007, http://www.tuaw.com/2007/08/30/found-footage-scrolling-iphone-dock-smashes-through-16-icon-hom/, 3 pages.
Sharewareconnection, "Handy Animated Emoticons," Jul. 2007, http://www.sharewareconnection.com/handy-animated-emoticons.htm, 3 pages.
YouTube, "SummerBoard 3.0a9 for iPhone," 4:50 minute video uploaded to YouTube Oct. 21, 2007, by AppleiPhoneSchool, http://www.youtube.com/watch?v=s_P_9mrZTKs, 2 pages.
Office Action dated Oct. 24, 2013, received in U.S. Appl. No. 11/850,010, 19 pages (Omernick).
Examination Report dated Nov. 28, 2013, received in Australian Patent Application No. 2009204252, which corresponds to U.S. Appl. No. 12/242,851, 7 pages (Herz).
Office Action dated Nov. 19, 2013, received in Australian Patent Application No. 2012200475, which corresponds to U.S. Appl. No. 12/242,851, 4 pages (Herz).
Office Action dated Oct. 8, 2013, received in European Patent Application No. 12 194 312.0, which corresponds to U.S. Appl. No. 12/242,851, 5 pages (Herz).
Office Action dated Oct. 8, 2013, received in European Patent Application No. 12 194 315.3, which corresponds to U.S. Appl. No. 12/242,851, 5 pages. (Herz).
Office Action dated Aug. 26, 2011, received in U.S. Appl. No. 12/274,346 (Moore).
Final Office Action dated Mar. 14, 2012, received in U.S. Appl. No. 12/274,346, 49 pages (Moore).
Notice of Allowance dated Mar. 12, 2013, received in U.S. Appl. No. 12/274,346, 19 pages (Moore).
Notice of Allowance dated Jul. 17, 2013, received in U.S. Appl. No. 12/274,346, 12 pages (Moore).
Office Action dated Dec. 5, 2012, received in Chinese Patent Application No. 200980152822.9, which corresponds to U.S. Appl. No. 12/274,346, 10 pages (Moore).
Office Action dated Oct. 21, 2013, received in Chinese Patent Application No. 200980152822.9, which corresponds to U.S. Appl. No. 12/274,346, 2 pages (Moore).
Office Action dated Jan. 25, 2013, received in Japanese Patent Application No. 201153745.2, which corresponds to U.S. Appl. No. 12/274,346, 5 pages (Moore).
Grant of Application dated Jun. 14, 2013, received in Japanese Patent Application No. 2011-537452, which corresponds to U.S. Appl. No. 12/274,346, 4 pages (Moore).
Office Action dated Jan. 17, 2013, received in Korean Patent Application No. 10 2011 7014104, which corresponds to U.S. Appl. No. 12/274,346, 4 pages (Moore).
Notice of Allowance dated Aug. 29, 2013, received in Korean Patent Application No. 10 2011 7014104, which corresponds to U.S. Appl. No. 12/274,346, 2 pages (Moore).
Office Action dated Aug. 31, 2011, received in U.S. Appl. No. 12/365,887 (Moore).
Final Office Action dated Feb. 29, 2012, received in U.S. Appl. No. 12/365,887 (Moore).
Notice of Allowance dated May 23, 2012, received in U.S. Appl. No. 12/365,887, 5 pages (Moore).
Office Action dated Nov. 10, 2011, received in U.S. Appl. No. 12/365,888 (Moore).
Notice of Allowance dated Oct. 10, 2013, received in U.S. Appl. No. 11/849,938, 35 pages (Chaudhri).
Notice of Allowance dated Nov. 20, 2013, received in Korean Patent Application No. 2010 7007258, which corresponds to U.S. Appl. No. 11/849,938, 2 pages (Chaudhri).
Office Action dated Oct. 25, 2013, received in Korean Patent Application No. 2010 7007258, which corresponds to U.S. Appl. No. 11/849,938, 4 pages (Chaudhri).
Office Action dated Oct. 24, 2013, received in U.S. Appl. No. 11/850,005, 12 pages (Chaudhri).
Office Action received for Australian Patent Application No. 2012200475, dated Jun. 29, 2015, 3 pages.
Non-Final Office Action received for U.S. Appl. No. 14/261,112, dated Jul. 8, 2015, 29 pages.
Non-Final Office Action received for U.S. Appl. No. 12/242,851, dated Jun. 26, 2015, 33 pages.
ImageShack—Hosting, available at <http://img129.imageshack.us/mv.php?image=autocompleteemoticonprexw0.jpg>, Nov. 10, 2008, 1 page.
Smiley Conversion Table, available at <http://surf-style.us/manual3.htm>, Dec. 5, 2008, 8 pages.
Office Action received for European Patent Application No. 07814690.9, dated Jun. 21, 2010, 5 pages.
Office Action received for European Patent Application No. 07814690.9, dated Oct. 19, 2010, 8 pages.
Summons to Attend Oral Proceedings received for European Patent Application No. 07814690.9, dated Nov. 22, 2011, 4 pages.
Office Action received for European Patent Application No. 07841980.1, dated Feb. 23, 2012, 5 pages.
Summons to Attend Oral Proceedings received for European Patent Application No. 07841980.1, dated Sep. 28, 2012, 8 pages.
Office Action received for European Patent Application No. 07869929.5, dated Dec. 27, 2010, 6 pages.
Summons to Attend Oral Proceedings received for European Patent Application No. 07869929.5, dated Dec. 13, 2011, 6 pages.
Summons to Attend Oral Proceedings received for European Patent Application No. 07869929.5, dated Jan. 23, 2012, 1 page.
Communication received for European Patent Application No. 08798713.7, dated Apr. 28, 2010, 2 pages.
Office Action received for European Patent Application No. 08798713.7, dated Feb. 9, 2012, 7 pages.
Office Action received for European Patent Application No. 08798713.7, dated Jul. 29, 2014, 18 pages.
Office Action received for European Patent Application No. 08798713.7, dated Jun. 22, 2011, 10 pages.
Extended European Search Report (includes Partial European Search Report and European Search Opinion) received for European Patent Application No. 09170697.8, dated Apr. 28, 2010, 3 pages.
Office Action received for European Patent Application No. 09170697.8, dated Dec. 13, 2011, 4 pages.
Summons to attend oral proceedings received for European Application No. 09170697.8, dated Apr. 22, 2013, 6 pages.
Decision to Refusal received for European Patent Application No. 09171787.6, dated Dec. 14, 2011, 22 pages.
Extended European Search Report (includes Partial European Search Report and European Search Opinion) received for European Patent Application No. 09171787.6, dated Jan. 26, 2010, 6 pages.

(56) References Cited

OTHER PUBLICATIONS

Office Action received for European Patent Application No. 09171787.6, dated Jul. 12, 2011, 5 pages.
Office Action received for Taiwan Patent Application No. 097100075, dated Dec. 29, 2011, 5 pages (English Translation only).
Notice of Allowance received for Korean Patent Application No. 10-2009-7007064, dated Sep. 30, 2011, 2 pages (Official Copy only). (See Communication under 37 CFR § 1.98(a) (3)).
Notice of Allowance received for Korean Patent Application No. 10-2009-7007067, dated Dec. 1, 2011, 2 pages (Official Copy only). (See Communication under 37 § 1.98(a) (3)).
Office Action received for Korean Patent Application No. 10-2009-7007067, dated Aug. 30, 2011, 2 pages (English Translation only).
Office Action received for Korean Patent Application No. 10-2009-7007067, dated Nov. 12, 2010, 3 pages (English Translation only).
Notice of Allowance received for Korean Patent Application No. 10-2011-7019633, dated May 18, 2012, 2 pages (Official Copy only). (See Communication under 37 CFR § 1.98(a) (3)).
Notice of Allowance received for Korean Patent Application No. 10-2011-7026583, dated Apr. 29, 2015, 2 pages (Official Copy only). (See Communication under 37 CFR § 1.98(a) (3)).
Office Action received for Korean Patent Application No. 10-2011-7026583, dated Aug. 14, 2014, 6 pages (2 pages of English Translation and 4 pages of Official Copy).
Notice of Allowance received for Korean Patent Application No. 10-20147011273, dated Apr. 28, 2015, 2 pages (Official Copy only). (See Communication under 37 CFR § 1.98(a) (3)).
Office Action received for Korean Patent Application No. 10-2014-7011273, dated Aug. 14, 2014, 5 pages (2 pages of English Translation and 3 pages of Official Copy).
Final Office Action received for U.S. Appl. No. 11/620,647, dated Dec. 23, 2010, 21 pages.
Non-Final Office Action received for U.S. Appl. No. 11/620,647 dated Jun. 24, 2010, 19 pages.
Non-Final Office Action received for U.S. Appl. No. 11/620,647 dated Nov. 17, 2009, 20 pages.
Non-Final Office Action received for U.S. Appl. No. 11/620,647, dated Oct. 13, 2011, 23 pages.
Notice of Allowance received for U.S. Appl. No. 11/620,647 dated Mar. 2, 2012, 8 pages.
Notice of Allowance received for U.S. Appl. No. 11/849,938, dated Nov. 27, 2013, 2 pages.
Final Office Action received for U.S. Appl. No. 11/850,005, dated Jul. 8, 2011, 9 pages.
Final Office Action received for U.S. Appl. No. 11/850,005, dated May 22, 2014, 13 pages.
Non Final Office Action received for U.S. Appl. No. 11/850,005, dated May 29, 2015, 12 pages.
Non-Final Office Action received for U.S. Appl. No. 11/850,005, dated Mar. 18, 2011, 10 pages.
Non-Final Office Action received for U.S. Appl. No. 11/850,005, dated Nov. 10, 2011, 11 pages.
Final Office Action received for U.S. Appl. No. 11/850,008, dated Dec. 29, 2010, 14 pages.
Non-Final Office Action received for U.S. Appl. No. 11/850,008, dated Aug. 2, 2010, 14 pages.
Notice of Allowance received for U.S. Appl. No, 11/850,008, dated Mar. 11, 2011, 7 pages.
Final Office Action received for U.S. Appl. No. 11/850,010, dated Feb. 15, 2013, 12 pages.
Final Office Action received for U.S. Appl. No. 11/850,010, dated May 8, 2014, 11 pages.
Non Final Office Action received for U.S. Appl. No. 11/850,010, dated Dec. 17, 2014, 10 pages.
Non-Final Office Action received for U.S. Appl. No. 11/850,010, dated Jun. 25, 2015, 10 pages.
Notice of Allowance received for U.S. Appl. No. 11/850,011, dated Feb. 11, 2011, 5 pages.

Supplemental Notice of Allowance received for U.S. Appl. No. 11/850,011, dated Feb. 24, 2011, 6 pages.
Non-Final Office Action received for U.S. Appl. No. 11/850,013, dated Jun. 11, 2010, 32 pages.
Notice of Allowance received for U.S. Appl. No. 11/850,013, dated Oct. 20, 2010, 20 pages.
Final Office Action received for U.S. Appl. No. 11/850,638, dated May 15, 2012, 16 pages.
Final Office Action received for U.S. Appl. No. 11/850,638, dated Feb. 8, 2011, 14 pages.
Non-Final Office Action received for U.S. Appl. No. 11/850,638, dated Oct. 26, 2010, 17 pages.
Non-Final Office Action received for U.S. Appl. No. 11/850,638, dated Jan. 17, 2012, 15 pages.
Final Office Action received for U.S. Appl. No. 11/961,773, dated Nov. 2, 2011, 12 pages.
Final Office Action received for U.S. Appl. No. 11/961,773, dated Nov. 29, 2012, 15 pages.
Non-Final Office Action received for U.S. Appl. No. 11/961,773, dated Apr. 15, 2011, 21 pages.
Non-Final Office Action received for U.S. Appl. No. 11/961,773, dated May 10, 2012, 14 pages.
Notice of Allowance received for U.S. Appl. No. 11/969,912, dated Jun. 11, 2014, 4 pages.
Notice of Allowance received for U.S. Appl. No. 11/969,912, dated Mar. 6, 2014, 12 pages.
Office Action received from German Patent Application No. 112006003600.9, dated Aug. 9, 2011, 4 pages (English Translation only).
Office Action received for German Patent Application No. 112007002107.1, dated Jun. 7, 2010, 3 pages (English Translation only).
Advisory Action received for U.S. Appl. No. 12/242,851, dated Nov. 15, 2013, 4 pages.
Non-Final Office Action received for U.S. Appl. No. 12/242,851, dated Oct. 6, 2014, 27 pages.
Non-Final Office Action received for U.S. Appl. No. 12/981,433, dated Oct. 11, 2012, 29 pages.
Extended European Search Report (includes Partial European Search Report and European Search Opinion) received for European Patent Application No. 12169786.6, dated Jul. 11, 2012, 10 pages.
Office Action received for European Patent Application No. 12194312.0, dated Jan. 13, 2014, 4 pages.
Office Action received for European Patent Application No. 12194315.3, dated Jan. 13, 2014, 4 pages.
Non-Final Office Action received for U.S. Appl. No. 13/155,304, dated Sep. 5, 2012, 11 pages.
Extended European Search Report (includes Partial European Search Report and European Search Opinion) received for European Patent Application No. 13174706.5, dated Jan. 8, 2015, 8 pages.
Non Final Office Action received for U.S. Appl. No. 14/142,640, dated Jun. 5, 2015, 29 pages.
Final Office Action received for U.S. Appl. No. 14/261,112, dated Oct. 9, 2014, 29 pages.
Non-Final Office Action received for U.S. Appl. No. 14/261,112, dated Jun. 18, 2014, 25 pages.
Office Action received for Canadian Patent Application No, 2,633,759, dated Aug. 12, 2010, 8 pages.
Notice of Allowance received for Canadian Patent Application No. 2,633,759, dated Sep. 9, 2013, 1 page.
Office Action received from Canadian Patent Application o. 2,633,759, dated Apr. 18, 2013, 2 pages.
Notice of Allowance received for Canadian Patent Application No. 2,845,297, dated Nov. 10, 2014, 1 page.
Office Action received for Canadian Patent Application No. 2,845,297, dated Apr. 23, 2014, 2 pages.
Office Action received for Chinese Patent Application No. 200680053441.1, dated Nov. 12, 2010, 4 pages (English Translation only).

(56) References Cited

OTHER PUBLICATIONS

Grant for Invention Patent Received in Chinese Patent Application No. 200680053441.1, dated Jan. 28, 2011, 1 page (Official Copy only). (See Communication under 37 CFR § 1.98(a) (3)).
Office Action received for Australian Patent Application No. 2007289019, dated Jul. 2. 2009, 3 pages.
Office Action received for Australian Patent Application No. 2007289019, dated Oct. 7, 2009, 2 pages.
Notice of Acceptance received for Australian Patent Application No. 2007292383, dated Jan. 4, 2012, 3 pages.
Office Action received for Australian Patent Application No. 2007292383, dated Dec. 22, 2011, 2 pages.
Office Action received for Australian Patent Application No. 2007292383, dated Mar. 24, 2010, 2 pages.
Office Action received for Australian Patent Application No. 2007292383, dated May 12, 2011, 2 pages.
Decision to Grant received for Chinese Patent Application No. 200780001140.9, dated Feb. 3, 2012, 4 pages (2 pages of English Translation and 2 pages of Official copy).
Office Action received for Chinese Patent Application No. 200780001140.9, dated Jan. 15, 2010, 5 page (English Translation only).
Office Action received for Chinese Patent Application No. 200780001140.9, dated Jun. 10, 2011, 7 pages (English Translation only).
Office Action received for Chinese Patent Application No. 200780041222.6, dated Feb. 29, 2012, 6 pages (3 pages of English Translation and 3 pages of Official copy).
Office Action received for Chinese Patent Application No. 200780041222.6, dated Jul. 25, 2012, 3 pages (English Translation only).
Office Action received for Chinese Patent Application No. 200780041222.6, dated Oct. 13. 2010, 10 pages (English Translation only).
Office Action received for Chinese Patent Application No. 200780052019.9, dated Feb. 29, 2012, 6 pages (3 pages of English Translation and 3 pages of Official Copy).
Office Action received from Japanese Patent Application No. 2008-548858 dated May 30, 2011, 3 pages (English Translation only).
Office Action received from Japanese Patent Application No. 2008-548858, dated Jan. 20, 2012, 5 pages (English Translation only).
Office Action received for Chinese Patent Application No. 200880110709.X, dated Nov. 24, 2011, 10 pages (6 pages of English Translation and 4 pages of Official Copy).
Office Action received from Japanese Patent Application No. 2009-51921 dated Jan. 20, 2012, 5 pages (English Translation only).
Office Action received for Japanese Patent Application No. 2009-051921, dated May 31, 2013, 7 pages (3 pages of English Translation and 4 pages of Official Copy).
Office Action received from Japanese Patent Application No. 2009-051921, dated Jun. 27, 2011, 6 pages (English Translation only).
Office Action received from Japanese Patent Application No. 2009-051921, dated Sep. 24, 2012, 3 pages (English Translation only).
Office Action received for Australian Patent Application No. 2009100760, dated Sep. 28, 2009, 2 pages.
Intention to Grant received for Chinese Patent Application No. 200910173272.0, dated Oct. 23, 2012, 1 page (English Translation Only).
Office Action received from Chinese Patent Application No. 200910173272.0, dated Nov. 30, 2011, 8 pages (5 pages of English Translation and 3 pages of Official Copy).
Office Action received for Chinese Patent Application No. 200910175852.3, dated Apr. 24, 2012, 10 pages (6 pages of English Translation and 4 pages of Official Copy).
Office Action received for Chinese Patent Application No. 200910175852.3, dated Jun. 2, 2011, Jun. 2, 2011, 6 pages (English Translation only).
Office Action received for Australian Patent Application No. 2009204252, dated Sep. 16, 2014, 6 pages.
Response to Notice of Opposition filed for Australian Patent Application No. 2009204252, dated Apr. 28, 2014, 4 pages.
Office Action received for Japanese Patent Application No. 2009-527541, dated May 21, 2012, 3 pages (English Translation only).
Office Action received for Japanese Patent Application No. 2009-527541, dated Sep. 26, 2011, 3 pages (English Translation only).
Office Action received for Japanese Patent Application No. 2009-527566, dated Aug. 15, 2011, 3 pages (English Translation only).
Office Action received for Japanese Patent Application No. 2009-527566, dated Sep. 21, 2012, 3 pages (English Translation only).
Notice of Allowance received for Chinese Patent Application No. 200980000229.2, dated Oct. 24, 2014, 2 pages (Official Copy only). (See Communication under 37 CFR § 1.98(a) (3)).
Office Action received for Chinese Patent Application No. 200980000229.2, dated Jan. 6, 2014, 6 pages (3 pages of English Translation and 3 pages of Official Copy).
Office Action received for Chinese Patent Application No. 200980000229.2, dated Jun. 27, 2014, 7 pages (4 pages of English Translation and 3 pages of Official copy).
Notice of Acceptance received for Australian Patent Application No. 2010200763, dated Aug. 21, 2012, 1 page.
Office Action received for Australian Patent Application No. 2010200763, dated Jul. 28, 2011, 2 pages.
Certificate of Examination received for Australian Patent Application No. 2011101190, dated Nov. 23, 2011, 1 page.
Office Action received for Chinese Patent Application No. 201210399033.9, dated Nov. 27, 2014, 7 pages (Official Copy only). (See Communication under 37 CFR § 1.98(a) (3)).
Notice of Acceptance received for Australian Patent Application No. 2012202140, dated May 28, 2014, 2 pages.
Notice of Acceptance received for Australia Patent Application No. 2012261534, dated Jan. 6, 2015, 2 pages.
Office Action received for Australian Patent Application No. 2012261534, dated Dec. 3, 2013, 3 pages.
Office Action received for Japanese Patent Application No. 2013-011209, dated Feb. 7, 2014, 3 pages (Official copy only). (See Communication under 37 CFR § 1.98(a) (3)).
Office Action received for Japanese Patent Application No. 2013-011209, dated Oct. 27, 2014, 3 pages (Official Copy only). (See Communication under 37 CFR § 1.98(a) (3)).
Office Action received for Japanese Patent Application No. 2013-127963, dated Aug. 15, 2014, 8 pages (6 pages of English Translation and 2 pages of Official Copy).
Office Action received for Japanese Patent Application No. 2013-127963, dated Mar. 10, 2014, 7 pages (4 pages of English translation and 3 pages of Official copy).
Office Action received for Japanese Patent Application No. 2013-252338, dated Jan. 30, 2015, 4 pages (Official Copy only). (See Communication under 37 CFR § 1.98(a) (3)).
Patent Grant received for Japanese Patent Application No. 2008-548858, dated Sep. 24, 2012, 3 pages (Official Copy only). (See Communication under 37 CFR § 1.98(a) (3)).
Notice of Allowance received for Japanese Patent Application No. 2009-051921, dated Jan. 20, 2014, 2 pages (Official Copy only). (See Communication under 37 CFR § 1.98(a) (3)).
International Preliminary Report on Patentability received for PCT Patent Application No. PCT/US2006/062685, dated Jul. 1, 2008, 6 pages.
International Search Report and Written Opinion received for PCT Patent Application No. PCT/US2007/077838, dated Feb. 19, 2008, 9 pages.
International Preliminary Report on Patentability received for PCT Patent Application No. PCT/US2007/077839, dated Mar. 10, 2009, 6 pages.
International Preliminary Report on Patentability received for PCT Patent Application No. PCT/US2007/077843, dated Mar. 10, 2009, 7 pages.
International Search Report and Written Opinion received for PCT Patent Application No. PCT/US2007/077844, dated May 30, 2008, 18 pages.
Invitation to pay additional fees received for PCT Patent Application No. PCT/US2007/077644, dated Jan. 23, 2008, 10 pages.

(56) References Cited

OTHER PUBLICATIONS

International Search Report and Written Opinion received for PCT Patent Application No. PCT/US2007/077773, dated Jan. 15, 2008, 8 pages.
International Search Report and Written Opinion received for PCT Patent Application No. PCT/US2007/088879, dated Jun. 30, 2008, 8 pages.
International Search Report and Written Opinion received for PCT Patent Application No. PCT/US2007/088893, dated Jul. 11, 2008, 10 pages.
International Preliminary Report on Patentability received for PCT Patent Application No. PCT/US2008/050430, dated Jul. 7, 2009, 10 pages.
International Preliminary Report on Patentability received for PCT Patent Application No. PCT/US2008/050431, dated Jul. 7, 2009, 8 pages.
International Preliminary Report on Patentability received for PCT Patent Application No. PCT/US2008/074341, dated Mar. 9, 2010, 8 pages.
International Search Report and Written Opinion received for PCT Patent Application No. PCT/US2008/074625, dated Jan. 8, 2009, 8 pages.
Agarwal, Amit, "iTunesInlineVideo", Digital Inspiration—The Tech Guide, available online at <http://labnol.blogspot.com/2006_09_17_labnol_archive.html>, 2006, 27 pages.
Ahmad et al., "Content-Based Image Retrieval on Mobile Devices", Proceedings of SPIE-IS&T Electronic Imaging, vol. 5684, 2005, pp. 255-264.
Alam et al., "Web Document Manipulation for Small Screen Devices: A Review", Available at <http://www.csc.liv.ac.uk/~wda2003/Papers/Section_II/Paper_8.pdf>, 2003, pp. 33-36.
Alejandre, Suzanne, "Graphing Linear Equations", Available at <http://mathforum.org/alejandre/palm/times.palm.html>, retrieved on Jun. 12, 2006, 2006, 3 pages.
Apparao et al,, "Level 1 Document Object Model Specification", W3C Working Draft, available at <http://www.w3.org/TR/WD-DOM/>, Jul. 20, 1998, 3 pages.
Apple, "Iphone User Guide", iPhone first generation, Available at: <http://pocketpccentral.net/iphone/products/1g_iphone.htm> Retrieved on Sep. 25, 2013, Jun. 29, 2007, 124 pages.
Apple IPhone School, "Customize 1.19 Update for the iPhone", 4:02 minutes video, available at <http://www.youtube.com/watch?v=5ogDzOM89oc>, uploaded on Dec. 8, 2007, 2 pages.
Barsch, Bill, "3D Desktop! TouchScreen and XGL on Linux!", 2:42 minutes video, available at <http://www.youtube.com/watch?v=Yx9FgLr9oTk>, uploaded on Aug. 15, 2006, 2 pages.
Baudisch et al., "Collapse-to-Zoom: Viewing Web Pages on Small Screen Devices by Interactively Removing Irrelevant Content", Microsoft Research Available at <http://www.patrickbaudisch.com/publications/2004-Baudisch-UIST04-CollapseToZoom.pdf>, Oct. 27, 2004, 4 pages.
Bitstream, "ThunderHawk Pocket PC Edition for End Users", Available at <http://www.bitstream.com/wireless/products/pocketpc/faq_using.html>, retrieved on Jun. 12, 2006, 4 pages.
Blickenstorfer, Conrad H., "NeoNode N1 Can a Unique Interface Put this Compelling Smart Phone on the Map?", available at <http://pencomputing.com/WinCE/neonode-n1-review.html>, retrieved on Sep. 1, 2014, 5 pages.
Bos et al., "3 Conformance: Requirements and Recommendations", Cascading Style Sheets, level 2 CSS2 Specification, W3C Recommendation, available at <http://www.w3.org/TR/CSS21/conform.html#doctree>, May 12, 1998, 6 pages.
Buyukkokten et al., "Power Browser: Efficient Web Browsing for PDAs", Proceedings of the SIGCHI conference on Human Factors in Computing Systems, Dec. 27, 2000, 8 pages.
Chen et al., "A Novel Navigation and Transmission Technique for Mobile Handheld Devices", Technical Report CSE-2003-1, Department of Computer Science, University of California at Davis, 2003, 8 pages.
Chen et al., "Detecting Web Pages Structure for Adaptive Viewing on Small Form Factor Devices", Proceedings of the 12th international conference on World Wide Web, 2003, 9 pages.
Chen et al., "DRESS: A Slicing Tree Based Web Page Representation for Various Display Sizes", Microsoft Research, Technical Report, Nov. 16, 2002, 9 pages.
CNET, "Fujitsu LifeBook B6110D", Reviews, Nov. 24, 2005, 2 pages.
Cooper, Alan, "The Inmates Are Running the Asylum", Sams Publishing, Mar. 23, 1999, pp. 138-147.
Delltech, "Working with Graphics", Windows XP: The Complete Reference, Chapter 18, Apr. 5, 2005, 4 pages.
Elo, "Touchscreen User Manual, Elo Projected Capacitance Driver Software Version 1.00 (Serial)", Elo TouchSystems, Inc., Dec. 30, 2005, 37 pages.
Expansystv, "HTC Touch Dual Demonstration by eXpansys", 5:26 minutes video, available at <http://www.youtube.com/watch?v=Tupk8MYLhMk>, uploaded on Oct. 1, 2007, 2 pages.
Eyemodule Springboard Compatible, "Turn Your Handspring™ Visor™ Handheld into a Digital Camera", User's Manual, 2000, 9 pages.
Farber, Dan, "Jobs: Today Apple is Going to Reinvent The Phone", ZDNet, available at <http://www.zdnet.com/blog/btl/jobs-today-apple-is-going-to-reinvent-the-phone/4249>, Jan. 9, 2007, 3 pages.
Fingerworks Forums, "Is the Multitouch Lemur?", Available at <http://64233.167.104/search?q=cache:sjVdtyFBvRMJ:forums.finger>, retrieved on Nov. 16, 2005, Dec. 24, 2004, 2 pages.
Fingerworks, Inc., "Installation and Operation Guide for the TouchStream and TouchStream LP", available at <http://www.fingerworks.com>, 2002, pp. 1-25.
Fingerworks, Inc., "Quick Reference Guide for iGesture Products", available at <http://www.fingerworks.com>, 1999-2002, 2 pages.
Fingerworks, Inc., "Quick Reference Guide for TouchStream ST/LP", available at <http://www.fingerworks.com>, 2001-2003, 4 pages.
Fingerworks, Inc., "TouchStream LP Silver", available at <http://www.fingerworks.com>, Apr. 27, 2005, 18 pages.
Forsberg et al., "Aperture Based Selection for Immersive Virtual Environments", Proceedings of the ACM Symposium on User Interface Software and Technology, 1996, 2 pages.
Gears, Leigh, "Orange SPV C600 Review", Available at <http://www.coolsmartphone.com/article569.html>, retrieved on Apr. 14, 2006, 57 pages.
Getgreg, "Jeff Han's Multiple Touch Point Display, the Stuff Dreams are Made of", Available at <http://www.theyshoulddothat.com/2006/08/jeff_hanns_multiple_touch_poin.html>, retrieved on Aug. 16, 2006, Aug. 16, 2006, 2 pages.
GSM, Arena, "Neonode N2 User Interface", 3:06 minutes video, available at <https://www.youtube.com/watch?v=MfDMHmIZRLc>, uploaded on Feb. 13, 2007, 2 pages.
GSMARENA, Team, "HTC Touch Review: Smart to Touch the Spot", available at <http://www.gsmarena.com/htc_touch-review-189.php>, Nov. 28, 2007, 18 pages.
Guan et al., "Zoom Selector: A Pen-based Interaction Technique for Small Target Selection", Transactions of the Information Processing Society of Japan, vol. 45. No. 8, Aug. 2004, pp. 2087-2097.
Han, Jeff, "Unveiling the Genius of Multi-touch Interface Design", Ted Ideas Worth Spreading, available at <http://www.ted.com/index.php/talks/view/id/65>, Aug. 2006, 1 page.
Hart, Kim, "Rewriting the Web for Mobile Phones", washingtonpost.com, available at <http://www.washingtonpost.com/wp-dyn/content/article/2006/07/25/AR2006072501517_pf.html>, Jul. 26, 2006, 2 pages.
Hinckley et al., "Input/Output Devices and Interaction Techniques", CRC Press, Nov. 2004, pp. 1-79.
Holmquist, Lars Erik., "The Zoom Browser Showing Simultaneous Detail and Overview in Large Documents", Available at<http://www.hb.se/bhs/ith/3-98/leh.htm> retrieved Dec. 19, 2007, Human IT, 1998, pp. 1-12.
Joire, Myriam, "Neonode N1m Review", 9:55 minutes video, available at <http://www.youtube.com/watch?v=Tj-KS2kflr0>, uploaded on Jun 29, 2007, 3 pages.

(56) References Cited

OTHER PUBLICATIONS

Karlson et al., "AppLens and LaunchTile: Two Designs for One-Handed Thumb Use on Small Devices", CHI 2005, Papers: Small Devices 1, Apr. 2-7, 2005, pp. 201-210.
Karlson et al., "AppLens and LaunchTile: Two Designs for One-Handed Thumb Use on Small Devices", Powerpoint Presentation, CHI 2005, 17 pages.
Khella et al., "Pocket PhotoMesa: A Zoomable Image Browser for PDAs", Proceedings of the 3rd International Conference on Mobile and Ubiquitous Multimedia, available at <http://delivery.acm.org/10.1145/1060000/1052384/p19-khella.pdf?key1=1052384&key2=2419987911&coll=GUIDE&dl=GUIDE&CFID=47073625&CFTOKEN=65767142>, Oct. 29, 2004, pp. 19-24.
Kinoma, "Kinoma Player 4 EX Documentation", Available at <http://replay.waybackmachine.org/20061101175306/http://www.kinoma.com/index/pd-player-4>, archived on Nov. 1, 2006, Nov. 1, 2006, 28 pages.
Laakko et al., "Adapting Web Content to Mobile User Agents", IEEE Internet Computing, vol. 9, No. 2, Mar./Apr. 2005, pp. 46-53.
Landragin, Frederic, "The Role of Gesture in Multimodal Referring Actions", Proceedings of the 4th IEEE International Conference on Multimodal Interfaces, available at <http://ieeexplore.iee.org/ie15/8346/26309/01166988pdf?arnumber=1166988>, 2002, 6 pages.
Lie, Hakon Wium., "Cascading Style Sheets", University of Osloensis, MDCCCXI, 2005, pp. 243-247.
Microsoft Word, "Example of Scrolling Pages in Word 2003", 2003, 3 pages.
Milic-Frayling et al., "SmartView: Enhanced Document Viewer for Mobile Devices", Microsoft Technical Report, available at <ftp://ftp.research.microsoft.com/pub/tr/tr-2002-114.pdf>, retrieved on Dec. 17, 2007, Nov. 15, 2002, 9 pages.
Milic-Frayling et al,, "SmartView: Flexible Viewing of Web Page Contents", Proceedings of the Eleventh International World Wide Web Conference, available at <http://www2002.org/CDROM/poster/172/>, May 11, 2002, 4 pages.
Miller, Matthew, "HTC Touch and TouchFLO Interface", 7:53 minutes video, available at <http://www.youtube.com/watch?v=6oUp4wOcUc4>, uploaded on Jun 6, 2007, 2 pages.
Neonode Inc., "Welcome to the N1 Guide", available at <http://www.ebookspdf.com/gadget/2818/neonode-n1m-manual/>, Jul. 2004, pp. 1-42.
Neonode.com, "N1 Chick StartGuide", Version 0.5, Apr. 5, 2005, pp. 1-24.
NTT DOCOMO, "i-mode Compatible Pictograms", available at <http://www.nttdocomo.co.jp/english/service/imode/make/content/pictograph/index.html>, 2008, 2 pages.
O'Hara, "Absolute Beginner's Guide to Microsoft Window XP", 2003, One Publishing, 1 page.
Oliver, Dick, "Adding Multimedia to Your Web Site", Chapter 22, Web Publishing Professional Reference Edition, Available online at <http://www.ssuet.edu.pk/taimoor/books/1-57521-198-X/index.htm>, 1997, 14 pages.
Opera Software, "Download the Opera Mobile™ Browser", Available at <http://www.opera.com/products/mobile/products/>, retrieved on Oct. 19, 2006, 5 pages.
Opera Software, "Opera 7.60 for Series 60 Mobile", Available at <http://jp.opera.com/support/tutorials/s60/760/O760manual.pdf>, 2009, 14 pages.
Opera Software, "Opera 8.5 Beta 2 for Windows Mobile, Pocket PC", Available at <http://www.opera.com/products/mobile/products/winmobileppc>, retrieved on Apr. 5, 2006, 2 pages.
Opera Software, "Opera 8.5 for S60 Phones—Get the Full Internet Experience on Your Mobile Phone", Available at <http://www.symbian-freak.com/news/1105/opera.htm>,, Oct. 14, 2005, 3 pages.
Opera Software, "Opera for Mobile, The Full Web Anytime, Anywhere", Available at <www.opera.com/mobile>, Jan. 2006, 7 pages.
Opera Software, "Opera for 560 Tutorial", Available at <http://www.xmarks.com/site/www.opera.com/support/tutorials/s60/>, retrieved on Apr. 5, 2006, 5 pages.
Opera Software, "Opera for Windows Mobile Smartphone 2003 Tutorial", Available at <http://www.opera.com/support/tutorials/winmobile>, retrieved on Apr. 5, 2005, 4 pages.
Opera Software, "The New Opera Browser for Series 60 Features Zoom and Password Manager", Press Releases Database, Available at <http://pressreleases.techwhack.com/1334/1411-opera-browser-features-zoom-and-password>, Nov. 14, 2005, 3 pages.
Palme et al., "MIME Encapsulation of Aggregate Documents, such as HTML", Network Working Group, 1999, 24 pages.
Palmone, "Your Mobile Manager", Chapter 2, LifeDrive™ User's Guide, available at <http://www.palm.com/us/support/handbooks/lifedrive/en/lifedrive_handbook.pdf>, 2005, 23 pages.
Park, Will, "Apple iPhone v1.1.1 SpringBoard Hacked to Display Multiple Pages", available at <http://www.intomobile.com/2007/10/09/apple-iphone-v111-springboard-hacked-to-display-multiple-pages/>, Oct. 9, 2007, 5 pages.
Park, Will, "Neonode N2 Unboxing Pics!", available at <http://www.intomobile.com/2007/07/18/neonode-n2-unboxing-pics/>, Jul. 18, 2007, 7 pages.
PCFAN, "Boot Camp Introduction/Data Transition/Operability/Ability Truth Derived from Gap Mac&Win Dual Boot Hard Verification", Daily Communications, vol. 13, No. 14, Jun. 15, 2006, p. 57 (Japanese Language only).
Raman et al., "Application-Specific Workload Shaping in Multimedia-Enabled Personal Mobile Devices", CODES+ISSS, Oct. 22-25, 2006, pp. 4-9.
Robie, Jonathan, "What is the Document Object Model?", Texcel Research, available at <http://www.w3.org/TR-DOM/introduction.html>, 2006, 5 pages.
Rohrer, Tim, "Metaphors We Compute by: Bringing Magic into Interface Design", Available online at <http://www.uoregon.edu/~uophil/metaphor/gui4web.htm>, retrieved on Jun. 13, 2006, 7 pages.
Roto et al., "Minimap—A Web Page Visualization Method for Mobile Phones", Proceedings of the SIGCHI Conference on Human Factors in Computing Systems, Apr. 22-27, 2006, pp. 35-44.
Salmre, I., "Characteristics of Mobile Applications", Chapter 2, Salmre_02.fm, Dec. 20, 2004, pp. 19-36.
Schreiner, Tony, "High DPI in IE: Tip & Mystery Solved", Tony Schreiner's Blog, available at <http://blogs.msdn.com/tonyschr/archive/2004/05/051126305.aspx>, May 2004, 2 pages.
Stampfli, Tracy, "Exploring Full-Screen Mode in Flash Player 9", Available online at <http://www.adobe.com/devnet/flashplayer/articles/full_screen_mode.html>, Nov. 14, 2006, 2 pages.
Stanek et al., "Video and Animation Plug-Ins", Chapter 9, Web Publishing Professional Reference Edition, available online at <http://www.ssuet.edu.pk/taimoor/books/1-57521-198-X/index.htm>, 1997, 18 pages.
Surfin'Safari, "XUL", Available online at <http://weblogs.mozillazine.org/hyatt.archives/2003_10.html>, Oct. 2003, 7 pages.
Tidwell, Jenifer, "Animated Transition", Designing Interfaces, Patterns for effective Interaction Design, First Edition, Nov. 2005, 4 pages.
Tooeasytoforget, "iPhone—Demo of SummerBoard & Its Features", 5:05 minutes video, available at <http://www.youtube.com/watch?v=CJOb3ftQLac>, uploaded on Sep. 24, 2007, 2 pages.
Tuaw.com, "1.1.1 iPhone Multi page Springboard Hack", Available at <http://www.tuaw.com/2007l0/09/1-1-1-iohone-multioaoe-sorinQ"board-hack/>, Oct. 9, 2007, 5 pages.
Versiontracker, "Photogather-7.2,6. Hi-res Image Viewer & Editor for Palm", Available online at <http://www.versiontracker.com/dyn/moreinfo/palm/4624>, retrieved on Jun. 12, 2006, 2006, 5 pages.
W3schools.com, "Playing Videos on the Web", Available online at <http://www.w3schools.com/media/media_browservideos.asp?out=print>, 2006, 3 pages.
W3schools.com, "Multimedia Video Formats", Available online at <http://www.w3sschools.com/media/media_videoformats.asp?output=print>, 2006, 2 pages.
W3schools.com, "Playing QuickTime Movies", Available online at <http://www.3schools.com/.media/media_quicktime.asp?output=print>, 2006, 2 pages.

(56) References Cited

OTHER PUBLICATIONS

Warabino et al., "Video Transcoding Proxy for 3Gwireless Mobile Internet Access", IEEE Communications Magazine, vol. 38, No. 10, Oct. 2000, pp. 66-71.
Wave Technologies, International Inc., "Certified Internet Webmaster Foundations Study Guide", A Thomson Learning Company, CIWF-SGMN-0101A, copyright 1988-2000, 88 pages.
Weblogs, "An Overview of WebCore", Chapter 2, WebCore Documentation, available at <http://1weblogs.mozillazine.org/hyatt/WebCore/chapter2.html>, 2006, 3 pages.
Weblogs, "Downloading and Building WebCore", Chapter 1, WebCore Documentation, available at <http://weblogs.mozillazine.org/hyatt/WebCore/chapter1.html>, 2006, 2 pages.
Webmasterworld.com, "Page Zooming with IE-Hidden Feature!", Available at <http://www.webmasterworld.com/forum83/4179.htm>, Jul. 2004, 7 pages.
Wikipedia, "Comparison of Layout Engines", The free encyclopedia, available at <http://en.wikipedia.org/wiki/Comparison_of_layout_engines>, 2006, 3 pages.
Wikipedia, "History of YouTube", The Free Encyclopedia, available at <http://en.wikipedia.org/wiki/History_of_YouTube>, retrieved on Mar. 15, 2011, 4 pages.
Wikipedia, "KDE", The free encyclopedia, available at <http://en.wikipedia.org/wiki/KDE>, 2006, 9 pages.
Wikipedia, "KHTML", The free encyclopedia, available at <http://en.wikipedia.org/wiki/KHTML>, 2006, 3 pages.
Wikipedia, "List of Layout Engines", The Free Encyclopedia, available at <http://en.wikipedia.org/wiki/List_of_layout_engines>, 2006, 1 page.
Williams, Martyn, "LG's Cell Phone Can Pause Live TV", PC World, Oct. 11, 2005, 2 pages.
Wobbrock et al., "WebThumb: Interaction Techniques for Small-Screen Browsers", UIST'02, Paris France, Oct. 27-30, 2002, pp. 205-208.
Xiao et al., "Slicing*—Tree Based Web Page Transformation for Small Displays", International Conference on Information and Knowledge Management, Oct. 31-Nov. 5, 2005, 2 pages.
Xie et al., "Efficient Browsing of Web Search Results on Mobile Devices Based on Block Importance Model", Microsoft Research Asia, 2005, 10 pages.
Yin et al., "Using Link Analysis to Improve Layout on Mobile Devices", Proceedings of the 13th international conference on World Wide Web, available at <http://www.iw3c2.org/WWW2004/docs/1p338.pdf>, May 17-22, 2004, pp. 338-344.
YouTube, "Broadcast Yourself", Available at <www.youtube.com>, Nov. 1, 2005, 2 pages.
YouTube, "Broadcasting Ourselves", The Official Youtube blog Available at <http://youtube-global.blogspot.in/2005_11_01_archive.html>, Nov. 15, 2005, 5 pages.
Zytronic, "Touchscreen User Manual Zytronic X-Y Controller (Serial and USB)", XP007916436, Nov. 17, 2006, pp. 1-51.
Office Action received for Australian Patent Application No. 2012200475, dated Aug. 4, 2015, 3 pages.
Office Action received for Australian Patent Application No. 2014204422, dated Aug. 7, 2015, 3 pages.
Notice of Allowance received for U.S. Appl. No. 14/011,639, dated Feb. 16, 2016, 5 pages.
Final Office Action received for U.S. Appl. No. 14/142,640, dated Mar. 8, 2016, 35 pages.
Final Office Action received for U.S. Appl. No. 14/261,112, dated Mar. 3, 2016, 31 pages.
Office Action Received for European Patent Application No. 12189764.9, dated Mar. 1, 2016, 6 pages.
Office Action received for Japanese Patent Application No. 2014-253365, dated Dec. 14, 2015, 6 pages (3 pages of English Translation and 3 pages Official Copy).
Shima et al., "From Basics of Development to Mashup/Hardware Interaction, a Road to "takumi" of Android Application-Development, Section I, Difference from Prior Platforms, Things Which Can Be Done With Android", Mar. 18, 2009, pp. 58-65 (See the communication filed under 37 CFR § 1.98(a) (3)).
Decision to refuse a European Patent application received for European Patent Application No. 06846840.4, dated Mar. 4, 2010, 10 pages.
Summons to Attend Oral proceedings received for European Patent Application No. 06846840.4, dated May 18, 2009, 7 pages.
Decision to Refuse Patent Application received for European Patent Application No. 07814689.1, dated May 11, 2012, 15 pages.
Decision to Refuse Application received for European Patent Application No. 09170697.8, dated Oct. 23, 2013, 12 pages.
Decision to Grant received for European Patent Application No. 09700333.9, dated Nov. 7, 2013, 2 pages.
Final Office Action received for U.S. Appl. No. 11/850,005, dated Nov. 16, 2015, 13 pages.
Notice of Allowance received for U.S. Appl. No. 14/011,639, dated Sep. 29, 2015, 11 pages.
Advisory Action received for U.S. Appl. No. 14/261,112, dated Apr. 23, 2015, 3 pages.
Office Action received for Chinese Patent Application No. 201210399033.9, dated Oct. 8, 2015, 8 pages (3 pages of English Translation and 5 pages of Official Copy).
Notice of Acceptance received for Australian Patent Application No. 2012200475, dated Aug. 24, 2015, 2 pages.
Office Action received for Japanese Patent Application No. 2013-011209, dated Nov. 2, 2015, 9 pages (2 pages of English Translation and 7 pages of Official Copy).
Notice of Allowance received for Japanese Patent Application No. 2013-127963, dated Oct. 9, 2015, 3 pages (1 page of English Translation and 2 pages of Official Copy).
Office Action received for Japanese Patent Application No. 2013-252338, dated Dec. 4, 2015, 4 pages (2 pages of English Translation and 2 pages of official copy).
Non-Final Office Action received for U.S. Appl. No. 14/710,125, dated Apr. 12, 2016, 12 pages.
Final Office Action received for U.S. Appl. No. 11/850,010, dated Apr. 18, 2016, 16 pages.
Cha, B., "HTC Touch (Sprint)," CNET Reviews, Nov. 6, 2007, http://web.archive.org/web/20071106065114/http://reviews.cnet.com/smartphones/htc-touch-sprint/4505-6452_7-3267123.html, 10 pages.
Gade. L., "HTC Touch (Sprint)—MobileTechReview," Smartphone Reviews by Mobile Tech Review, Nov. 2, 2007, http://www.mobiletechreview.com/phones/HTC-Touch.htm, 7 pages.
ISO 9241-10:1996 Ergonomic requirements for office work with visual display terminals (VDTs)—Part 10: Dialogue principles, International Standard—ISO, Zuerich, CH, vol. 9241-10, May 1, 1996 (May 1, 1995), 18 pages.
ISO 9241-11:1998 Ergonomic requirements for office work with visuai display terminals (VDTs)—Part 11: Guidance on usability, International Standard—ISO, Zuerich, CH, vol. 9241-11, Jan. 1, 1998 (Jan. 1, 1998), 28 pages.
ISO 9241-12:1998 Ergonomic requirements for office work with visual display terminals (VDTs)—Part 12: Presentation of Information, International Standard—ISO Zuerich, CH, vol. 9241-12, Dec. 1, 1998 (Dec. 1, 1998), 52 pages.
SnapFiles, "Dexpot," SnapFiles.com, Oct. 10, 2007, 3 pages.
Zhang et al., "An Ergonomics Study of Menu-Operation on Mobile Phone Interface" In Proceedings of the Workshop on Intelligent Information Technology Application, Dec. 2007, 5 pages.
Extended European Search Report dated Feb. 1, 2013, received in European Patent Application No. 12177813.8, which corresponds to U.S. Appl. No. 11/850,011, 6 pages (Forstall).
European Search Report dated Jan. 16, 2013, received in European Patent Application No. 12194312.0 which corresponds to U.S. Appl. No. 12/242,851, 8 pages (Herz).
European Search Report dated Jan. 16, 2013, received in European Patent Application No. 12194315.3, which corresponds to U.S. Appl. No. 12/242,851,7 pages (Herz).
European Search Report dated Dec. 18, 2012, received in European Patent Application No. 12189764.9 which corresponds to U.S. Appl. No. 11/849,938, 5 pages (Chaudhri).

(56) References Cited

OTHER PUBLICATIONS

Final Office Action dated Feb. 15, 2013, received in U.S. Appl. No. 11/850,010, 21 pages (Omernick).
Office Action dated Nov. 1, 2012, received in Chinese Patent Application No. 200750041309.3, which corresponds to U.S. Appl. No. 11/850,011, 5 pages (Forstall).
Office Action dated Jul. 2, 2013, received in Chinese Patent Application No. 200780041309.3, which corresponds to U.S. Appl. No. 11/850.011, 12 pages (Forstall).
Notice of Allowance dated Apr. 20, 2013, received in U.S. Appl. No. 11/969,809, 23 pages (Platzer).
Office Action dated Sep. 10, 2013, received in U.S. Appl. No. 11/964,912, 20 pages (Lemay).
Office Action dated Sep. 20, 2012, received in U.S. Appl. No. 12/242,851, 21 pages (Herz).
Final Office Action dated May 10, 2013, received in U.S. Appl. No. 12/242,851, 33 pages (Herz).
Office Action dated Oct. 26, 2012, received in Chinese Patent Application No. 200980000229.2, which corresponds to U.S. Appl. No. 12/242,851, 22 pages (Herz).
Office Action dated Jul. 2, 2013, received in Chinese Patent Application No. 200980000229.2, which corresponds to U.S. Appl. No. 12/242,851 4 pages (Herz).
Summons to oral proceedings dated Sep. 21, 2012, received in European Patent Application No. 09700333.9, which corresponds to U.S. Appl. No. 12/242,851, 4 pages (Herz).
Grant Notice dated Jun. 20, 2013, received in European Patent Application No. 09 700 333.9 which corresponds to U.S. Appl. No. 12/242,851, 7 pages (Herz).
Final Office Action dated Jan. 30, 2013, received in U.S. Appl. No. 11/849,938, 38 pages (Chaudhri).
Office Action dated Aug. 12, 2013, received in Australian Patent Application No. 2012202140, which corresponds to U.S. Appl. No. 11/849,938, 2 pages (Chaudhri).
Office Action dated Feb. 20, 2013, received in Chinese Patent Application, which corresponds to U.S. Appl. No. 11/849,938, 5 pages (Chaudhri).
Office Action dated Aug. 2, 2013, received in European Patent Application No. 08 829 660.3, which corresponds to U.S. Appl. No. 11/849,938, 7 pages (Chaudhri).
Office Action dated Oct. 26, 2012, received in Japanese Patent Application No. 2010-524102, which corresponds to U.S. Appl. No. 11/849,938, 4 pages (Chaudhri).
Decision to Grant dated May 31, 2013, received in Japanese Patent Application No. 2010-524102, which corresponds to U.S. Appl. No. 11/849,938, 3 pages (Chaudhri).
Office Action dated Jan. 30, 2013, received in Koran Patent Application No. 1020107007258, which corresponds to U.S. Appl. No. 11/849,938, 4 pages (Chaudhri).
Office Action dated Nov. 13, 2012, received in U.S. Appl. No. 13/104,903, 21 pages, (Forstall).
Notice of Allowance dated Apr. 29, 2013, received in U.S. Appl. No. 13/104,903, 8 pages (Forstall).
Office Action dated Feb. 20, 2013, received in U.S. Appl. No. 13/104,911, 25 pages (Forstall).
Notice of Allowance dated Jun. 10, 2013, received in U.S. Appl. No. 13/104,911, 6 pages (Forstall).
Final Office Action dated Sep. 14, 2012, received in U.S. Appl. No. 11/850,005, 22 pages (Chaudhri).
Decision to Grant dated Aug. 6, 2012, received in Chinese Patent Application No. 200880110709.X, which corresponds to U.S. Appl. No. 11/850,005, 2 pages (Chaudhri).
Summons to attend oral arguments dated Aug. 30, 2013, received in European Patent Application No. 08798713.7, which corresponds to U.S. Appl. No. 11/850,005, 15 pages (Chaudhri).

\* cited by examiner

7000

```
Display, on a touch screen display on a portable multifunction device, an
icon for a web-clip widget. The web-clip widget corresponds to a user-
specified area of a web page 7002

Display the icon in a menu or list of icons 7004

The user-specified area was previously selected by translating and
    scaling a displayed portion of the web page 7006

The user-specified area was previously selected by centering and
    enlarging a displayed portion of the web page 7008
```

Detect an activation of the icon 7010

Detect a finger gesture (e.g., a tap gesture) on the icon 7012

In response to detecting activation of the icon, display the user-specified area of the web page 7014

On a touch screen display on a portable multifunction device, display a first set of a first plurality of application launch icons in a first area on the touch screen display. The first plurality of application launch icons includes a plurality of sets of application launch icons that are separately displayed in the first area of the touch screen display. 1602

Display a second plurality of application launch icons in a second area on the touch screen display. The second area is different from the first area. 1604

In response to detecting a first finger gesture on the touch screen display in the first area, replace display of the first set of the first plurality of application launch icons with display of a second set of the first plurality of application launch icons in the first area on the touch screen display while maintaining the display of the second plurality of application launch icons in the second area on the touch screen display. 1606

In response to detecting activation of any respective application launch icon in the plurality of application launch icons, display a first animation of a transition from display of application launch icons to display of an application that corresponds to the activated application launch icon. The first animation expands an image of the application. 1608

> The first animation expands the image of the application from a point on the display screen (e.g., a point at or near the center of the touch screen display). 1610

> The first animation slides respective application launch icons off of the touch screen display via respective corners of the touch screen display. 1612

Detect a finishing gesture. 1614

In response to detecting the finishing gesture, display a second animation of a transition from display of the application to display of application launch icons. The second animation shrinks the displayed image of the application. 1616

> The second animation shrinks the image of the application to a point on the display screen (e.g., a point at or near the center of the touch screen display). 1618

> The second animation slides respective application launch icons onto the touch screen display from respective corners of the touch screen display. 1620

On a touch screen display on a portable multifunction device, display a home menu comprising a plurality of application launch icons. 1624

Detect activation of any respective application launch icon. 1626

Detect a finger gesture (e.g., a tap gesture) on the respective application launch icon. 1628

In response to detecting the activation, display a first animation of a transition from display of the home menu to display of an application that corresponds to the activated application launch icon. The first animation expands an image of the application. 1630

The first animation slides respective application launch icons off of the touch screen display via respective corners of the touch screen display. 1632

Detect a finishing gesture. 1634

Detect a gesture on a button or touchpad. 1636

Detect a finger gesture on an icon in the application. 1638

In response to detecting the finishing gesture, display a second animation of a transition from display of the application to display of the home menu. The second animation shrinks the displayed image of the application. 1640

The second animation slides respective application launch icons onto the touch screen display from respective corners of the touch screen display. 1642

On a touch screen display on a portable multifunction device, display a first user interface including a group of items. 1646

The group of items includes titles of the items. 1648

Detect a gesture to select an item in the group. 1650

Detect a finger gesture (e.g., a tap gesture) on the item. 1652

In response to detecting the gesture, display a first animation of a transition from display of the first user interface to display of a second user interface corresponding to the selected item. The first animation slides the second user interface onto the touch screen display from a first side of the display. 1654

The first animation slides the first user interface off of a second side of the touch screen display. 1656

The second side is opposite to the first side. 1658

The first animation slides a header including the title of the selected item onto the touch screen display. 1660

Detect a finishing gesture on an icon in the second user interface. 1662

Detect a finger gesture (e.g., a tap gesture) on the icon. 1664

In response to detecting the finishing gesture, display a second animation of a transition from display of the second user interface to display of the first user interface. The second animation slides the second user interface onto the touch screen display. 1666

The second animation slides the second user interface onto the touch screen display from a second side opposite to the first side. 1668

USING GESTURES TO SLIDE BETWEEN USER INTERFACES

RELATED APPLICATIONS

This application claims priority to U.S. Provisional Patent Application Nos.: 61/019,841, "Portable Multifunction Device with Animated User Interface Transitions," filed Jan. 8, 2008; 61/010,208, "Portable Multifunction Device with Interface Reconfiguration Mode," filed Jan. 6, 2008; 60/937,993, and "Portable Multifunction Device," filed Jun. 29, 2007. All of these applications are incorporated by reference herein in their entirety.

This application is related to the following applications: (1) U.S. patent application Ser. No. 10/188,182, "Touch Pad For Handheld Device," filed on Jul. 1, 2002; (2) U.S. patent application Ser. No. 10/722,948, "Touch Pad For Handheld Device," filed on Nov. 25, 2003; (3) U.S. patent application Ser. No. 10/643,256, "Movable Touch Pad With Added Functionality," filed on Aug. 18, 2003; (4) U.S. patent application Ser. No. 10/654,108, "Ambidextrous Mouse," filed on Sep. 2, 2003; (5) U.S. patent application Ser. No. 10/840,862, "Multipoint Touchscreen," filed on May 6, 2004; (6) U.S. patent application Ser. No. 10/903,964, "Gestures For Touch Sensitive Input Devices," filed on Jul. 30, 2004; (7) U.S. patent application Ser. No. 11/038,590, "Mode-Based Graphical User Interfaces For Touch Sensitive Input Devices" filed on Jan. 18, 2005; (8) U.S. patent application Ser. No. 11/057,050, "Display Actuator," filed on Feb. 11, 2005; (9) U.S. patent application Ser. No. 11/367,749, "Multi-Functional Hand-Held Device," filed Mar. 3, 2006; (10) U.S. patent application Ser. No. 11/850,011, "Web Clip Widgets on a Portable Multifunction Device," filed Sep. 4, 2007; (11) U.S. patent application Ser. No. 11/969,912, "Web-Clip Widgets on a Portable Multifunction Device," filed Jan. 6, 2008; (12) U.S. patent application Ser. No. 11/459,602, "Portable Electronic Device with Interface Reconfiguration Mode," filed Jul. 24, 2006; and (13) U.S. patent application Ser. No. 12/101,832, "Touch Screen Device, Method, and Graphical User Interface for Determining Commands by Applying Heuristics," filed Apr. 11, 2008. All of these applications are incorporated by reference herein in their entirety.

TECHNICAL FIELD

The disclosed embodiments relate generally to portable electronic devices, and more particularly, to animating user interface transitions on portable multifunction devices with touch-sensitive displays.

BACKGROUND

As portable electronic devices become more compact, and the number of functions performed by a given device increases, it has become a significant challenge to design a user interface that allows users to easily interact with a multifunction device. This challenge is particularly significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of pushbuttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

In addition, a user may get lost in the myriad of user interfaces that are displayed on a multifunction device. It may be difficult for a user to follow the changes between the various interfaces, both changes between applications and changes within a particular application. Abrupt changes between user interfaces may be particularly jarring and confusing to a user, there by making the device difficult to use and frustrating the user.

Accordingly, there is a need for more transparent and intuitive user interfaces for portable devices that enable a user to easily navigate the user interfaces that are displayed on a multifunction device.

SUMMARY

The above deficiencies and other problems associated with user interfaces for portable devices are reduced or eliminated by the disclosed portable multifunction device. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include telephoning, video conferencing, e-mailing, instant messaging, blogging, digital photographing, digital videoing, web browsing, digital music playing, and/or digital video playing. Instructions for performing these functions may be included in a computer readable storage medium or other computer program product configured for execution by one or more processors.

In accordance with some embodiments, a computer-implemented method is performed at a computing device with a touch screen display. The computer-implemented method includes: displaying a first set of a first plurality of application launch icons in a first area on the touch screen display, wherein the first plurality of application launch icons includes a plurality of sets of application launch icons that are separately displayed in the first area of the touch screen display; displaying a second plurality of application launch icons in a second area on the touch screen display, wherein the second area is different from the first area; in response to detecting a first finger gesture on the touch screen display in the first area, replacing display of the first set of the first plurality of application launch icons with display of a second set of the first plurality of application launch icons in the first area on the touch screen display while maintaining the display of the second plurality of application launch icons in the second area on the touch screen display; and, in response to detecting activation of any respective application launch icon in the plurality of application launch icons, displaying a first animation of a transition from display of application launch icons to display of an application that corresponds to the activated application launch icon. The first animation comprises expanding an image of the application.

In accordance with some embodiments, a graphical user interface on a computing device with a touch screen display includes: a first set of a first plurality of application launch icons displayed in a first area on the touch screen display, wherein the first plurality of application launch icons includes a plurality of sets of application launch icons that are separately displayed in the first area of the touch screen display; and a second plurality of application launch icons displayed in a second area on the touch screen display, wherein the second area is different from the first area. In response to detecting a first finger gesture on the touch screen display in the first area, display of the first set of the first plurality of application launch icons is replaced with display of a second set of the first plurality of application launch icons in the first area on the touch screen display while maintaining the display of the second plurality of application launch icons in the second area on the touch screen display. In response to detecting activation of any respective application launch icon in the plurality of application launch icons, a first animation is displayed of a transition from display of application launch icons to display of an application that corresponds to the activated application launch icon. The first animation comprises expanding an image of the application.

In accordance with some embodiments, a computing device includes: a touch screen display; one or more processors; memory; and one or more programs. The one or more programs are stored in the memory and configured to be executed by the one or more processors. The one or more programs include instructions for: displaying a first set of a first plurality of application launch icons in a first area on the touch screen display, wherein the first plurality of application launch icons includes a plurality of sets of application launch icons that are separately displayed in the first area of the touch screen display; displaying a second plurality of application launch icons in a second area on the touch screen display, wherein the second area is different from the first area; replacing, in response to detecting a first finger gesture on the touch screen display in the first area, display of the first set of the first plurality of application launch icons with display of a second set of the first plurality of application launch icons in the first area on the touch screen display while maintaining the display of the second plurality of application launch icons in the second area on the touch screen display; and displaying, in response to detecting activation of any respective application launch icon in the plurality of application launch icons, a first animation of a transition from display of application launch icons to display of an application that corresponds to the activated application launch icon. The first animation comprises expanding an image of the application.

In accordance with some embodiments, a computer readable storage medium has stored therein instructions, which when executed by a device with a touch screen display, cause the device to: display a first set of a first plurality of application launch icons in a first area on the touch screen display, wherein the first plurality of application launch icons includes a plurality of sets of application launch icons that are separately displayed in the first area of the touch screen display; display a second plurality of application launch icons in a second area on the touch screen display, wherein the second area is different from the first area; replace, in response to detecting a first finger gesture on the touch screen display in the first area, display of the first set of the first plurality of application launch icons with display of a second set of the first plurality of application launch icons in the first area on the touch screen display while maintaining the display of the second plurality of application launch icons in the second area on the touch screen display; and display, in response to detecting activation of any respective application launch icon in the plurality of application launch icons, a first animation of a transition from display of application launch icons to display of an application that corresponds to the activated application launch icon. The first animation comprises expanding an image of the application.

In accordance with some embodiments, a computing device includes: a touch screen display; means for displaying a first set of a first plurality of application launch icons in a first area on the touch screen display, wherein the first plurality of application launch icons includes a plurality of sets of application launch icons that are separately displayed in the first area of the touch screen display; means for displaying a second plurality of application launch icons in a second area on the touch screen display, wherein the second area is different from the first area; means for replacing, in response to detecting a first finger gesture on the touch screen display in the first area, display of the first set of the first plurality of application launch icons with display of a second set of the first plurality of application launch icons in the first area on the touch screen display while maintaining the display of the second plurality of application launch icons in the second area on the touch screen display; and means for displaying, in response to detecting activation of any respective application launch icon in the plurality of application launch icons, a first animation of a transition from display of application launch icons to display of an application that corresponds to the activated application launch icon. The first animation comprises expanding an image of the application.

In accordance with some embodiments, a computer-implemented method is performed at a portable multifunction device with a touch screen display. The computer-implemented method includes: displaying a home menu comprising a plurality of application launch icons; detecting activation of any respective application launch icon; and, in response to detecting the activation, displaying a first animation of a transition from display of the home menu to display of an application that corresponds to the activated application launch icon. The first animation comprises expanding an image of the application.

In accordance with some embodiments, a graphical user interface on a portable multifunction device with a touch screen display includes a home menu comprising a plurality of application launch icons; and applications that correspond to the application launch icons. In response to detecting activation of any respective application launch icon, a first animation is displayed of a transition from display of the home menu to display of an application that corresponds to the activated application launch icon, wherein the first animation comprises expanding an image of the application.

In accordance with some embodiments, a portable multifunction device includes: a touch screen display; one or more processors; memory; and one or more programs. The one or more programs are stored in the memory and configured to be executed by the one or more processors. The one or more programs include instructions for: displaying a home menu comprising a plurality of application launch icons; detecting activation of any respective application launch icon; and displaying, in response to detecting the activation, a first animation of a transition from display of the home menu to display of an application that corresponds to the activated application launch icon. The first animation comprises expanding an image of the application.

In accordance with some embodiments, a computer readable storage medium has stored therein instructions, which when executed by a portable multifunction device with a touch screen display, cause the portable multifunction device to: display a home menu comprising a plurality of application launch icons; detect activation of any respective application launch icon; and display, in response to detecting the activation, a first animation of a transition from display of the home menu to display of an application that corresponds to the activated application launch icon. The first animation comprises expanding an image of the application.

In accordance with some embodiments, a portable multifunction device includes: a touch screen display; means for displaying a home menu comprising a plurality of application launch icons; means for detecting activation of any respective application launch icon; and means for displaying, in response to detecting the activation, a first animation of a transition from display of the home menu to display of an application that corresponds to the activated application launch icon, wherein the first animation comprises expanding an image of the application.

In accordance with some embodiments, a computer-implemented method is performed at a portable multifunction device with a touch screen display. The computer-implemented method includes: displaying a first user interface comprising a group of items; detecting a gesture to select an item in the group; and, in response to detecting the gesture, displaying a first animation of a transition from display of the first user interface to display of a second user interface corresponding to the selected item. The first animation comprises sliding the second user interface onto the touch screen display from a first side of the display.

In accordance with some embodiments, a graphical user interface on a portable multifunction device with a touch screen display includes a first user interface comprising a group of items; and a second user interface corresponding to a selected item in the group. In response to detecting a gesture to select an item in the group while the first user interface is displayed, a first animation is displayed of a transition from display of the first user interface to display of the second user interface corresponding to the selected item. The first animation comprises sliding the second user interface onto the touch screen display from a first side of the display.

In accordance with some embodiments, a portable multifunction device includes: a touch screen display; one or more processors; memory; and one or more programs. The one or more programs are stored in the memory and configured to be executed by the one or more processors. The one or more programs include instructions for: displaying a first user interface comprising a group of items; detecting a gesture to select an item in the group; and displaying, in response to detecting the gesture, a first animation of a transition from display of the first user interface to display of a second user interface corresponding to the selected item. The first animation comprises sliding the second user interface onto the touch screen display from a first side of the display.

In accordance with some embodiments, a computer readable storage medium has stored therein instructions, which when executed by a portable multifunction device with a touch screen display, cause the portable multifunction device to: display a first user interface comprising a group of items; detect a gesture to select an item in the group; and display, in response to detecting the gesture, a first animation of a transition from display of the first user interface to display of a second user interface corresponding to the selected item. The first animation comprises sliding the second user interface onto the touch screen display from a first side of the display.

In accordance with some embodiments, a portable multifunction device includes: a touch screen display; means for displaying a first user interface comprising a group of items; means for detecting a gesture to select an item in the group; and means for displaying, in response to detecting the gesture, a first animation of a transition from display of the first user interface to display of a second user interface corresponding to the selected item. The first animation comprises sliding the second user interface onto the touch screen display from a first side of the display.

In accordance with some embodiments, a computer-implemented method is performed at a portable multifunction device with a touch screen display. The computer-implemented method includes: displaying a first user interface; detecting a gesture on the touch screen display to select a second user interface; and, in response to detecting the gesture, displaying an animation of a transition from display of the first user interface to display of the second user interface. The animation comprises sliding a first element of the second user interface onto the display from a first side of the display while simultaneously sliding a second element of the second user interface across the top of the first element.

In accordance with some embodiments, a graphical user interface on a portable multifunction device with a touch screen display includes first and second user interfaces. In response to detecting a gesture on the touch screen display to select the second user interface while the first user interface is displayed, an animation is displayed of a transition from display of the first user interface to display of the second user interface. The animation comprises sliding a first element of the second user interface onto the display from a first side of the display while simultaneously sliding a second element of the second user interface across the top of the first element.

In accordance with some embodiments, a portable multifunction device includes: a touch screen display; one or more processors; memory; and one or more programs. The one or more programs are stored in the memory and configured to be executed by the one or more processors. The one or more programs include instructions for: displaying a first user interface; detecting a gesture on the touch screen display to select a second user interface; and displaying, in response to detecting the gesture, an animation of a transition from display of the first user interface to display of the second user interface. The animation comprises sliding a first element of the second user interface onto the display from a first side of the display while simultaneously sliding a second element of the second user interface across the top of the first element.

In accordance with some embodiments, a computer readable storage medium has stored therein instructions, which when executed by a portable multifunction device with a touch screen display, cause the portable multifunction device to: display a first user interface; detect a gesture on the touch screen display to select a second user interface; and display, in response to detecting the gesture, an animation of a transition from display of the first user interface to display of the second user interface. The animation comprises sliding a first element of the second user interface onto the display from a first side of the display while simultaneously sliding a second element of the second user interface across the top of the first element.

In accordance with some embodiments, a portable multifunction device includes: a touch screen display; means for displaying a first user interface; means for detecting a gesture on the touch screen display to select a second user interface; and means for displaying, in response to detecting the gesture, an animation of a transition from display of the first user interface to display of the second user interface, the animation comprising sliding a first element of the second user interface onto the display from a first side of the display while simultaneously sliding a second element of the second user interface across the top of the first element.

In accordance with some embodiments, a computer-implemented method is performed at a portable multifunction device with a touch screen display. The computer-implemented method includes: displaying a first user interface; detecting a gesture on the touch screen display to select a second user interface; and, in response to detecting the gesture, displaying an animation of flipping the first user interface to reveal the second user interface.

In accordance with some embodiments, a graphical user interface on a portable multifunction device with a touch screen display includes first and second user interfaces. In response to detecting a gesture on the touch screen display to select the second user interface while the first user interface is displayed, an animation is displayed of flipping the first user interface to reveal the second user interface.

In accordance with some embodiments, a portable multifunction device includes: a touch screen display; one or more processors; memory; and one or more programs. The one or more programs are stored in the memory and configured to be executed by the one or more processors. The one or more programs include instructions for: displaying a first user interface; detecting a gesture on the touch screen display to select a second user interface; and displaying an animation of flipping the first user interface to reveal the second user interface, in response to detecting the gesture.

In accordance with some embodiments, a computer readable storage medium has stored therein instructions, which when executed by a portable multifunction device with a touch screen display, cause the portable multifunction device to: display a first user interface; detect a gesture on the touch screen display to select a second user interface; and display an animation of flipping the first user interface to reveal the second user interface, in response to detecting the gesture.

In accordance with some embodiments, a portable multifunction device includes: a touch screen display; means for displaying a first user interface; means for detecting a gesture on the touch screen display to select a second user interface; and means for displaying an animation of flipping the first user interface to reveal the second user interface, in response to detecting the gesture.

In accordance with some embodiments, a computer-implemented method is performed at a portable multifunction device with a touch screen display. The computer-implemented method includes: playing music with a music player application while the device is in a user-interface lock state; detecting contact with the touch screen display while the device is playing music in the user-interface lock state; moving an unlock image across the touch screen display in accordance with the contact, wherein the unlock image is a graphical, interactive user-interface object with which a user interacts in order to unlock the device; transitioning the device to the user-interface unlock state and displaying a user interface in the music player application if the detected contact corresponds to a predefined gesture; and maintaining the device in the user-interface lock state and continuing to play music with the music player application if the detected contact does not correspond to the predefined gesture.

In accordance with some embodiments, a graphical user interface on a portable multifunction device with a touch screen display includes an unlock image. The unlock image is a graphical, interactive user-interface object with which a user interacts in order to unlock the device. Music is played with a music player application while the device is in a user-interface lock state. Contact with the touch screen display is detected while the device is playing music in the user-interface lock state. The unlock image is moved across the touch screen display in accordance with the contact. The device is transitioned to the user-interface unlock state and a user interface in the music player application is displayed if the detected contact corresponds to a predefined gesture. The device is maintained in the user-interface lock state and music play is continued with the music player application if the detected contact does not correspond to the predefined gesture.

In accordance with some embodiments, a portable multifunction device includes: a touch screen display; one or more processors; memory; and one or more programs. The one or more programs are stored in the memory and configured to be executed by the one or more processors. The one or more programs include instructions for: playing music with a music player application while the device is in a user-interface lock state; detecting contact with the touch screen display while the device is playing music in the user-interface lock state; moving an unlock image across the touch screen display in accordance with the contact, wherein the unlock image is a graphical, interactive user-interface object with which a user interacts in order to unlock the device; transitioning the device to the user-interface unlock state and displaying a user interface in the music player application if the detected contact corresponds to a predefined gesture; and maintaining the device in the user-interface lock state and continuing to play music with the music player application if the detected contact does not correspond to the predefined gesture.

In accordance with some embodiments, a computer readable storage medium has stored therein instructions, which when executed by a portable multifunction device with a touch screen display, cause the portable multifunction device to: play music with a music player application while the device is in a user-interface lock state; detect contact with the touch screen display while the device is playing music in the user-interface lock state; move an unlock image across the touch screen display in accordance with the contact, wherein the unlock image is a graphical, interactive user-interface object with which a user interacts in order to unlock the device; transition the device to the user-interface unlock state and displaying a user interface in the music player application if the detected contact corresponds to a predefined gesture; and maintain the device in the user-interface lock state and continuing to play music with the music player application if the detected contact does not correspond to the predefined gesture.

In accordance with some embodiments, a portable multifunction device includes: a touch screen display; means for playing music with a music player application while the device is in a user-interface lock state; means for detecting contact with the touch screen display while the device is playing music in the user-interface lock state; means for moving an unlock image across the touch screen display in accordance with the contact, wherein the unlock image is a graphical, interactive user-interface object with which a user interacts in order to unlock the device; means for transitioning the device to the user-interface unlock state and displaying a user interface in the music player application if the detected contact corresponds to a predefined gesture; and means for maintaining the device in the user-interface lock state and continuing to play music with the music player application if the detected contact does not correspond to the predefined gesture.

Animated transitions in accordance with the disclosed embodiments allow a user to navigate within and between applications in a multifunction device in a simple, intuitive manner.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 7F-7H are flow diagrams illustrating processes for displaying web-clip widgets in accordance with some embodiments.

FIGS. 1A-11I illustrate animations showing transitions between user interfaces for an instant messaging application in accordance with some embodiments.

FIGS. 16A-16E are flow diagrams illustrating processes for displaying user interfaces on a touch screen display on a portable multifunction device in accordance with some embodiments.

DESCRIPTION OF EMBODIMENTS

Figure 1A:
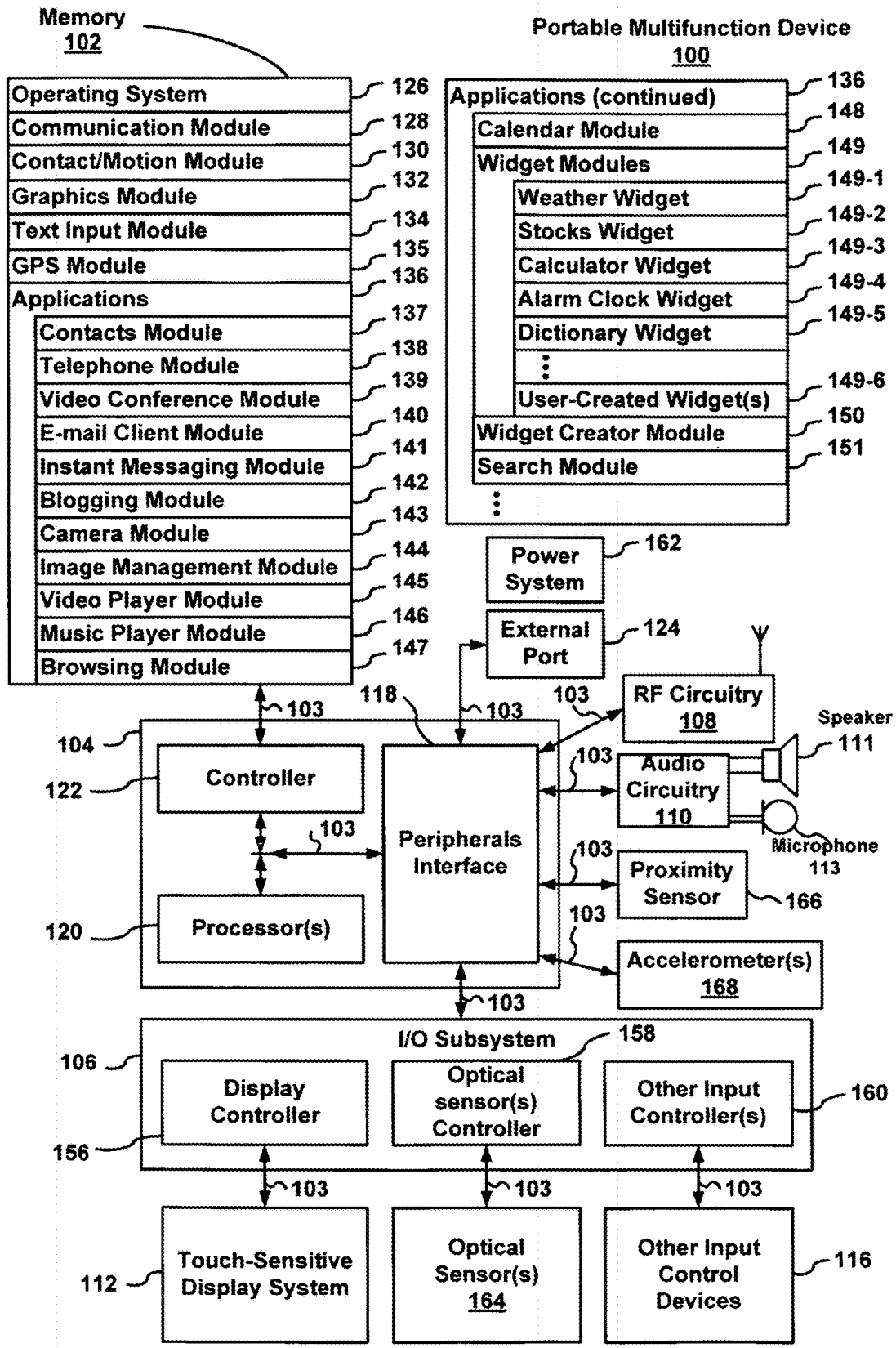
FIGS. 1A and 1B are block diagrams illustrating a portable multifunction device with a touch-sensitive display in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting

[the stated condition or event]" or "in response to detecting [the stated condition or event]," depending on the context.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, which may include one or more other physical user-interface devices, such as a physical click wheel, a physical keyboard, a mouse and/or a joystick.

The device supports a variety of applications, such as one or more of the following: a telephone application, a video conferencing application, an e-mail application, an instant messaging application, a blogging application, a photo management application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and U.S patent Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
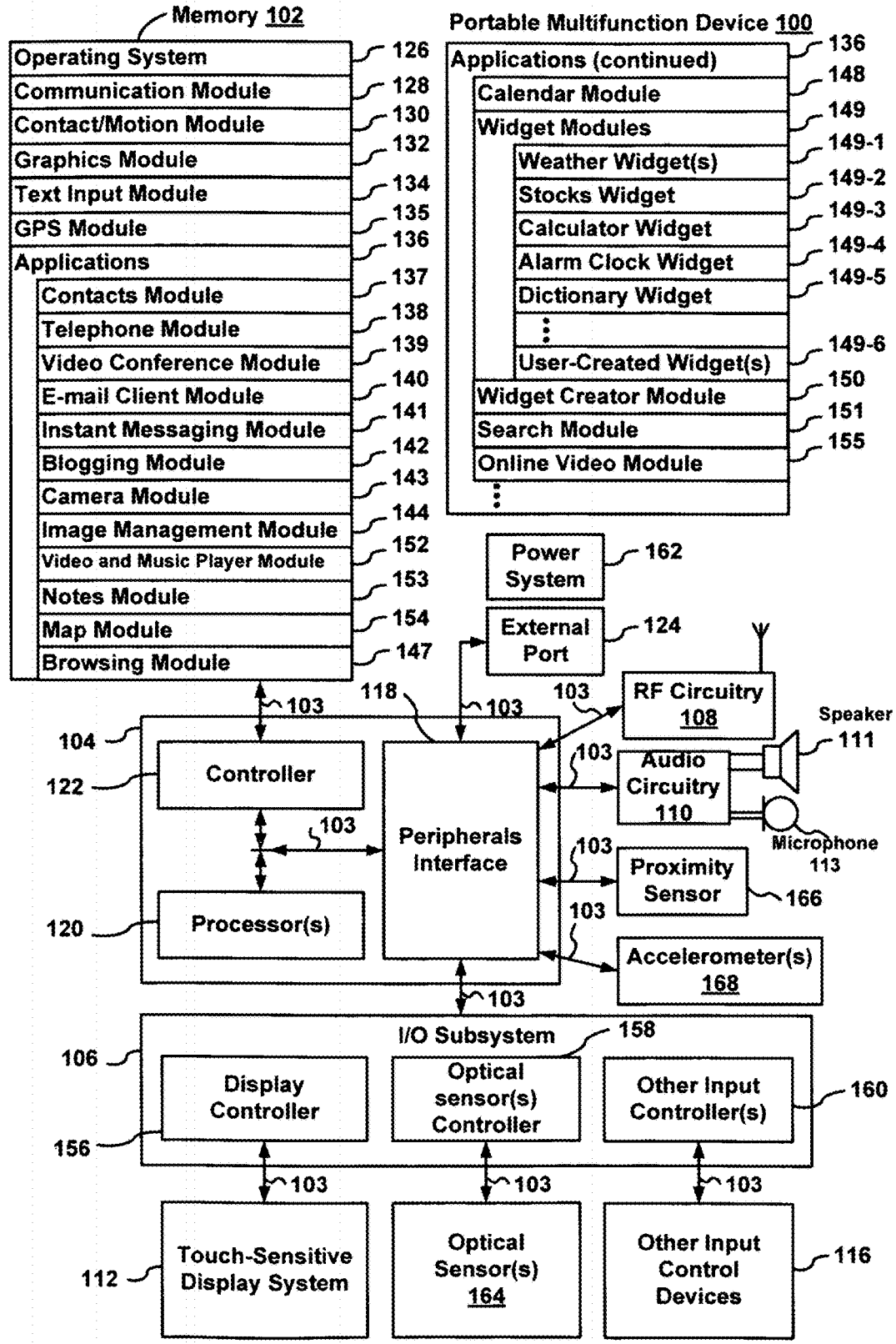

Attention is now directed towards embodiments of the device. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (WiFi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

A touch-sensitive display in some embodiments of the touch screen 112 may be analogous to the multi-touch sensitive tablets described in the following U.S. Pat. Nos. 6,323,846 (Westerman et al.), 6,570,557 (Westerman et al.), and/or 6,677,932 (Westerman), and/or U.S. Patent Publication 2002/0015024A1, each of which is hereby incorporated by reference in its entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference in their entirety herein.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device," Sep. 30, 2005; U.S patent application Ser. No. 11/240,788, "Proximity Detector In Handheld Device," Sep. 30, 2005; U.S. patent application Ser. No. 11/620,702, "Using Ambient Light Sensor To Augment Proximity Sensor Output"; U.S. patent application Ser. NO. 11/586,862, "Automated Response To And Sensing Of User Activity In Portable Devices." filed Oct. 24, 2006; and U.S. patent application Ser. No. 11/638,251, "Methods And Systems For Automatic Configuration Of Peripherals," which are hereby incorporated by reference herein in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the U/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated herein by reference in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like. An animation in this context is a display of a sequence of images that gives the appearance of movement, and informs the user of an action that has been performed (such as expanding a user-selected web-page portion to fill a browser window). In this context, a respective animation that executes an action, or confirms an action by the user of the device, typically takes a predefined, finite amount of time, typically between 0.2 and 1.0 seconds, and generally less than two seconds.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:

a contacts module 137 (sometimes called an address book or contact list);
 a telephone module 138;
 a video conferencing module 139;
 an e-mail client module 140;
 an instant messaging (IM) module 141;
 a blogging module 142;
 a camera module 143 for still and/or video images;
 an image management module 144;
 a video player module 145;
 a music player module 146;
 a browser module 147;
 a calendar module 148;
 widget modules 149, which may include weather widget 149-1, stocks widget 149-2, calculator widget 149-3, alarm clock widget 149-4, dictionary widget 149-5, and other widgets obtained by the user, as well as user-created widgets 149-6;
 widget creator module 150 for making user-created widgets 149-6;
 search module 151;
 video and music player module 152, which merges video player module 145 and music player module 146;
 notes module 153;
 map module 154; and/or
 online video module 155.

Examples of other applications 136 that may be stored in memory 102 include other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages. Embodiments of user interfaces and associated processes using browser module 147 are described further below.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets). Embodiments of user interfaces and associated processes using widget modules 149 are described further below.

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a web-clip widget). In some embodiments, a web-clip widget comprises a file containing an XML property list that includes a URL for the web page and data indicating the user-specified portion of the web page. In some embodiments, the data indicating the user-specified portion of the web page includes a reference point and a scale factor. In some embodiments, the data indicating the user-specified portion of the web page includes a set of coordinates within the web page or an identification of a structural element within the web page. Alternatively, in some embodiments a web-clip widget includes an HTML (Hypertext Markup Language) file, a CSS (Cascading Style Sheets) file, and a JavaScript file. Alternatively, in some embodiments a web-clip widget includes an XML (Extensible Markup Language) file and a JavaScript file.

In some embodiments a web-clip widget includes an image file (e.g., a png file) of an icon corresponding to the widget. In some embodiments, a web-clip widget corresponds to a folder containing the image file and a file that includes the URL for the web page and data indicating the user-specified portion of the web page. In some embodiments, a web-clip widget corresponds to a folder containing the image file and an executable script.

Embodiments of user interfaces and associated processes using widget creator module 150 are described further below.

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, the content of which is hereby incorporated by reference in its entirety.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise rearranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
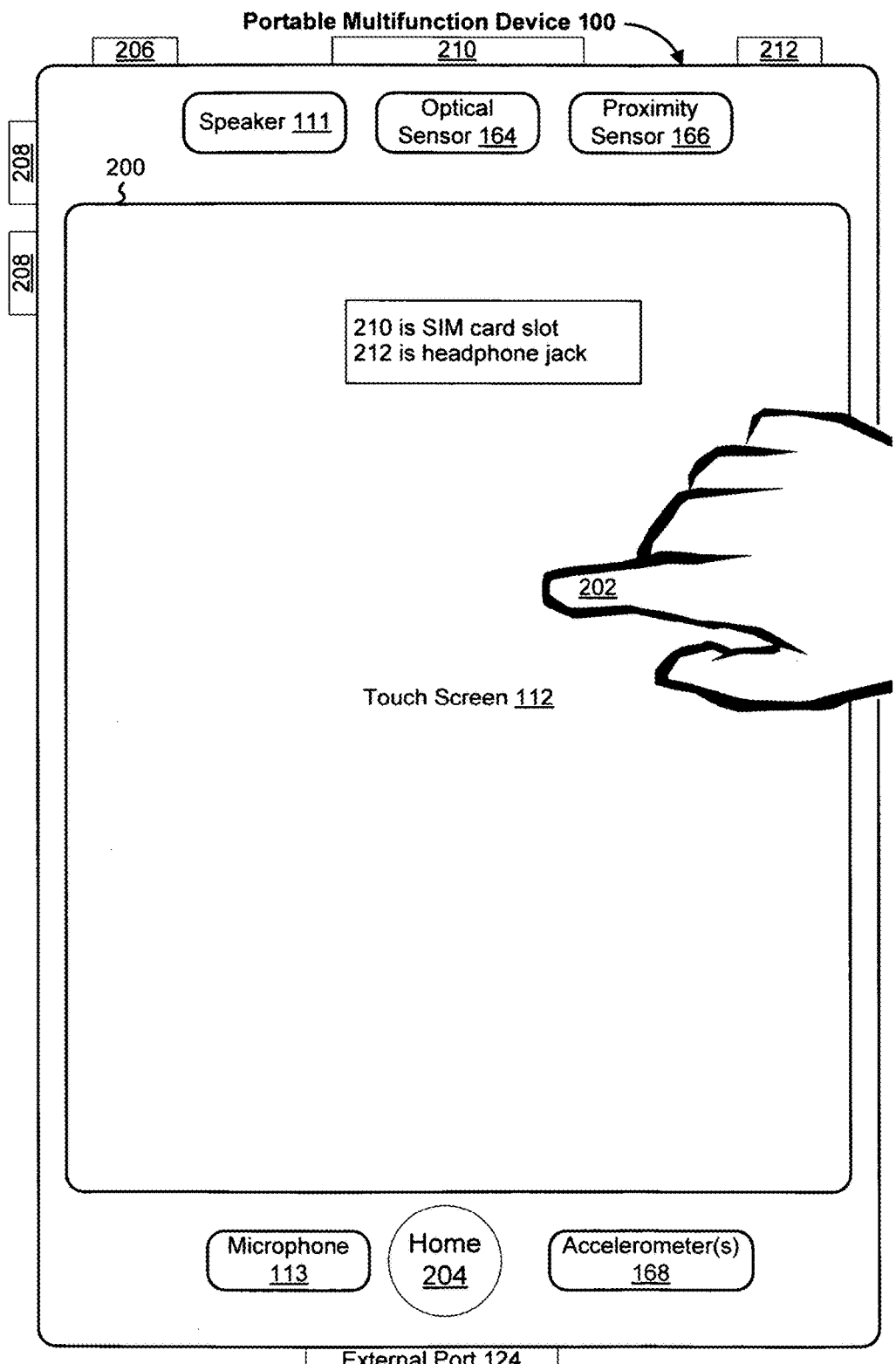
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3:
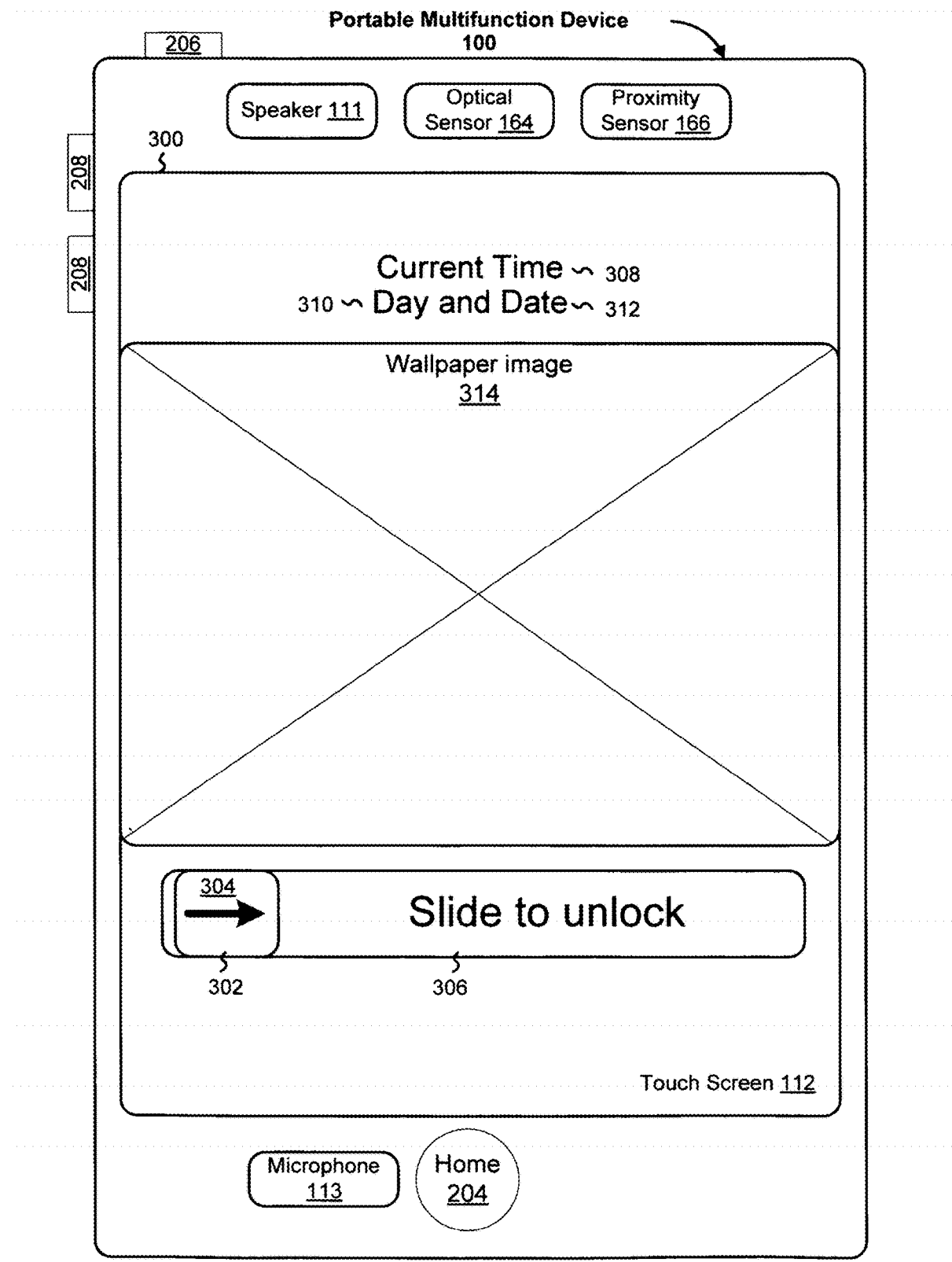
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:

Unlock image 302 that is moved with a finger gesture to unlock the device;
Arrow 304 that provides a visual cue to the unlock gesture;
Channel 306 that provides additional cues to the unlock gesture;
Time 308;
Day 310;
Date 312; and
Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. This process saves battery power by ensuring that the device is not accidentally awakened. This process is easy for users to perform, in part because of the visual cue(s) provided on the touch screen.

As noted above, processes that use gestures on the touch screen to unlock the device are described in U.S. patent application Ser. No. 11/322,549, "Unlocking A Device By Performing Gestures On An Unlock Image," filed Dec. 23, 2005, and U.S. patent application Ser. No. 11/322,550, "Indication Of Progress Towards Satisfaction Of A User Input Condition," filed Dec. 23, 2005, which are hereby incorporated by reference in their entirety.

Figure 4A:
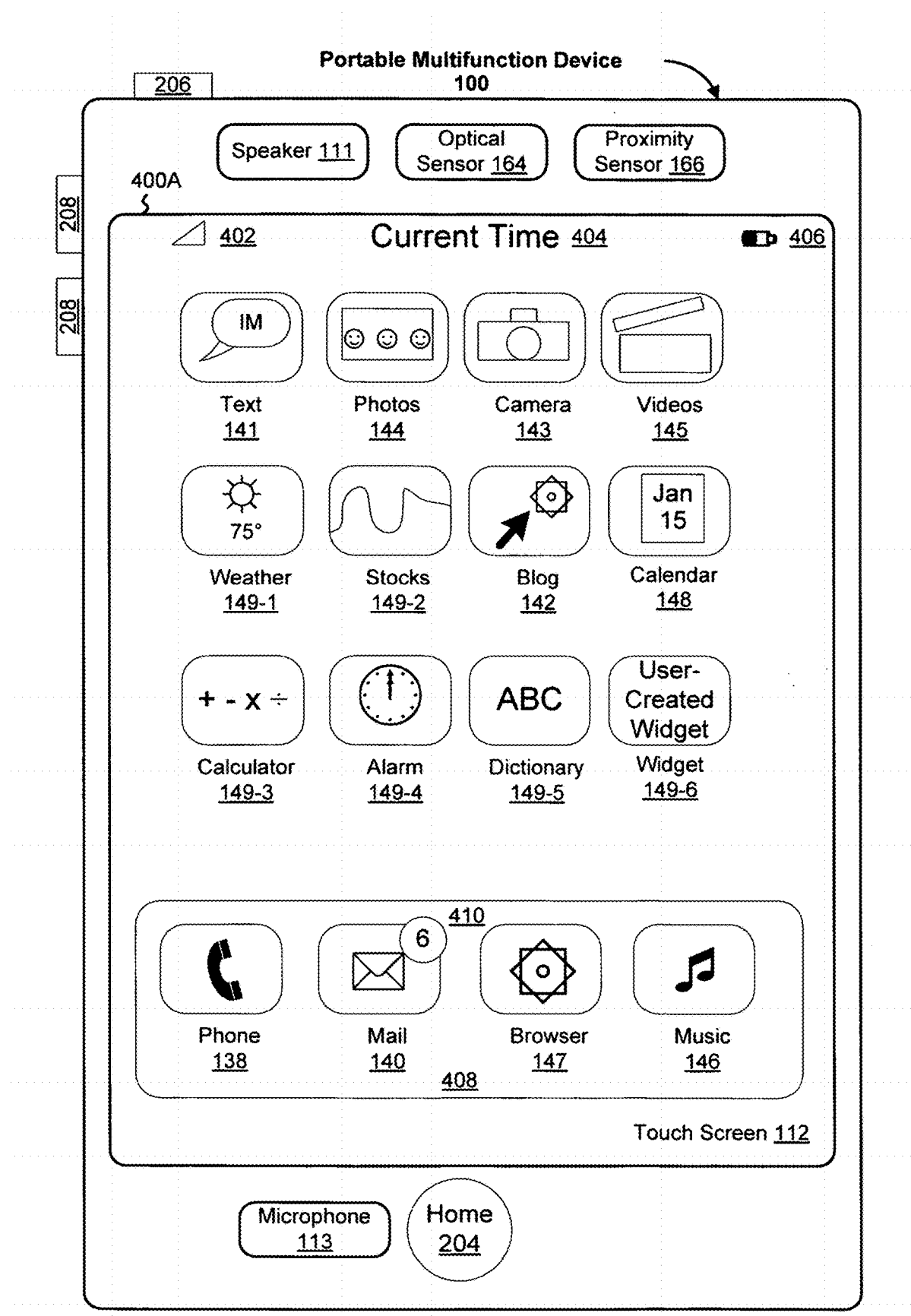
FIGS. 4A-4B illustrate exemplary user interfaces having menus of applications and/or widgets on a portable multifunction device in accordance with some embodiments.

FIG. 4A illustrates an exemplary user interface for a menu of applications on a portable multifunction device in accordance with some embodiments. In some embodiments, user interface 400A includes the following elements, or a subset or superset thereof:

Signal strength indicator 402 for wireless communication;
Time 404;
Battery status indicator 406;

Tray 408 with icons for frequently used applications, such as:
- Phone 138;
- E-mail client 140, which may include an indicator 410 of the number of unread e-mails;
- Browser 147; and
- Music player 146; and Icons for other applications, such as:
- IM 141;
- Image management 144;
- Camera 143;
- Video player 145;
- Weather 149-1;
- Stocks 149-2;
- Blog 142;
- Calendar 148;
- Calculator 149-3;
- Alarm clock 149-4;
- Dictionary 149-5;
- User-created widget 149-6; and
- Other applications (not shown)(e.g., map 154 and online video 155).

In some embodiments, UI 400A displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400A provides integrated access to both widget-based applications and non-widget-based applications. In some embodiments, all of the widgets, whether user-created or not, are displayed in UI 400A. In other embodiments, activating the icon for user-created widget 149-6 may lead to another UI that displays the user-created widgets or icons corresponding to the user-created widgets. For example, UI 400B (FIG. 4B) displays a menu of six icons corresponding to six user-created widgets 149-6-1 through 149-6-6 in accordance with some embodiments. A user may activate a particular widget by gesturing on the corresponding icon. Alternatively, user-created widgets may be displayed in a list. UI 400C (FIG. 4C) illustrates a list of names of six user-created widgets 149-6-1 through 149-6-6 along with corresponding icons in accordance with some embodiments. A user may activate a particular widget by gesturing on the corresponding name or icon.

In some embodiments, a user may rearrange the icons in UI 400A, UI 400B, or UI 400C, e.g., using processes described in U.S. patent application Ser. No. 11/459,602, "Portable Electronic Device With Interface Reconfiguration Mode," filed Jul. 24, 2006, which is hereby incorporated by reference in its entirety. For example, a user may move application icons in and out of tray 408 using finger gestures.

In some embodiments, UI 400A includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference in its entirety.

Making and Using Web-Clip Widgets

FIGS. 5A-5I illustrate an exemplary user interface for a browser in accordance with some embodiments.

Figure 5A:
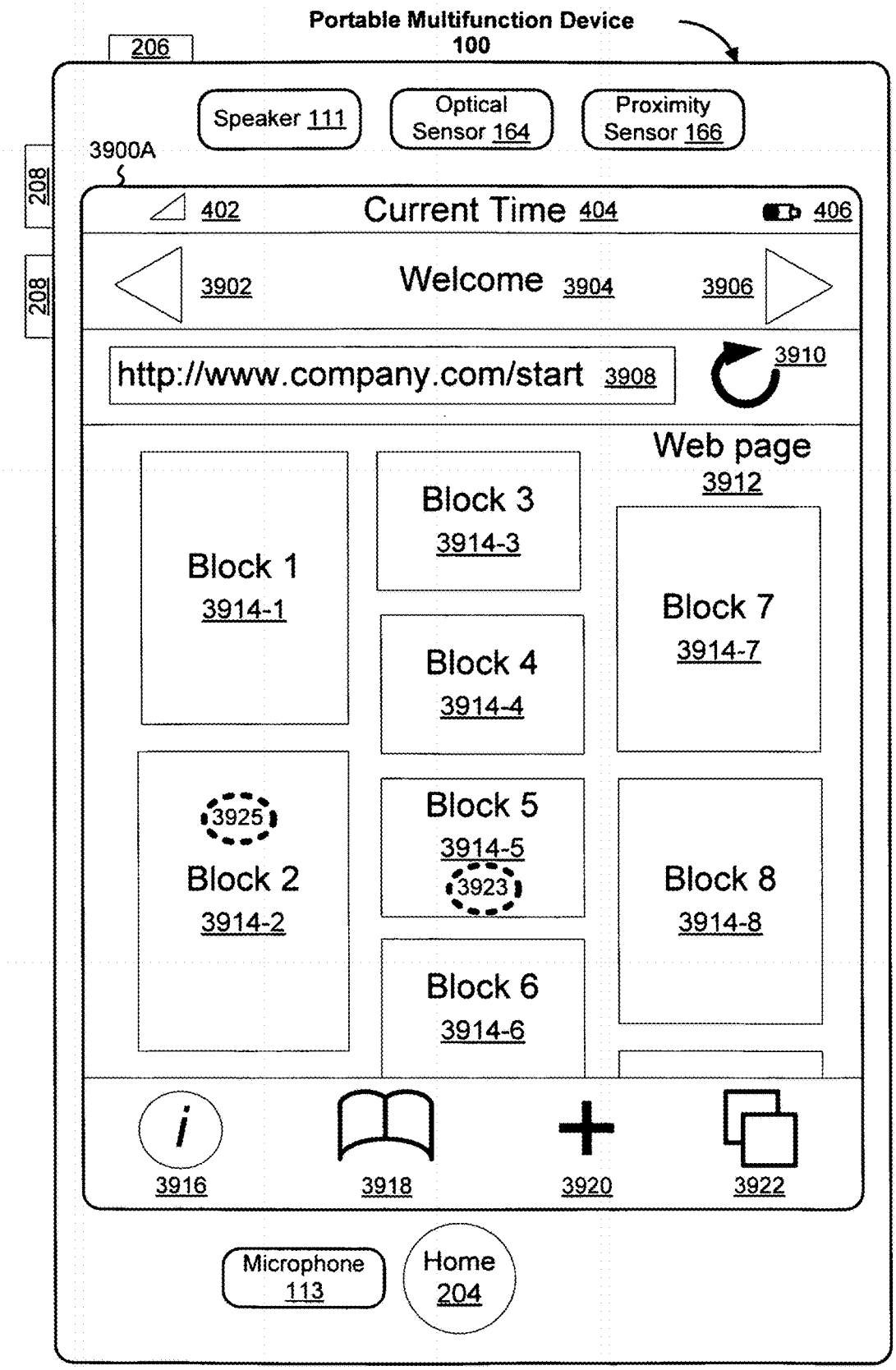
FIGS. 5A-5K illustrate an exemplary user interface for a browser in accordance with some embodiments.
Figure 5B:
Figure 5C:
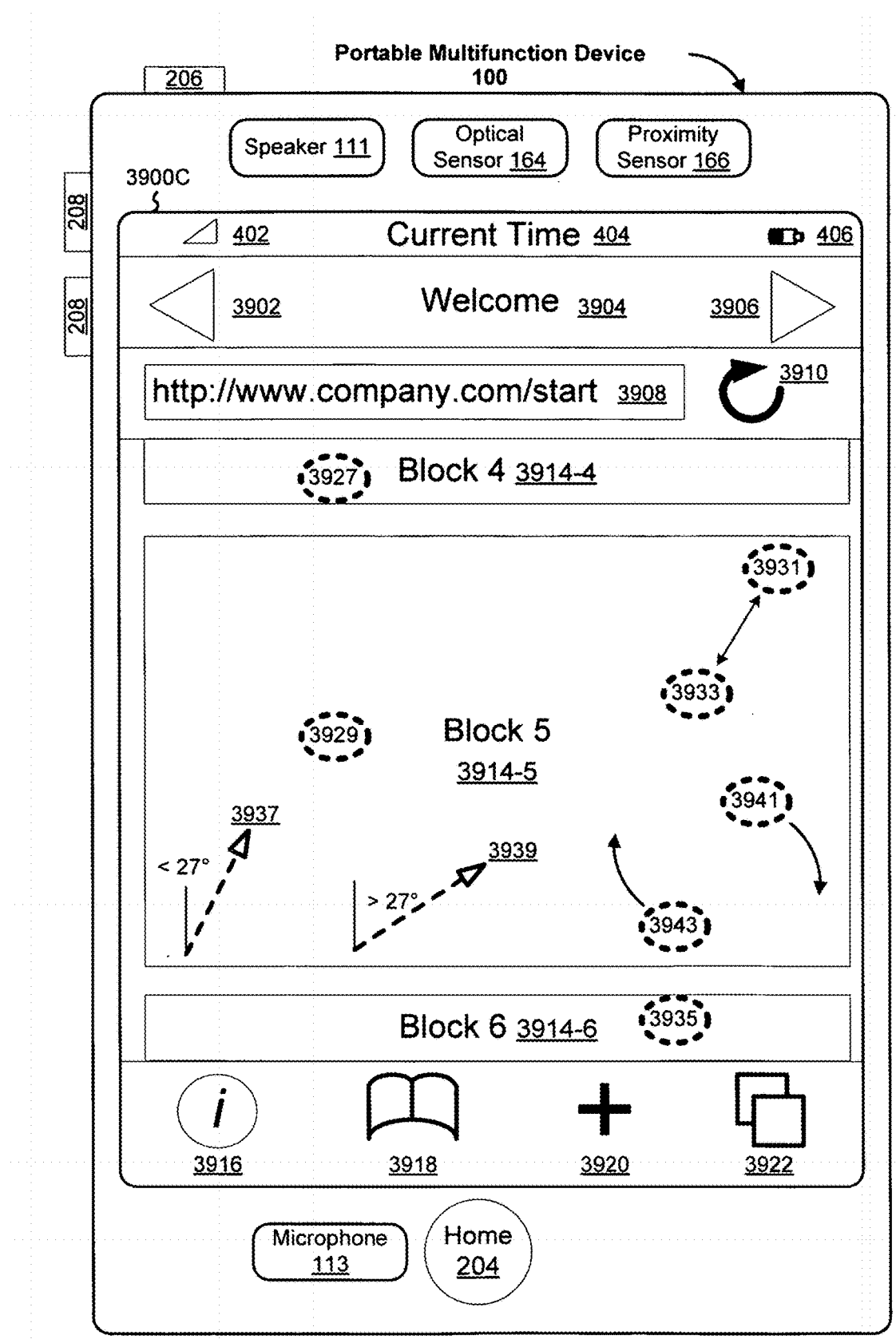
Figure 5D:
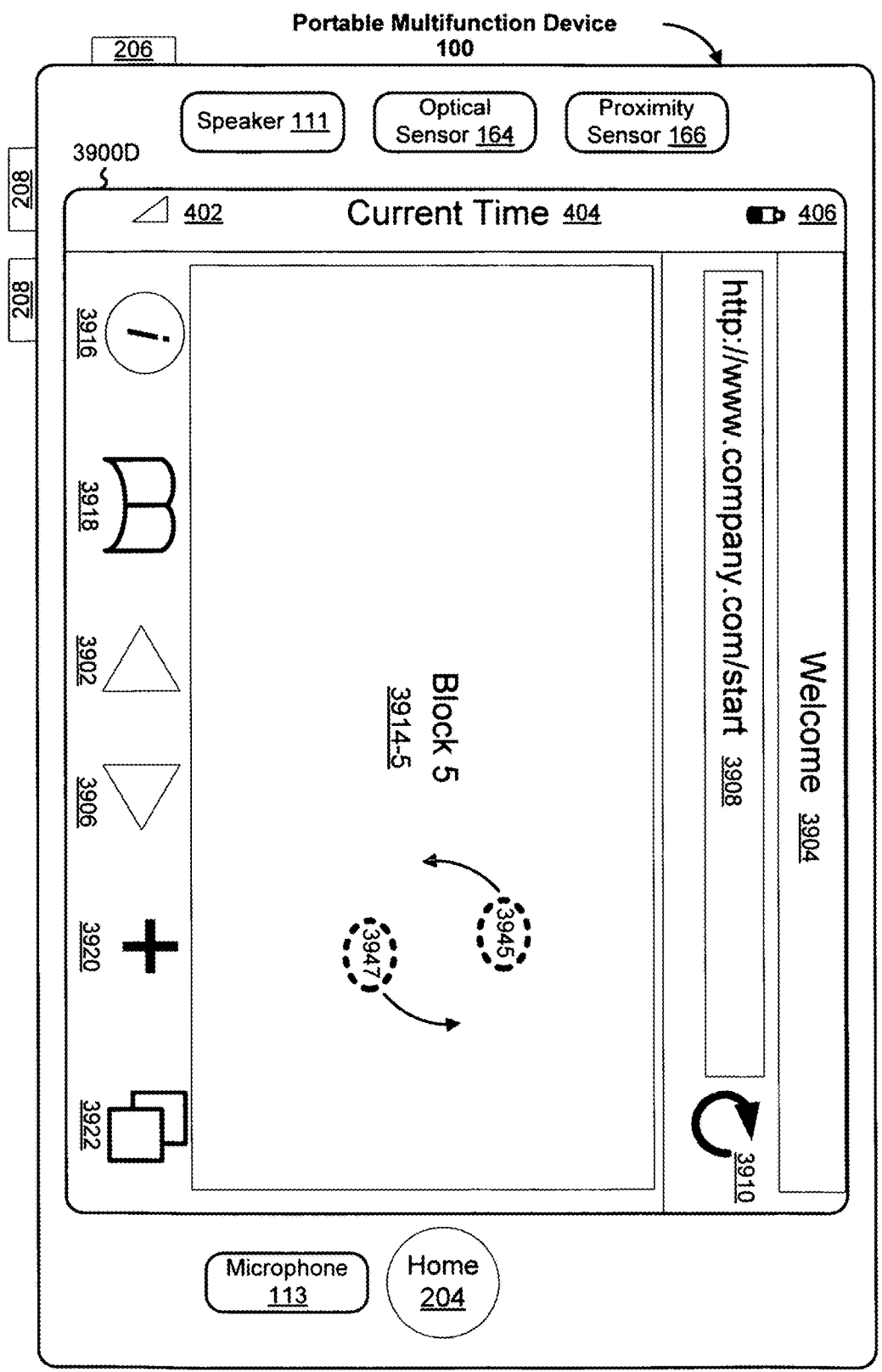
Figure 5E:
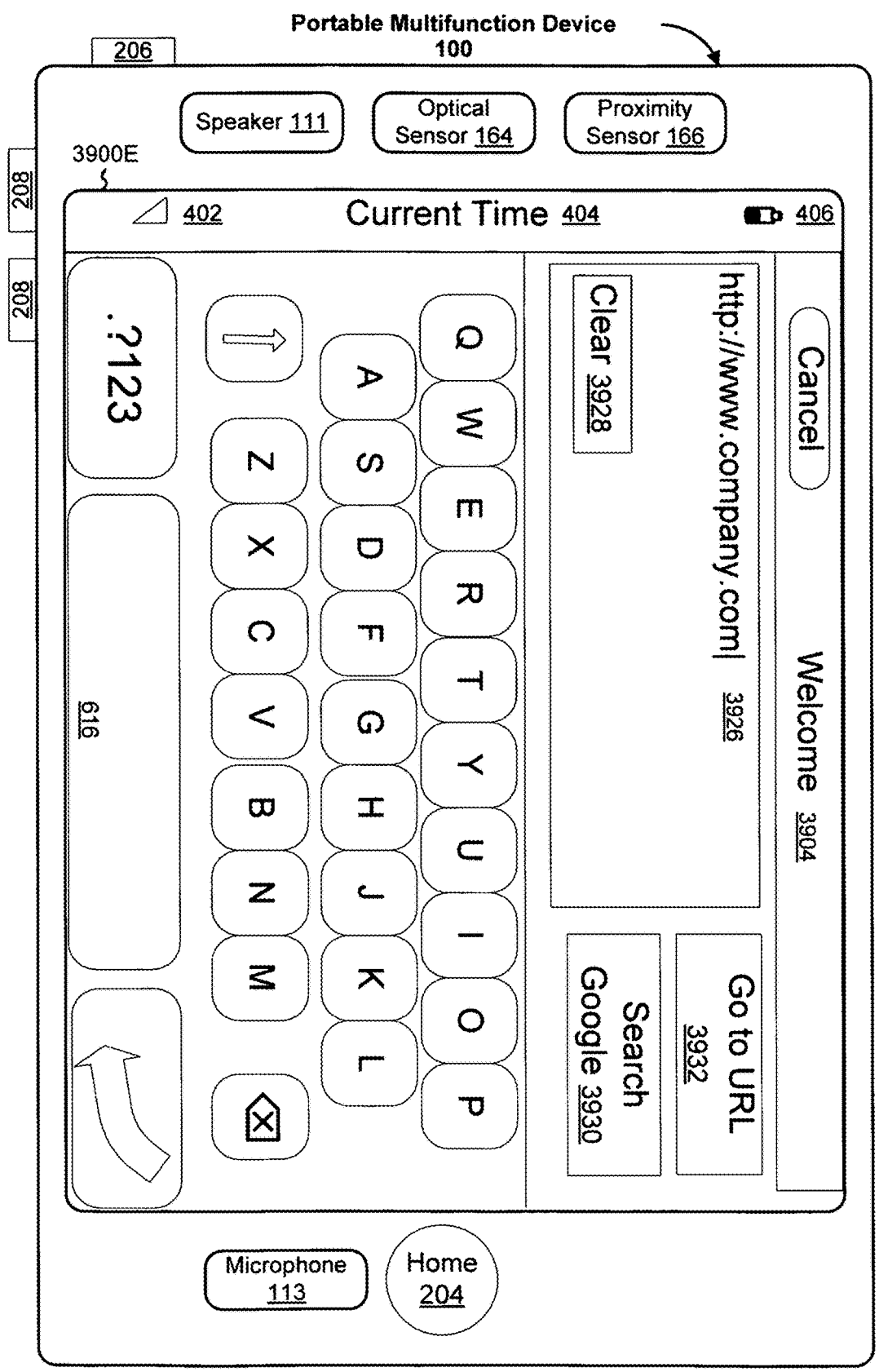
Figure 5F:
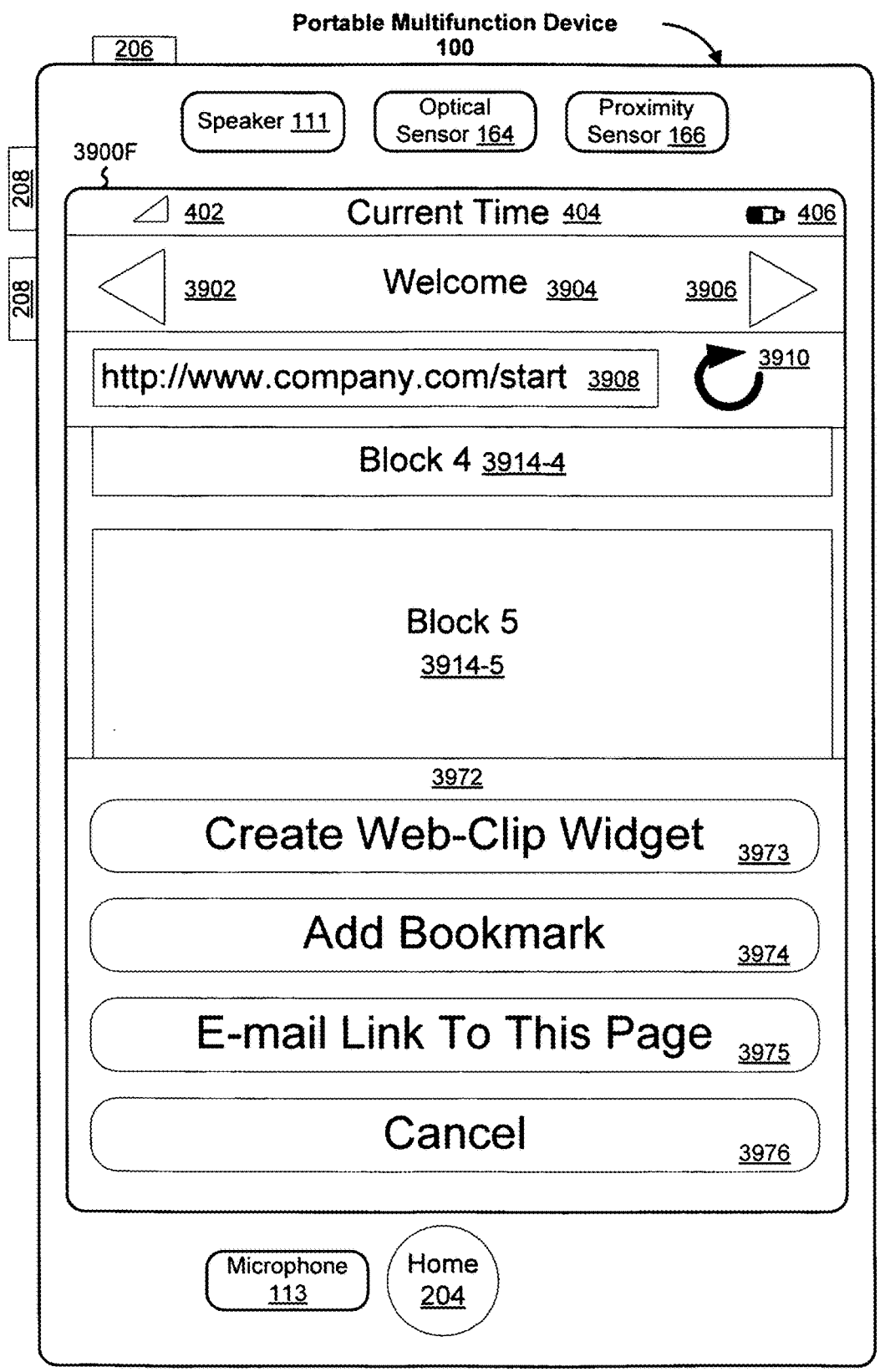
Figure 5G:
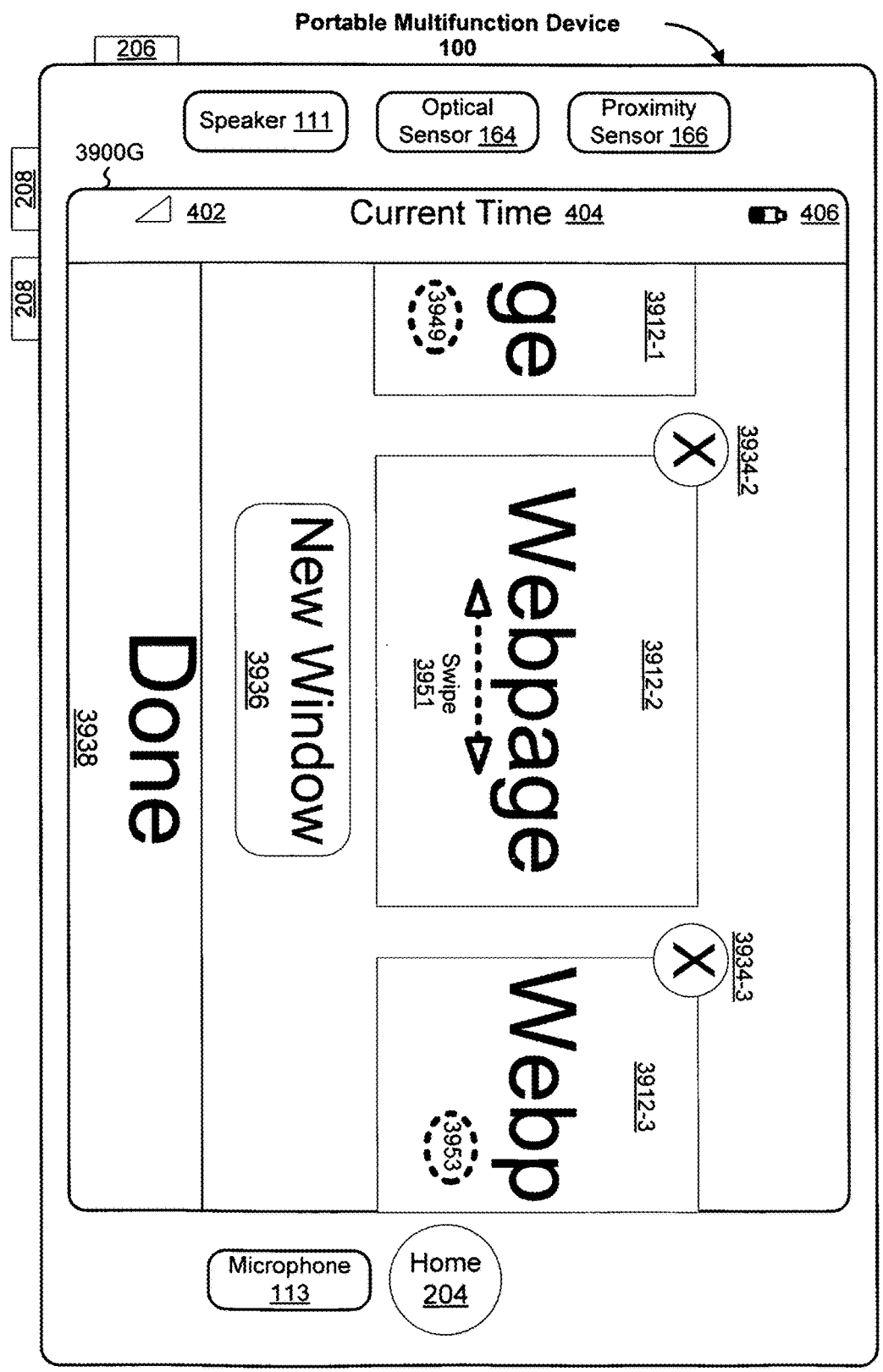
Figure 5H:
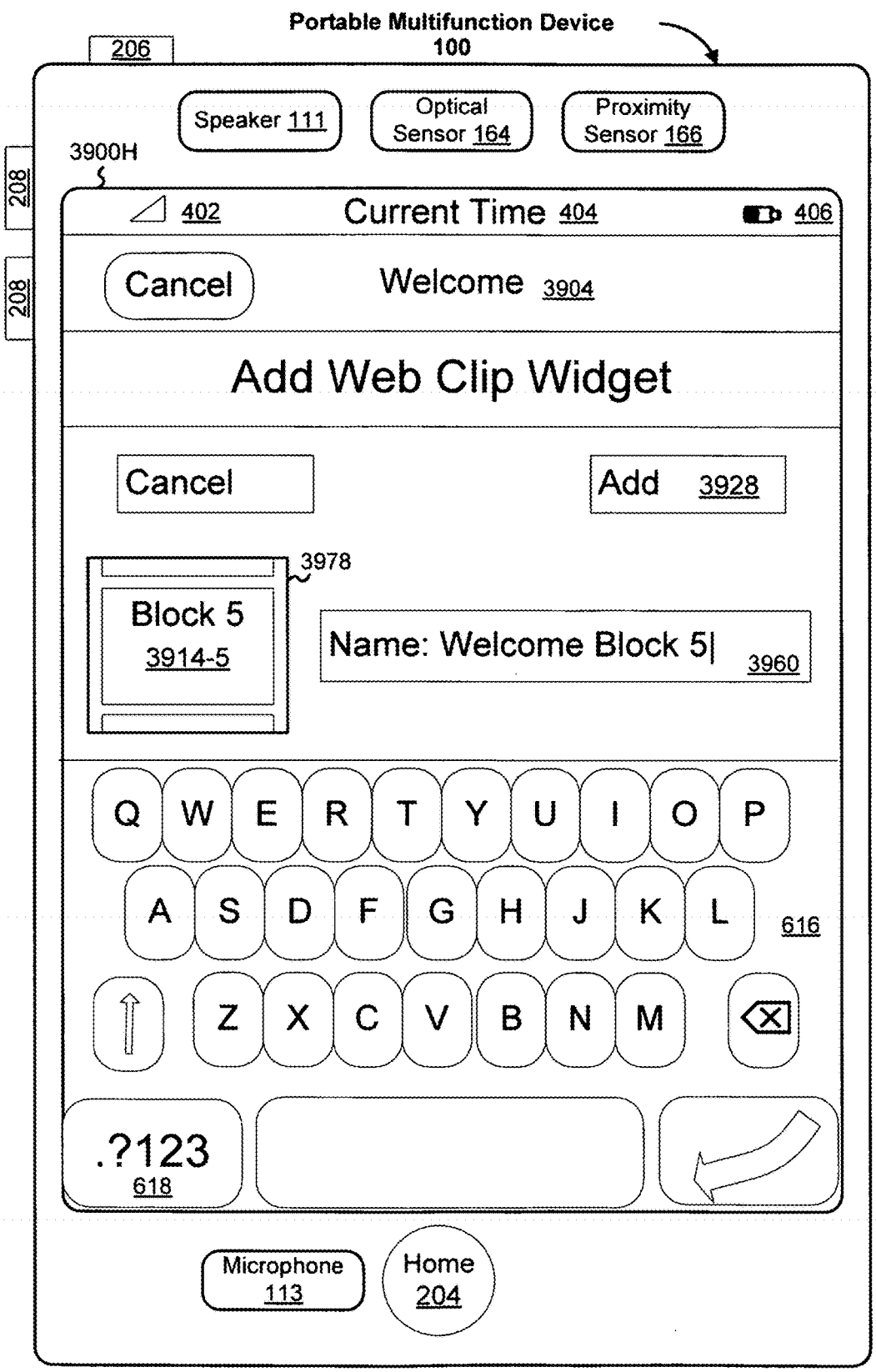
Figure 5I:
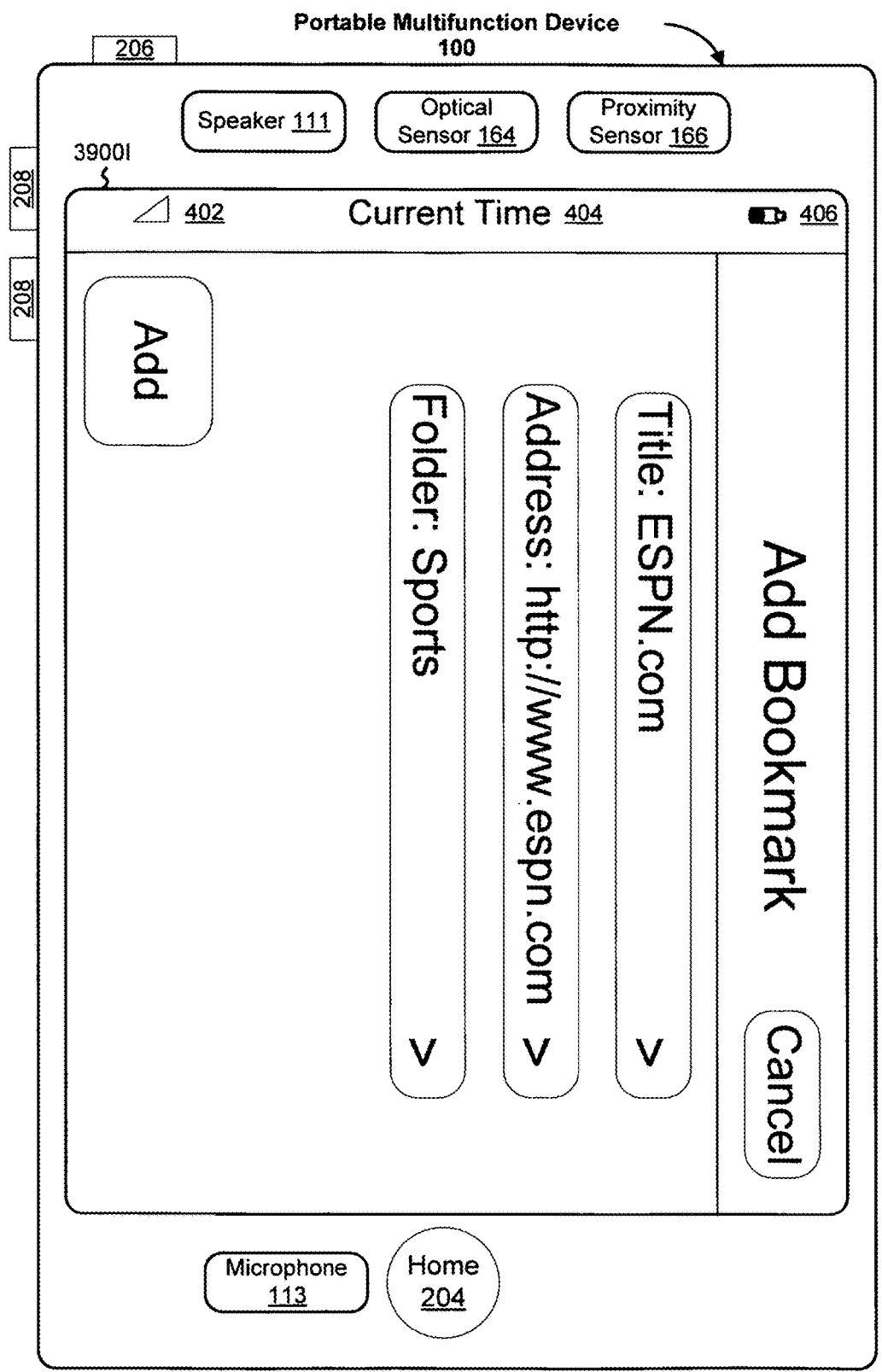

In some embodiments, user interface 3900A (FIG. 5A) includes the following elements, or a subset or superset thereof:
- 402, 404, and 406, as described above;
- Previous page icon 3902 that when activated (e.g., by a finger tap on the icon) initiates display of a previous web page (if any);
- Web page name 3904;
- Next page icon 3906 that when activated (e.g., by a finger tap on the icon) initiates display of a next web page (if any);
- URL (Uniform Resource Locator) entry box 3908 for inputting URLs of web pages;
- Refresh icon 3910 that when activated (e.g., by a finger tap on the icon) initiates a refresh of the web page;
- Web page 3912 or other structured document, which includes a plurality of blocks 3914 of text content and other graphics (e.g., images);
- Settings icon 3916 that when activated (e.g., by a finger tap on the icon) initiates display of a settings menu for the browser;
- Bookmarks icon 3918 that when activated (e.g., by a finger tap on the icon) initiates display of a bookmarks list or menu for the browser;
- Options icon 3920 that when activated (e.g., by a finger tap on the icon) initiates display of a plurality of options, including options for creating a web-clip widget, adding a bookmark, and emailing a link to the displayed web page 3912 (e.g., UI 3900F, FIG. 5F, which like other UIs and pages, can be displayed in either portrait or landscape view); and
- New window icon 3922 that when activated (e.g., by a finger tap on the icon) initiates display of a UI for adding new windows to the browser (e.g., UI 3900G, FIG. 5G).

In some embodiments, in response to a predefined gesture by the user on a block 3914 (e.g., a single tap gesture or a double tap gesture), the block is enlarged and centered (or substantially centered) in the web page display. For example, in response to a single tap gesture 3923 on block 3914-5, the user-selected block 3914-5 may be enlarged and centered in the display, as shown in UI 3900C (FIG. 5C). In some embodiments, the width of the user-selected block is scaled to fill the touch screen display. In some embodiments, the width of the user-selected block is scaled to fill the touch screen display with a predefined amount of padding along the sides of the display. In some embodiments, a zooming animation of the user-selected block is displayed during enlargement of the block. Similarly, in response to a single tap gesture 3925 on block 3914-2, block 3914-2 may be enlarged with a zooming animation and two-dimensionally scrolled to the center of the display (not shown).

In some embodiments, the device analyzes the render tree of the web page 3912 to determine the blocks 3914 in the web page. In some embodiments, a block 3914 corresponds to a render node that is: replaced; a block; an inline block; or an inline table.

In some embodiments, in response to the same predefined gesture by the user on a block 3914 (e.g., a single tap gesture or a double tap gesture) that is already enlarged and centered, the enlargement and/or centering is substantially or completely reversed. For example, in response to a single tap gesture 3929 on block 3914-5 (FIG. 5C), the web page image may zoom out and return to UI 3900A (FIG. 5A).

In some embodiments, in response to a predefined gesture (e.g., a single tap gesture or a double tap gesture) by the user on a block 3914 that is already enlarged but not centered, the block is centered (or substantially centered) in the web page display. For example, in response to a single tap gesture 3927 on block 3914-4 (FIG. 5C), block 3914-4 may be centered (or substantially centered) in the web page display. Similarly, in response to a single tap gesture 3935 on block 3914-6, block 3914-6 may be centered (or substantially centered) in the web page display. Thus, for a web page display that is already enlarged, in response to a predefined gesture, the device may display in an intuitive manner a series of blocks that the user wants to view. This same gesture may initiate different actions in different contexts (e.g., (1) zooming and/or enlarging in combination with scrolling when the web page is reduced in size, UI 3900A and (2) reversing the enlargement and/or centering if the block is already centered and enlarged).

In some embodiments, in response to a multi-touch (3931 and 3933) de-pinching gesture by the user (FIG. 5C), the web page may be enlarged. Conversely, in response to a multi-touch pinching gesture by the user, the web page may be reduced.

In some embodiments, in response to a substantially vertical upward (or downward) swipe gesture by the user, the web page (or, more generally, other electronic documents) may scroll one-dimensionally upward (or downward) in the vertical direction. For example, in response to an upward swipe gesture 3937 by the user that is within a predetermined angle (e.g., 27°) of being perfectly vertical, the web page may scroll one-dimensionally upward in the vertical direction.

Conversely, in some embodiments, in response to a swipe gesture that is not within a predetermined angle (e.g., 27°) of being perfectly vertical, the web page may scroll two-dimensionally (i.e., with simultaneous movement in both the vertical and horizontal directions). For example, in response to an upward or diagonal swipe gesture 3939 by the user that is not within a predetermined angle (e.g., 27°) of being perfectly vertical, the web page may scroll two-dimensionally along the direction of the swipe 3939.

In some embodiments, in response to a multi-touch (3941 and 3943) rotation gesture by the user, the web page may be rotated exactly 90° (UI 3900D, FIG. 5D) for landscape viewing, even if the amount of rotation in the multi-touch (3941 and 3943) rotation gesture is substantially different from 90°. Similarly, in response to a multi-touch (3945 and 3947) rotation gesture by the user (UI 3900D, FIG. 5D), the web page may be rotated exactly 90° for portrait viewing, even if the amount of rotation in the multi-touch (3945 and 3947) rotation gesture is substantially different from 90°.

Thus, in response to imprecise gestures by the user, precise movements of graphics occur. The device behaves in the manner desired by the user despite inaccurate input by the user. Also, note that the gestures described for UI 3900C, which has a portrait view, are also applicable to UIs with a landscape view (e.g., UI 3900D, FIG. 5D) so that the user can choose whichever view (portrait or landscape) the user prefers for web browsing.

In some embodiments, in response to a tap or other predefined user gesture on URL entry box 3908 (UI 3900A, FIG. 5A), the touch screen displays an enlarged entry box 3926 and a keyboard 616 (e.g., UI 3900B, FIG. 5B in portrait viewing and UI 3900E, FIG. 5E in landscape viewing). In some embodiments, the touch screen also displays:

Contextual clear icon 3928 that when activated (e.g., by a finger tap on the icon) initiates deletion of all text in entry box 3926;

a search icon 3930 that when activated (e.g., by a finger tap on the icon) initiates an Internet search using the search terms input in box 3926; and Go to URL icon 3932 that when activated (e.g., by a finger tap on the icon) initiates acquisition of the web page at the URL in box 3926;

Thus, the same entry box 3926 may be used for inputting both search terms and URLs. In some embodiments, whether or not clear icon 3928 is displayed depends on the context.

UI 3900G (FIG. 5G) is a UI for adding new windows to an application, such as the browser 147. UI 3900G displays an application (e.g., the browser 147), which includes a displayed window (e.g., web page 3912-2) and at least one hidden window (e.g., web pages 3912-1 and 3912-3 and possibly other web pages that are completely hidden off-screen). UI 3900G also displays an icon for adding windows to the application (e.g., new window or new page icon 3936). In response to detecting activation of the icon 3936 for adding windows, the browser adds a window to the application (e.g., a new window for a new web page 3912).

In response to detecting a gesture on the touch screen display, a displayed window in the application is moved off the display and a hidden window is moved onto the display. For example, in response to detecting a tap gesture 3949 on the left side of the screen, the window with web page 3912-2 is moved partially or fully off-screen to the right, the window with web page 3912-3 is moved completely off-screen, partially hidden window with web page 3912-1 is moved to the center of the display, and another completely hidden window (not shown in FIG. 5G) with a web page may be moved partially onto the display. Alternatively, detection of a left-to-right swipe gesture 3951 may achieve the same effect.

Conversely, in response to detecting a tap gesture 3953 on the right side of the screen, the window with web page 3912-2 is moved partially or fully off-screen to the left, the window with web page 3912-1 is moved completely off-screen, partially hidden window with web page 3912-3 is moved to the center of the display, and another completely hidden window (not shown in FIG. 5G) with a web page may be moved partially onto the display. Alternatively, detection of a right-to-left swipe gesture 3951 may achieve the same effect.

In some embodiments, in response to a tap or other predefined gesture on a delete icon 3934 (e.g., 3934-2 or 3934-3), the corresponding window 3912 is deleted. In some embodiments, in response to a tap or other predefined gesture on Done icon 3938, the window in the center of the display (e.g., 3912-2) is enlarged to fill the screen.

A user may create a web-clip widget in accordance with some embodiments. Activation of the user-created web-clip widget displays a previously specified area in a web page (having a specified URL) at a specified display size or scale factor. In some embodiments, the area in the web page is specified by scaling and/or translating the display of the web page. For example, a specified area in the web page is enlarged and centered. The specified area may be displayed in a browser application (e.g., the browser 147) or other application. For example, activation of the web-clip widget may display a particular block that is of interest to the user within the web page; furthermore, the block may be enlarged. Activation of the web-clip widget thus enables the user to view the particular block of interest without having to enlarge and center the web page area that is of interest each time the user visits the web page. In some embodiments, after activation of the web-clip widget, the user may manipulate the display to view other portions of the web page by scaling and/or translating the display. Alternatively, in some embodiments, the user may not be permitted to manipulate the display.

Web-clip widgets provide more functionality than mere bookmarks: activation of a bookmark only displays a specified web page, while activation of a web-clip widget displays a specified area of a web page at a specified display size or scale factor in accordance with some embodiments. Similarly, a web-clip widget is distinguishable from a hyperlink. To view a web page or portion thereof specified by a hyperlink, the user must activate the browser application, navigate to a web page containing the hyperlink, activate the hyperlink, and then potentially scroll and/or scale the resulting web page. In contrast, to view an area of a web page specified by a web-clip widget, the user merely activates the widget.

In some embodiments, the web-clip widget corresponds to a block or other structural element of the web page. As described in U.S. patent application Ser. No. 11/620,492, "Selecting and Manipulating Web Content," filed on Jan. 5, 2007, which application is incorporated by reference herein in its entirety, structural elements that are displayed in a web page may be identified during the web-clip widget creation process. In some embodiments, if the dimensions of a selected structural element change after creation of a web-clip widget, the area that is displayed upon activation of the web-clip widget is changed accordingly.

In some embodiments, a web-clip widget comprises a URL for the web page and data (e.g., metadata) indicating the user-specified portion of the web page. For example, in some embodiments the web-clip widget comprises a file containing an XML property list that includes the URL and the data indicating the user-specified portion of the web page. In some embodiments, the data indicating the user-specified portion of the web page includes a reference point (e.g., a corner point or center point for the widget) and a scale factor. In some embodiments, the data indicating the user-specified portion of the web page includes a set of coordinates within the web page (e.g., a user-defined rectangle) or an identification of a structural element within the web page. The application for viewing the web-clip widget (e.g., the browser 147) is configured to process the data indicating the user-specified portion of the web page and to display the corresponding portion.

In some embodiments a web-clip widget comprises an executable script. In some embodiments, the widget includes an HTML (Hypertext Markup Language) file, a CSS (Cascading Style Sheets) file, and a JavaScript file. In some embodiments, the widget includes an XML (Extensible Markup Language) file and a JavaScript file (e.g., Yahoo! Widgets).

To the extent that any application incorporated by reference herein includes a definition of web-clip widgets that contradicts the definition in the preceding five paragraphs, the definition in the preceding five paragraphs is to be considered controlling for purposes of interpreting the specification and claims of the present application.

Figure 7A:
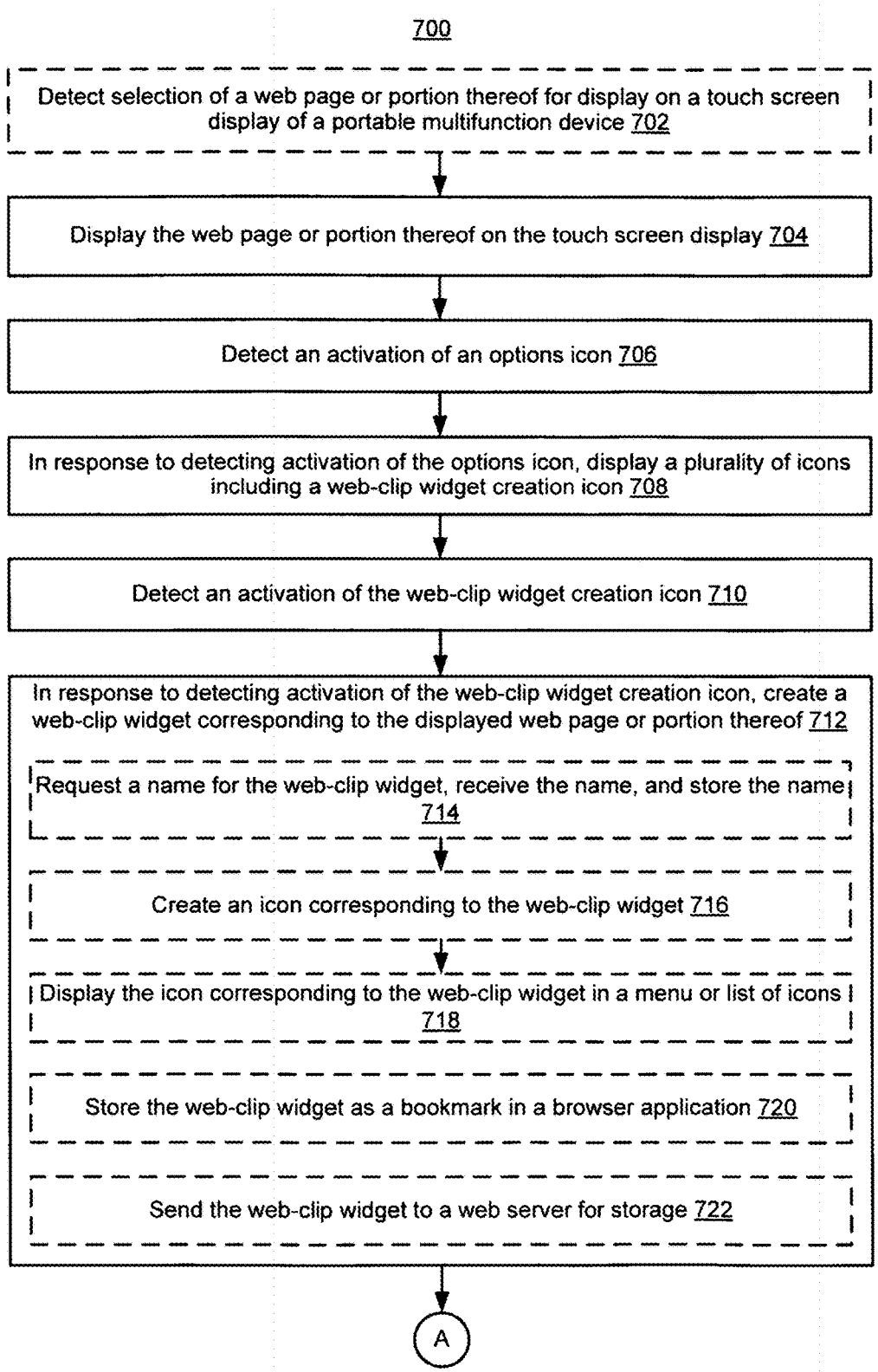
FIGS. 7A-7E are flow diagrams illustrating processes for creating and using a web-clip widget in accordance with some embodiments.

Referring to FIG. 5C, in some embodiments, once a user has centered and/or enlarged an area of a web page (e.g., block 3914-5), the user may initiate creation of a web-clip widget by activating the options icon 3920. The options icon 3920 is an example of an options icon referenced in operation 706 of process 700 (FIG. 7A, below). In some embodiments, the user activates the options icon 3920 by performing a tap or other predefined gesture on the options icon 3920.

As a result of activating the options icon 3920, a user interface such as UI 3900F (FIG. 5F) is displayed (e.g., operation 708, FIG. 7A), which includes a plurality of icons 3972. In some embodiments, the plurality of icons 3972 includes an icon 3973 for creating a web-clip widget, an icon 3974 for adding a bookmark (e.g., via UI 3900I, FIG. 5I), an icon 3975 for emailing a link corresponding to the displayed web page 3912, and a cancel icon 3976 for returning to the previous UI. If the user activates the "create web-clip widget" icon 3973, a web-clip widget corresponding to the centered and/or enlarged area of the web page (e.g., block 3914-5 or the entire displayed portion of the web page 3912), will be created (e.g., operations 710 and 712, FIG. 7A). Text and/or graphics displayed for the icon 3973 may vary. In some embodiments, for example, the icon 3973 may be labeled "Add to Home Screen."

In some embodiments, in response to user activation of the "create web-clip widget" icon 3973 (FIG. 5F), UI 3900H (FIG. 5H) will appear and will prompt the user to enter the widget name in text entry box 3960 using the contextual keyboard 616. In some embodiments, the user can access other keyboards that display other symbols by activating the alternate keyboard selector icon 618. In some embodiments, UI 3900H includes an image 3978 of the selected area of the web page. Once the user has completed entering the widget name in the text entry box 3960, the user activates the add-widget icon 3928 and the widget is created. Alternately, the user may activate the cancel icon to avoid creating the widget.

In some embodiments, as a result of activating the "create web-clip widget" icon 3973, a web-clip widget corresponding to the centered and/or enlarged area of the web page will be created and assigned a name without any further actions by a user. In some embodiments, instead of displaying a user interface such as UI 3900H (FIG. 5H) for receiving a name, the newly created web-clip widget may be assigned the same name as the web page name 3904.

Figure 4B:
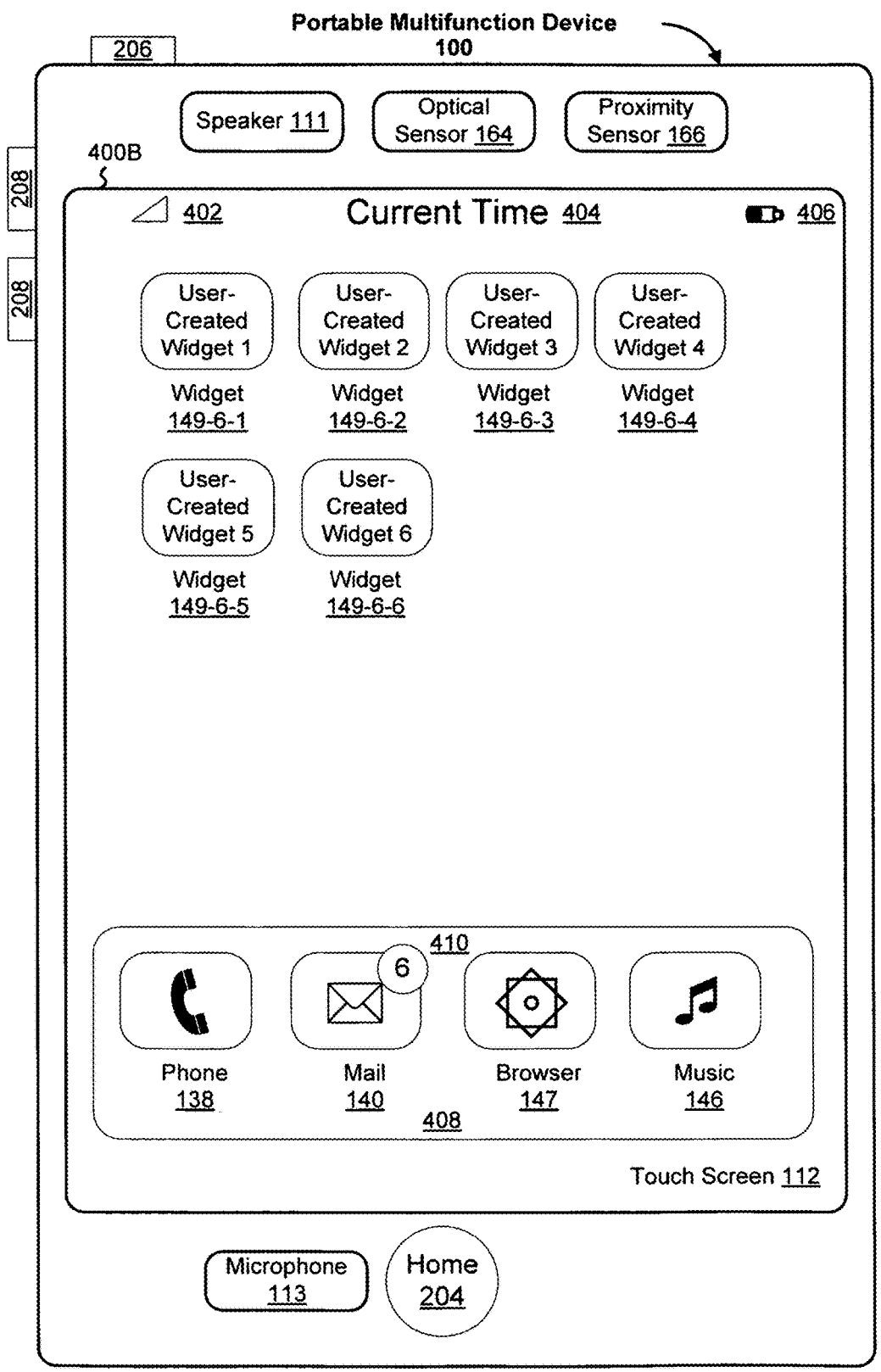
Figure 4C:
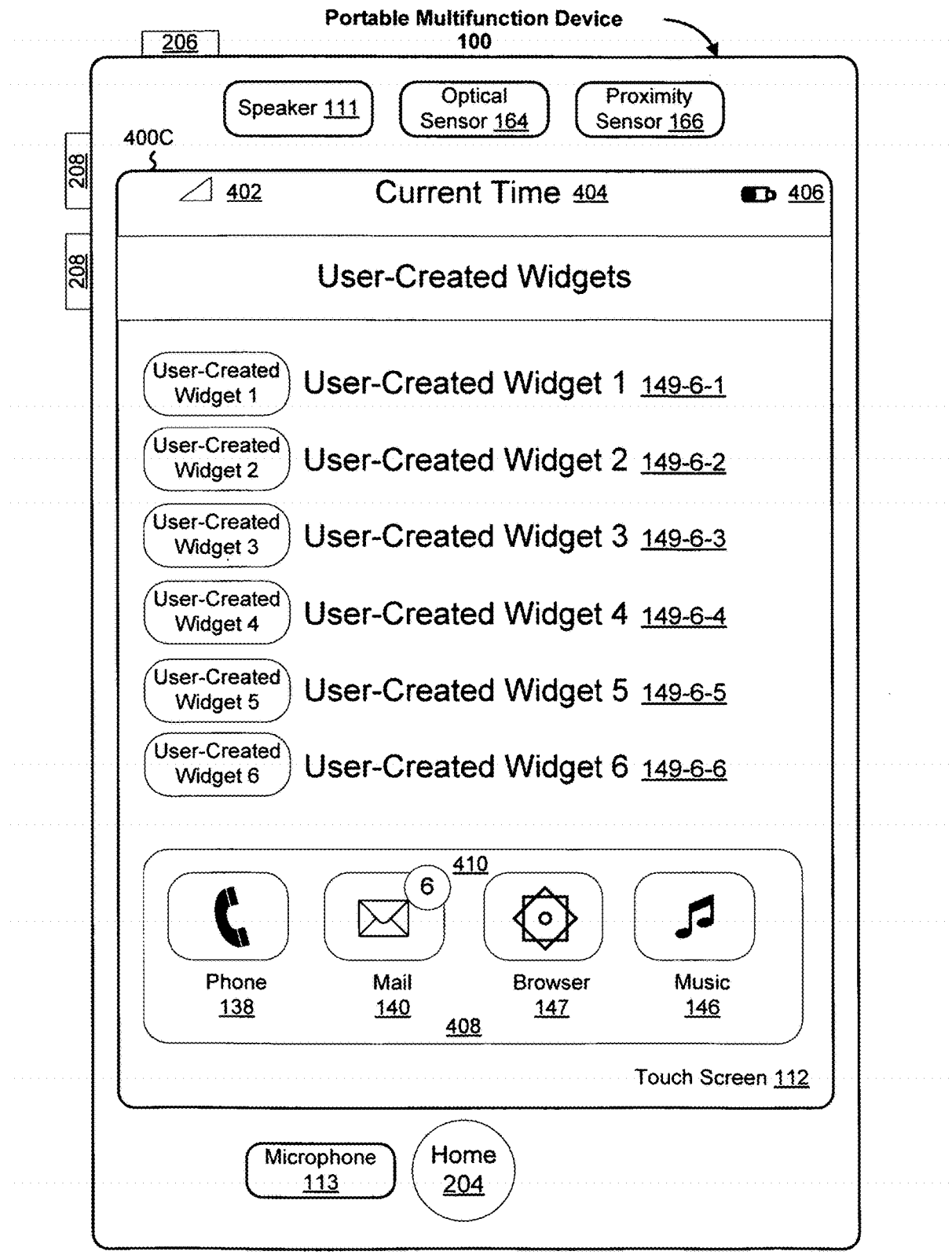
FIG. 4C illustrates an exemplary user interface having a list of user-created widgets on a portable multifunction device in accordance with some embodiments.

An icon corresponding to the newly created widget may be created and displayed on a menu in a UI such as UI 400A or UI 400B (FIG. 4A or 4B). Alternatively, the icon and/or the name of the newly created widget may be listed on a UI such as UI 400C (FIG. 4C). Subsequent activation of the newly created widget will launch an application (e.g., the browser 147) that will display the web-clip widget. In some embodiments, the web-clip widget is displayed within the browser UI (e.g., UI 3900C, FIG. 5C). In some embodiments, the web-clip widget is displayed without other elements of the browser UI (e.g., without elements 3902, 3906, 3908, and/or 3910), such that the web-clip widget appears to be its own mini-application rather than a portion of a web page displayed in a browser. In some embodiments, the web-clip widget is displayed with decorative features such as a decorative frame or a border resembling a torn page. In some embodiments, the decorative features are user-customizable.

For example, as described above, a user viewing web page 3912 (FIG. 5A) may enlarge and center block 3914-5 by performing a tap gesture 3923 (e.g., a single tap or a double tap) on block 3914-5. As a result, block 3914-5 appears enlarged and centered in the browser window, as shown in FIG. 5C. The user then may perform gestures (e.g., taps) on the options icon 3920 and the web-clip widget creation icon 3973 (FIG. 5F) to create a widget corresponding to block 3914-5, in accordance with some embodiments. In some embodiments, the user then enters a widget name in the text entry box 3960 (FIG. 5H) and activates the add-widget icon 3928. A corresponding icon may be created and displayed on a menu such as in UI 400A or 400B (FIG. 4A or 4B) or in a list such as in UI 400C (FIG. 4C). In some embodiments, subsequent activation of the newly created widget will launch the browser 147, which will display block 3914-5, as shown in UI 3900C (FIG. 5C).

In some embodiments, instead of or in addition to performing a tap gesture 3923 (FIG. 5A) to center and enlarge a block, a user may define the area of a web page to be associated with a widget by performing one or more other gestures. Examples of gestures that may be used to define the area of the web page include a tap gesture 3927 or 3935 (FIG. 5C) to center an adjacent enlarged block; a multi-touch depinching gesture (3931 and 3933) (FIG. 5C) to enlarge the web page; a multi-touch pinching gesture (not shown) to reduce the web page; swipe gestures such as a substantially vertical swipe 3937 (FIG. 5C), an upward or diagonal swipe 3939 (FIG. 5C), and/or other swipe gestures (not shown) to scroll the web page; and/or a multi-touch rotation gesture (3941 and 3943) to select a portrait or landscape view (FIG. 5C).

In some embodiments, instead of first defining the area of the web page to be associated with the web-clip widget and then activating the options icon 3920 (e.g., FIG. 5C) and the "create web-clip widget" icon 3973 (FIG. 5F), a user may first activate the icons 3920 and 3973 and then define the area by performing gestures that are detected by the touch screen display, such as those described above. Once the area has been selected and/or scaled, the user may make a gesture on the touch screen to indicate that the area of the web page to be associated with the widget has been defined.

Figure 5J:
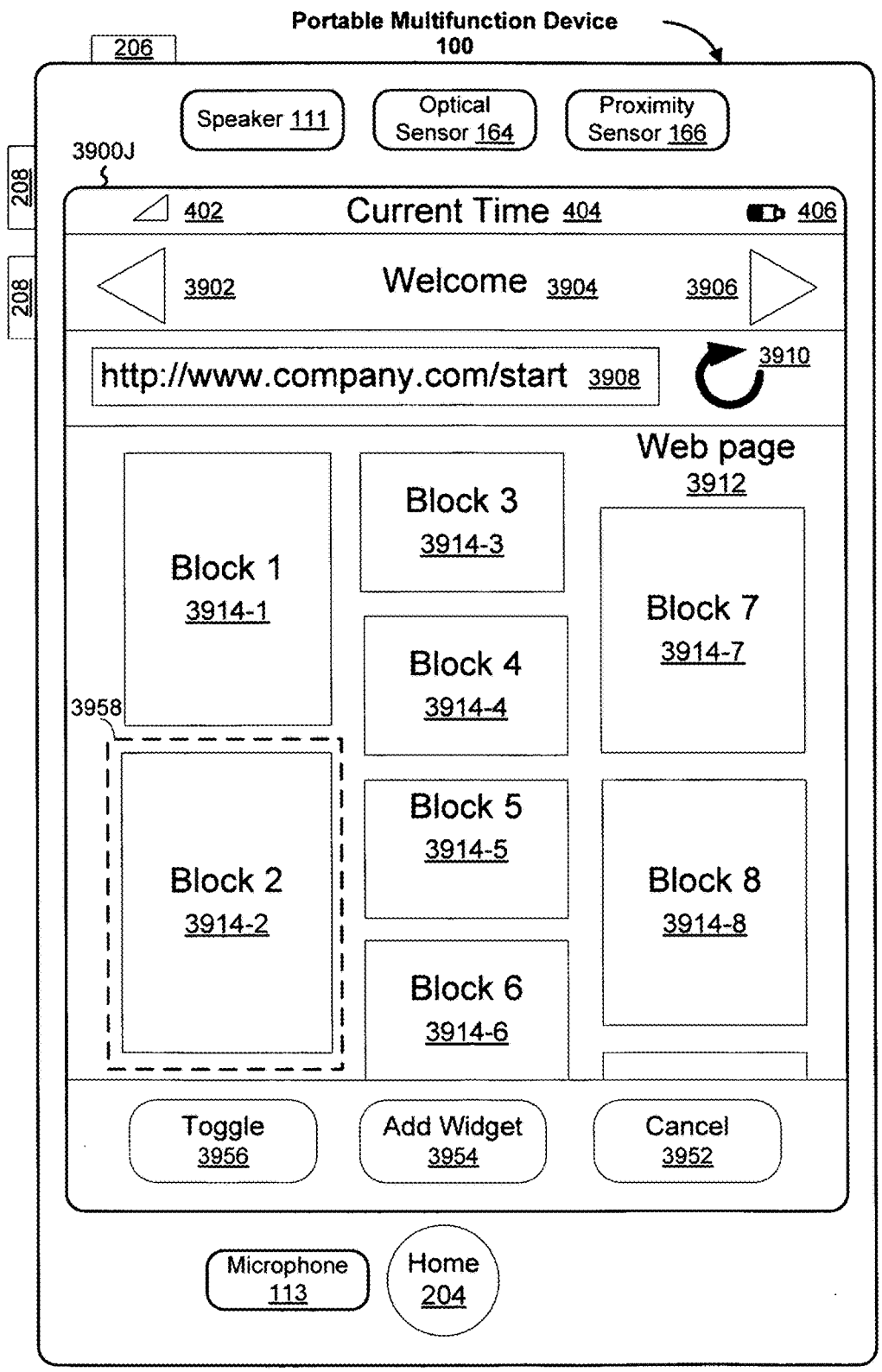
Figure 5K:
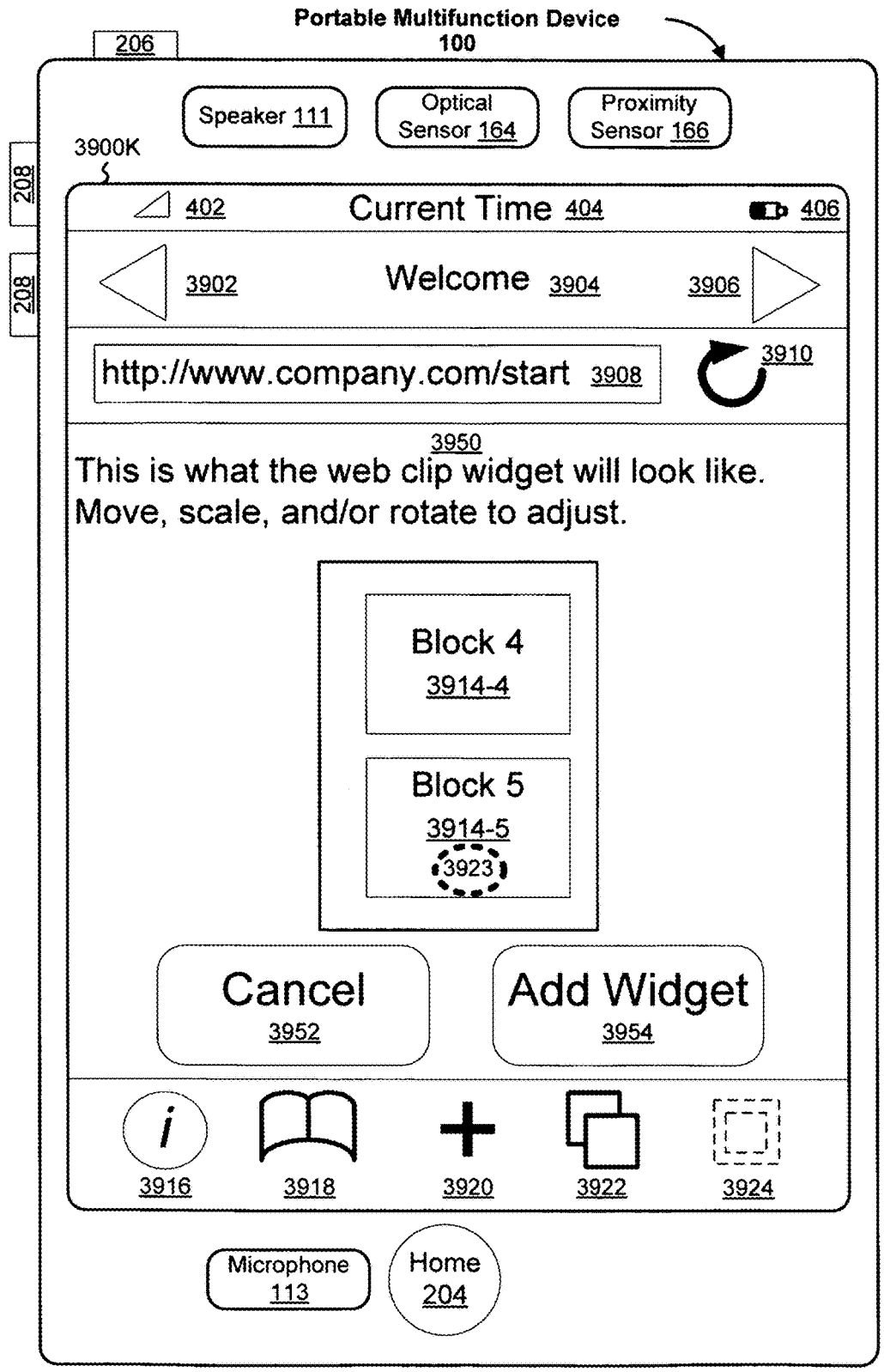

In some embodiments, in response to the user activating the "create web-clip widget" icon 3973 (FIG. 5F), the device displays a user interface (e.g., UI 3900K, FIG. 5K) that lets the user define the area of the web page to be associated with the widget. The user may define the area using gestures such as the gestures described above with reference to UIs 3900A, 3900C, and 3900D (FIGS. 5A, 5C, and 5D). In some embodiments, the user interface may include information 3950 to help guide the user. In some embodiments, the user may activate a cancel icon 3952 to abort the widget creation process and may activate an add widget icon 3954 to complete the widget creation process. In some embodiments, a rotation gesture such as multi-touch rotation gesture (3941 and 3943, FIG. 5C) rotates the entire UI 3900K, and not just the defined area, from portrait viewing to landscape viewing or vice versa.

In some embodiments, in response to the user activating the "create web-clip widget" icon 3973 (FIG. 5F), the device displays a user interface (e.g., UI 3900J, FIG. 5J) that lets the user define the area of a web page to be associated with a widget by toggling between frames. The frames are successively overlaid on the web page to frame or highlight successive blocks and other structural elements of the web page. For example, in UI 3900J a frame 3958 frames block 2 3914-2. The user may activate a toggle icon 3956 to toggle between successive blocks. Once a block of interest is framed, the user may activate an add widget icon 3954 to create a widget corresponding to the framed block. The user may activate a cancel icon 3952 to end the widget creation process.

Figure 6A:
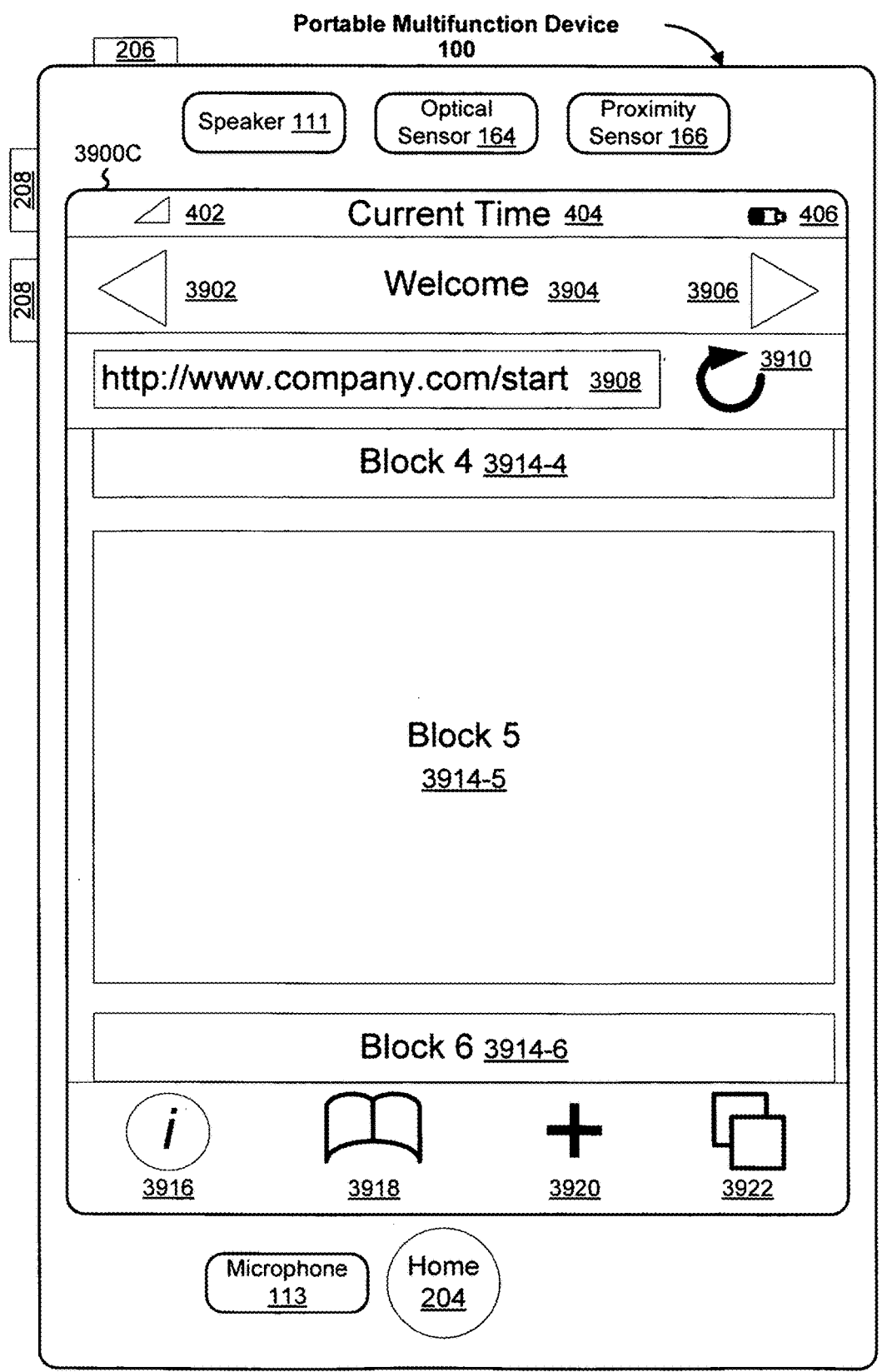
FIGS. 6A-6D illustrate an animation for creating and displaying an icon corresponding to a web-clip widget in accordance with some embodiments.
Figure 6B:
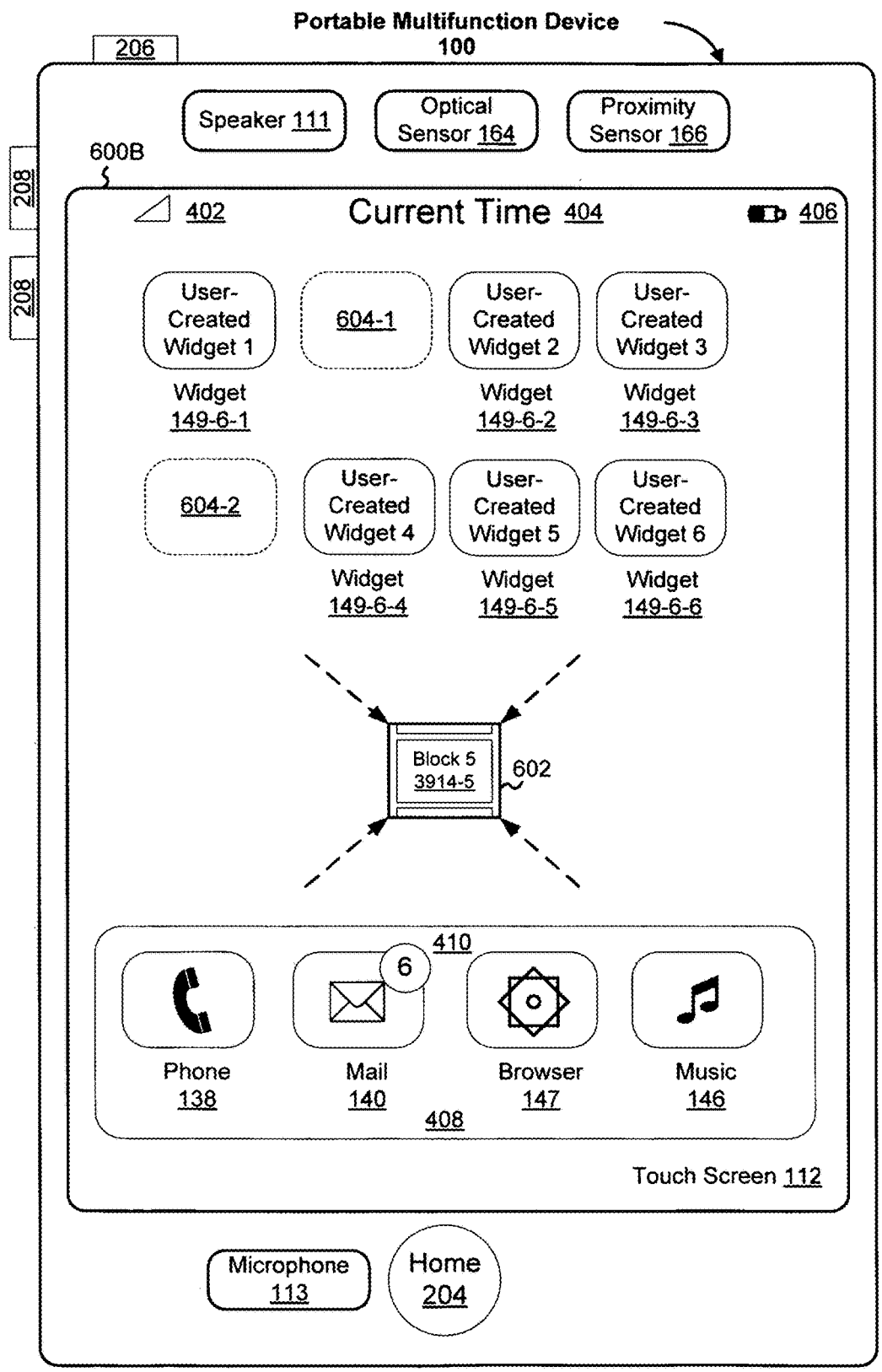
Figure 6C:
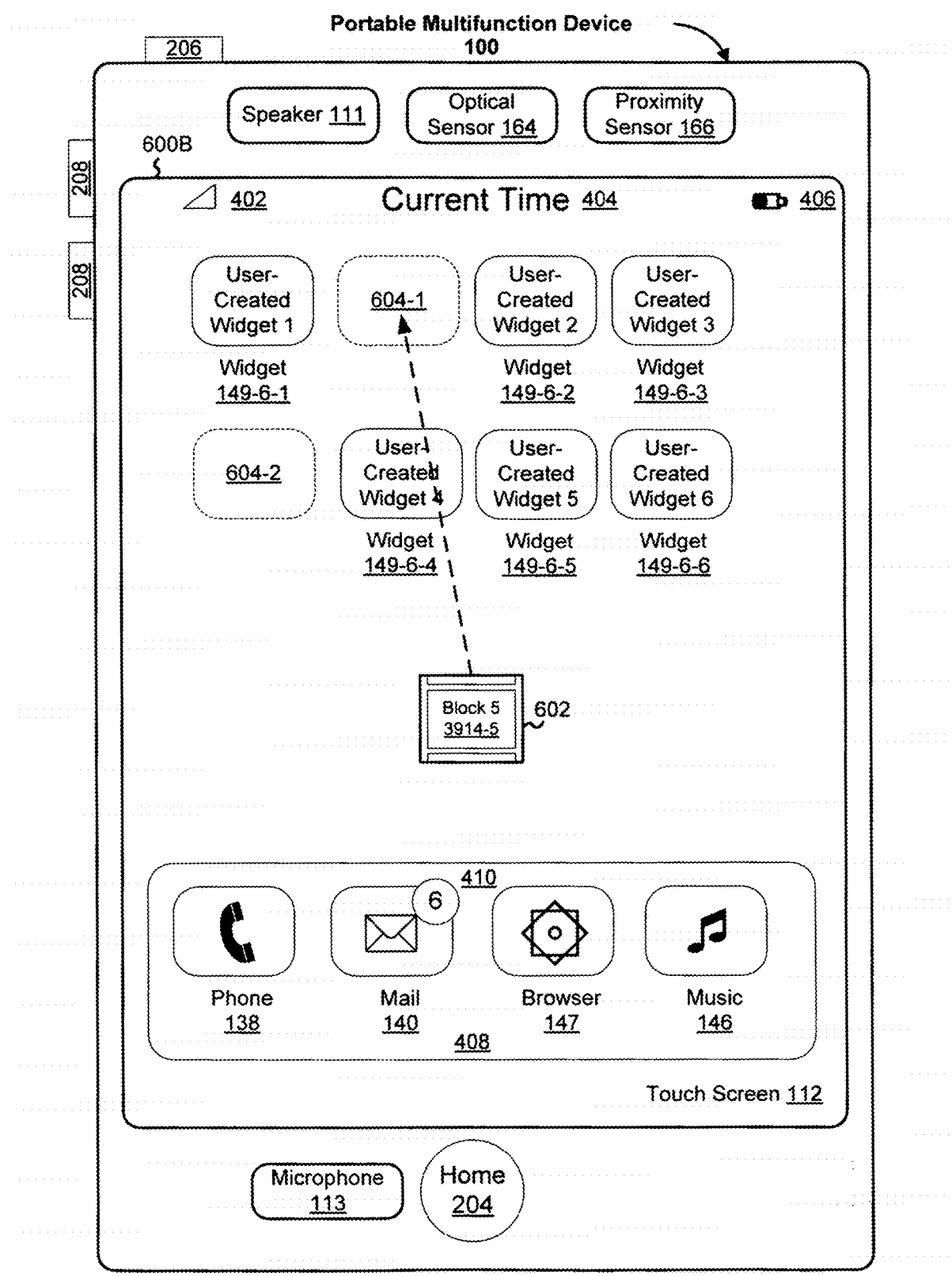
Figure 6D:
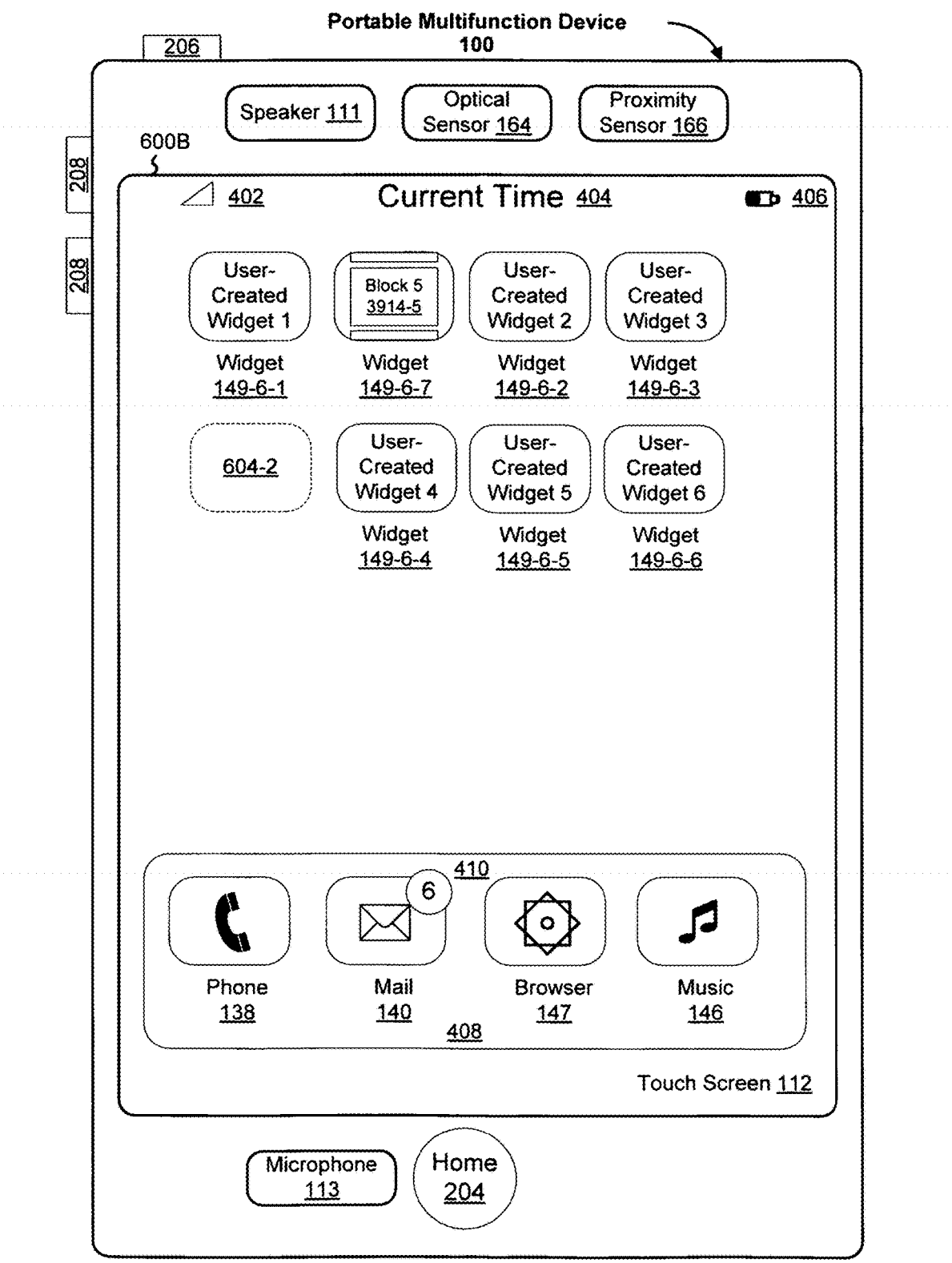

In some embodiments, creating and displaying an icon corresponding to the newly created web-clip widget includes displaying an animation, as illustrated in FIGS. 6A-6D in accordance with some embodiments. The animation may be displayed, for example, after activation of the add-widget icon 3928 (FIG. 5H) or after activation of the "create web-clip widget" icon 3973 (FIG. 5F). In the animation, the selected area of the web page 3912 corresponding to the newly created web-clip widget (e.g., block 3914-5 in UI 3900C) is displayed, as illustrated in FIG. 6A. The displayed image is shrunk down, as illustrated for image 602 (FIG. 6B), and displayed over a menu of icons. In some embodiments, the menu of icons includes vacant areas (e.g., 604-1 and 604-2, FIG. 6B) in which an icon could be displayed but is not currently displayed. The image 602 may be moved (FIG. 6C) into the first available vacancy 604-1, where it is displayed as an icon corresponding to the new web-clip widget 149-6-7 (FIG. 6D). In some embodiments, the first available vacancy is the left-most vacancy in the highest row with a vacancy. In other embodiments, the image is moved into another vacancy or is appended to the menu after the last (e.g., lowest and right-most) vacancy.

In some embodiments, instead of displaying an animation, the icon corresponding to the newly created web-clip widget is simply displayed in a first available vacancy in a menu of icons or in another available vacancy in the menu, or is appended to the menu.

Figure 6E:
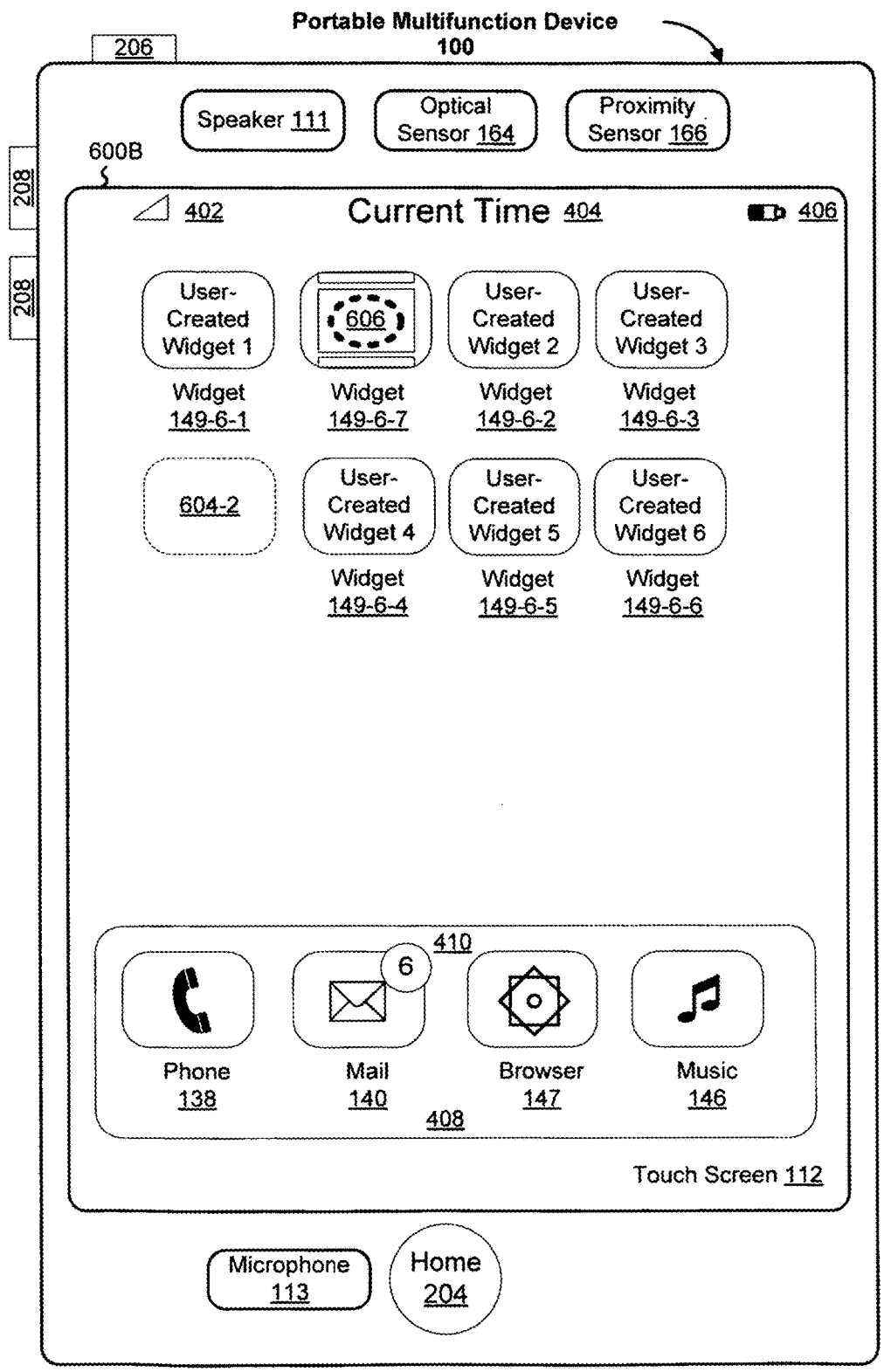
FIG. 6E illustrates an exemplary user interface for activating a web-clip widget in accordance with some embodiments.

Activation of the icon corresponding to the newly created web-clip widget 149-6-7 (e.g., by a gesture 606 (FIG. 6E) on the icon, such as a tap gesture) results in display of the corresponding web-clip widget (e.g., display of block 3914-5, as shown in FIG. 6A) in the browser application or in its own mini-application without other elements of the browser UI.

Figure 5L:
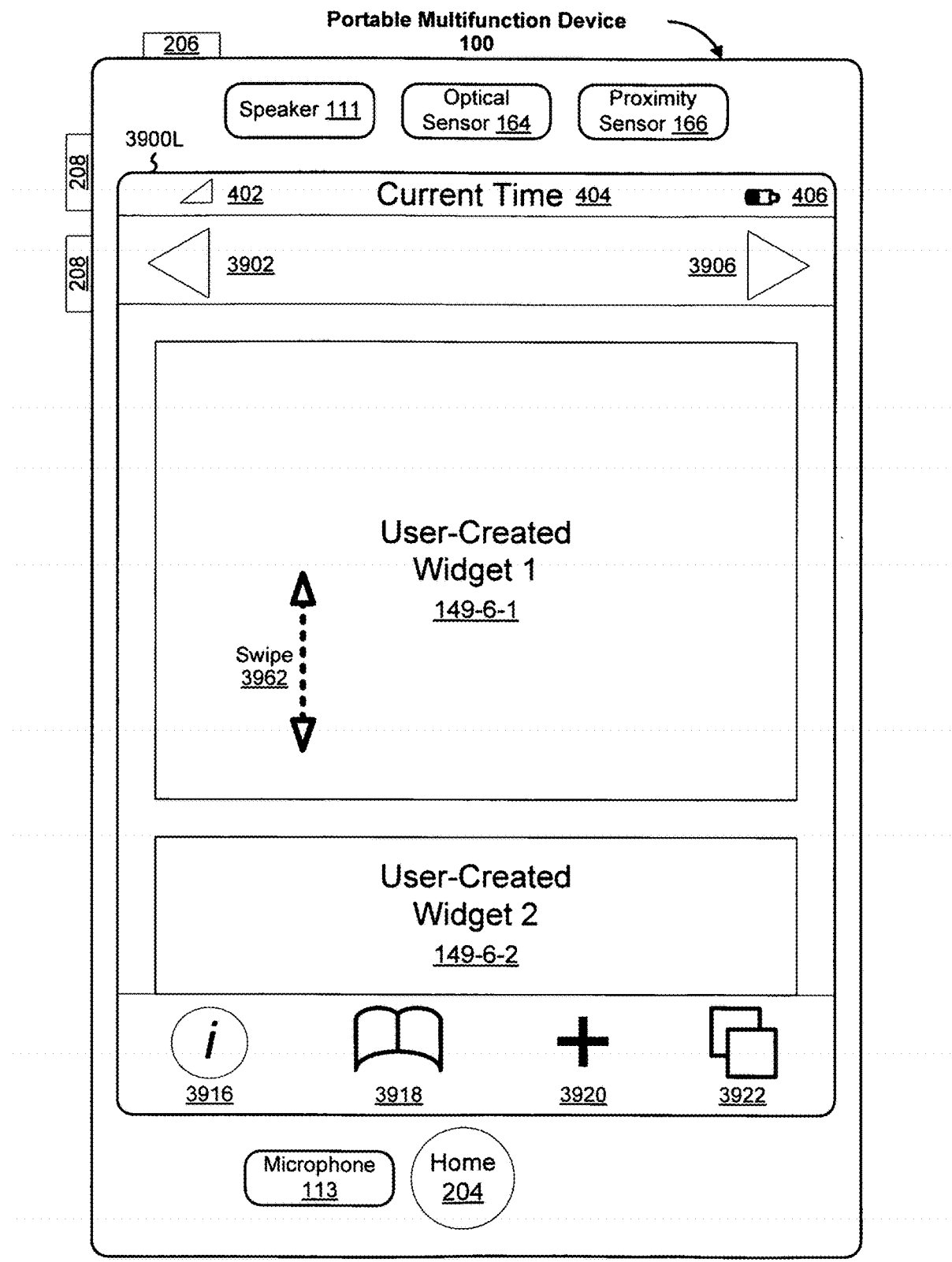
FIGS. 5L and 5M illustrate exemplary user interfaces for displaying web-clip widgets in accordance with some embodiments.

UI 3900L (FIG. 5L) is a UI for displaying a portion of two or more web-clip widgets, in accordance with some embodiments. The displayed portion may include a first web-clip widget (e.g., 149-6-1), and may include all or a portion of additional web-clip widgets (e.g., 149-6-2). The displayed portion is scrolled in response to detecting a gesture on the touch screen display, such as a swipe gesture 3962.

UI 3900M (FIG. 5M) is a UI for displaying a web-clip widget (e.g., 149-6-2) in accordance with some embodiments. In response to detecting a gesture on the touch screen display, display of the web-clip widget is ceased and another web-clip widget is displayed. For example, in response to detecting a downward swipe 3962 or a tap gesture 3964 at the top of the displayed widget 149-6-2, display of the web-clip widget 149-6-2 is ceased and a previous user-created widget 149-6-1 is displayed. In response to detecting an upward swipe 3962 or a tap gesture 3966 at the bottom of the displayed widget 149-6-2, display of the web-clip widget 149-6-2 is ceased and a next user-created widget 149-6-3 is displayed. Alternatively, in response to detecting a substantially horizontal right-to-left swipe 3963 or a tap gesture 3965 at the right side of the displayed widget 149-6-2, display of the web-clip widget 149-6-2 is ceased and a next user-created widget 149-6-3 is displayed. In response to detecting a substantially horizontal left-to-right swipe 3963 or a tap gesture 3967 at the left side of the displayed widget 149-6-2, display of the web-clip widget 149-6-2 is ceased and a previous user-created widget 149-6-1 is displayed.

FIG. 7A is a flow diagram illustrating a process 700 for creating a web-clip widget from a web page or portion thereof on a portable multifunction device with a touch screen display in accordance with some embodiments.

While the web-clip widget creation process 700 described below includes a number of operations that appear to occur in a specific order, it should be apparent that the process 700 can include more or fewer operations, which can be executed serially or in parallel (e.g., using parallel processors or a multi-threading environment), an order of two or more operations may be changed, and/or two or more operations may be combined into a single operation.

In some embodiments, selection of a web page or portion thereof for display is detected (702). For example, one or more finger gestures are detected on the touch screen display to select the web page or portion thereof. In some embodiments, the one or more finger gestures include one or more finger gestures to scale an area in the web page. In some embodiments, the one or more finger gestures include one or more finger gestures to center an area in the web page. Examples of finger gestures used to select, center, and/or scale an area in the web page include a tap gesture 3923 or 3925 to center and enlarge a block (FIG. 5A); a tap gesture 3927 or 3935 to center an adjacent enlarged block; a multi-touch depinching gesture (3931 and 3933) to enlarge the web page; a multi-touch pinching gesture (not shown) to reduce the web page; swipe gestures such as a substantially vertical swipe 3937, an upward or diagonal swipe 3939, and/or other swipe gestures (not shown) to translate the web page; and/or a multi-touch rotation gesture (3941 and 3943) to select a portrait or landscape view (FIG. 5C).

The web page or portion thereof is displayed (704) on the touch screen display. In the example of FIG. 5C, block 3914-5 is displayed on the touch screen display.

An activation of an options icon (e.g., icon 3920) is detected (706). In some embodiments, detecting activation of the options icon includes detecting a finger gesture (e.g., a tap gesture) on the options icon.

In response to detecting activation of the options icon, a plurality of icons (e.g., 3972, FIG. 5F) is displayed (708) including a web-clip widget creation icon (e.g., icon 3973, FIG. 5F). In some embodiments, the web-clip widget creation icon includes text, such as "Create Web-Clip Widget" or "Add to Home Screen."

An activation of the web-clip widget creation icon (e.g., 3973) is detected (710). In some embodiments, detecting activation of the web-clip widget creation icon includes detecting a finger gesture (e.g., a tap gesture) on the web-clip widget creation icon.

In response to detecting activation of the web-clip widget creation icon, a web-clip widget is created (712) corresponding to the displayed web page or portion thereof.

In some embodiments, the web-clip widget corresponds to a structural element of the web page, such as a particular block within the web page. In some embodiments, the web-clip widget corresponds to a user-specified rectangle in the web page.

In some embodiments, creating the web-clip widget includes (714) requesting a name for the web-clip widget, receiving the name, and storing the name. In some embodiments, requesting the name includes displaying a keyboard to receive input for the name. For example, in UI 3900H (FIG. 5H), the user is prompted to enter the widget name in the text entry box 3960 using the keyboard 616.

In some embodiments, creating the web-clip widget includes creating (716) an icon corresponding to the web-clip widget and displaying (718) the icon corresponding to the web-clip widget in a menu (e.g., UI 400A or 400B, FIG. 4A or 4B) or list (e.g., UI 400C, FIG. 4C) of icons. In some embodiments, the icon corresponding to the web-clip widget is created in response to detecting an activation of an add-widget icon (e.g., icon 3928, FIG. 5H). In some embodiments, the icon corresponding to the web-clip widget is created in response to detecting an activation of the web-clip widget creation icon (e.g., 3973, FIG. 5F).

In some embodiments, the menu or list of icons comprises a menu or list of applications and widgets (e.g., UI 400A, FIG. 4A) on the multifunction device. In some embodiments, the menu or list of icons comprises a menu or list of widgets on the multifunction device. In some embodiments, the menu or list of icons comprises a menu or list of user-created widgets (e.g., UI 400B or 400C, FIG. 4B or 4C) on the multifunction device.

In some embodiments, the icon corresponding to the web-clip widget is displayed in a previously vacant area in the menu of icons. In some embodiments, the previously vacant area is a first available vacancy (e.g., 604-1, FIG. 6B) in the menu of icons. In some embodiments, an animation is displayed of the icon corresponding to the web-clip widget moving into the previously vacant area. For example, FIGS. 6A-6D illustrate an animation in which an icon corresponding to the web-clip widget 149-6-7 is created and moved into a previously vacant area in UI 600B.

In some embodiments, the web-clip widget is stored (720) as a bookmark in a browser application. In some embodiments, as described in U.S. patent application Ser. No. 11/469,838, "Presenting and Managing Clipped Content," filed on Sep. 1, 2006, which application is incorporated by reference herein in its entirety, the web-clip widget is encoded as a URL associated with the bookmark.

In some embodiments, the web-clip widget is sent (722) to a web server for storage. In some embodiments, the web-clip widget stored on the web server is publicly accessible. Storing a user-created web-clip widget on a publicly accessible server allows the user to share the web-clip widget with other users.

Figure 7B:
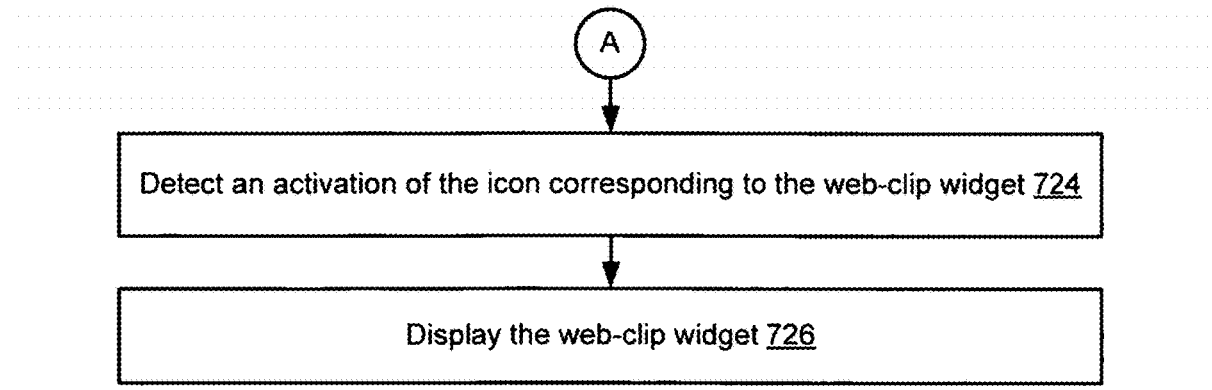

In some embodiments, as illustrated in FIG. 7B, an activation of the icon corresponding to the web-clip widget is detected (724). For example, a finger gesture (e.g., a tap gesture 606, FIG. 6E) is detected on the icon. In response, the web-clip widget is displayed (726). For example, in response to detecting the tap gesture 606, block 3914-5 is displayed, as illustrated in FIG. 6A in the browser application or, as described above, as its own mini-application without other elements of the browser UI.

Figure 7C:
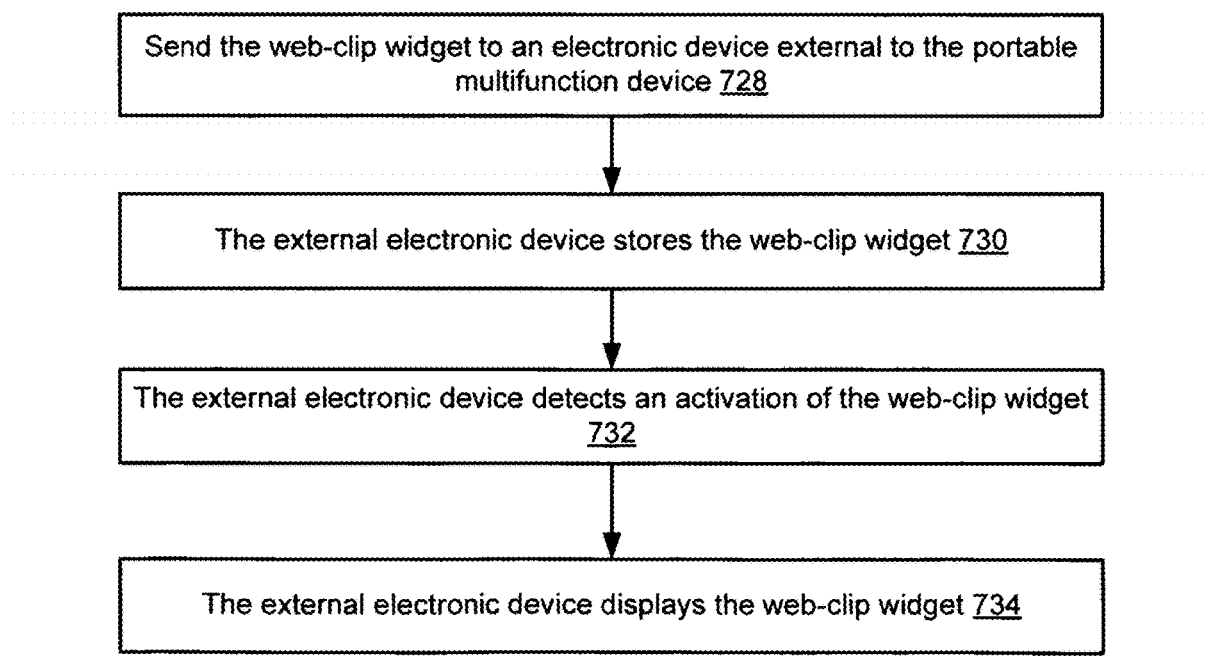

In some embodiments, as illustrated in FIG. 7C, the web-clip widget is sent (728) to an electronic device external to the portable multifunction device. For example, the web-clip widget may be sent to another portable multifunction device 100. The external electronic device stores (730) the web-clip widget, detects an activation (732) of the web-clip widget, and displays the web-clip widget (734). In some embodiments, the web-clip widget is sent to the external electronic device via email. In some embodiments, the web-clip widget is sent to the external electronic device via instant messaging. As used herein, "instant messaging" refers to both telephony-based messages (e.g., messages sent using Multimedia Message Service (MMS)) and Internet-based messages (e.g., messages sent using Extensible Messaging and Presence Protocol (XMPP), Session Initiation Protocol for Instant Messaging and Presence Leveraging Extensions (SIMPLE), or Instant Messaging and Presence Service (IMPS)). Sending a user-created web-clip widget to another electronic device provides the user with a way to share the web-clip widget with other users. Operations 728-734 of FIG. 7C may be performed as part of process 700 or may be performed as an independent process.

Figure 7D:
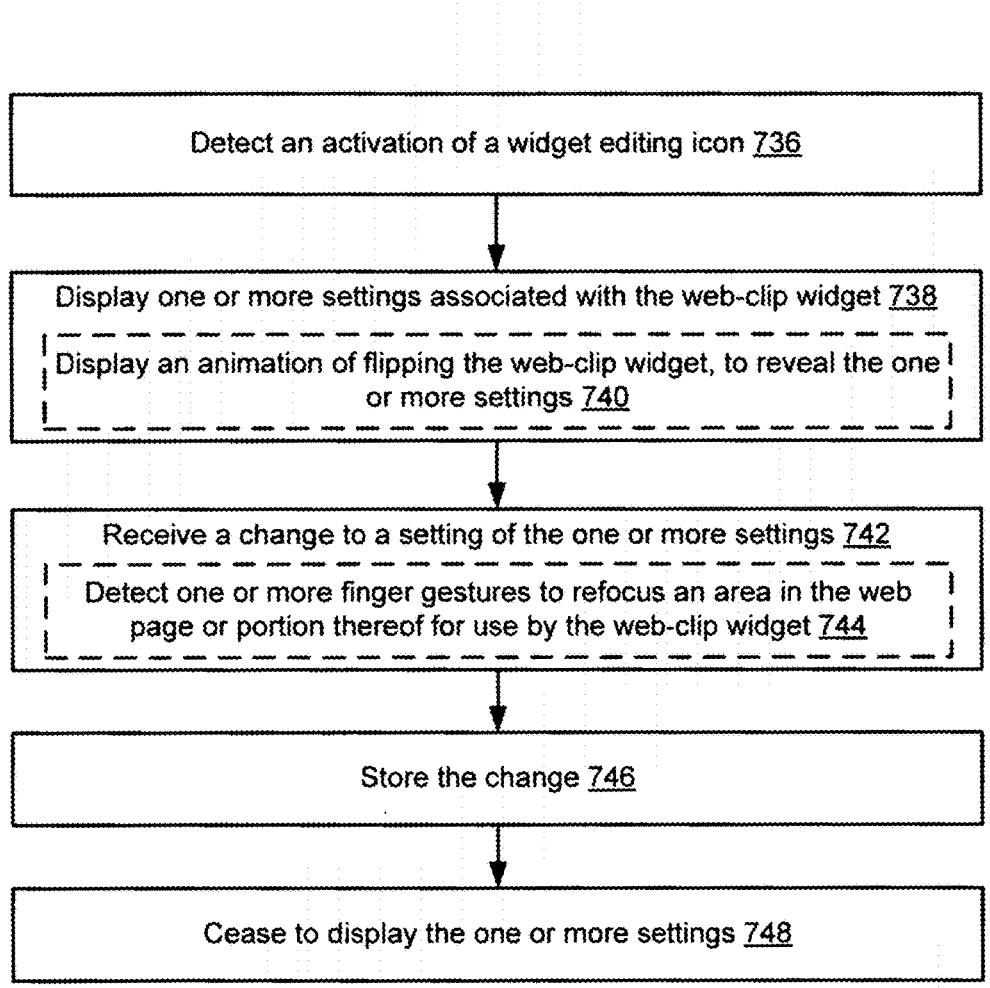

In some embodiments, as illustrated in FIG. 7D, an activation of a widget editing icon (e.g., edit widget icon 3970, FIG. 5M) is detected (736). In response to detecting the activation of the widget editing icon, one or more settings associated with the web-clip widget are displayed (738). In some embodiments, an animation is displayed (740) of flipping the web-clip widget, to reveal the one or more settings. As described in U.S. patent application Ser. No. 11/145,561, "Presenting Clips of Content," filed on Jun. 3, 2005, which application is incorporated by reference herein in its entirety, settings (e.g., preferences) associated with a web-clip widget may be displayed by flipping the widget to reveal a user interface to edit the settings. A change to a setting of the one or more settings is received (742). In some embodiments, one or more finger gestures are detected to refocus (744) an area in the web-clip or portion thereof for use by the web-clip widget. As described in the "Presenting Clips of Content" application, the user interface revealed by flipping the widget may include a refocus preference to allow redefinition of the selected area of the web page for use by the web-clip widget. The change is stored (746) and display of the one or more settings is ceased (748). Operations 736-748 of FIG. 7D may be performed as part of process 700 or may be performed as an independent process.

In some embodiments, each operation of process 700 is performed by a portable multifunction device. In some embodiments, however, one or more operations of process 700 are performed by a server system in communication with a portable multifunction device via a network connection. The portable multifunction device may transmit data associated with the widget creation process to the server system and may receive information corresponding to the widget in return. For example, code (e.g., an HTML file, a CSS file, and/or a JavaScript file, in accordance with some embodiments, or an XML file and/or a JavaScript file, in accordance with some other embodiments) associated with the widget may be generated by the server system and then transmitted to the portable multifunction device. In general, operations in the widget creation process may be performed by the portable multifunction device, by the server system, or by a combination thereof.

Process 700 creates a widget that allows a user to view a specified area in a web page upon activation of the widget. The user thus is spared from having to enlarge and center the area of the web page that is of interest, such as a particular block of interest, each time the user visits the web page.

Figure 7E:
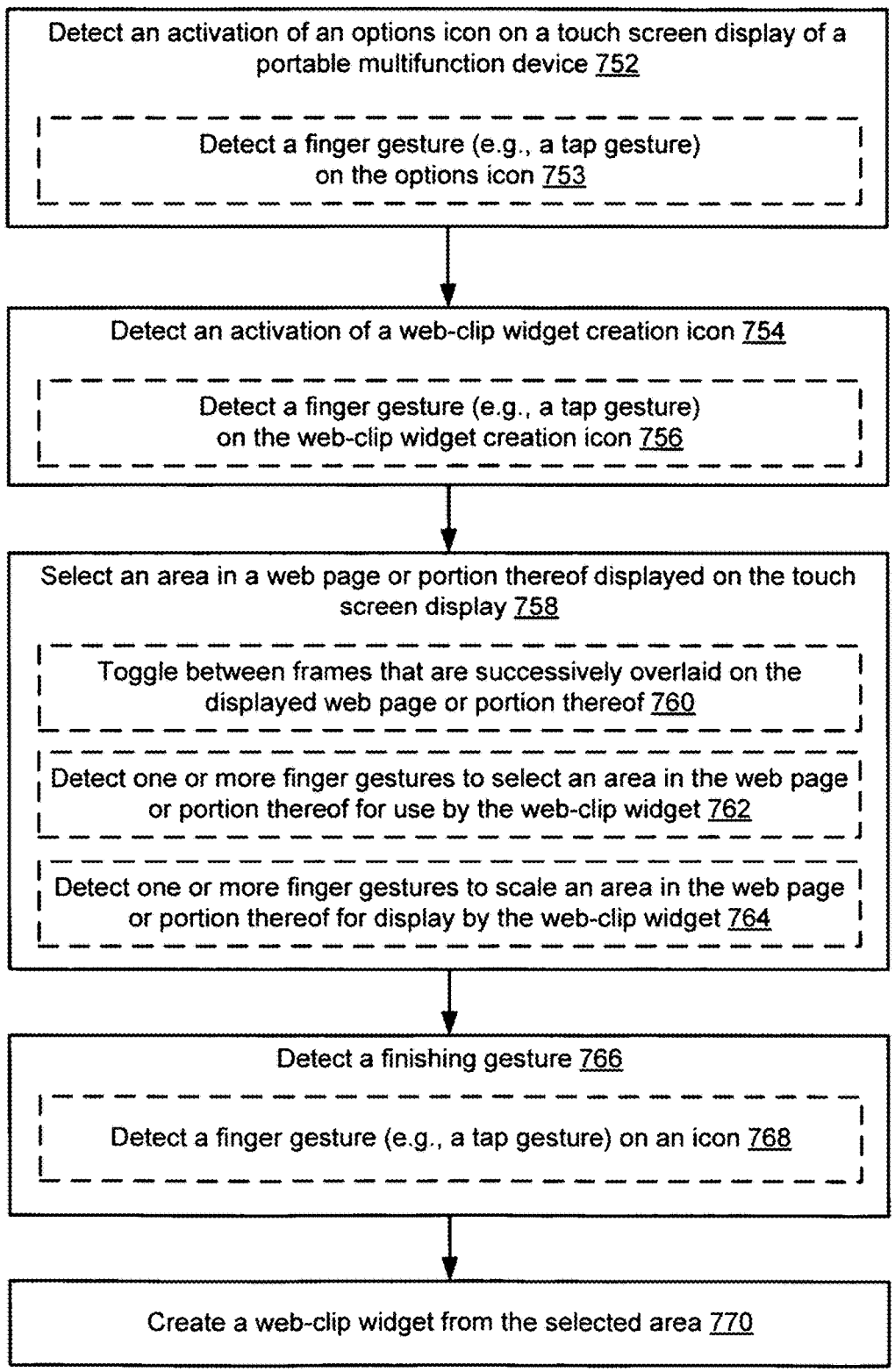

FIG. 7E is a flow diagram illustrating a process 750 for creating a web-clip widget from a web page or portion thereof in accordance with some embodiments. While the web-clip widget creation process 750 described below includes a number of operations that appear to occur in a specific order, it should be apparent that the process 750 can include more or fewer operations, which can be executed serially or in parallel (e.g., using parallel processors or a multi-threading environment), an order of two or more operations may be changed and/or two or more operations may be combined into a single operation.

On a touch screen display of a portable multifunction device, an activation of an options icon (e.g., icon 3920, FIG. 5A) is detected (752). In some embodiments, a finger gesture (e.g., a tap gesture) is detected (753) on the options icon.

An activation of a web-clip widget creation icon (e.g., icon 3973, FIG. 5F) is detected (754). In some embodiments, a finger gesture (e.g., a tap gesture) is detected (756) on the web-clip widget creation icon.

An area in a web page or portion thereof displayed on the touch screen display is selected (758). In some embodiments, selecting the area includes toggling (760) between frames that are successively overlaid on the displayed web page or portion thereof. For example, in UI 3900J (FIG. 5J), a frame 3958 is displayed overlaid on the web page 3912 such that it frames block 2 3914-2. Upon activation of a toggle icon 3956, display of the frame 3958 is ceased and another frame is displayed overlaid on the web page 3912 such that it frames another block (e.g., block 3 3914-3). Thus, in some embodiments, the frames successively highlight blocks and other structural elements of the web page. As described in U.S. patent application Ser. No. 11/620,492, "Selecting and Manipulating Web Content," filed on Jan. 5, 2007, which application is incorporated by reference herein in its entirety, structural elements that are displayed in a web page can be identified during the web-clip widget creation process.

In some embodiments, selecting the area includes detecting (762) one or more finger gestures to select an area in the web page or portion thereof for use by the web-clip widget. In some embodiments, selecting the area includes detecting (764) one or more finger gestures to scale an area in the web page or portion thereof for display by the web-clip widget. Examples of finger gestures used to select and/or scale an area in the web page or portion thereof include a single tap gesture 3923 or 3925 to center and enlarge a block (FIG. 5A); a single tap gesture 3927 or 3935 to center an adjacent enlarged block; a multi-touch depinching gesture (3931 and 3933) to enlarge the web page; a multi-touch pinching gesture (not shown) to reduce the web page; swipe gestures such as a substantially vertical swipe 3937, an upward or diagonal swipe 3939, and/or other swipe gestures (not shown) to scroll the web page; and/or a multi-touch rotation gesture (3941 and 3943) to select a portrait or landscape view (FIG. 5C).

A finishing gesture is detected (766). In some embodiments, a finger gesture (e.g., a tap gesture) on an icon (e.g., add widget icon 3954, FIG. 5J or 5K) is detected (768). A web-clip widget is created (770) from the selected area.

In some embodiments, creating the web-clip widget includes requesting a name for the web-clip widget, receiving the name, and storing the name, in accordance with operation 714 of process 700 (FIG. 7A).

In some embodiments, creating the web-clip widget includes creating an icon corresponding to the web-clip widget, in accordance with operation 716 of process 700. In some embodiments, the icon corresponding to the web-clip widget is displayed in a menu or list of icons, in accordance with operation 718 of process 700. In some embodiments, the menu or list of icons comprises a menu or list of applications and widgets on the multifunction device. In some embodiments, the menu or list of icons comprises a menu or list of widgets on the multifunction device. In some embodiments, the menu or list of icons comprises a menu or list of user-created widgets on the multifunction device.

In some embodiments, an activation of the icon corresponding to the web-clip widget is detected and the web-clip widget is displayed, in accordance with operations 724 and 726 (FIG. 6B) of process 700.

In some embodiments, settings associated with the web-clip widget are edited, in accordance with operations 736-748 (FIG. 7D) of process 700.

In some embodiments, the web-clip widget is stored as a bookmark in a browser application, in accordance with operation 720 of process 700 (FIG. 7A).

In some embodiments, the web-clip widget is sent to a web server for storage, in accordance with operation 722 of process 700. In some embodiments, the web-clip widget is sent to an external electronic device, in accordance with operations 728-734 (FIG. 7C) of process 700.

In some embodiments, each operation of process 750 is performed by a portable multifunction device. In some embodiments, however, one or more operations of process 750 are performed by a server system in communication with a portable multifunction device via a network connection. The portable multifunction device may transmit data associated with the widget creation process to the server system and may receive information corresponding to the widget in return. For example, code (e.g., an HTML file, a CSS file, and/or a JavaScript file, in accordance with some embodiments, or an XML file and/or a JavaScript file, in accordance with some other embodiments) associated with the widget may be generated by the server system and then transmitted to the portable multifunction device. In general, operations in the widget creation process may be performed by the portable multifunction device, by the server system, or by a combination thereof.

Process 750, like process 700, creates a widget that allows a user to view a specified area in a web page upon activation of the widget, thus sparing the user from having to enlarge and center the area of the web page that is of interest each time the user visits the web page.

Figure 7F:
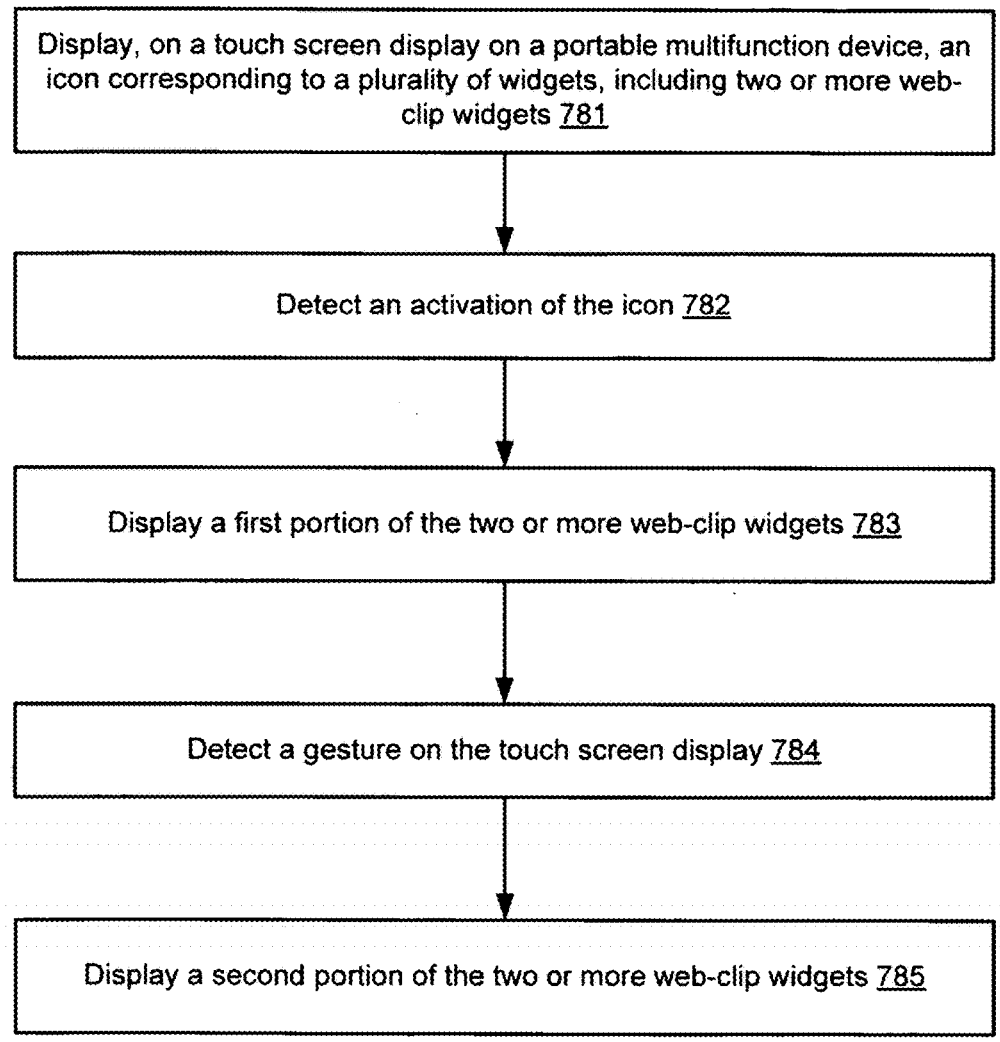

FIG. 7F is a flow diagram illustrating a process 780 for displaying web-clip widgets in accordance with some embodiments. On a touch screen display on a portable multifunction device, an icon is displayed (781) corresponding to a plurality of widgets, including two or more web-clip widgets. For example, in some embodiments, the icon for user-created widget 149-6 (FIG. 4A) corresponds to multiple widgets including multiple web-clip widgets.

An activation of the icon is detected (782). For example, a finger gesture (e.g., a tap gesture) on the icon is detected.

In response to detecting the activation, a first portion of the two or more web-clip widgets is displayed (783). For example, UI 3900L (FIG. 5L) displays a first portion that includes a first user-created widget 149-6-1 and a portion of a second user-created widget 149-6-2. In another example, UI 3900M (FIG. 5M) displays a first portion that includes the second user-created widget 149-6-2 and no other widgets or portions thereof. Thus, in some embodiments, the first portion is a first web-clip widget.

A gesture is detected (784) on the touch screen display. In some embodiments, the gesture is a scrolling gesture. For example, a swipe gesture 3962 (FIGS. 5L and 5M) or 3963 (FIG. 5M) is detected on the touch screen display.

In response to detecting the gesture, a second portion of the two or more web-clip widgets is displayed (785). In some embodiments, in response to detecting the gesture, a displayed portion of the two or more web-clip widgets is scrolled from the first portion to the second portion. For example, in response to detecting an upward scroll gesture 3962 in UI 3900L (FIG. 5L), a second portion is displayed that includes more or all of the second user-created widget 149-6-2 and less or none of the first user-created widget 149-6-1. In some embodiments, the second portion is a second web-clip widget (e.g., the second user-created widget 149-6-2).

In some embodiments, the gesture is a de-pinching gesture (e.g., gestures 3931 and 3933, FIG. 5C). In response to detecting the de-pinching gesture, a displayed portion of the two or more web-clip widgets is zoomed in from the first portion to the second portion.

In some embodiments, the gesture is a finger tap on an area within the first portion (e.g., a finger tap analogous to gesture 3923, FIG. 5A), and the displayed second portion is centered on the area and is zoomed in with respect to the first portion.

Figure 7G:
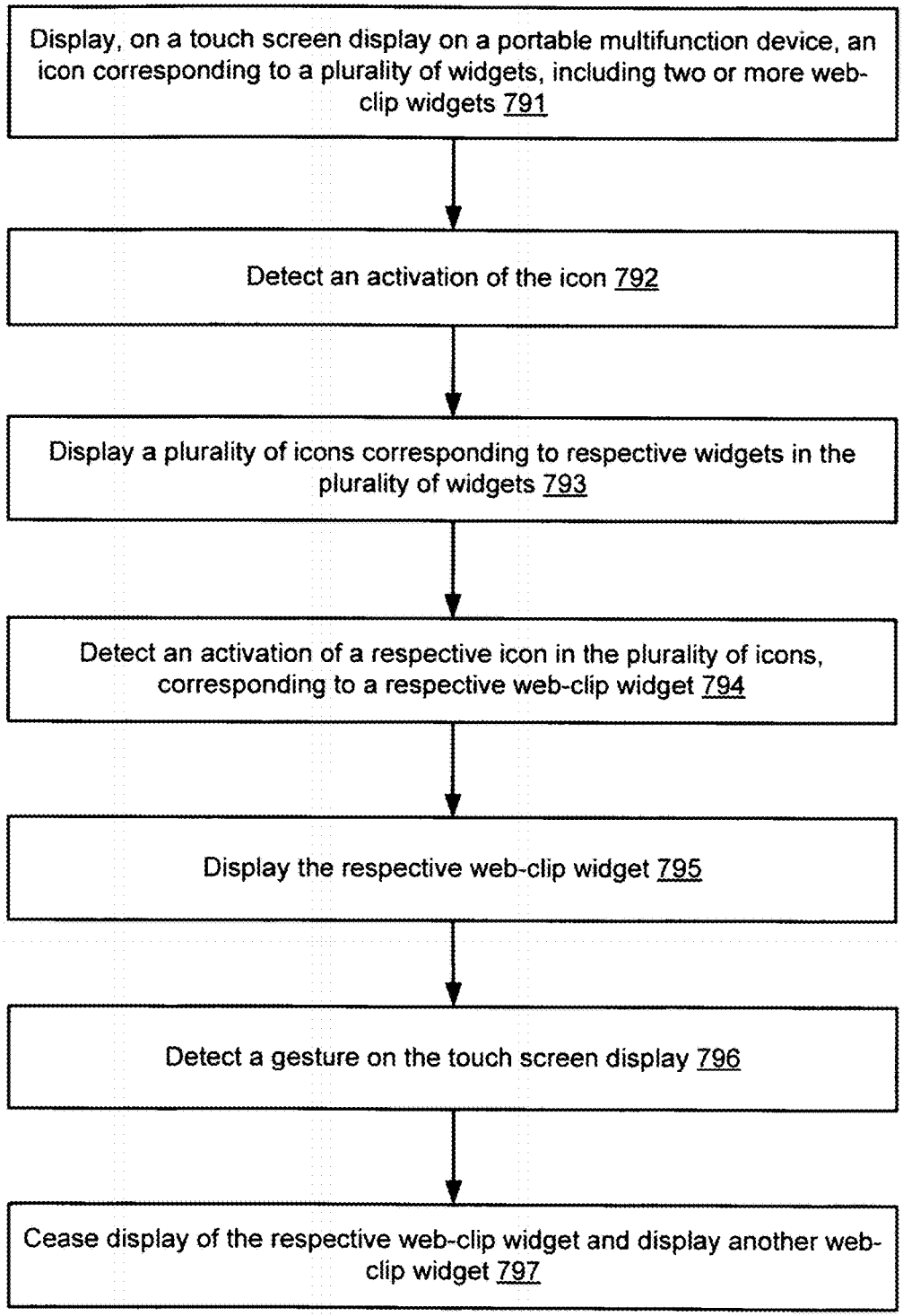

FIG. 7G is a flow diagram illustrating a process 790 for displaying web-clip widgets in accordance with some embodiments. On a touch screen display on a portable multifunction device, an icon is displayed (791) corresponding to a plurality of widgets, including two or more web-clip widgets. For example, in some embodiments, the icon for user-created widget 149-6 (FIG. 4A) corresponds to multiple widgets including multiple web-clip widgets.

An activation of the icon is detected (792). For example, a finger gesture (e.g., a tap gesture) on the icon is detected.

In response to detecting the activation of the icon, a plurality of icons corresponding to respective widgets in the plurality of widgets is displayed (793). In some embodiments, the plurality of icons is displayed in a menu, or in a list. For example, UI 400B (FIG. 4B) displays a menu of icons corresponding to user-created widgets 149-6-1 through 149-6-6, and UI 400C (FIG. 4C) displays a list of icons corresponding to user-created widgets 149-6-1 through 149-6-6.

Figure 5M:
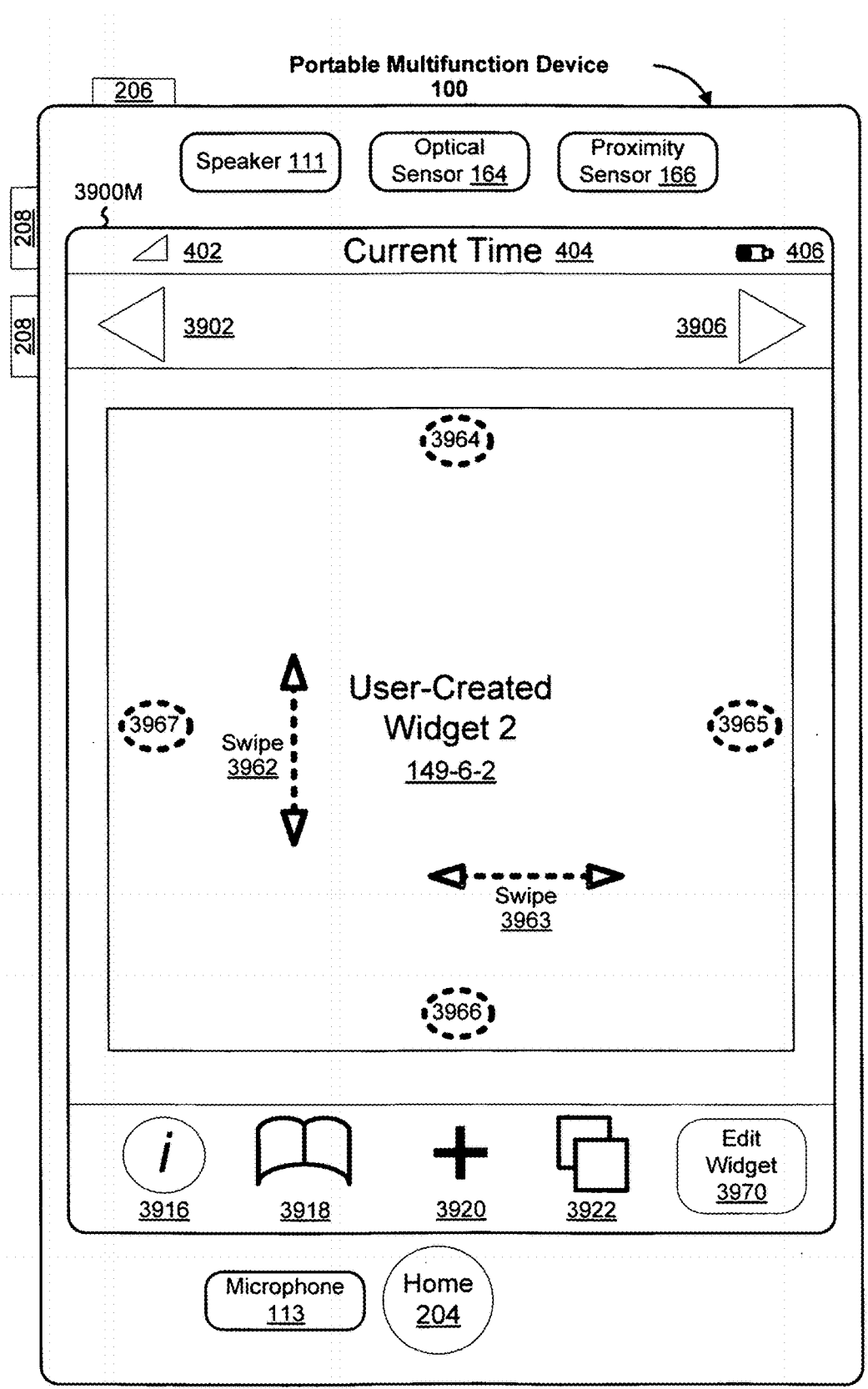

An activation is detected (794) of a respective icon in the plurality of icons corresponding to a respective web-clip widget. In response to detecting the activation of the respective icon, the respective web-clip widget is displayed (795). For example, in response to detecting an activation of an icon corresponding to user-created widget 149-6-2 in UI 400B or UI 400C, user-created widget 149-6-2 is displayed in UI 3900M (FIG. 5M).

A gesture is detected (796) on the touch screen display. For example, a swipe gesture 3962 or 3963 (FIG. 5M) is detected on the touch screen display. Alternately, a tap gesture 3964 at the top or a tap gesture 3966 at the bottom of the displayed widget 149-6-2 is detected. In another example, a tap gesture 3965 at the right side or a tap gesture 3967 at the left side of the displayed widget 149-6-2 is detected.

In response to detecting the gesture, display of the respective web-clip widget is ceased and another web-clip widget is displayed (797). For example, in response to detecting a downward swipe 3962, a substantially horizontal left-to-right swipe 3963, a tap gesture 3967 at the left side of the displayed widget 149-6-2, or a tap gesture 3964 at the top of the displayed widget 149-6-2, a previous user-created widget 149-6-1 is displayed. In response to detecting an upward swipe 3962, a substantially horizontal right-to-left swipe 3963, a tap gesture 3965 at the right side of the displayed widget 149-6-2, or a tap gesture 3966 at the bottom of the displayed widget 149-6-2, a next user-created widget 149-6-3 is displayed.

Processes 780 and 790 thus provide user-friendly ways to view multiple specified areas in web pages without having to surf between successive web pages and without having to enlarge and center an area of interest in each web page.

FIG. 7H is a flow diagram illustrating a process 7000 for displaying a web-clip widget in accordance with some embodiments. On a touch screen display on a portable multifunction device, an icon for a web-clip widget (e.g., 149-6-7, FIG. 6E) is displayed (7002). The web-clip widget corresponds to a user-specified area of a web page (e.g., block 3914-5, FIG. 6A).

In some embodiments, the icon is displayed (7004) in a menu or list of icons. In some embodiments, the menu or list of icons comprises a menu or list of applications and widgets (e.g., UI 400A, FIG. 4A) on the multifunction device. In some embodiments, the menu or list of icons comprises a menu or list of widgets on the multifunction device. In some embodiments, the menu or list of icons comprises a menu or list of user-created widgets (e.g., UI 400B or 400C, FIG. 4B or 4C) on the multifunction device.

In some embodiments, the user-specified area was previously selected by translating and scaling (7006) a displayed portion of the web page. In some embodiments, the user-specified area was previously selected by centering and enlarging (7008) a displayed portion of the web page. Examples of finger gestures used to translate, scale, center, and/or enlarge an area in the web page include a tap gesture 3923 or 3925 to center and enlarge a block (FIG. 5A); a tap gesture 3927 or 3935 to center an adjacent enlarged block; a multi-touch depinching gesture (3931 and 3933, FIG. 5C) to enlarge the web page; a multi-touch pinching gesture (not shown) to reduce the web page; swipe gestures such as a substantially vertical swipe 3937, an upward or diagonal swipe 3939, and/or other swipe gestures (not shown) to translate the web page; and/or a multi-touch rotation gesture (3941 and 3943, FIG. 5C) to select a portrait or landscape view.

An activation of the icon is detected (7010). In some embodiments, a finger gesture (e.g., a tap gesture 606, FIG. 6E) is detected (7012) on the icon.

In response to detecting activation of the icon, the user-specified area of the web page is displayed (7014). For example, in response to activation of the icon for the web-clip widget 149-6-7 (FIG. 6E), block 3914-5 is displayed (FIG. 6A).

The process 7000 allows a user to view a specified area in a web page upon activation of the corresponding icon. The user thus is spared from having to enlarge and center the area of the web page that is of interest, such as a particular block of interest, each time the user visits the web page.

Icon Display

FIGS. 8A-8D illustrate exemplary user interfaces for displaying icons in accordance with some embodiments. FIGS. 9A and 9B are flow diagrams of an icon display process 900 in accordance with some embodiments. The process is performed by a computing device with a touch screen display (e.g., portable multifunction device 100). The process provides a simple intuitive way for a user to view a large number of icons (e.g., multiple pages of application icons and web-clip widget icons) on a touch screen display.

Figure 8A:
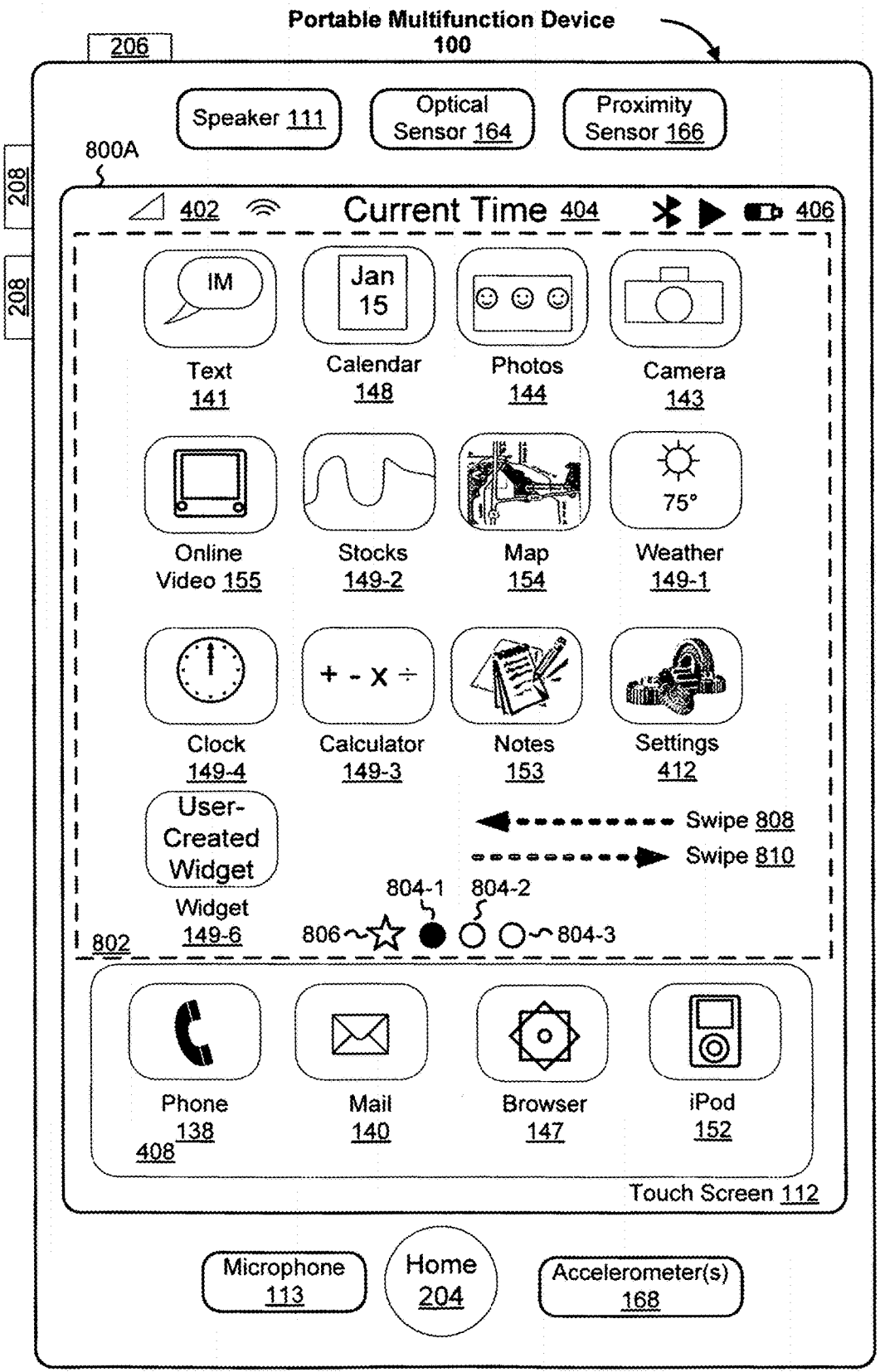
FIGS. 8A-8D illustrate exemplary user interfaces for displaying icons in accordance with some embodiments.

The computing device displays (902) a first set of a first plurality of icons in a first area of the touch screen display (e.g., area 802, FIG. 8A). The first plurality of icons includes a plurality of sets of icons that are separately displayed in the first area of the touch screen display. For example, in FIGS. 8A-8C, icons 141, 148, 144, 143, 155, 149-2, 154, 149-1, 149-4, 149-3, 153, 412, 149-6, 149-6-1, 149-6-2, 149-6-3, 149-6-4, 149-6-5, 149-6-6, 149-6-7, 149-6-8, 149-6-9, 149-6-10, 149-6-11, 149-6-12, 149-6-13, 149-6-14, and 149-6-15 are a first plurality of icons in area 802. Icons 141, 148, 144, 143, 155, 149-2, 154, 149-1, 149-4, 149-3, 153, 412, and 149-6 form a first set in area 802 in FIG. 8A; icons 149-6-1, 149-6-2, 149-6-3, 149-6-4, 149-6-5, and 149-6-6 form a second set in area 802 in FIG. 8B; and icons 149-6-7, 149-6-8, 149-6-9, 149-6-10, 149-6-11, 149-6-12, 149-6-13, 149-6-14, and 149-6-15 form a third set in area 802 in FIG. 8C. In this context, "separately displayed" means when one of the sets is displayed, the other sets are not concurrently displayed, except possibly during a brief transition from one set of icons to the next (e.g., an animation). As this example illustrates, the first and second sets of the first plurality of icons are distinct sets of icons.

In some embodiments, the first plurality of icons includes a plurality of application launch icons, wherein in response to detecting activation of an application launch icon in the plurality of application icons, an application that corresponds to the activated application icon is launched and displayed. In some embodiments, the applications include a default set of applications, third-party applications, and/or web-clip widget applications. The application launch icons are not for issuing commands or subcommands with an application. Rather, they are for launching applications. If an application is already launched, then activation of the corresponding application launch icon results in display of the application.

In some embodiments, the first plurality of icons includes one or more web-clip widget icons (e.g., widget icon 149-6, FIG. 8A), wherein in response to detecting activation of a web-clip widget icon, a portion of a web page that corresponds to the activated web-clip widget icon is displayed.

The computing device displays (904) a second plurality of icons in a second area (e.g., tray 408, FIG. 8A) on the touch screen display while displaying icons in the first plurality of icons in the first area. For example, in FIGS. 8A-8C, application launch icons 138, 140, 147, and 152 are displayed in tray 408. The second area is different (e.g., visually distinct) from the first area. For example, tray 408 is different from area 802 in FIG. 8A. In some embodiments, the second plurality of icons corresponds to applications or functions that are frequently used by a user.

In some embodiments, the second plurality of icons includes a plurality of application launch icons, wherein in response to detecting activation of an application icon in the plurality of application icons, an application that corresponds to the activated application icon is launched and/or displayed, as explained above. In some embodiments, the applications include a default set of applications, third-party applications, and/or web-clip widget applications.

The computing device detects (906) a first finger gesture on the touch screen display in the first area. In some embodiments, the first finger gesture is a swipe gesture (e.g., swipe 808, FIG. 8A). In some embodiments, the swipe gesture is a horizontal (or substantially horizontal) swipe gesture on the touch screen display, from left to right or from right to left on the touch screen display. In some embodiments, the swipe gesture is a vertical (or substantially vertical) swipe gesture on the touch screen display.

Figure 8B:
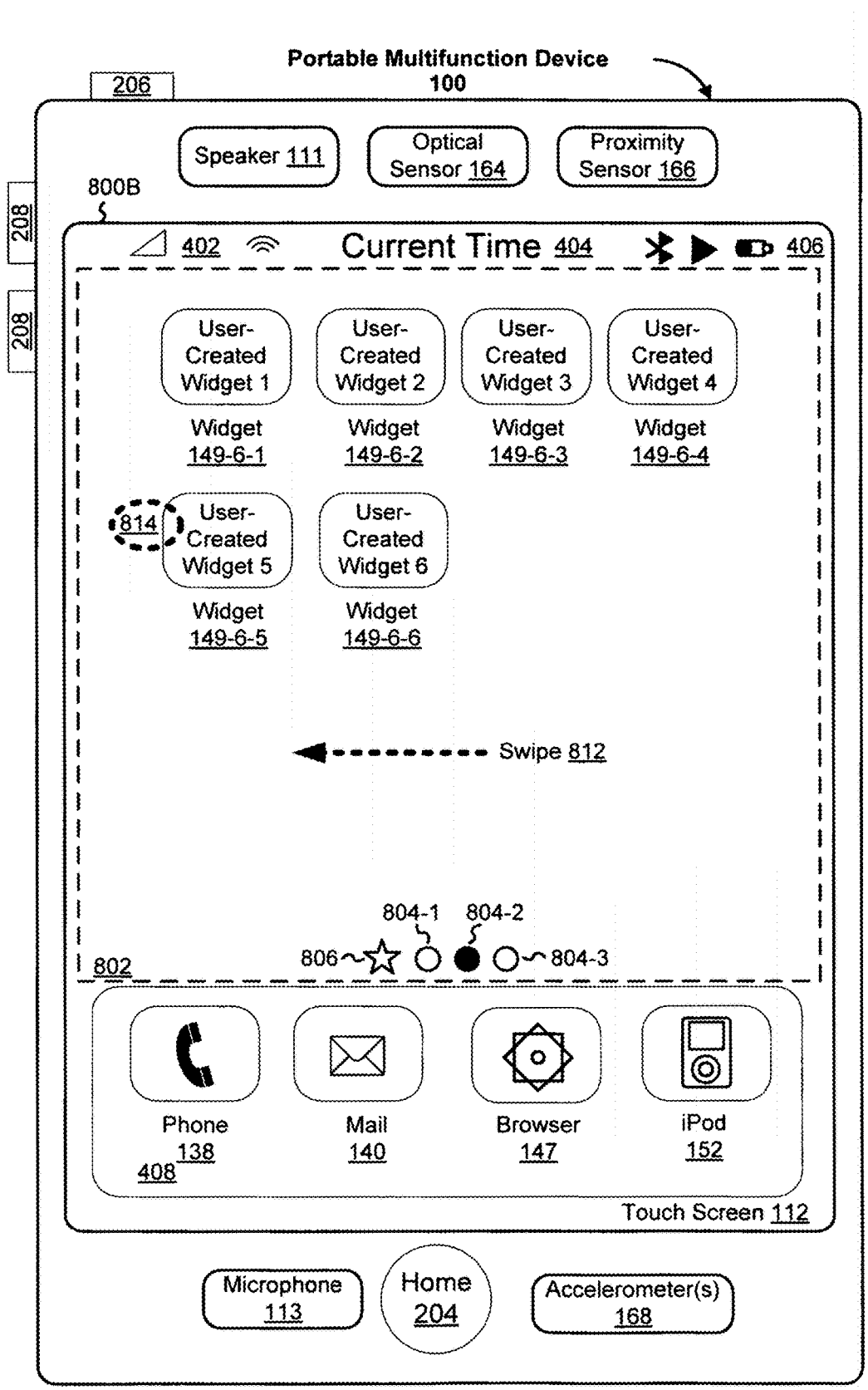
Figure 8C:
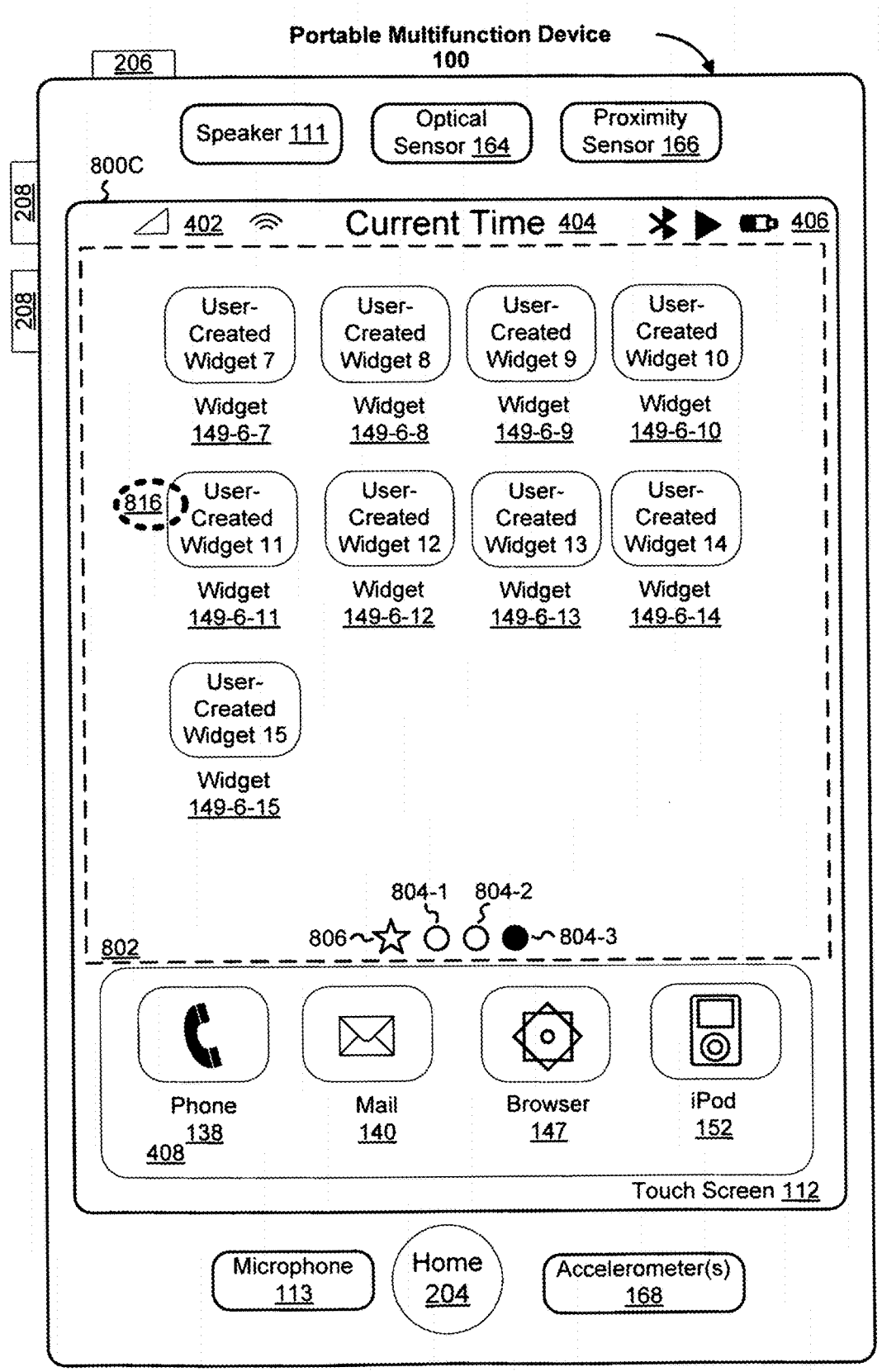
Figure 8D:
Figure 9A:
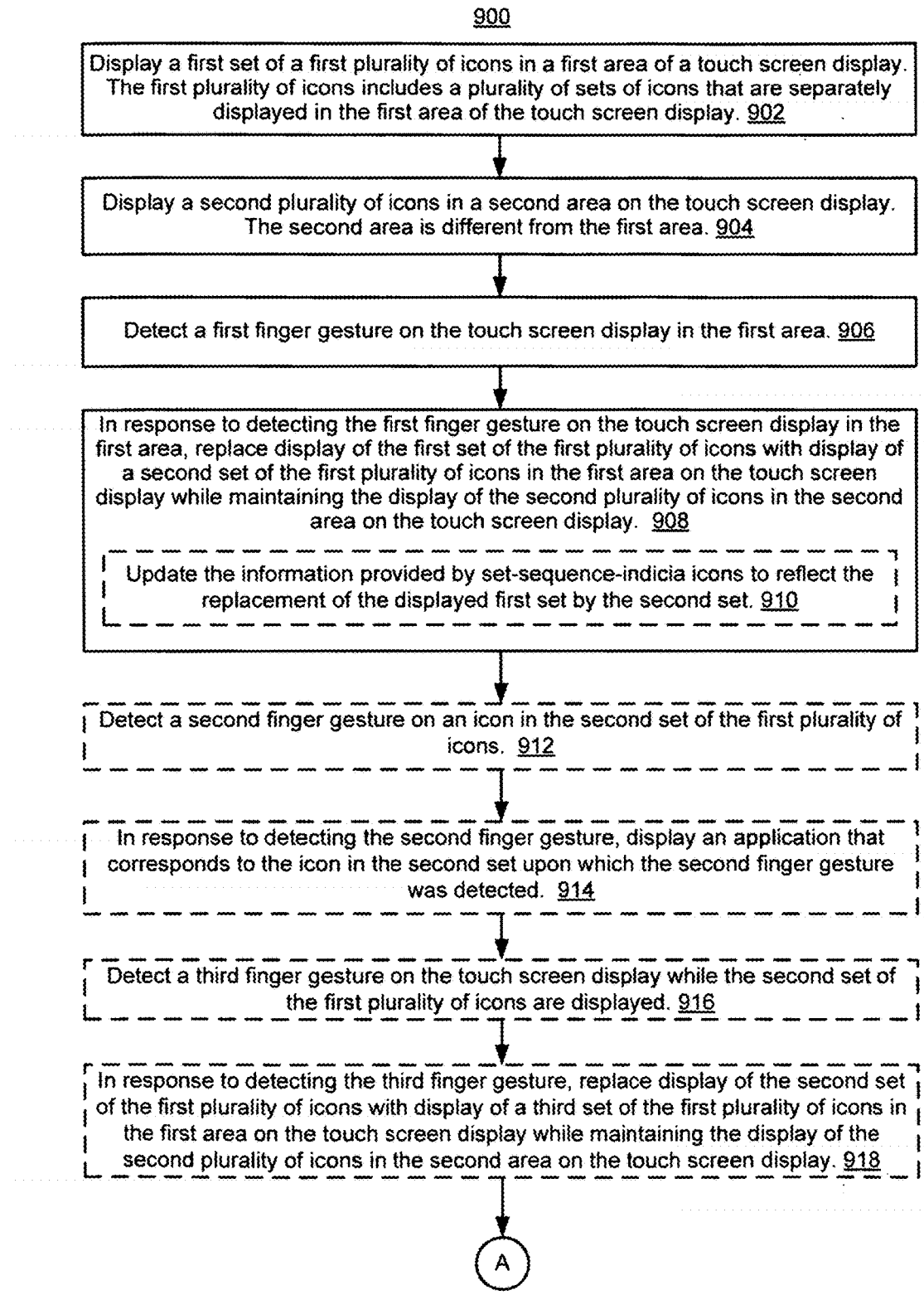
FIGS. 9A and 9B are flow diagrams of an icon display process in accordance with some embodiments.
Figure 9B:
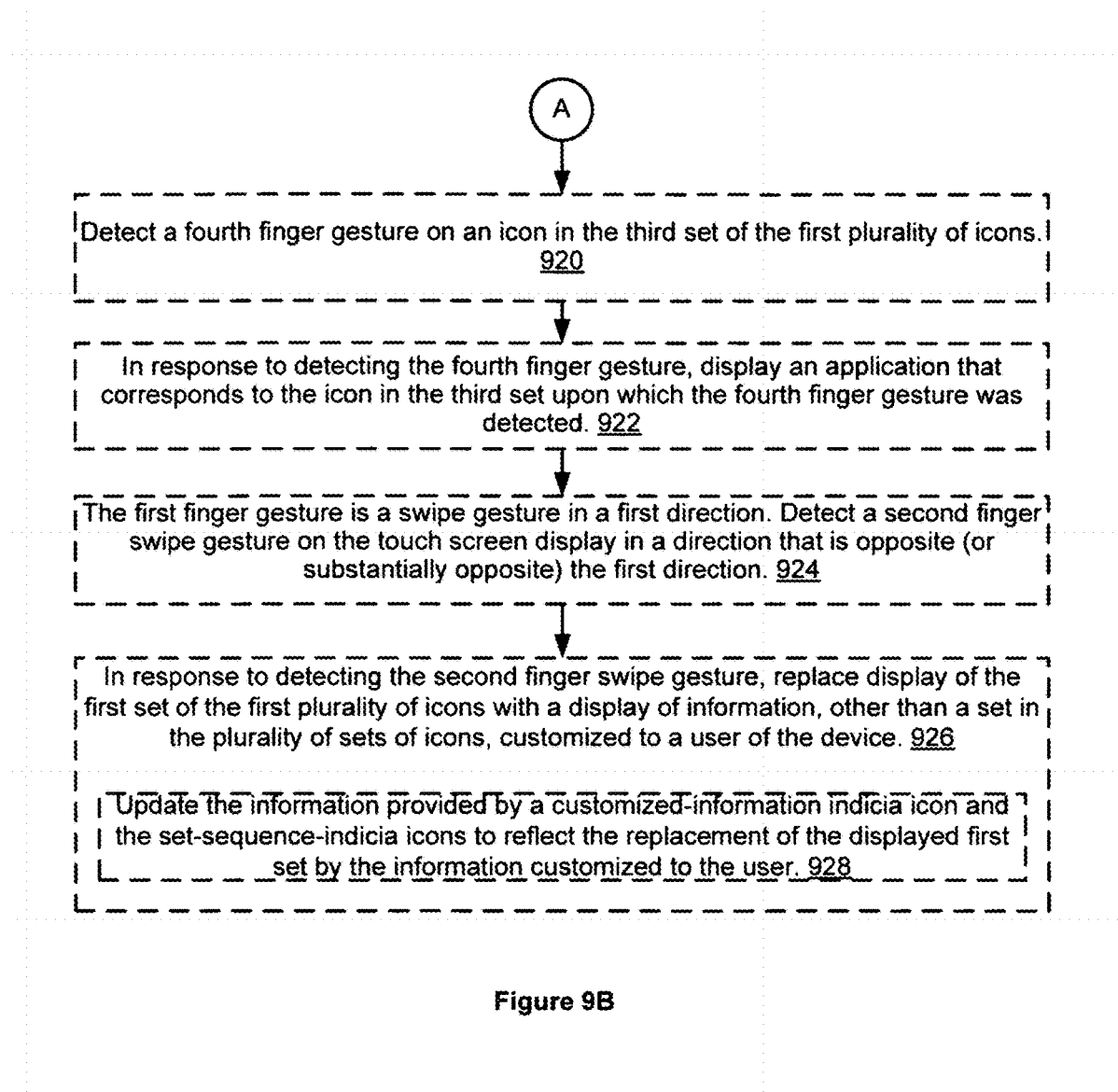

In response to detecting the first finger gesture on the touch screen display in the first area, the computing device replaces (908) display of the first set of the first plurality of icons with display of a second set of the first plurality of icons in the first area on the touch screen display while maintaining the display of the second plurality of icons in the second area on the touch screen display. For example, in response to swipe 808, UI 800A (FIG. 8A) transitions to UI 800B (FIG. 8B). The first set of icons (141, 148, 144, 143, 155, 149-2, 154, 149-1, 149-4, 149-3, 153, 412, and 149-6 in area 802, FIG. 8A) are replaced by a second set of icons (149-6-1, 149-6-2, 149-6-3, 149-6-4, 149-6-5, and 149-6-6 in area 802, FIG. 8B) while the display of the second plurality of icons (138, 140, 147, and 152) is maintained.

In some embodiments, replacing display of the first set of the first plurality of icons with display of a second set of the first plurality of icons in the first area on the touch screen display comprises an animation that moves the first set out of the first area and the second set into the first area.

In some embodiments, the plurality of sets of icons includes a number of sets of icons that are configured to be separately displayed as a sequence of sets of icons in the first area of the touch screen display. In some embodiments, the computing device displays two or more set-sequence-indicia icons (e.g., icons 804-1, 804-2, and 804-3 in FIGS. 8A-8D). The set-sequence-indicia icons provide information about the number of sets of icons in the plurality of sets of icons and a position of a displayed set of icons in the sequence of sets of icons. In response to detecting the first finger gesture, the computing device updates (910) the information provided by the set-sequence-indicia icons to reflect the replacement of the displayed first set by the second set. For example, set-sequence-indicia icons 804-1, 804-2, and 804-3 in FIGS. 8A-8D indicate that there are three sets of icons in the plurality of sets of icons. The set-sequence-indicia icons 804-1, 804-2, and 804-3 also indicate a position of a displayed set of icons in the sequence of sets of icons. For example, the set-sequence-indicia icons are displayed in a sequence, with the icon that corresponds to the set that is currently displayed being visually distinguished from the other set-sequence-indicia icons (e.g., icon 804-1 is darkened in FIG. 8A when the first set is displayed, icon 804-2 is darkened in FIG. 8B when the second set is displayed, and icon 804-3 is darkened in FIG. 8C when the third set is displayed).

In some embodiments, the computing device detects (912) a second finger gesture on an icon in the second set of the first plurality of icons. In response to detecting the second finger gesture, the computing device displays (914) an application that corresponds to the icon in the second set upon which the second finger gesture was detected. For example, in response to a finger tap gesture 814 (FIG. 8B), user-created widget 149-6-5 is displayed.

In some embodiments, the computing device detects (916) a third finger gesture on the touch screen display while the second set of the first plurality of icons are displayed. In response to detecting the third finger gesture, the computing device replaces (918) display of the second set of the first plurality of icons with display of a third set of the first plurality of icons in the first area on the touch screen display while maintaining the display of the second plurality of icons in the second area on the touch screen display. For example, in response to detecting swipe 812 (FIG. 8B), the computing device replaces (918) display of the second set of the first plurality of icons (icons 149-6-1, 149-6-2, 149-6-3, 149-6-4, 149-6-5, and 149-6-6, FIG. 8B) with display of a third set of the first plurality of icons (icons 149-6-7, 149-6-8, 149-6-9, 149-6-10, 149-6-11, 149-6-12, 149-6-13, 149-6-14, and 149-6-15, FIG. 8C) in area 802 on the touch screen display while maintaining the display of the second plurality of icons in the second area on the touch screen display (icons 138, 140, 147, and 152 in tray 408).

In some embodiments, the computing device detects (920) a fourth finger gesture on an icon in the third set of the first plurality of icons. In response to detecting the fourth finger gesture, the computing device displays (922) an application that corresponds to the icon in the third set upon which the fourth finger gesture was detected. For example, in response to a finger tap gesture 816 (FIG. 8C), user-created widget 149-6-11 is displayed.

In some embodiments, the first finger gesture is a swipe gesture in a first direction and the computing device detects (924) a second finger swipe gesture on the touch screen display in a direction that is opposite (or substantially opposite) the first direction. In response to detecting the second finger swipe gesture, the computing device replaces (926) display of the first set of the first plurality of icons with a display of information, other than a set in the plurality of sets of icons, customized to a user of the device. In some embodiments, the customized information includes: local time, location, weather, stocks, calendar entries, and/or recent messages for the user. For example, in response to detecting finger swipe gesture 810 (FIG. 8A), the computing device replaces (926) display of the first set of the first plurality of icons (icons 141, 148, 144, 143, 155, 149-2, 154, 149-1, 149-4, 149-3, 153, 412, and 149-6, FIG. 8A) with a display of information, other than a set in the plurality of sets of icons, customized to a user of the device (e.g., local time, location, weather, stocks, calendar entries, and recent messages for the user in area 802, FIG. 8D).

In some embodiments, the first finger gesture is a swipe gesture (e.g., swipe 808, FIG. 8A) in a first direction and the computing device detects (924) a second finger swipe gesture (e.g., swipe 810, FIG. 8A) on the touch screen display in a direction that is opposite (or substantially opposite) the first direction. In response to detecting the second finger swipe gesture, the computing device replaces (926) display of the first set of the first plurality of icons with a display of information, other than a set in the plurality of sets of icons, customized to a user of the device, and updates (928) the information provided by a customized-information indicia icon (e.g., icon 806, FIGS. 8A-8D) and the set-sequence-indicia icons (e.g., icons 804) to reflect the replacement of the displayed first set by the information customized to the user (e.g., icon 806 is darkened in FIG. 8D and none of the set-sequence-indicia icons 804 are darkened). In some embodiments, the customized-information indicia icon and the set-sequence-indicia icons have the same visual appearance (e.g., all are circles, not shown). In some embodiments, the customized-information indicia icon and the set-sequence-indicia icons are visually distinct (e.g., the customized-information indicia icon 806 is a star and the set-sequence-indicia icons 804 are circles). In some embodiments, the customized-information indicia icon 806 and the set-sequence-indicia icons 804 are adjacent to each other (e.g., as shown in FIGS. 8A-8D).

Transitioning Between User Interfaces

Figure 10A:
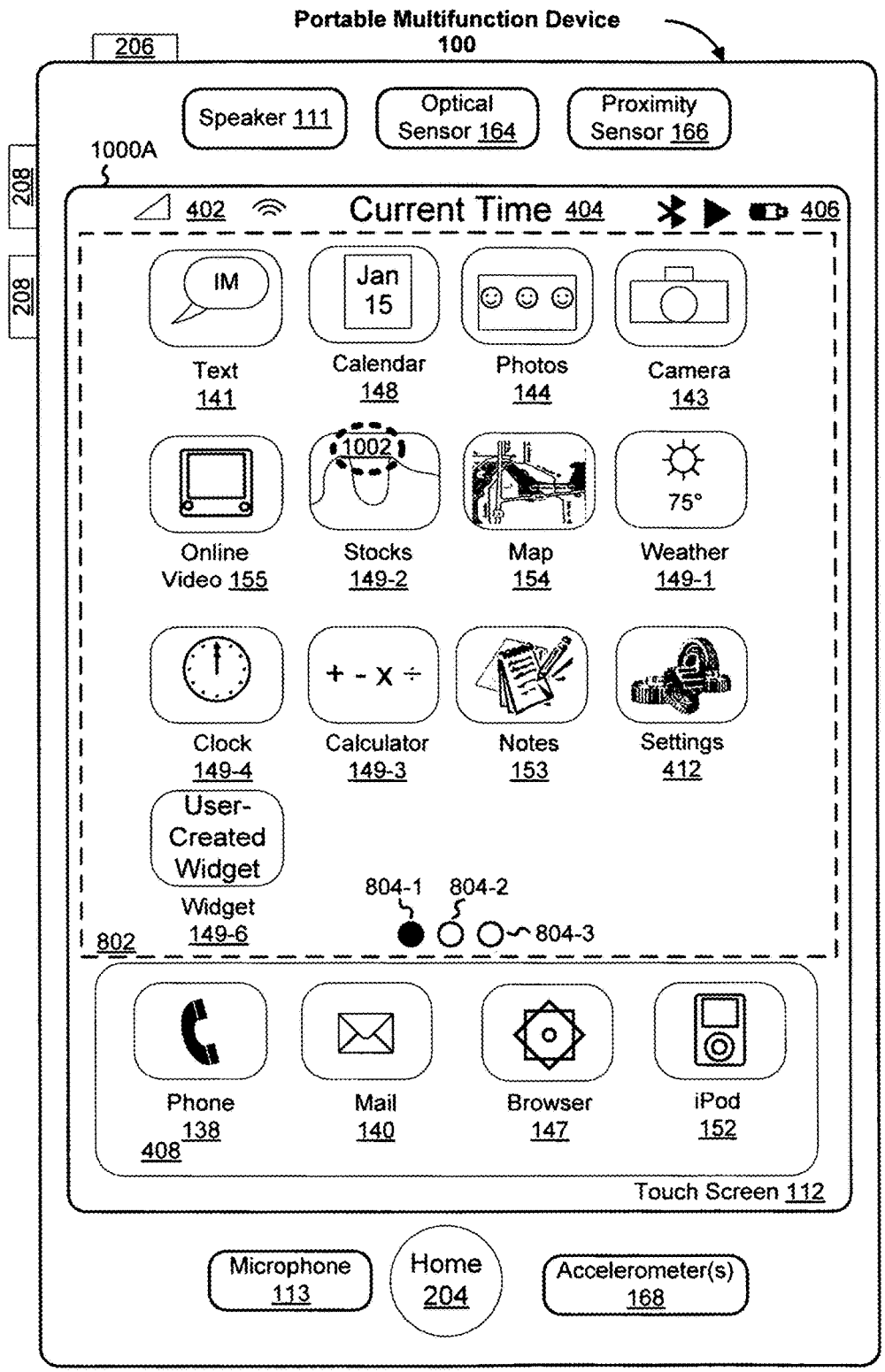
FIGS. 10A-10I illustrate animations showing transitions between first and second user interfaces in accordance with some embodiments.
Figure 10B:
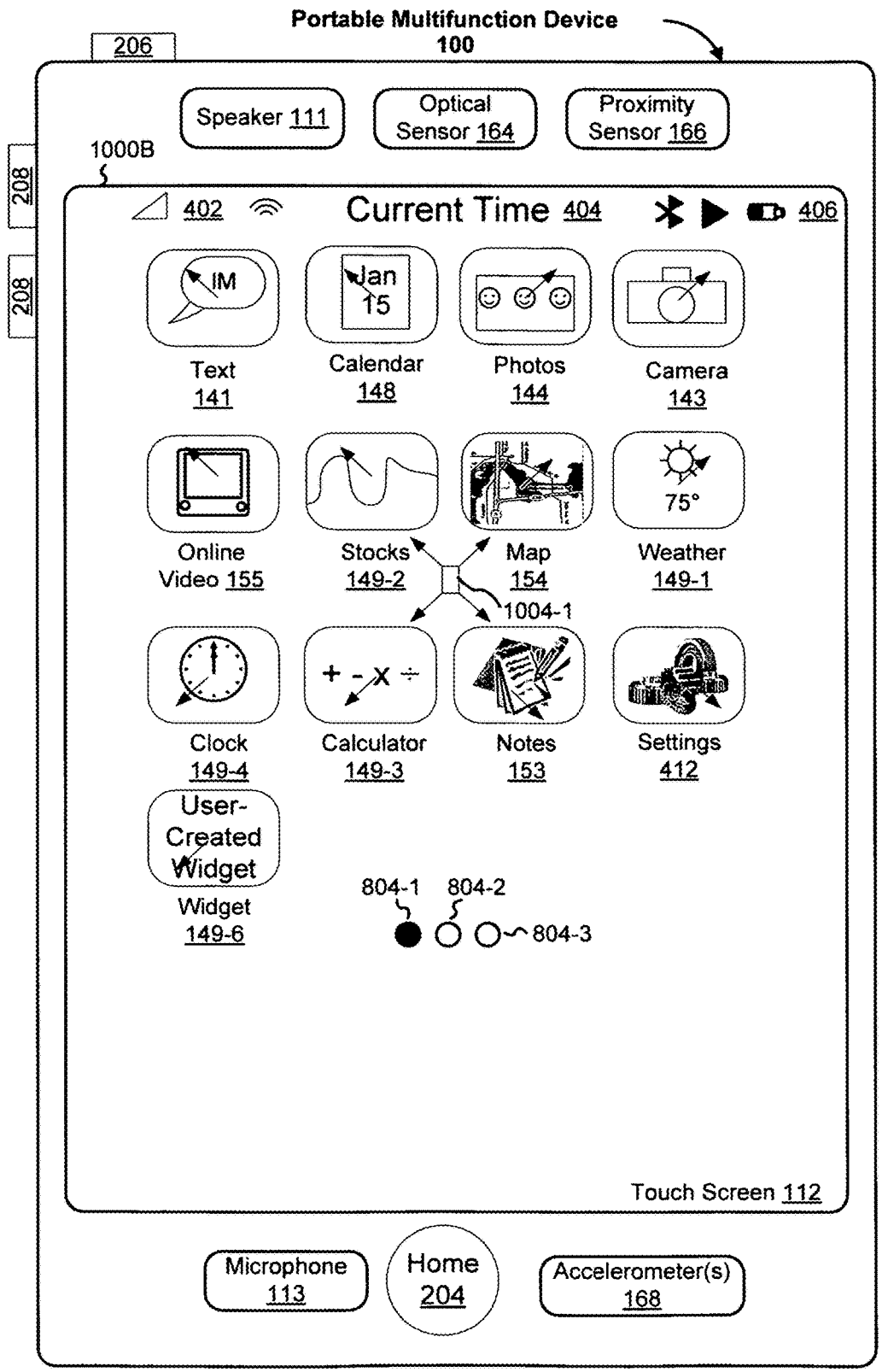
Figure 10C:
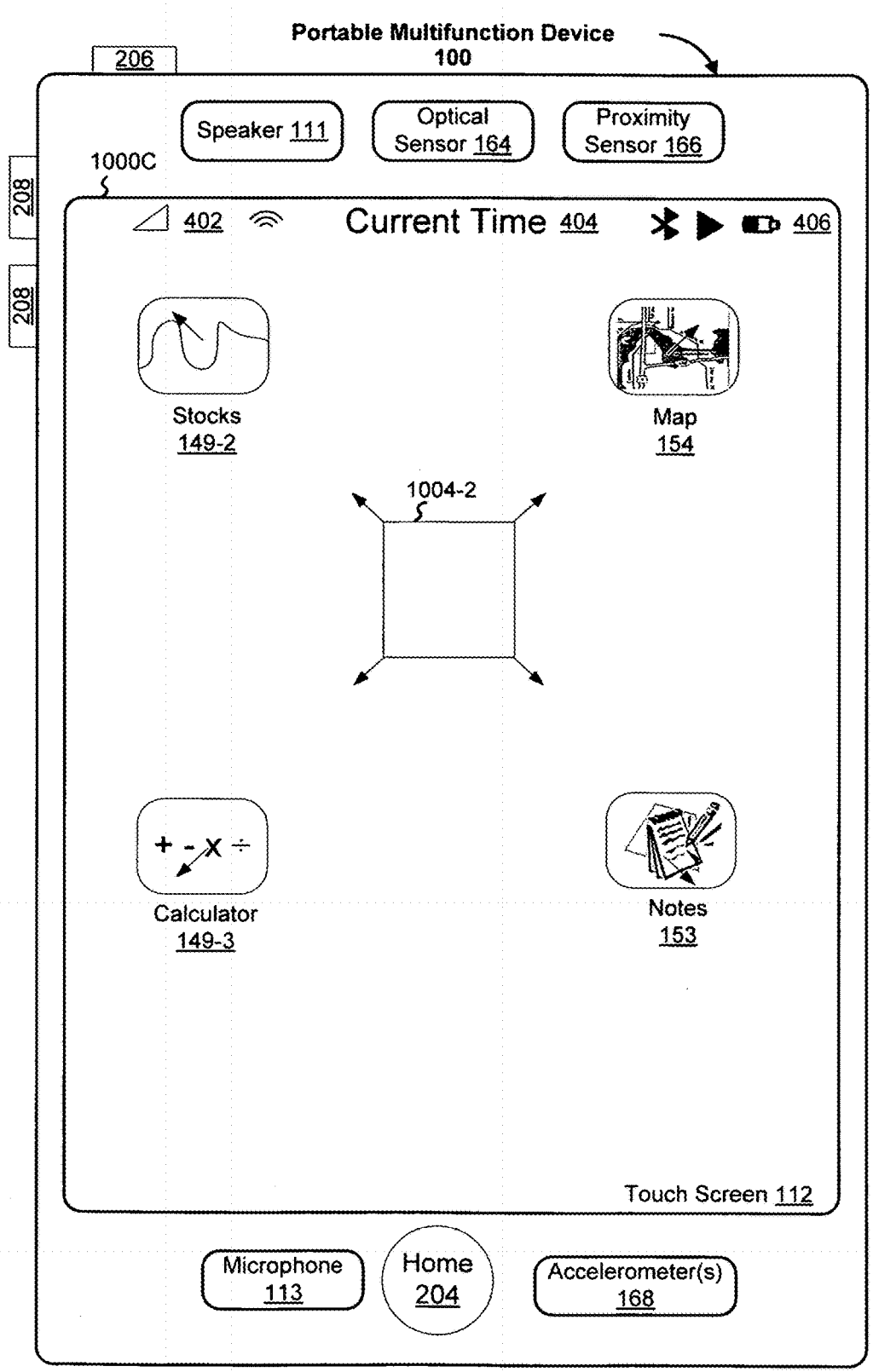
Figure 10D:
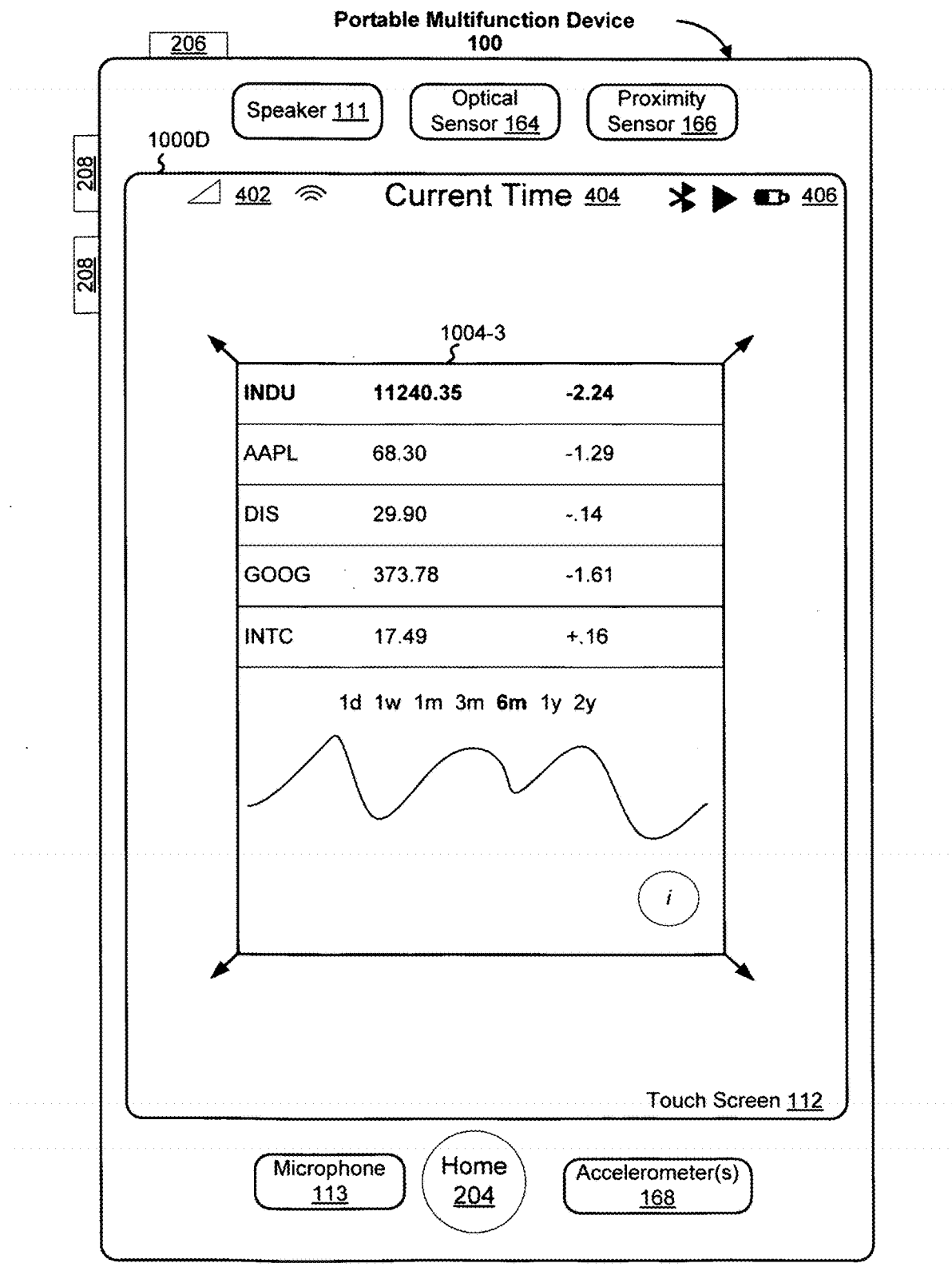
Figure 10E:
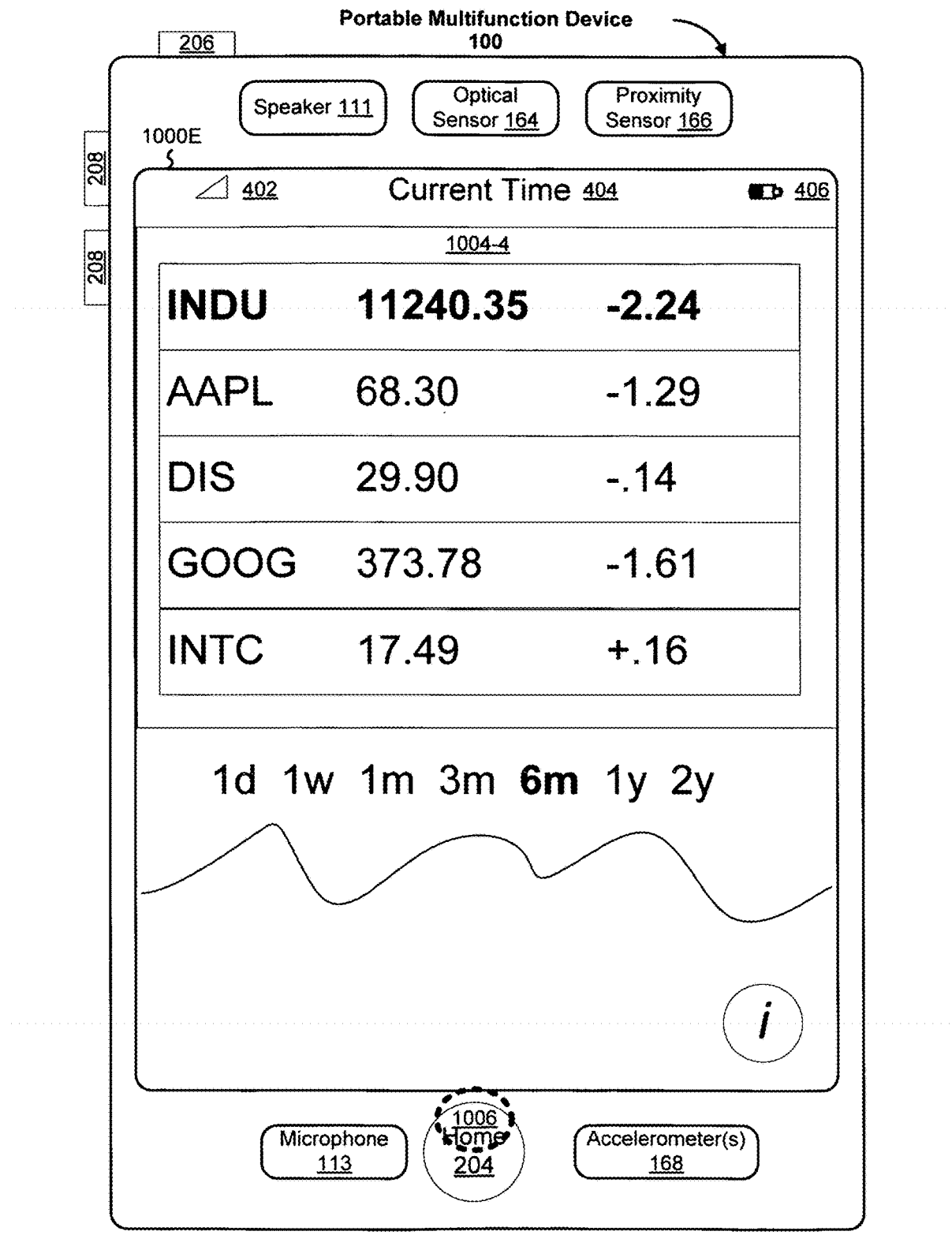
Figure 10F:
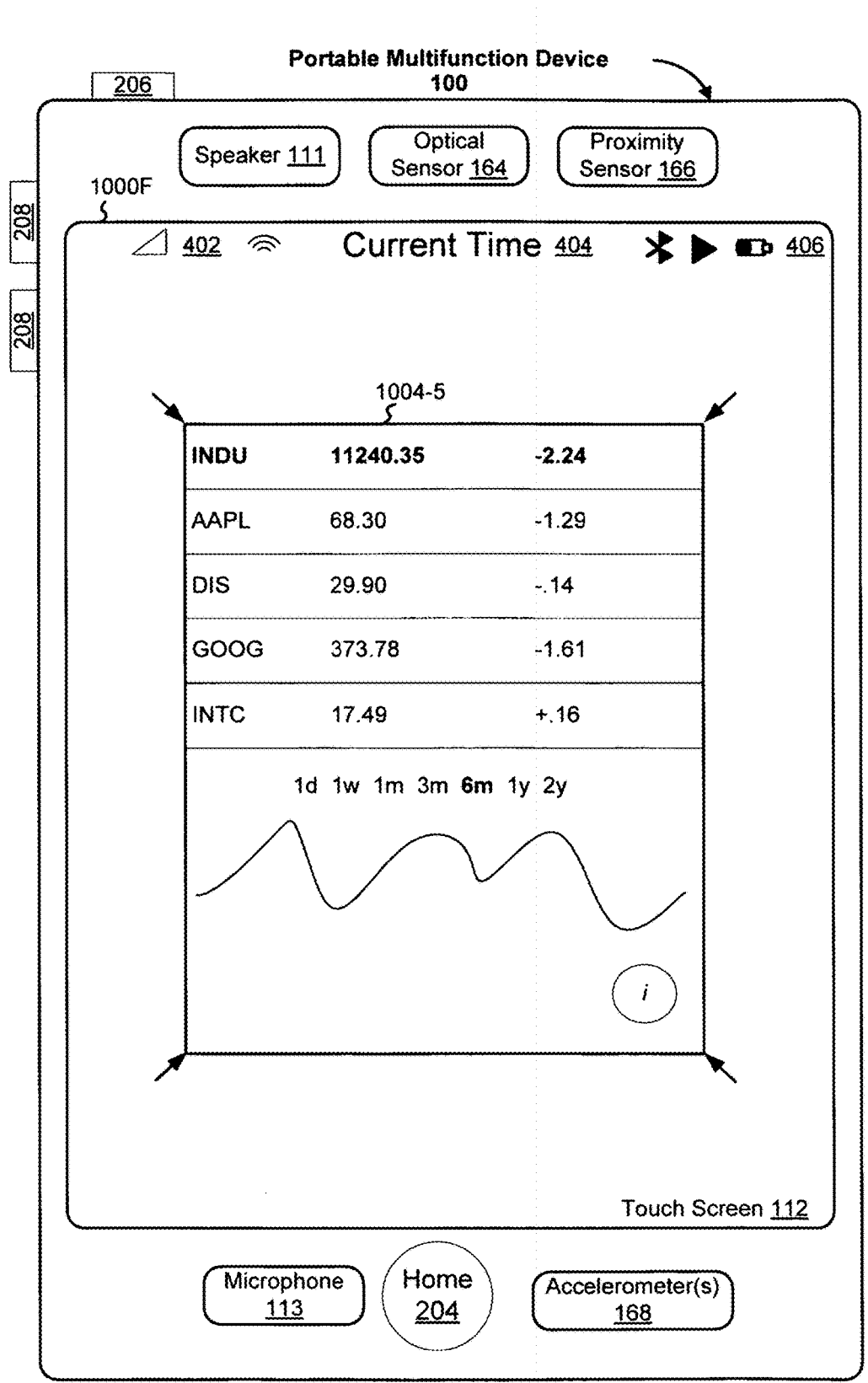

FIGS. 10A-10E illustrate an animation showing a transition from a first user interface to a second user interface in accordance with some embodiments. This animated transition helps a user to navigate between multiple applications in a multifunction device in a simple, intuitive manner. A first user interface 1000A (FIG. 10A) includes elements described above with regard to UI 800A (FIG. 8A). A finger gesture 1002 (e.g., a tap gesture) is detected on an icon corresponding to an application (e.g., a widget) 149-2 for displaying stock prices. In response to detecting the finger gesture 1002, an image 1004 of the stocks application 149-2 appears and is expanded, as illustrated in FIGS. 10B-10E in accordance with some embodiments. In some embodiments, the image 1004 is expanded until it covers substantially the entire width of the touch screen 112, as shown in FIG. 10E. In some embodiments, the image 1004 appears to expand from a point on the touch screen 112, such as a point at or near the center of the touch screen 112. As the image 1004 expands, individual features or elements within the image 1004 become distinguishable, as illustrated by comparing the images 1004-3 and -4 (FIGS. 10D-10E) to the images 1004-1 and -2 (FIGS. 10B-10C; the rectangles corresponding to the images 1004-1 and -2 are shown as blank to indicate that individual features or elements cannot be distinguished or are difficult to distinguish). Expanding the image is distinguishable from sliding the image onto the touch screen 112: the animation of expanding the image includes a series of images (e.g., 1004-1 through 1004-4) of the application at increasing resolutions, as opposed to a series of images of increasing portions of the application at a constant resolution.

In some embodiments, while the image 1004 expands, icons in the first user interface 1000A appear to slide off of the touch screen 112 via respective corners, as illustrated in FIGS. 10B-10D. For example, in UI 1000C (FIG. 10C), the icons for applications 141, 148, and 155 have disappeared off of the upper-left corner; the icons for applications 143, 144, and 149-1 have disappeared off of the upper-right corner; the icons for applications 149-4 and 149-6 have disappeared off of the lower-left corner; and the icon for application 412 has disappeared off of the lower-right corner. Similarly, in UI 1000D (FIG. 10D) the icons for applications 149-2, 149-3, 153, and 154 have disappeared off of their respective corners.

FIGS. 10E-10I illustrate an animation showing a transition from the second user interface to the first user interface in accordance with some embodiments. A gesture 1006 (FIG. 10E) is detected on the home button 204. In response to detecting the finger gesture 1006, the image 1004-4 (FIG. 10E) of the stocks application 149-2 is shrunk until it disappears, as illustrated in FIGS. 10F-10I in accordance with some embodiments. In some embodiments, the image 1004 appears to shrink to a point on the touch screen 112, such as a point at or near the center of the touch screen 112. As the image 1004 shrinks, individual features or elements within the image 1004 become indistinguishable, as illustrated by comparing the image 1004-5 (FIG. 10F) to the images 1004-6 and -7 (FIGS. 10G-10H; the rectangles corresponding to the images 1004-6 and -7 are shown as blank to indicate that individual features or elements cannot be distinguished or are difficult to distinguish). Shrinking the image is distinguishable from sliding the image off of the touch screen 112: the animation of shrinking expanding the image includes a series of images (e.g., 1004-4 through 1004-7) of the application at decreasing resolutions, as opposed to a series of images of decreasing portions of the application at a constant resolution.

In some embodiments, while the image 1004 shrinks, icons in the first user interface 1000A appear to slide onto the touch screen 112 from respective corners For example, in UI 1000G (FIG. 10G) the icon for application 149-2 has appeared from the upper-left corner; the icon for application 154 has appeared from the upper-right corner, the icon for application 149-3 has appeared from the lower-left corner, and the icon for application 153 has appeared from the lower-right corner. In UI 100H (FIG. 10H), additional icons have appeared from respective corners, as shown. The icons appear to slide until UI 1000A (FIG. 10A) has been reassembled, as illustrated in UI 1000I (FIG. 10I).

FIGS. 11A-11I illustrate animations showing transitions between user interfaces for an instant messaging application in accordance with some embodiments. These animated transitions help a user to navigate within a messaging application in a simple, intuitive manner.

Figure 11A:
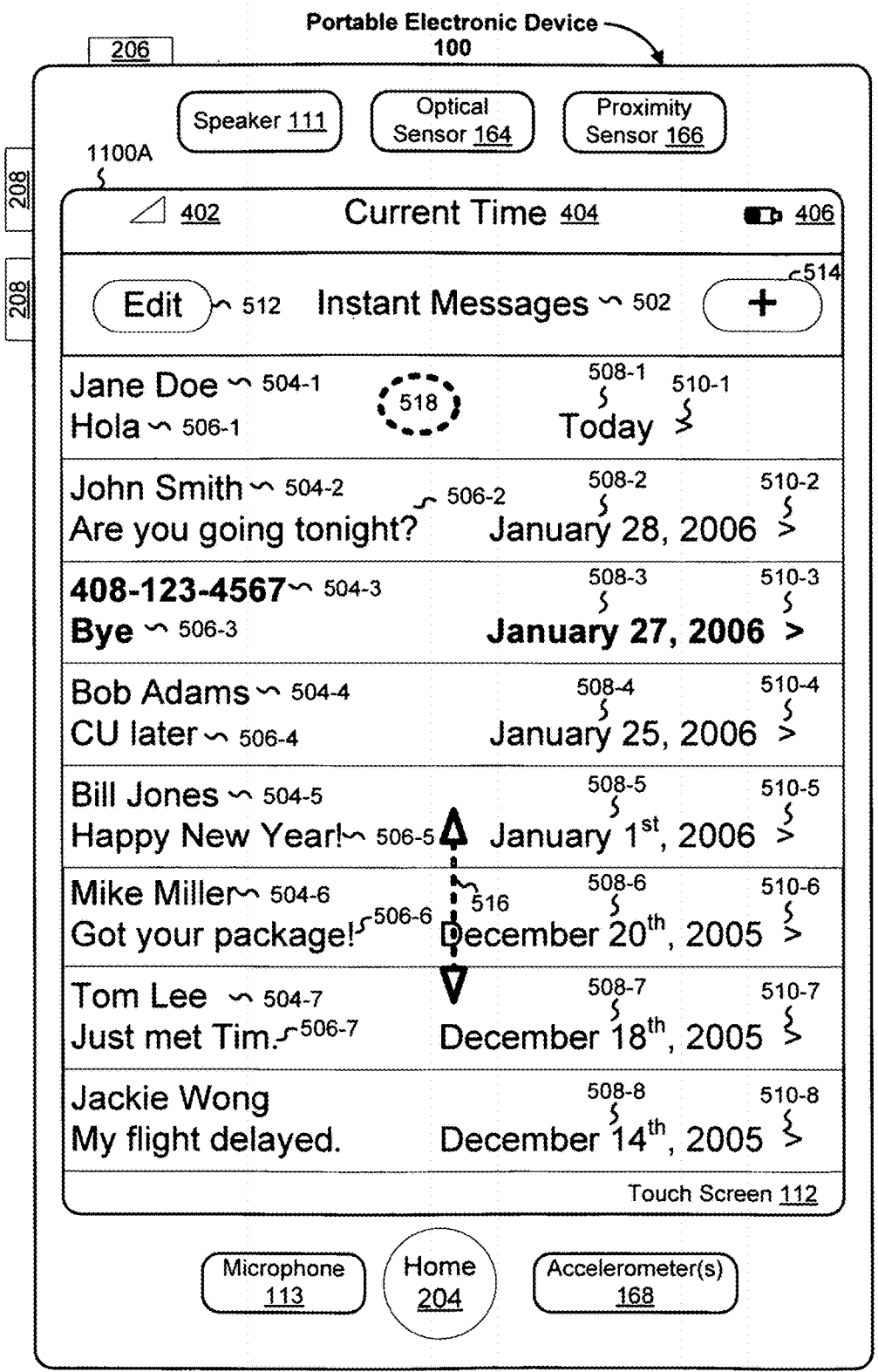
Figure 11B:
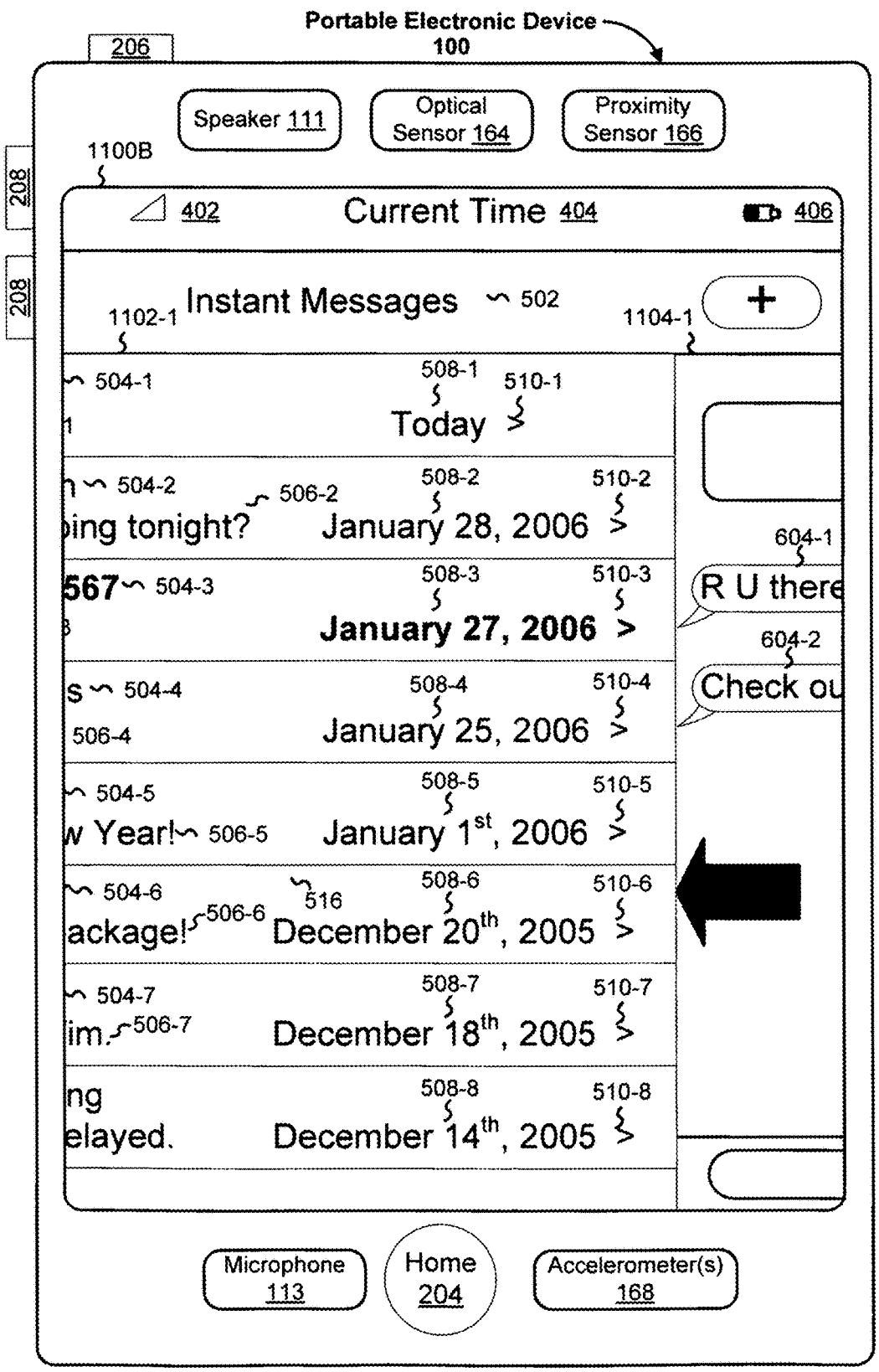

FIG. 11A illustrates an exemplary user interface 1100A for listing instant message conversations on a portable electronic device in accordance with some embodiments. An instant message conversation includes a set of messages exchanged between a user of the portable electronic device and one or more other persons. In some embodiments, user interface 1100A includes the following elements, or a subset or superset thereof:

- 402, 404, and 406, as described above;
- "Instant Messages" or other similar label 502;
- Names 504 of the persons a user has instant message conversations with (e.g., Jane Doe 504-1) or the phone number if the corresponding person's name is not available (e.g., 408-123-4567 504-3);
- Text 506 of the last message or a portion thereof in the conversation (note that the last message could be the last one either sent or received by the user);
- Date 508 and/or time of the last message in the conversation;
- Selection icon 510 that when activated (e.g., by a finger gesture on the icon) initiates transition to a UI for the corresponding conversation (e.g., UI 1100E, FIG. 11E for Jane Doe 504-1) (alternatively, a gesture anywhere in the row listing the conversation initiates transition to a UI for the conversation);
- Edit icon 512 that when activated (e.g., by a finger gesture on the icon) initiates transition to a UI for deleting conversations; and
- Create message icon 514 that when activated (e.g., by a finger gesture on the icon) initiates transition to the user's contact list.

As shown in FIG. 11A, the list of conversations may be displayed in a chronological order. The conversation with "Jane Doe" is at the top because it is the only conversation that includes at least one message generated today 508-1, which is assumed to be Jan. 29, 2006 in this example. In some embodiments, the conversations are ordered by the timestamp of the most recent message in each conversation. In some embodiments, a conversation including at least one message that has not been checked by the user is highlighted in the touch screen. For example, the third conversation in the list is displayed using boldfaced characters to suggest that the user has not checked the recent message sent by the person at the phone number 408-123-4567.

In some embodiments, the name 504 associated with an instant message conversation is determined by finding an entry in the user's contact list 137 that contains the phone number used by the instant message conversation. If no such entry is found, then just the phone number is displayed (e.g., 504-3). In some embodiments, if the other person sends messages from two or more different phone numbers, the messages may appear in the same conversation including the person's name if all the phone numbers used are found in the same entry (i.e., the entry for the other person) in the user's contact list 137. In some embodiments, the conversation includes messages sent from phone numbers and/or email addresses associated with the other person. In some embodiments, the messages sent by the other person include a first message sent from a first address associated with the other person and a second message sent from a second address associated with the other person that is different from the first address. In some embodiments, the first address is a telephone number and the second address is an email address. In some embodiments, the first and second addresses are two distinct telephone numbers. In some embodiments, the first and second addresses are two distinct email addresses.

In some other embodiments, if the other person sends messages from two or more different phone numbers, the messages may appear in different conversations corresponding to different numbers. The phone numbers or other identifiers are displayed next to the person's name to distinguish these conversations from each other.

In some embodiments, the name field of an instant message conversation includes names or other identifiers of multiple parties that participate in the conversation as message recipients and/or senders. If there is no room for displaying all the names, a selected subset of names is displayed with a symbol like " . . . " at the end, indicating that there are more parties in the conversation. By default, a message by the user of the portable electronic device is sent to all the parties of the conversation. For simplicity, the subsequent embodiments of IM conversations described here involve only two parties, the user and another person. But one skilled in the art will appreciate that the methodologies described in the present invention are also applicable to an IM conversation involving more than two parties.

Automatically binning the instant messages into "conversations" (instant messages exchanged between the user of the device and a respective person or phone number) makes it easier for the user to carry on and keep track of instant message exchanges with multiple parties.

As noted above, the portable device monitors user contact with the conversation list. When the user swipes his finger or a stylus on the touch screen in a substantially vertical direction, this user contact may be interpreted as a scrolling gesture. In some embodiments, the scrolling gesture is independent of the horizontal position of the user contact with the touch screen display. In some embodiments, the scrolling gesture is substantially independent of the horizontal position of the user contact with the touch screen display (e.g., one or more side regions of the touch screen display may be reserved for other functions, such as functions corresponding to icons, soft keys or application navigation functions, and not available for the scroll gesture). The portable electronic device, accordingly, scrolls the conversation list and displays a different portion of the conversation list.

The conversation list moves in a direction consistent with the scrolling gesture 516. If the scrolling gesture is downward (or upward), the conversation list also moves downward (or upward). Scrolling the conversation list downward will typically scroll the list to earlier entries in the list, until the first entry is reached (e.g., Jane Doe 504-1). But if the user does not have too many IM conversations, the portable electronic device may display the entire conversation list and the scrolling gesture has no effect.

If the user taps on the edit icon 512 using his finger or stylus, the portable electronic device replaces the conversation list UI with a new UI that allows the user to edit the conversations (not shown). Similarly, if the user taps on the message creation icon 514, the portable electronic device replaces the conversation list UI with a new UI that allows the user to create a new instant message and therefore a new conversation (not shown).

If the user selects a particular conversation in the list (e.g., by a tap gesture 518 on the row listing the conversation, or by a gesture on a corresponding selection icon 510), the portable electronic device interprets the gesture as indicating that the user intends to check the messages associated with the user selected conversation. Accordingly, the portable electronic device replaces the conversation list UI 1100A (FIG. 11A) with a conversation UI 1100E (FIG. 11E).

In some embodiments, the portable electronic device replaces the conversation list UI 1100A (FIG. 11A) with the conversation UI 1100E (FIG. 11E) by displaying an animation illustrating the UI 1100E sliding onto the screen from a first side while the UI 1100A slides off the screen on a second side. In some embodiments, the first and second sides are opposite sides of the screen. In the example of FIGS. 11A-11E, the UI 1100E appears to slide onto the screen from the right side while the UI 1100A slides off of the screen on the left side. In successive images shown in FIGS. 11B-11D, increasingly wide portions 1104-1 through 1104-3 of the UI 1100E are shown to extend from the right side of the screen while increasingly narrow portions 1102-1 through 1102-3 of the UI 1100A are shown to extend from the left side of the screen, until the complete UI 1100E is shown and display of the UI 1100A ceases entirely, as shown in FIG. 11E.

Figure 11C:
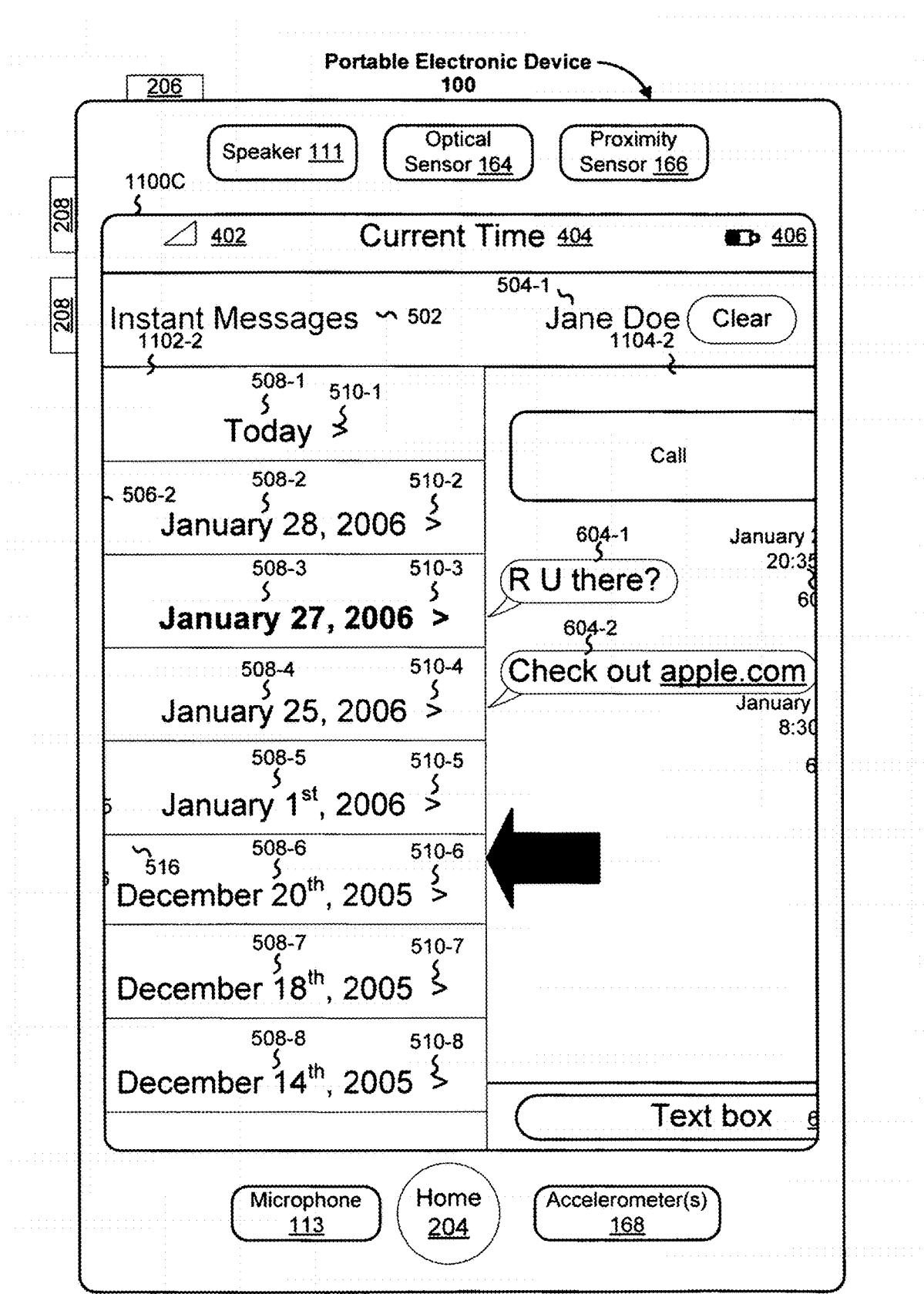
Figure 11D:
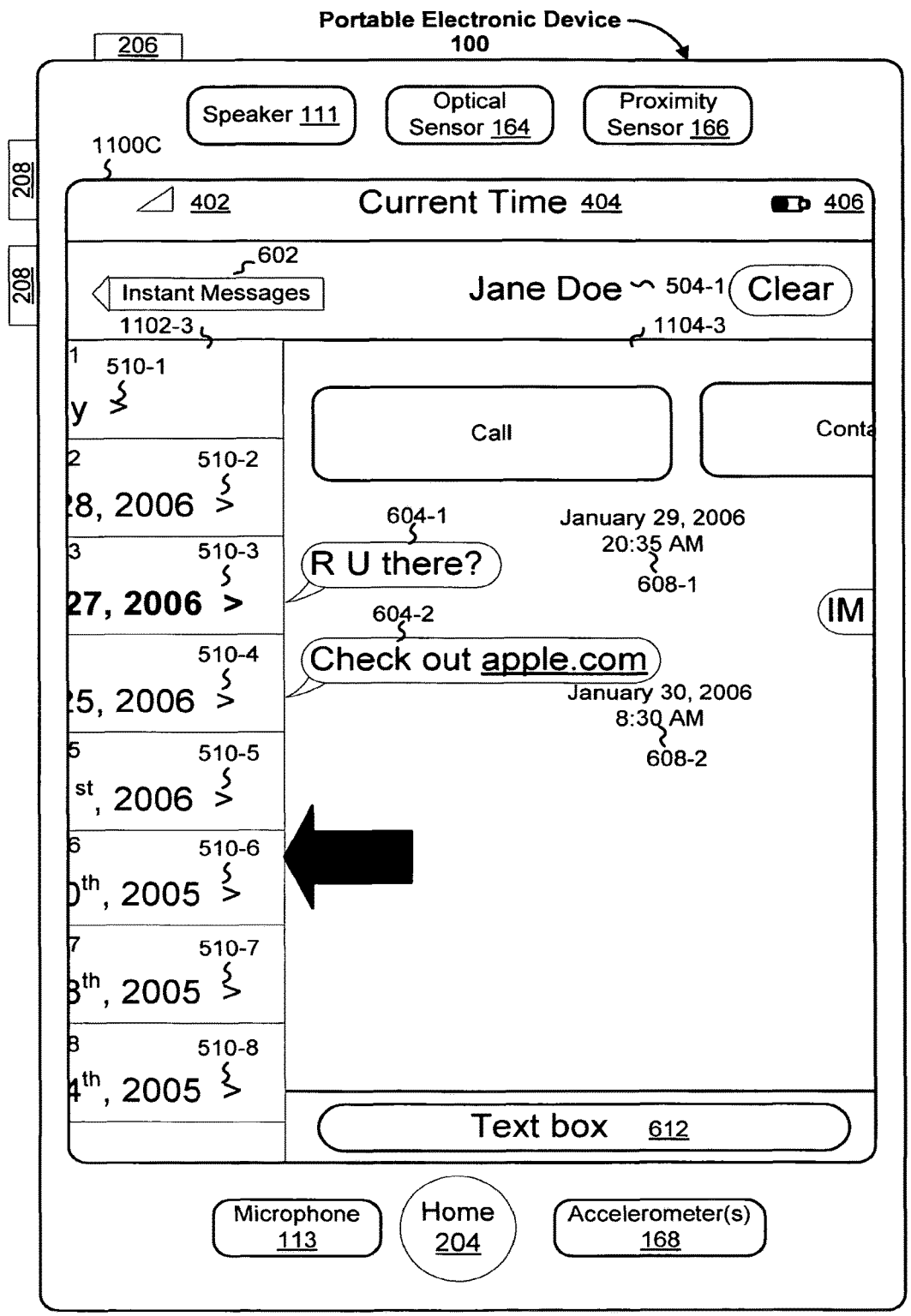
Figure 11E:
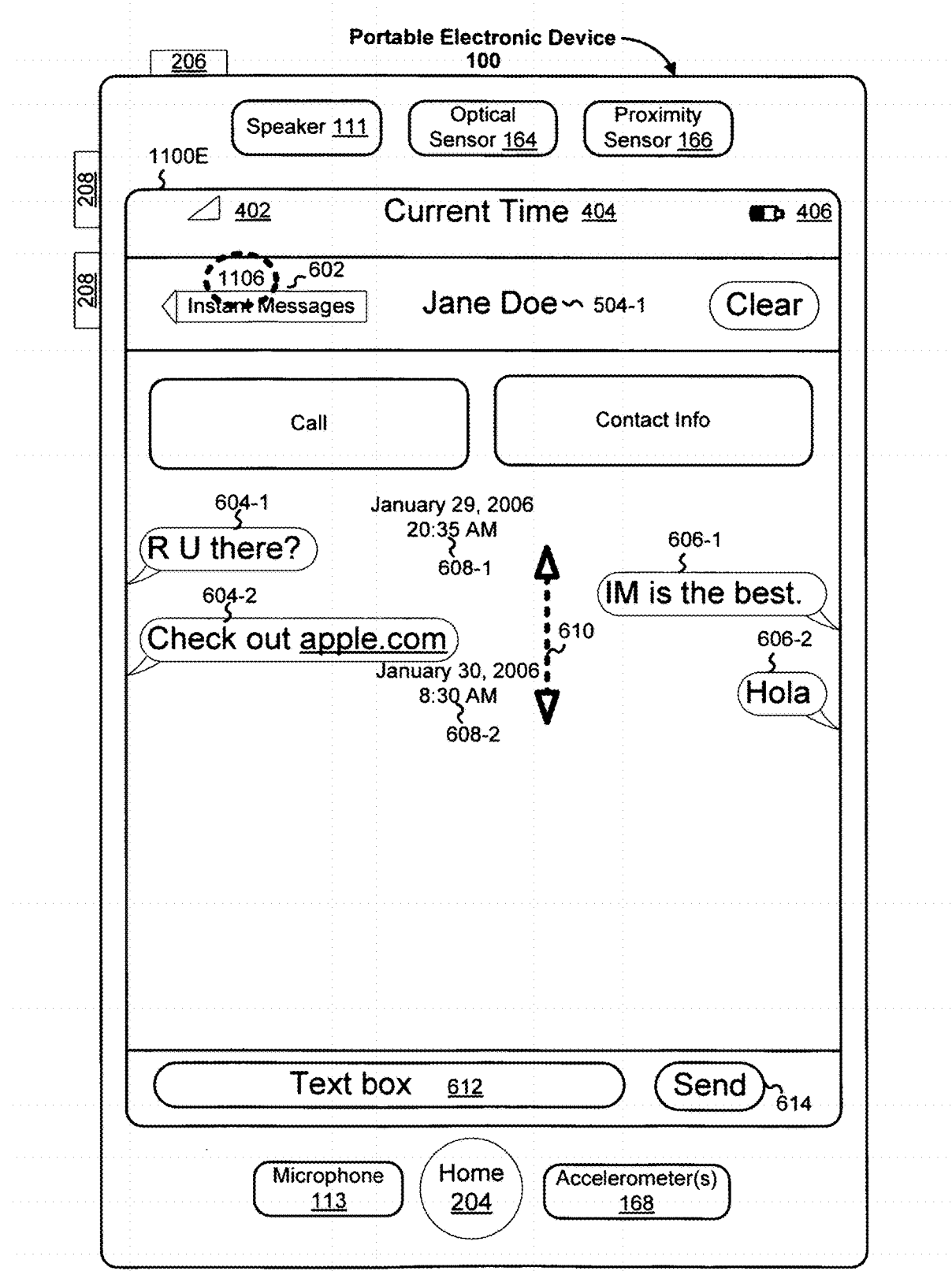
Figure 11F:
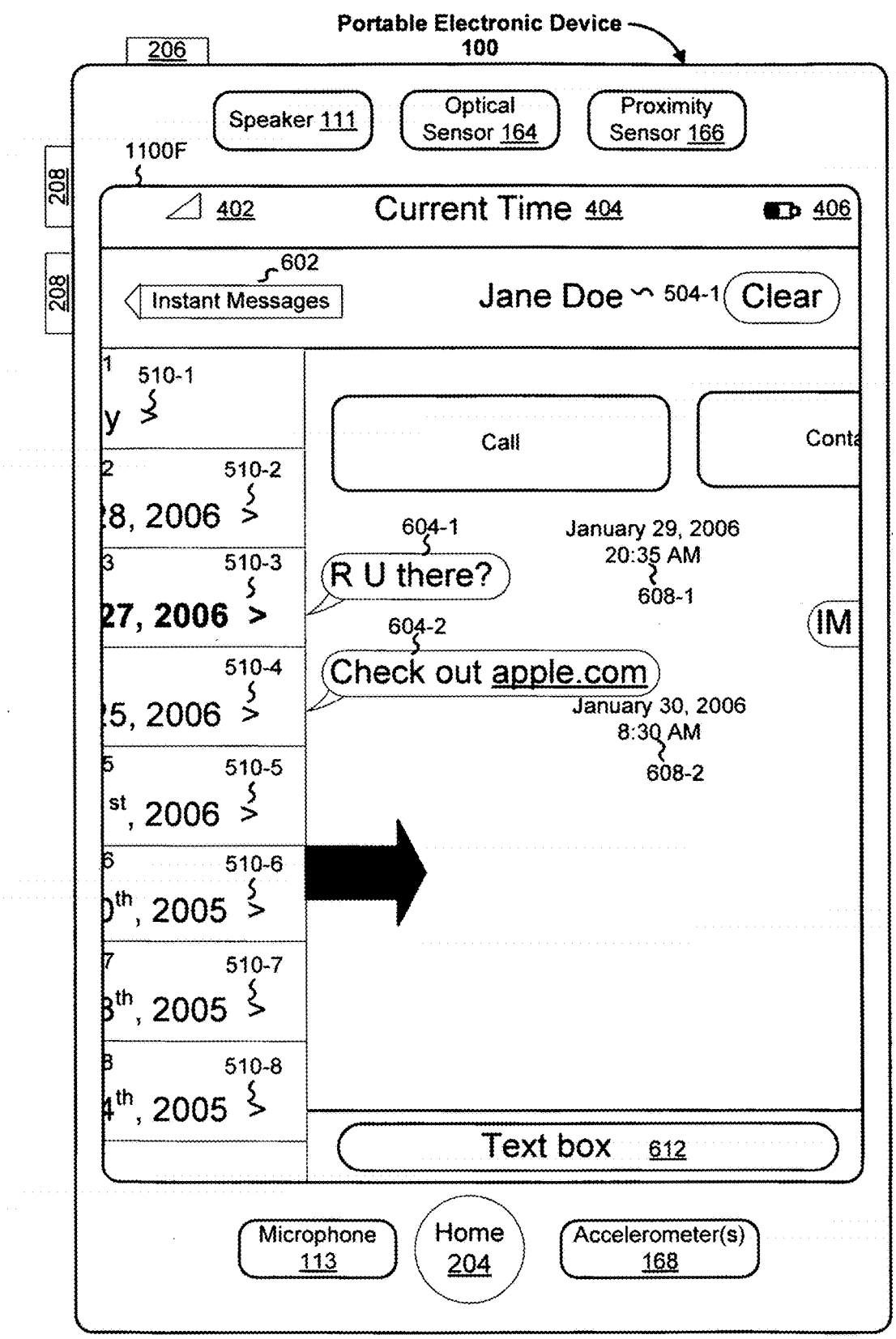
Figure 11G:
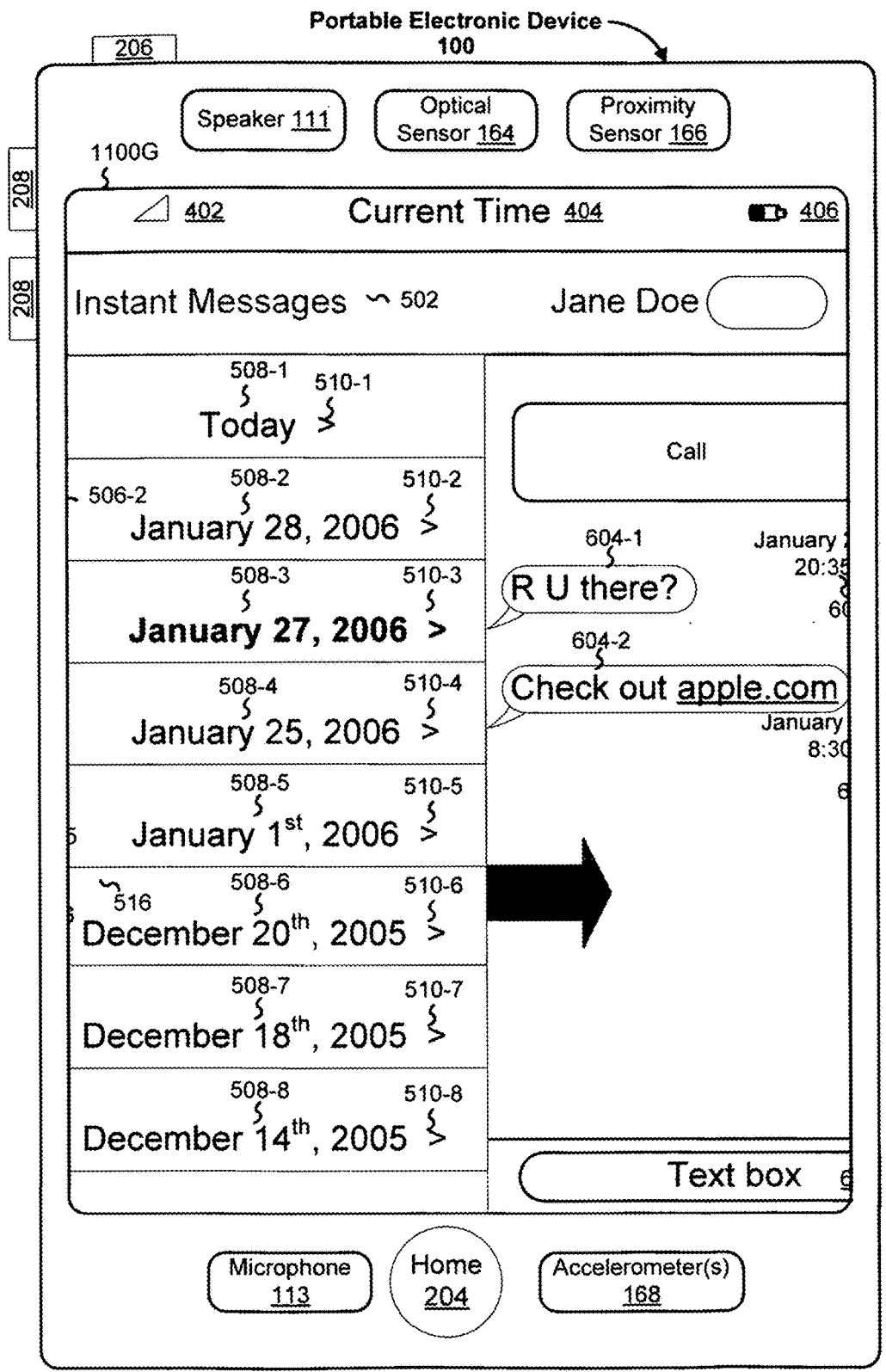
Figure 11H:
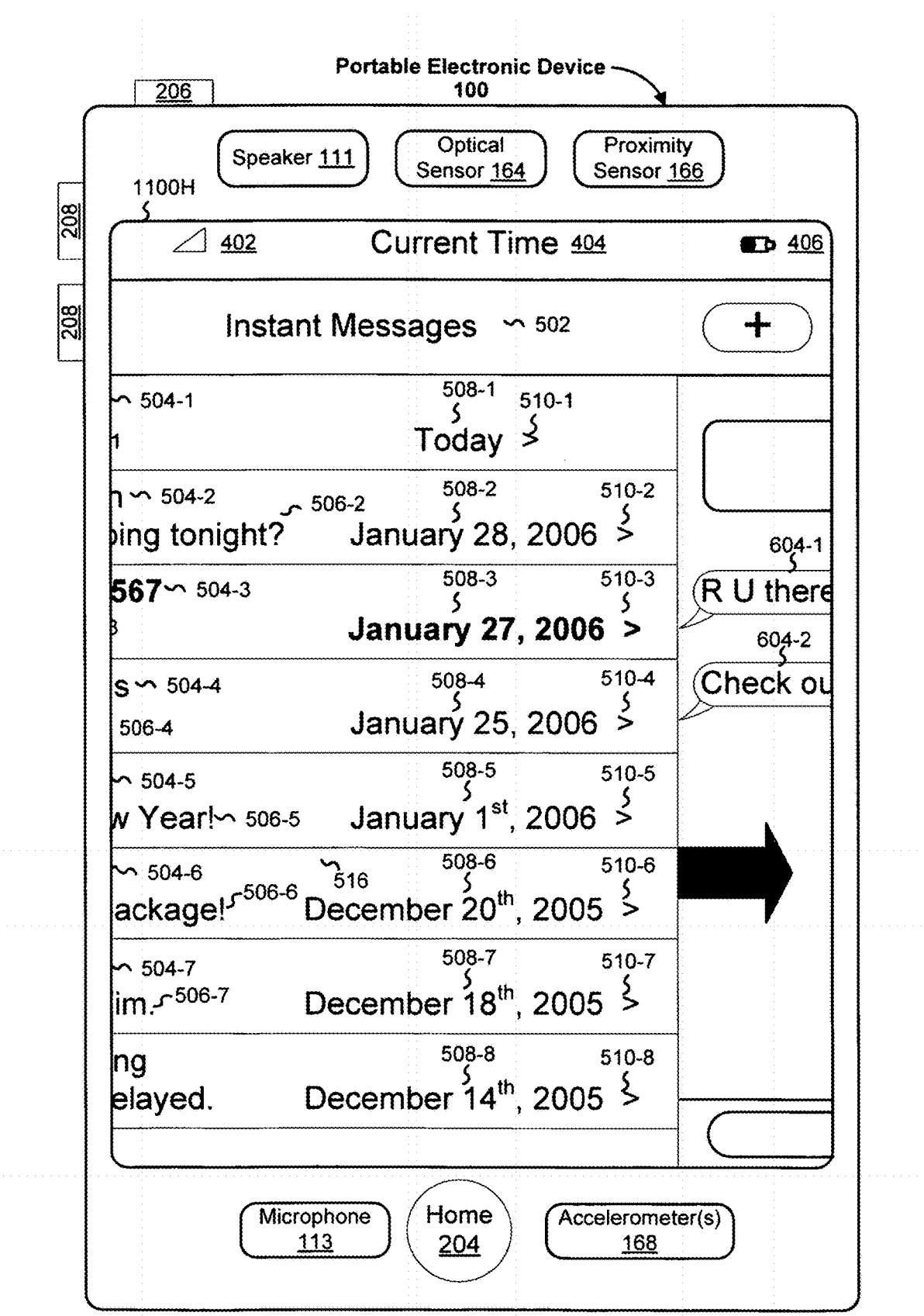
Figure 11I:
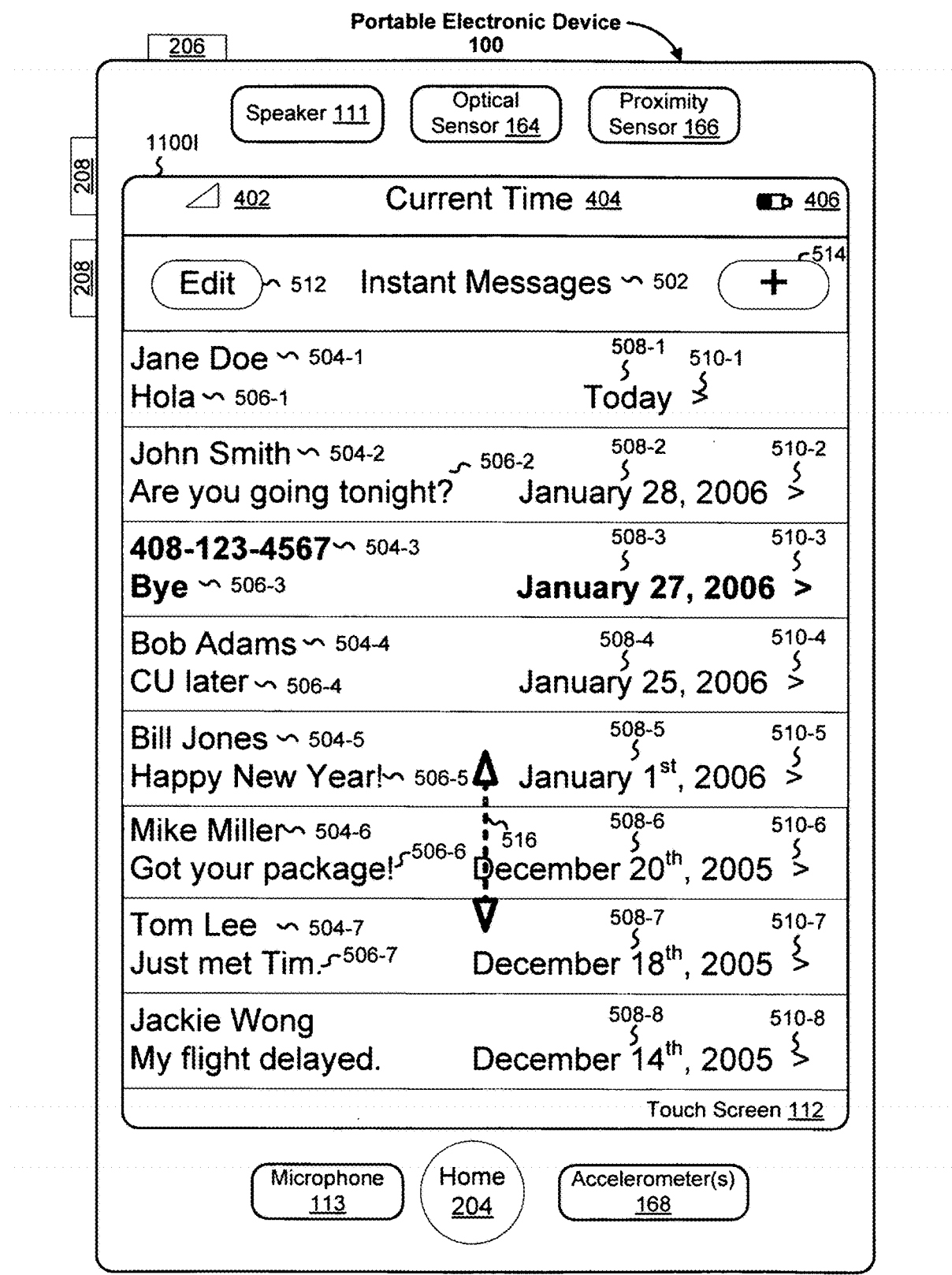

In some embodiments, a header including a title (e.g., "Jane Doe" 504-1, corresponding to a name of a party in the instant message conversation) appears to slide onto the screen, as shown in FIGS. 11C-11E. In some embodiments, if a name is not available, a title including the phone number used in the selected instant message conversation appears to slide onto the screen as a header.

In some embodiments, user interface 1100E (FIG. 11A) includes the following elements, or a subset or superset thereof:
- 402, 404, and 406, as described above;
- Name 504 corresponding to the phone number used in the instant message conversation (or the phone number itself if the name is not available);
- Instant messages icon 602 that when activated (e.g., by a finger gesture 1106 on the icon) initiates transition to a UI listing instant message conversations (e.g., UI 1100A/1100I, FIGS. 11A and 11I);
- Instant messages 604 from the other party, typically listed in chronological order along one side of UI 1100E;
- Instant messages 606 to the other party, typically listed in order along the opposite side of UI 1100E to show the back and forth interplay of messages in the conversation;
- Timestamps 608 for at least some of the instant messages;
- Text entry box 612 (in some embodiments, in response to detecting a gesture on the text entry box 612, a soft keyboard appears for entering text); and
- Send icon 614 that when activated (e.g., by a finger gesture on the icon) initiates sending of the message in text box 612 to the other party (e.g., Jane Doe 504-1).

As shown in FIG. 11E, the instant messages 604 from Jane Doe may be displayed on the left side of the message display region with the most recent message (e.g., 604-2) towards the bottom. The messages sent by the user to Jane Doe are on the opposite side of the display region. The messages' relative vertical locations correspond to the order in which these messages are exchanged between the user of the device and Jane Doe. Selected timestamps 608 further indicate when these messages are exchanged. In some embodiments, a timestamp is displayed near the message it is associated with. If the message display region does not have enough room to display the timestamp of every message currently in the message display region, the device may choose to display timestamps for a subset of the messages, e.g., a timestamp 608-1 corresponding to the message 604-1 at the top of the message region and a timestamp 608-2 corresponding to the message 606-2 at the bottom of the message region. In some embodiments, the device may display more timestamps for messages in the middle if, e.g., the time gap between the two messages is above a predefined threshold. From the instant messages, the user can easily capture the topic of the conversation. If necessary, the user can browse the other old messages not currently on display by applying a scrolling gesture 610 on the message display region. In response, the portable electronic device scrolls the set of message conversations. In some embodiments, the scrolling gesture is independent of the horizontal position of the user contact with the touch screen display. In some embodiments, the scrolling gesture is substantially independent of the horizontal position of the user contact with the touch screen display, as described above.

In some embodiments, the device highlights certain portions of incoming and outgoing messages using, e.g., underlines, distinct font sizes or styles, and/or colors. Typically, the highlighted portions are deemed to have special connotations such as phone numbers, URLs, stock tickers, or contacts' names. These highlighted message portions may be user-selectable. For example, a user finger gesture on the highlighted portion "apple.com" of the message 604-2 causes the activation of the browser 147, which then brings up the home page of the website www.apple.com. Similarly, a user finger gesture on a telephone number activates the phone 138 and initiates a call to the telephone number.

In some embodiments, a vertically downward scrolling gesture scrolls the conversation downward, thereby showing older messages in the conversation. In some embodiments, a vertically upward scrolling gesture scrolls the conversation upward, thereby showing newer, more recent messages in the conversation. In some embodiments, as noted above, the last message in the conversation (e.g., 606-2) is displayed in the list of instant message conversations 500 (e.g., 506-1, FIG. 11A).

In some embodiments, in response to detecting activation of the instant messages icon 602 (e.g., detecting a gesture 1106, FIG. 11E), an animation is displayed illustrating a transition from displaying the UI 1100E (FIG. 11E) to displaying the UI 1100A/1100I (FIG. 11I), as illustrated in FIGS. 11E-11I. In some embodiments, the animation is the reverse of the animation shown in FIGS. 11A-11E.

Figure 12A:
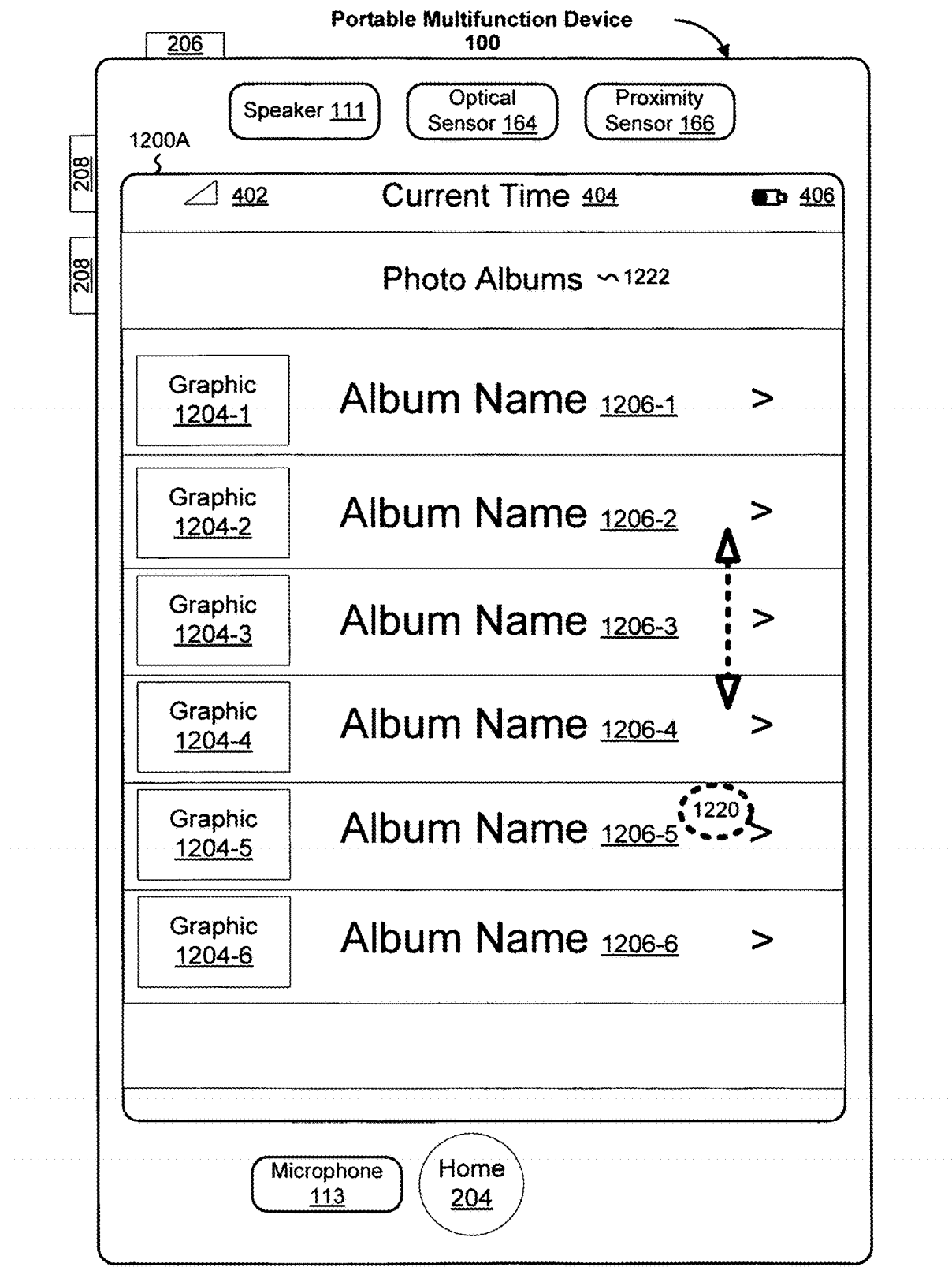
FIGS. 12A-12F illustrate transitions between user interfaces for viewing photos and photo albums in accordance with some embodiments.
Figure 12B:
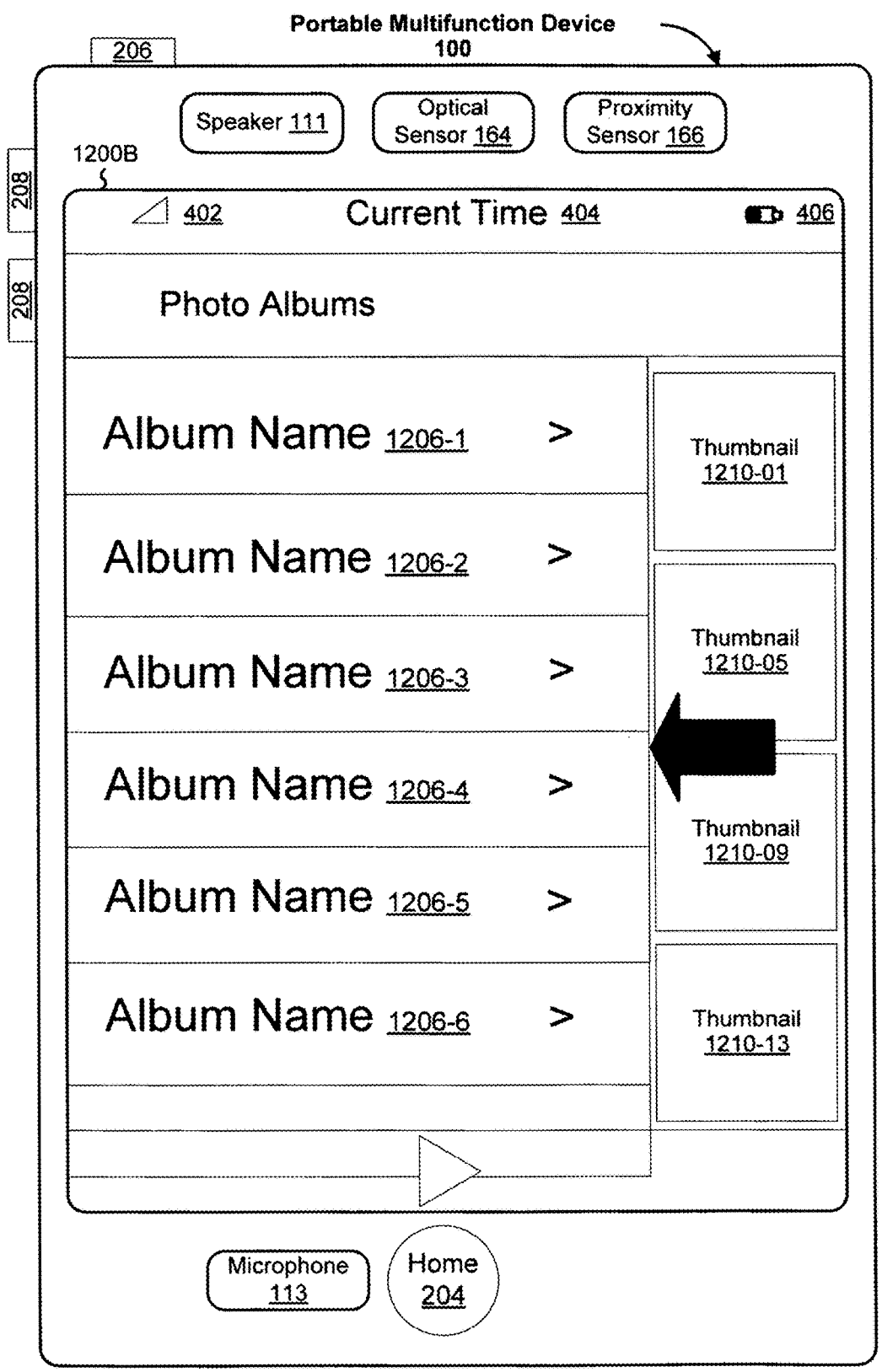
Figure 12C:
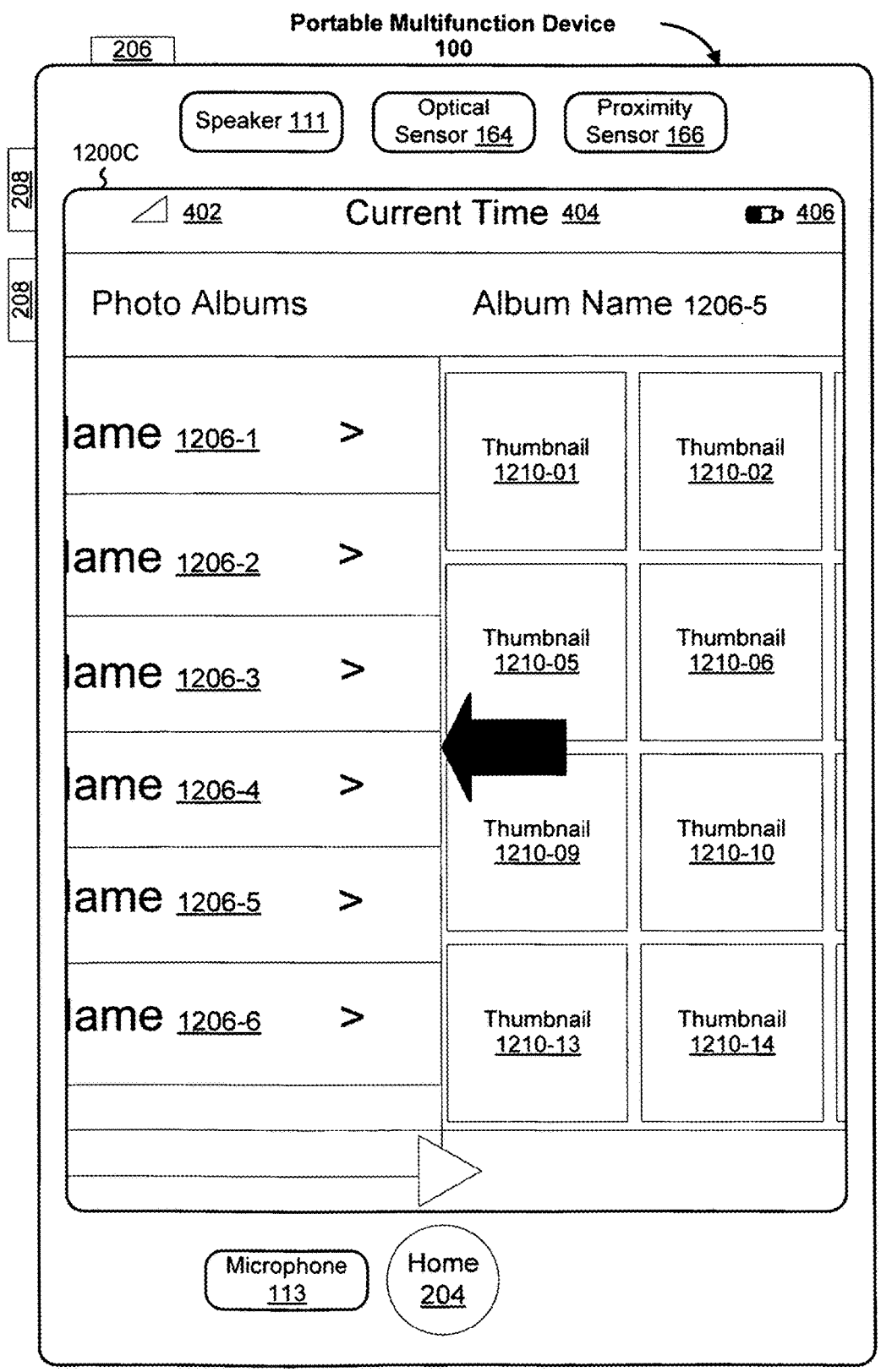
Figure 12D:
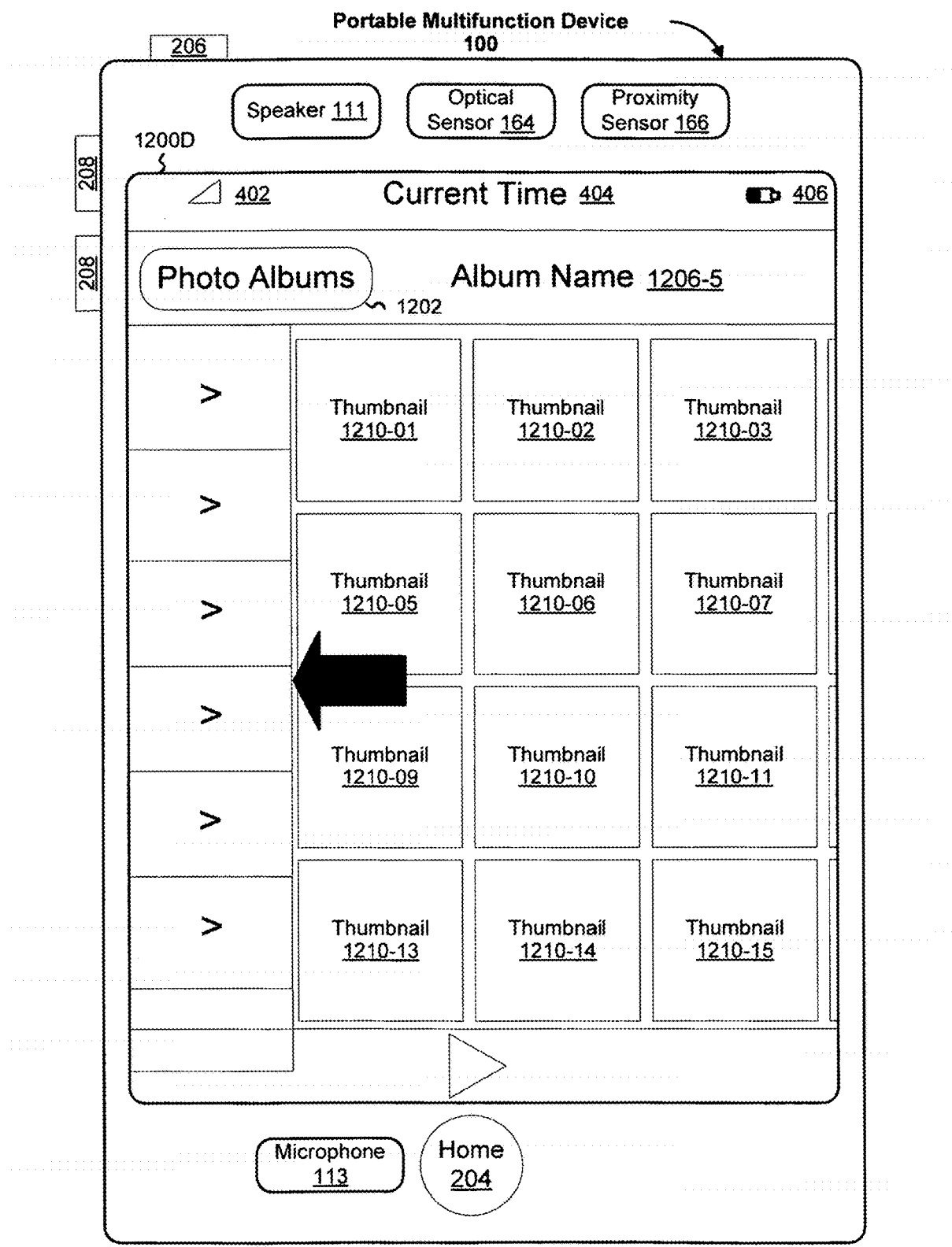
Figure 12E:
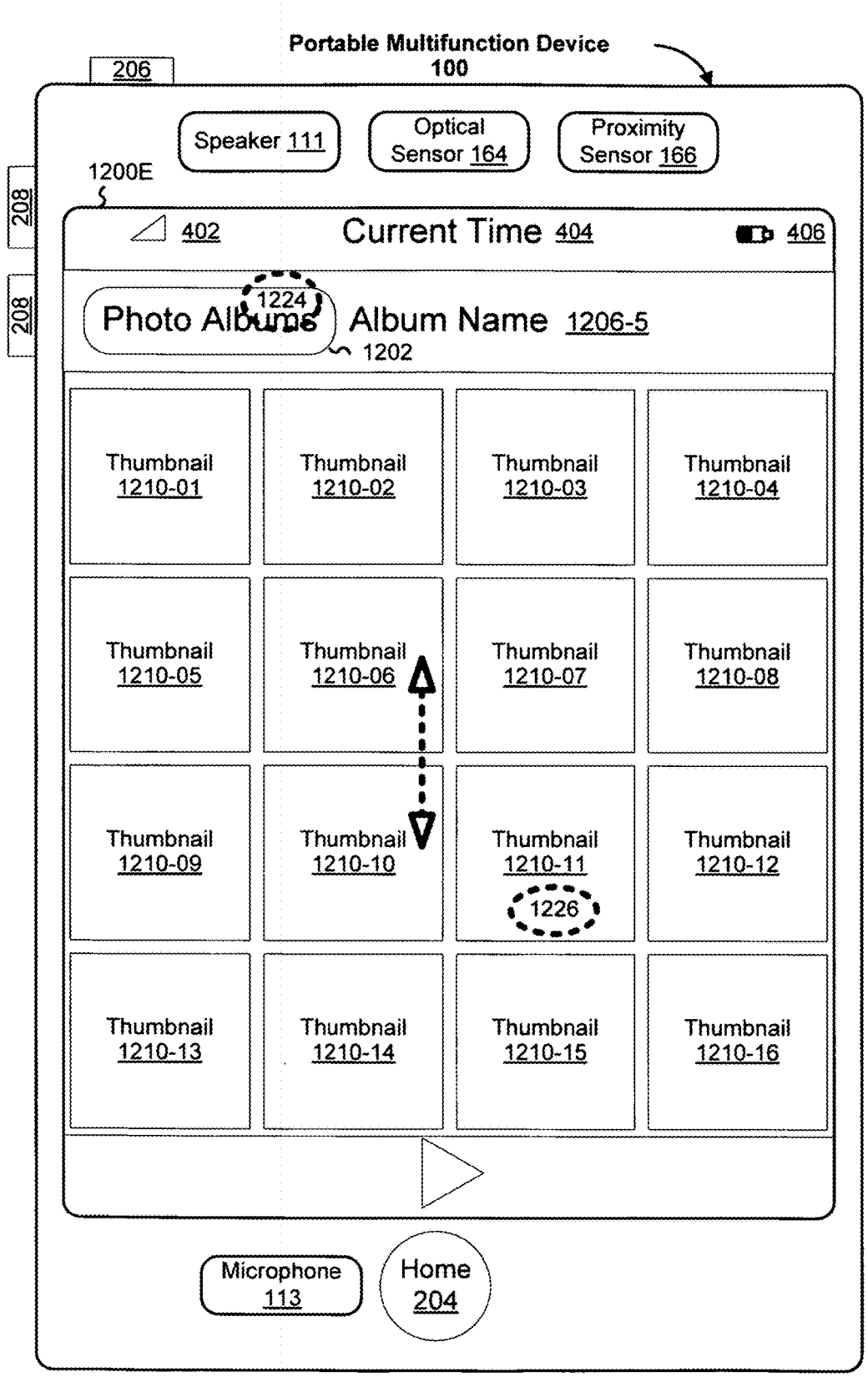

FIGS. 12A-12F illustrate transitions between user interfaces for viewing photos and photo albums in accordance with some embodiments. These animated transitions help a user to navigate within a photo management application in a simple, intuitive manner. FIGS. 12A and 12E correspond respectively to FIGS. 8 and 10 in U.S. patent application Ser. No. 11/848,210, "Portable Electronic Device for Photo Management," filed Aug. 30, 2007. In FIG. 12A, a gesture 1220 is detected on an entry listing an album name 1206-5. In response, an animation is displayed of a transition from displaying UI 1200A to displaying UI 1200E (FIG. 12E), which shows the photo album selected by the gesture 1220. As illustrated in FIGS. 12A-12E, the UI 1200A appears to slide off the left side of the screen while the UI 1200E slides onto the right side of the screen. In the animation, a header including the album name 1206-5 for the UI 1200E slides onto the screen from the left side, while the title 1222 ("Photo Albums") of UI 1200A slides to the left side of the screen and transforms into an icon 1202 (FIGS. 12D-12E).

Figure 12F:
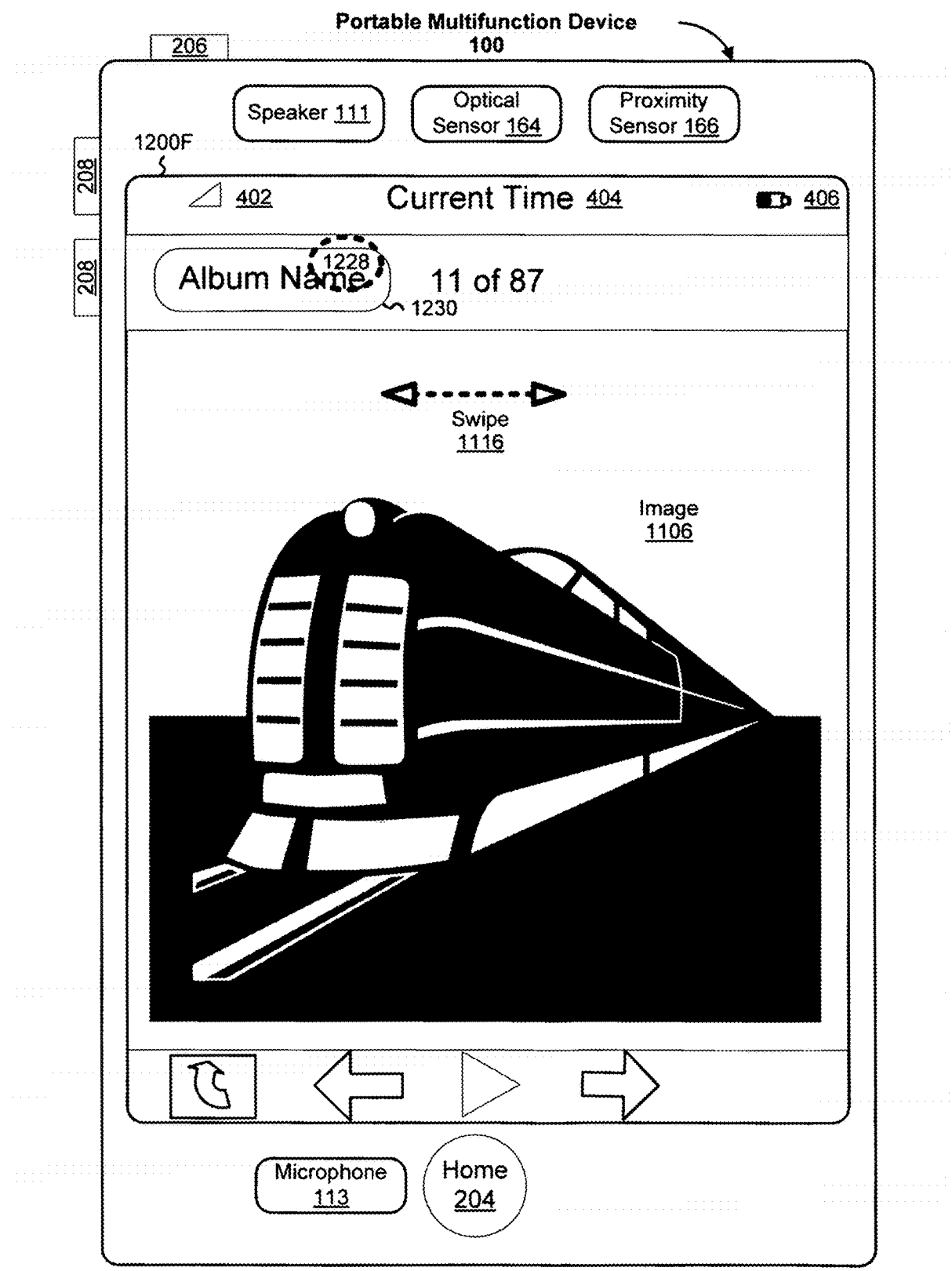

In the UI 1200E, if a gesture 1224 is detected on the icon 1202, a reverse animation is displayed illustrating a transition back to UI 1200A. If a gesture 1226 is detected on a thumbnail 1210-11, an animation (not shown) is displayed of a transition to UI 1200F (FIG. 12F). For example, UI 1200E appears to slide off of the left side of the screen while UI 1200F slides onto the screen from the right side. In the UI 1200F, if a gesture 1228 is detected on the album name icon 1230, a reverse animation (not shown) is displayed of a transition back to UI 1200E. If a swipe gesture 1116 is detected, a previous or next photo is displayed.

Figure 13A:
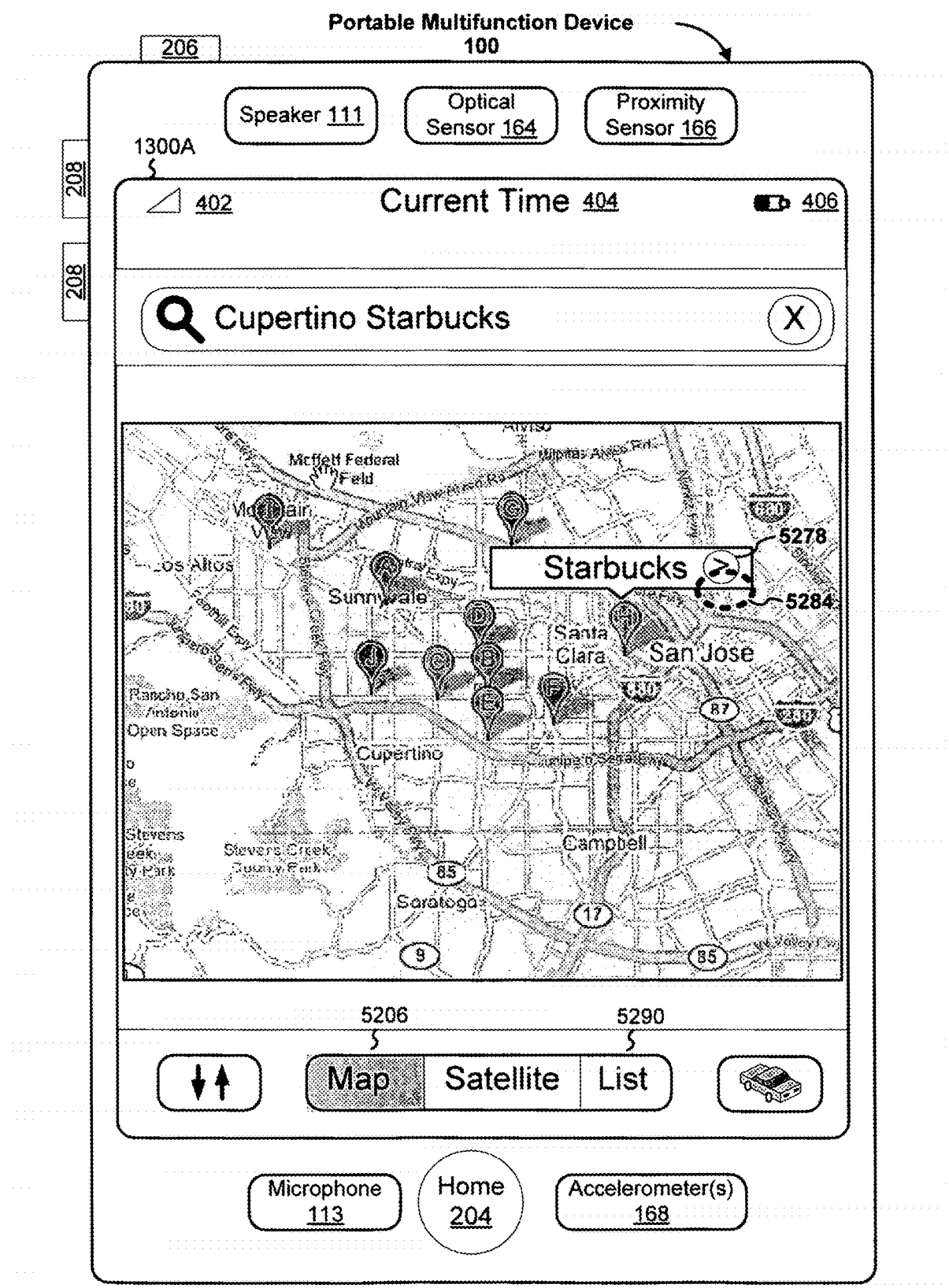
FIGS. 13A-13U illustrate transitions between user interfaces for a map application in accordance with some embodiments.
Figure 13B:
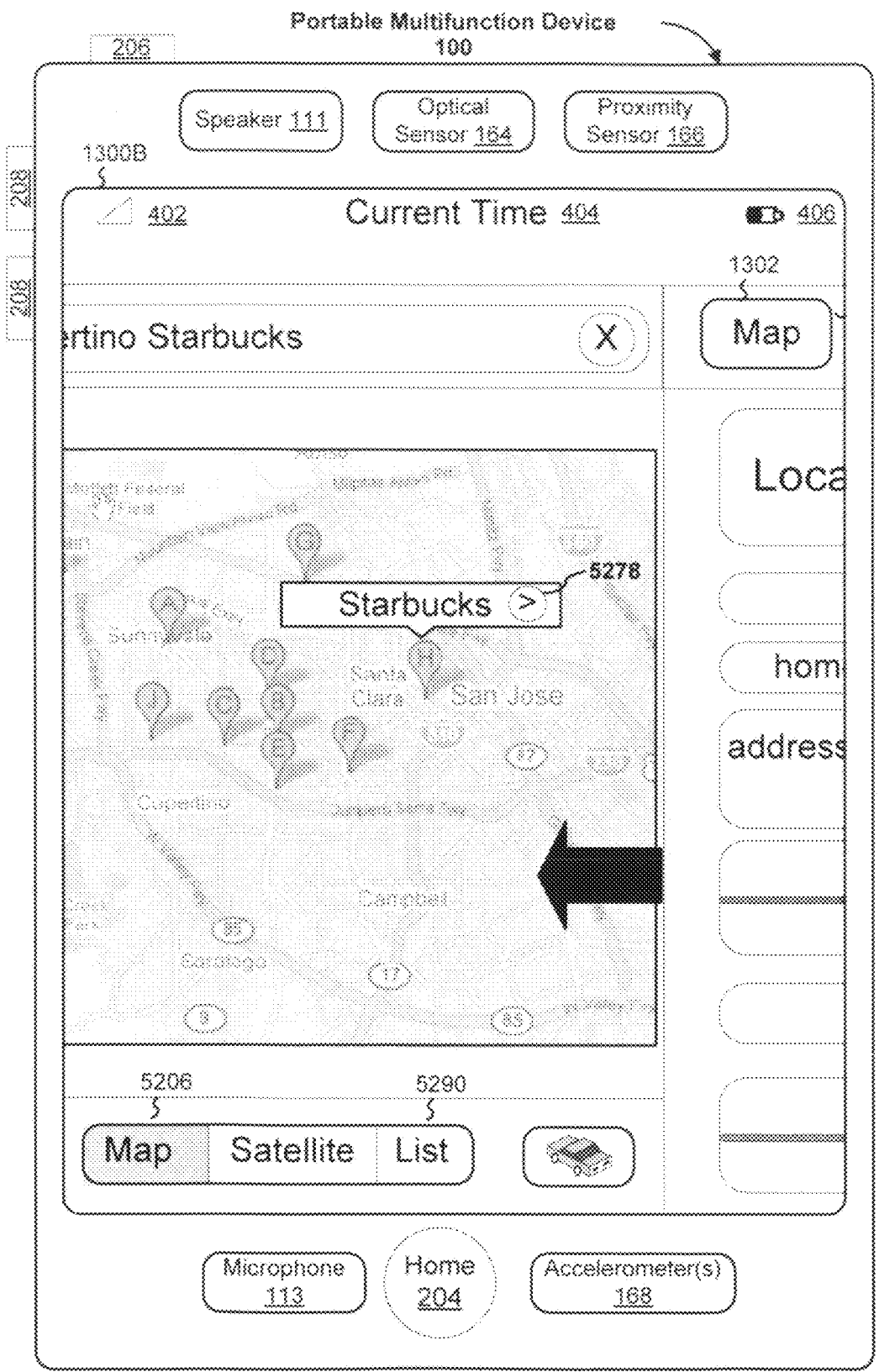
Figure 13C:
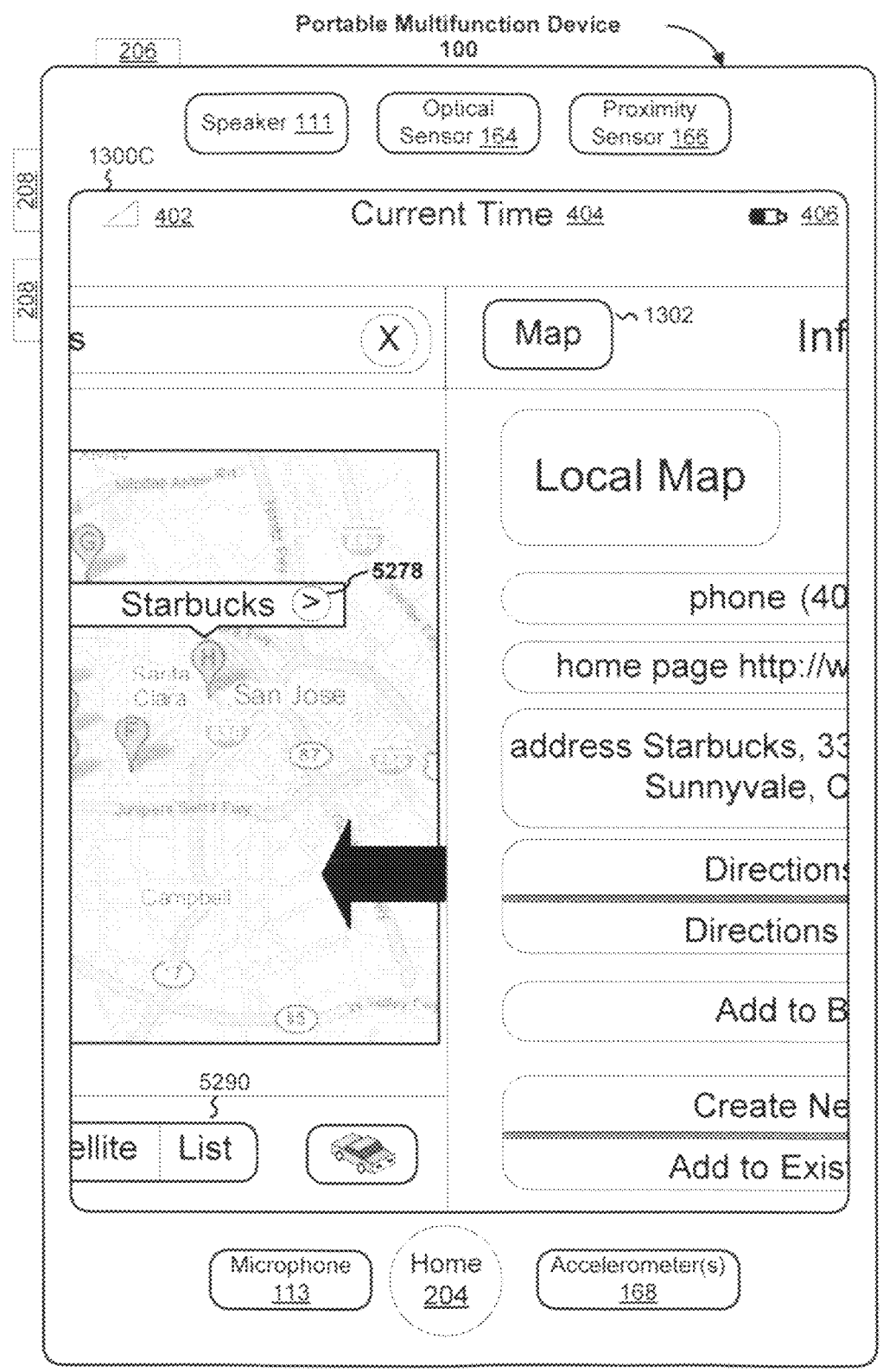
Figure 13D:
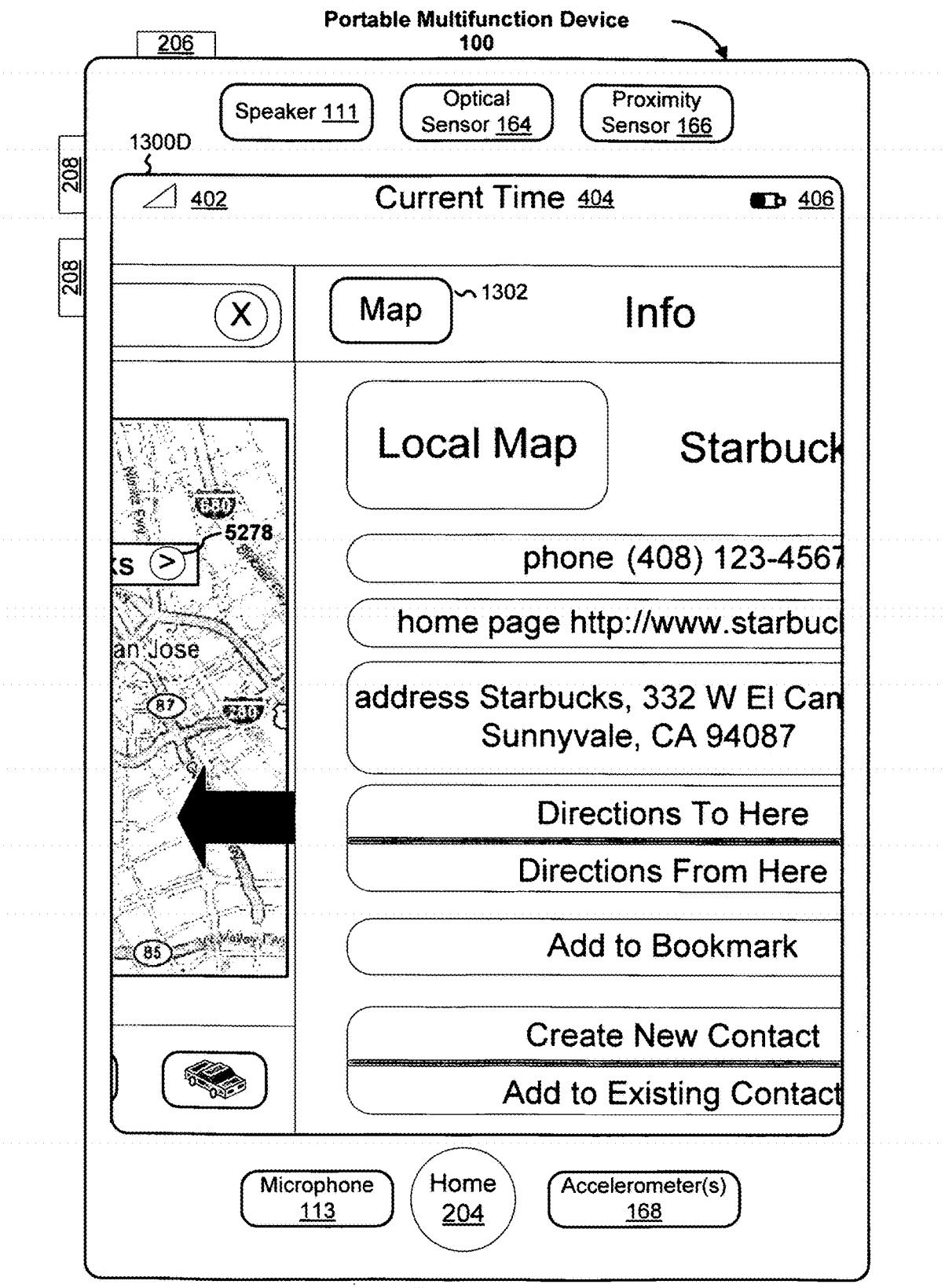
Figure 13E:
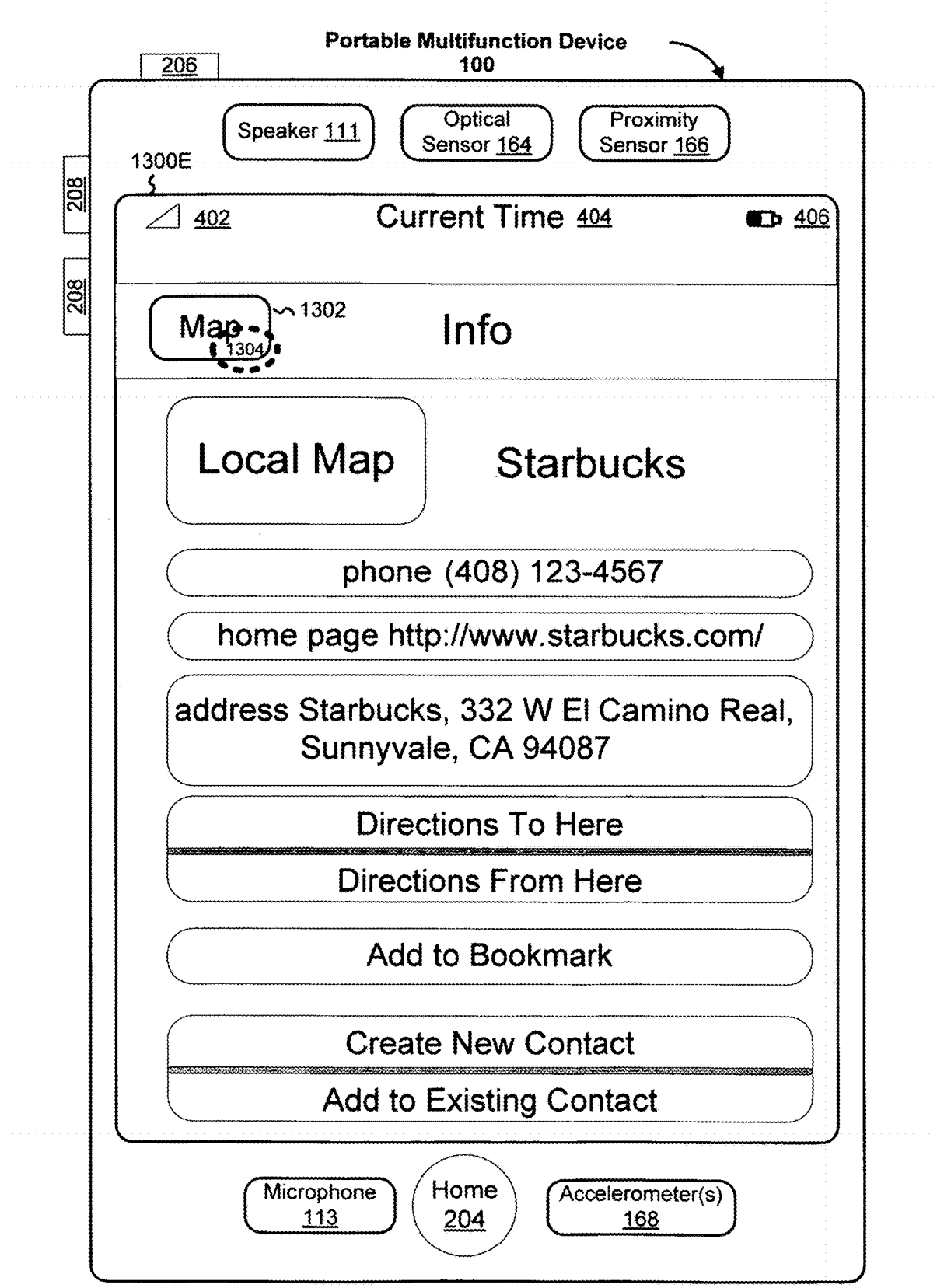
Figure 13F:
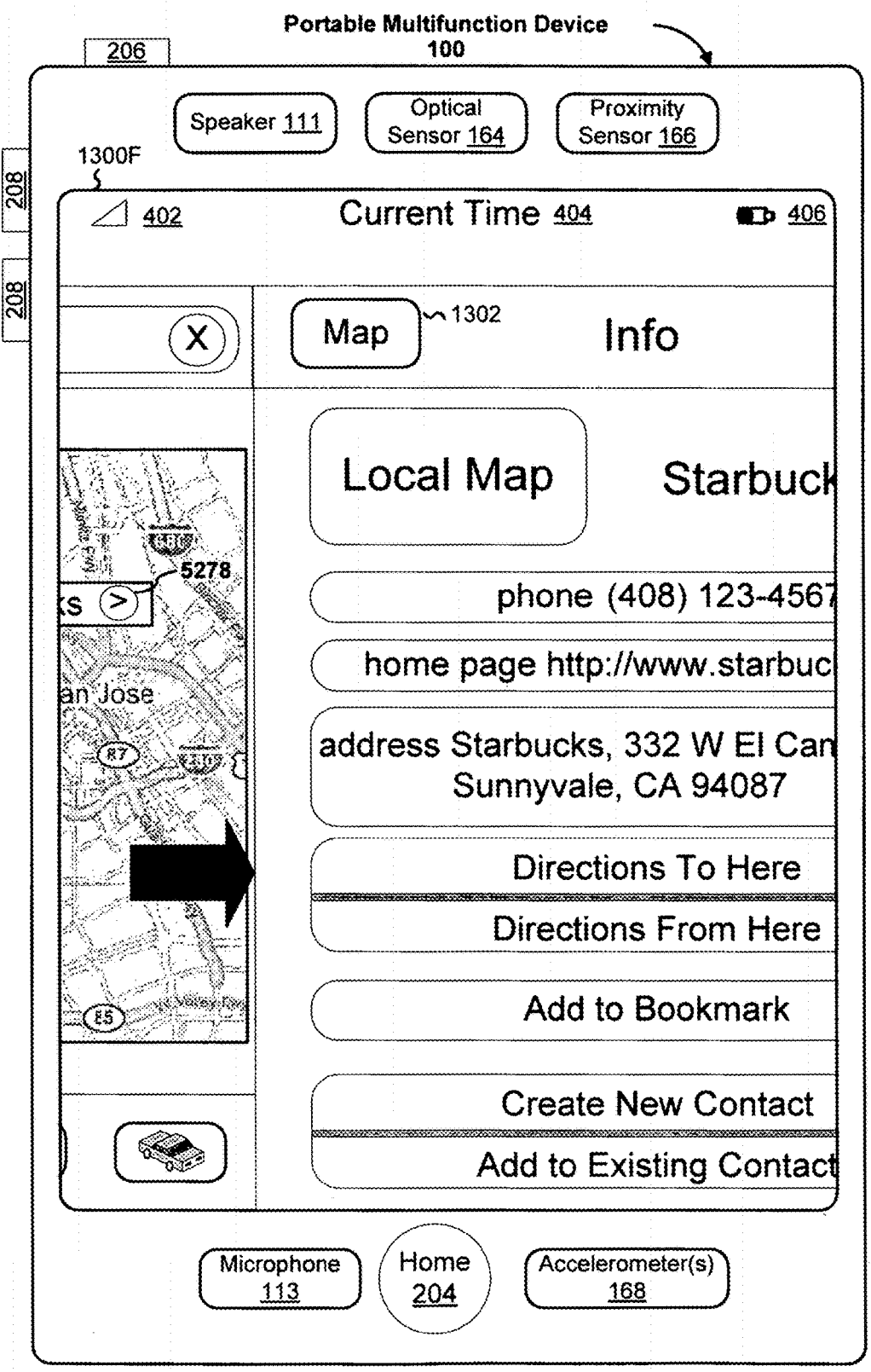
Figure 13G:
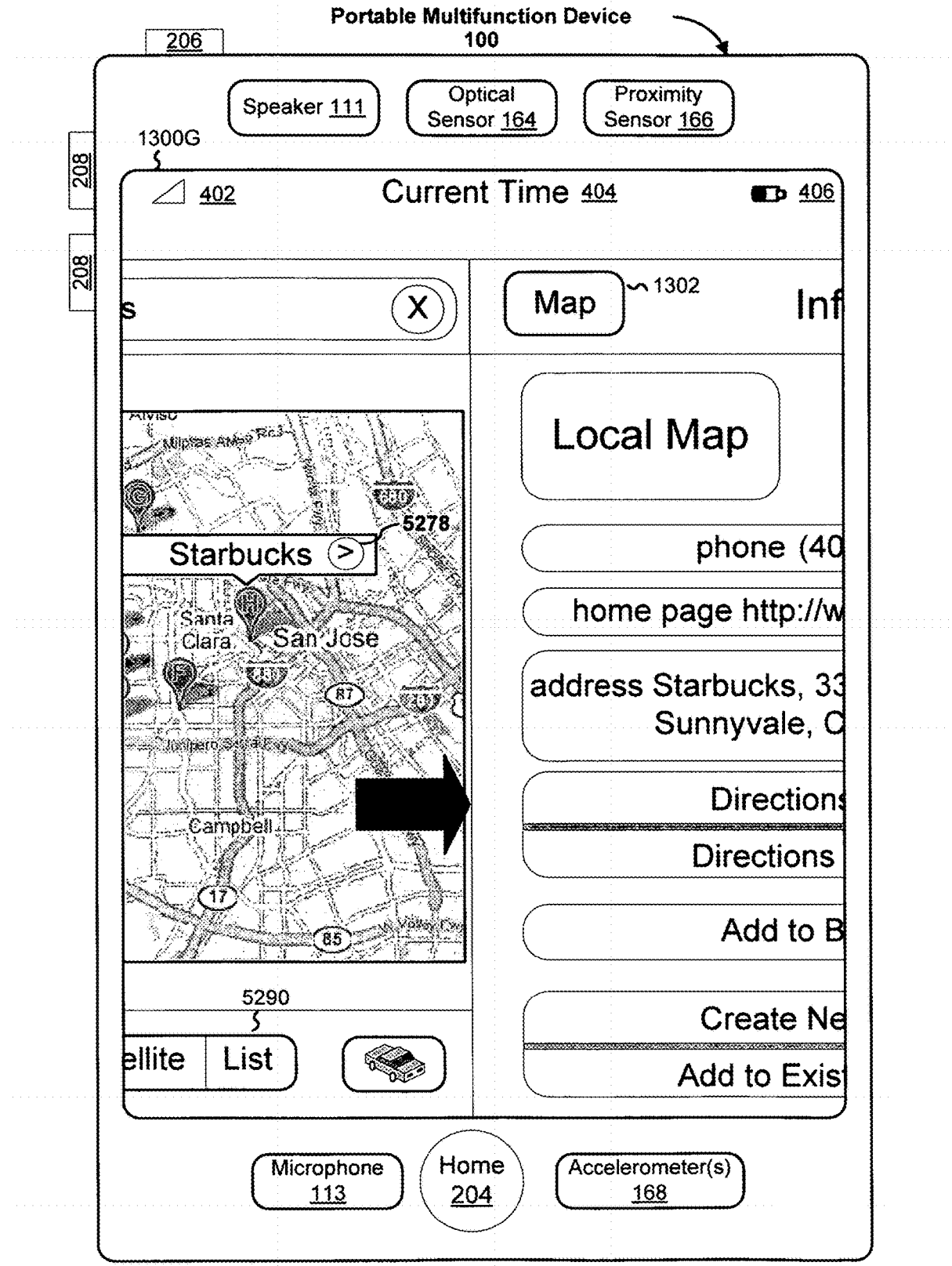
Figure 13H:
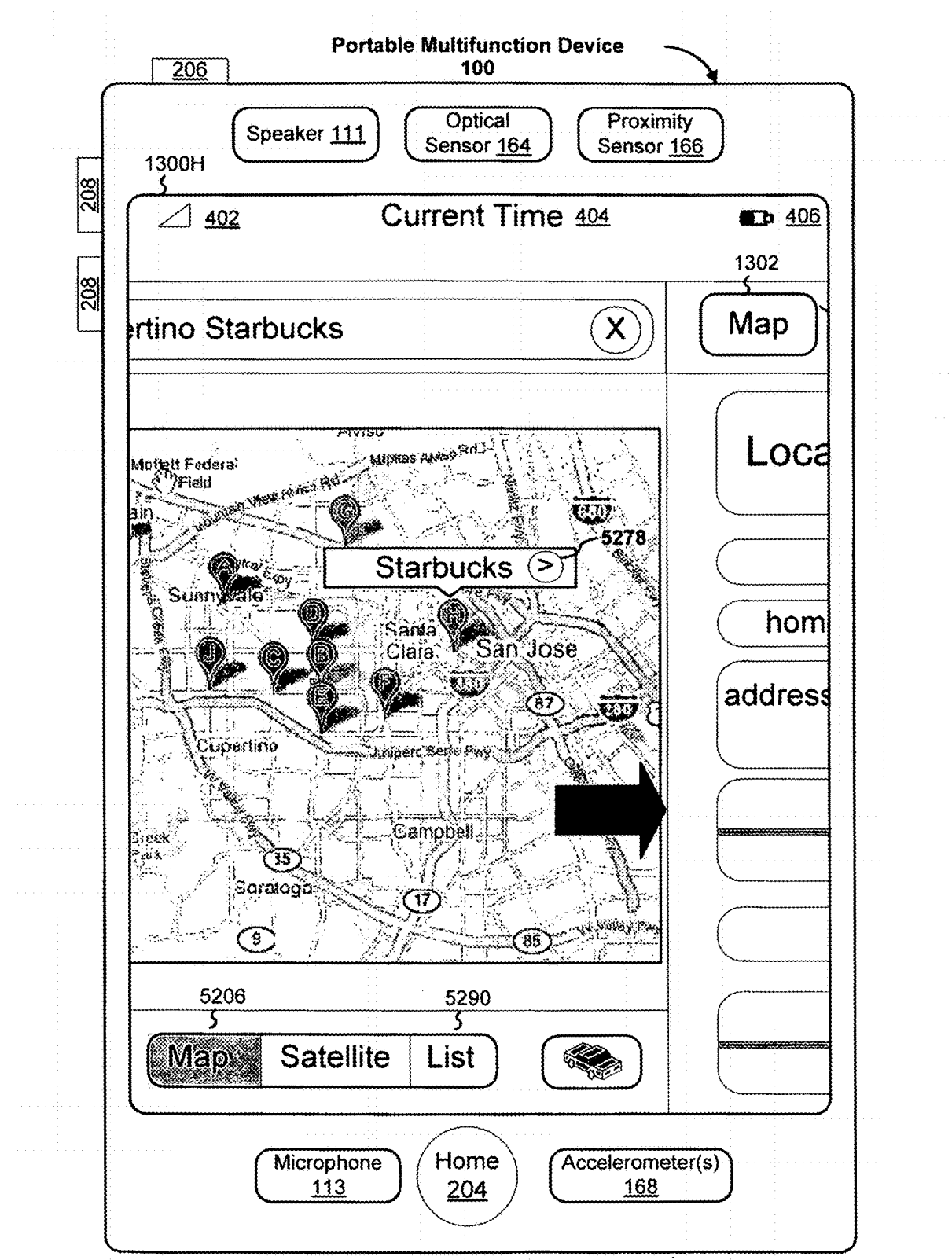
Figure 13I:
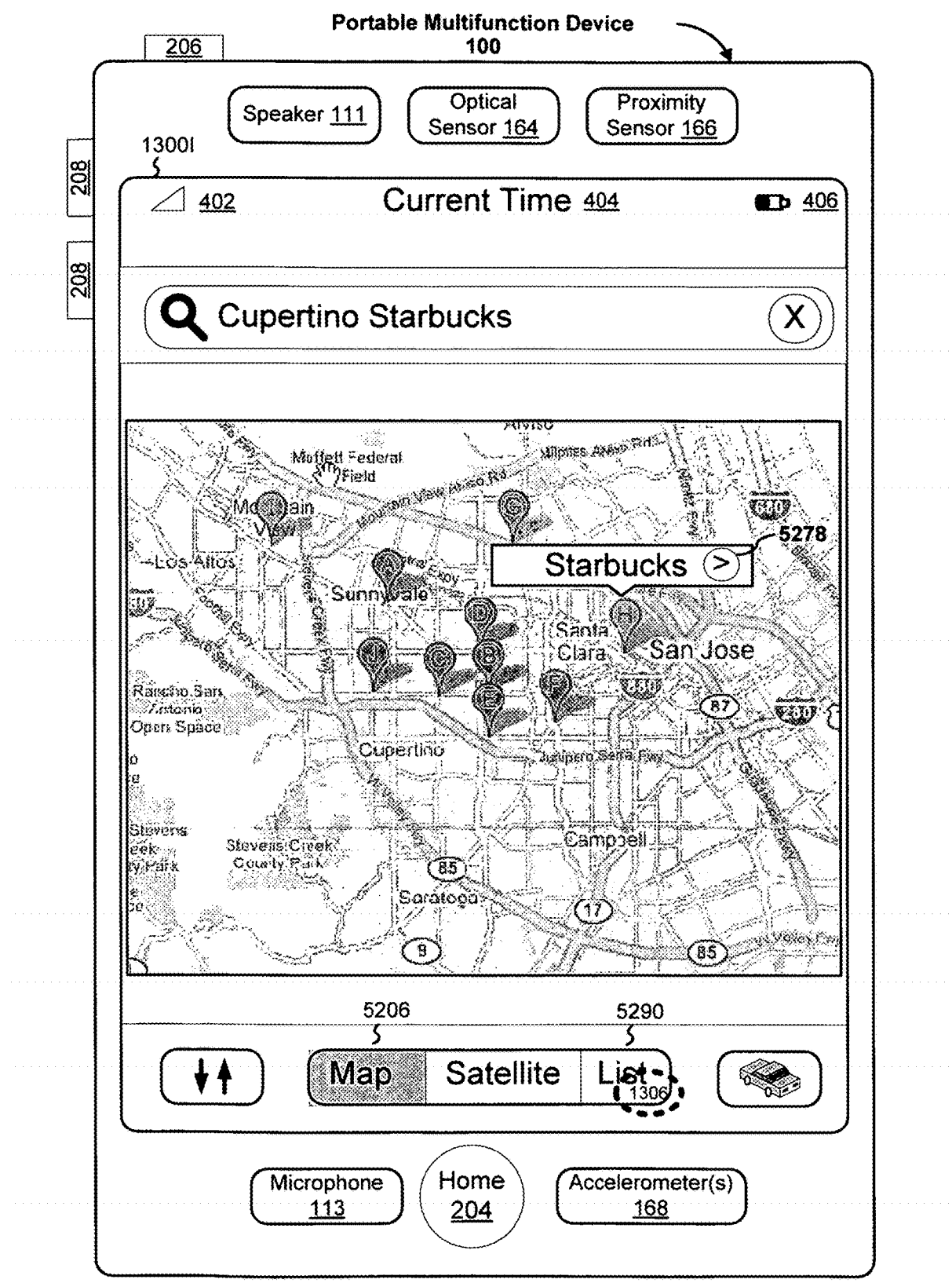
Figure 13J:
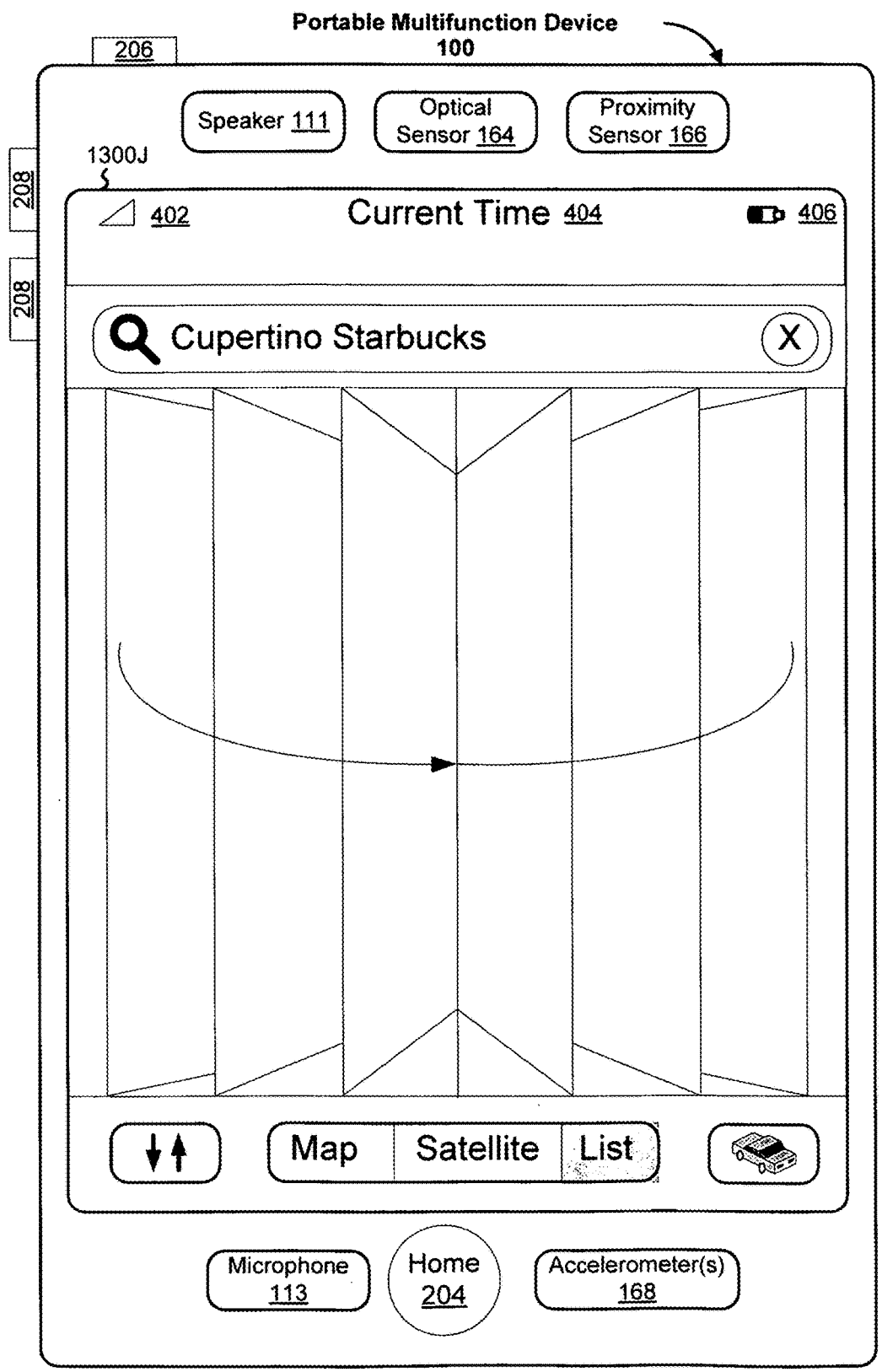
Figure 13K:
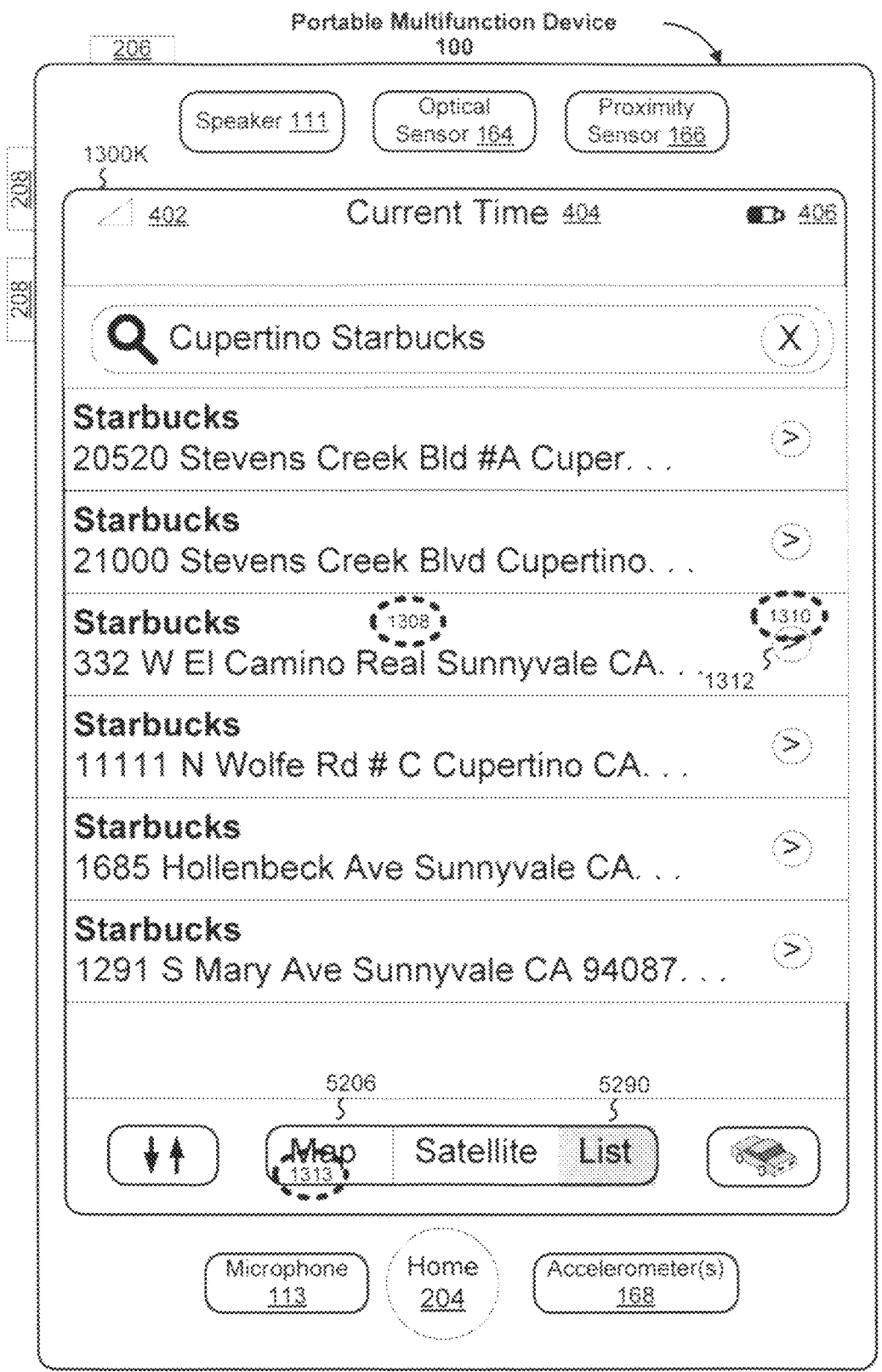
Figure 13L:
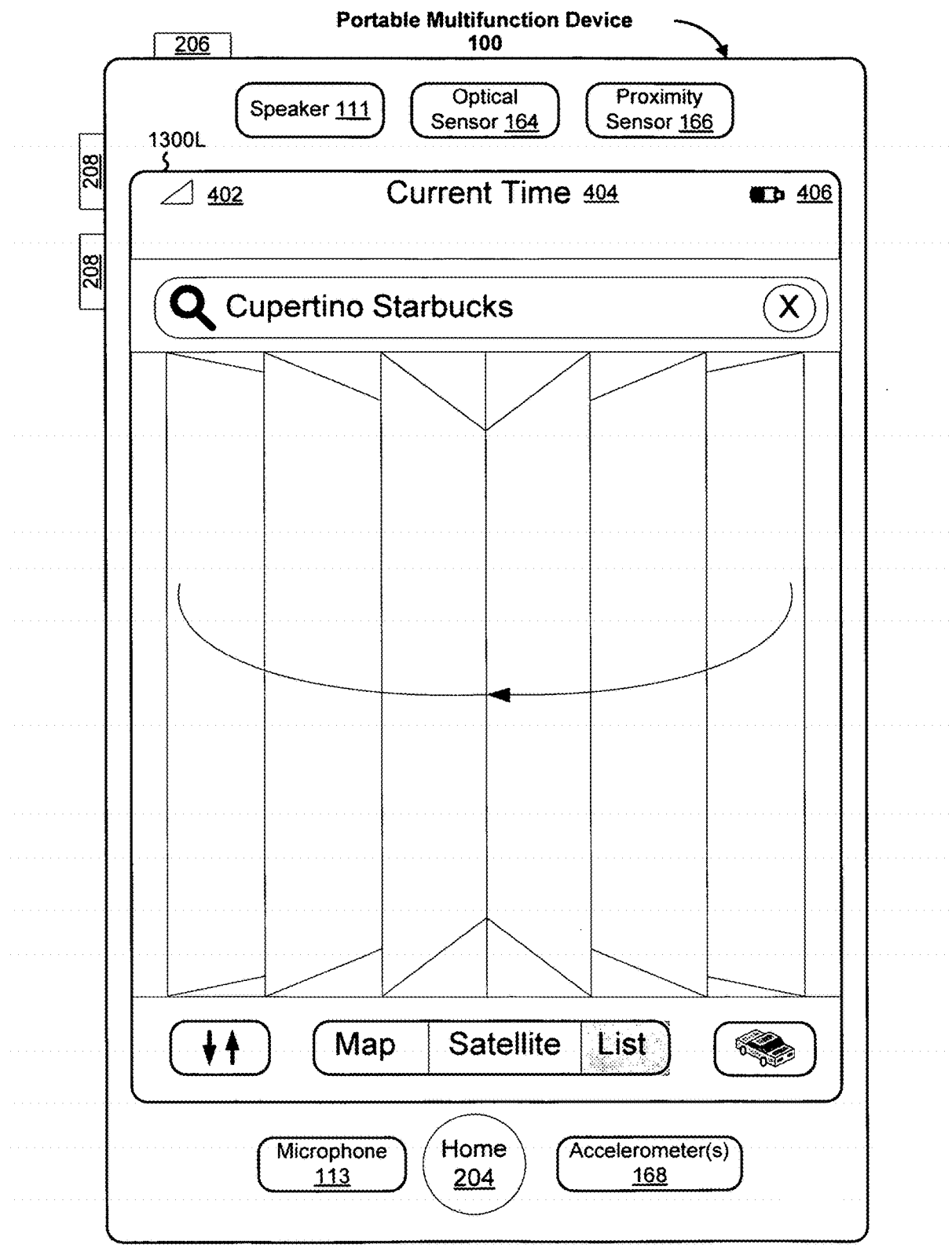
Figure 13M:
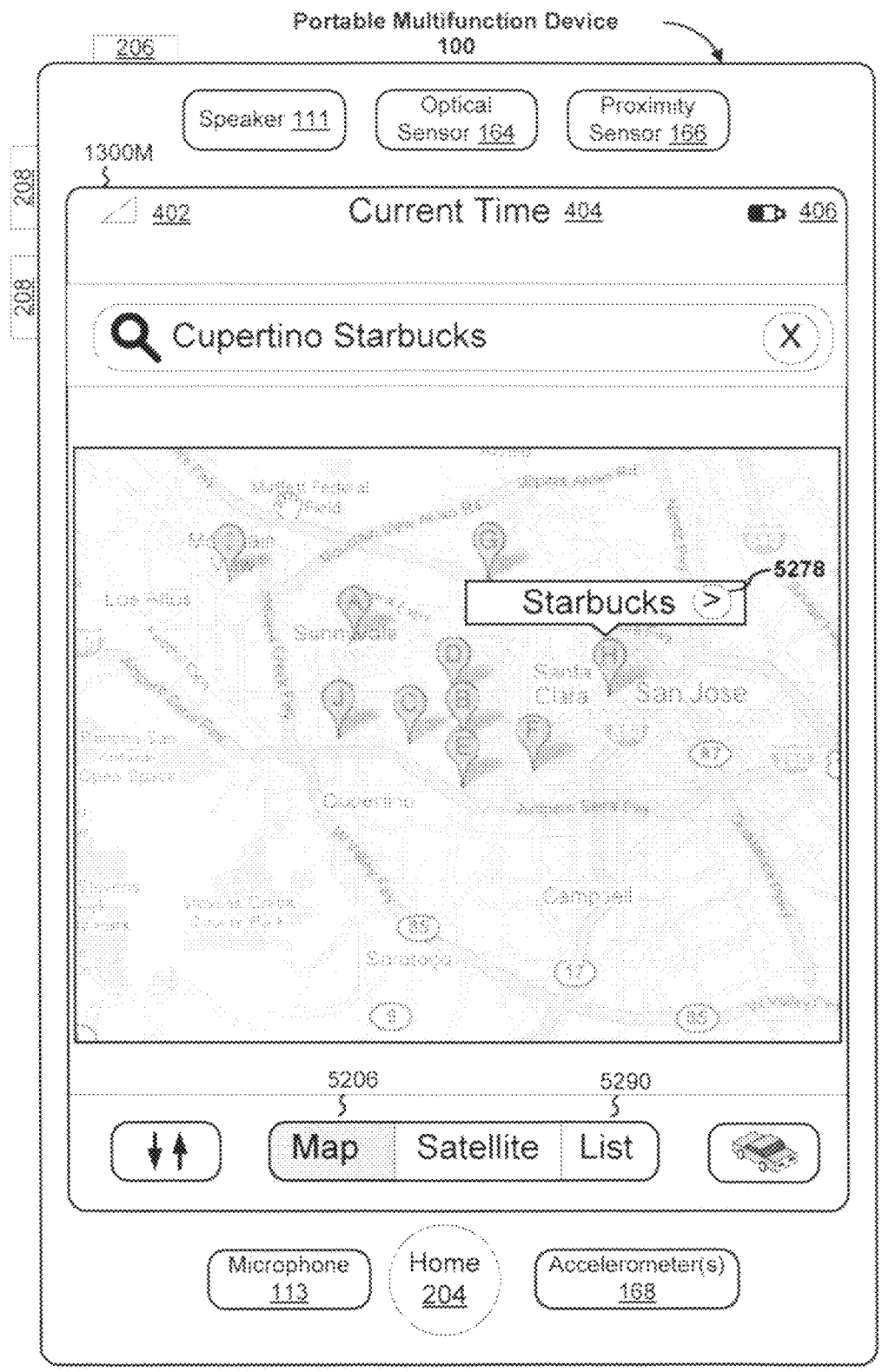
Figure 13N:
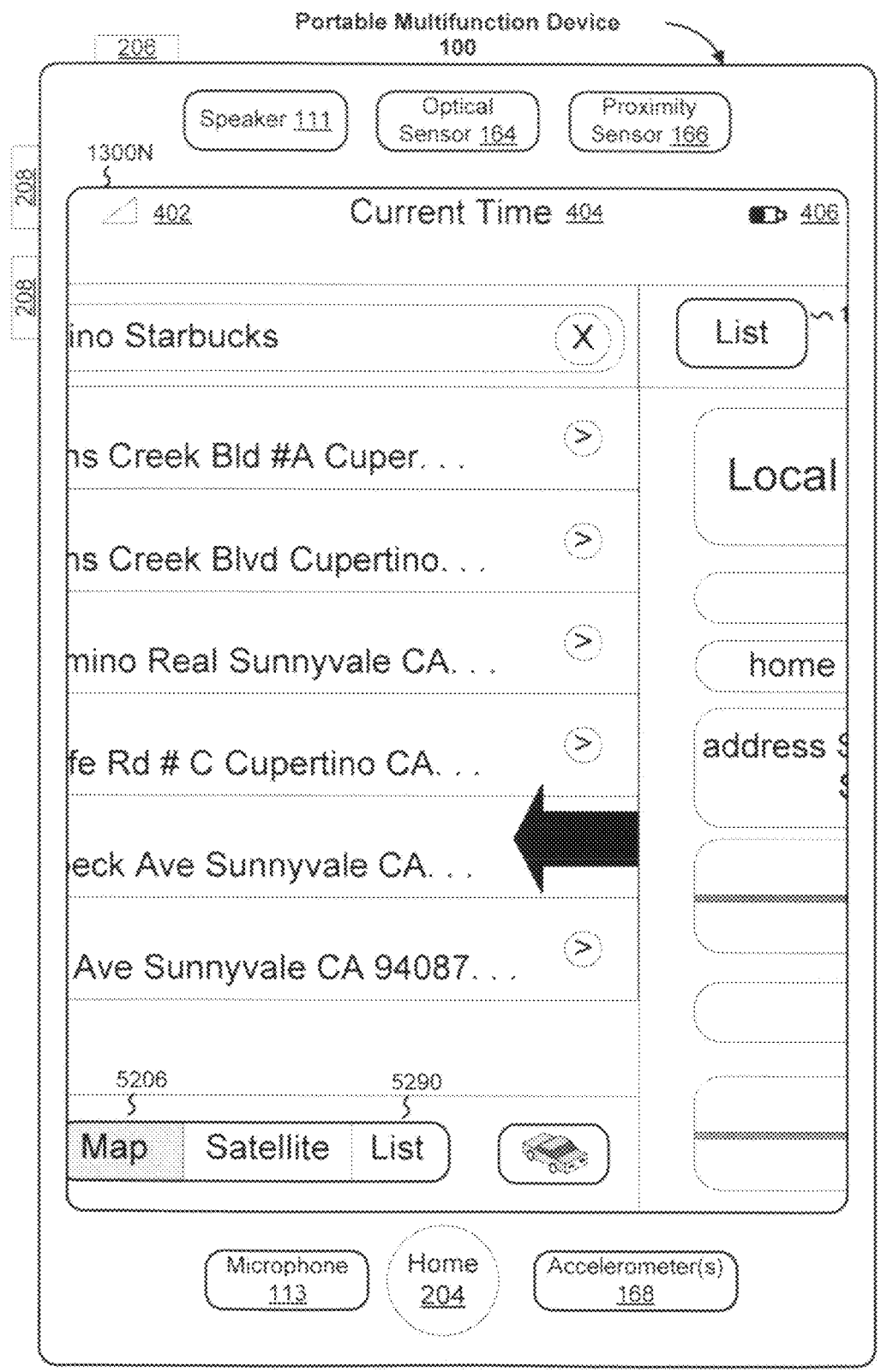
Figure 13O:
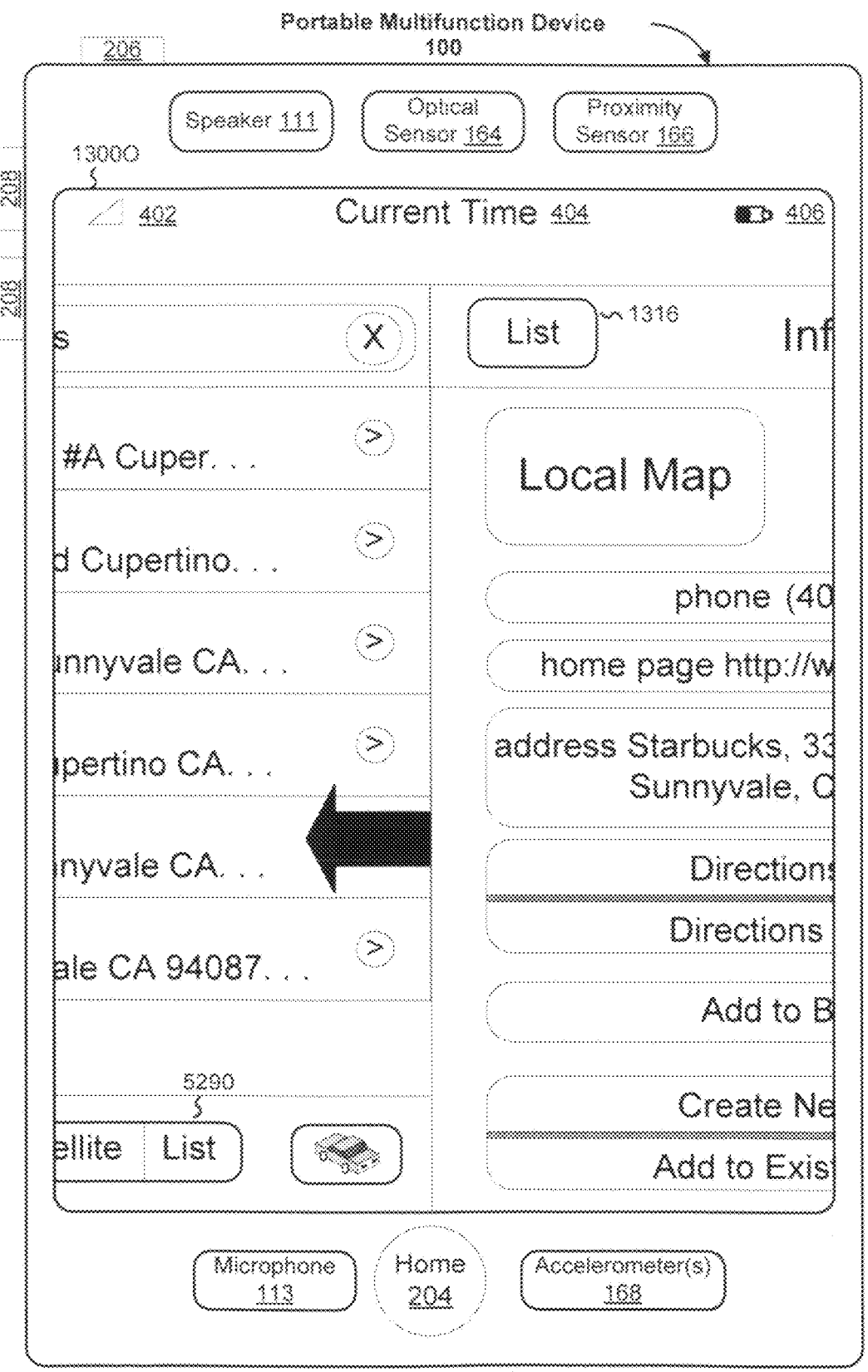
Figure 13P:
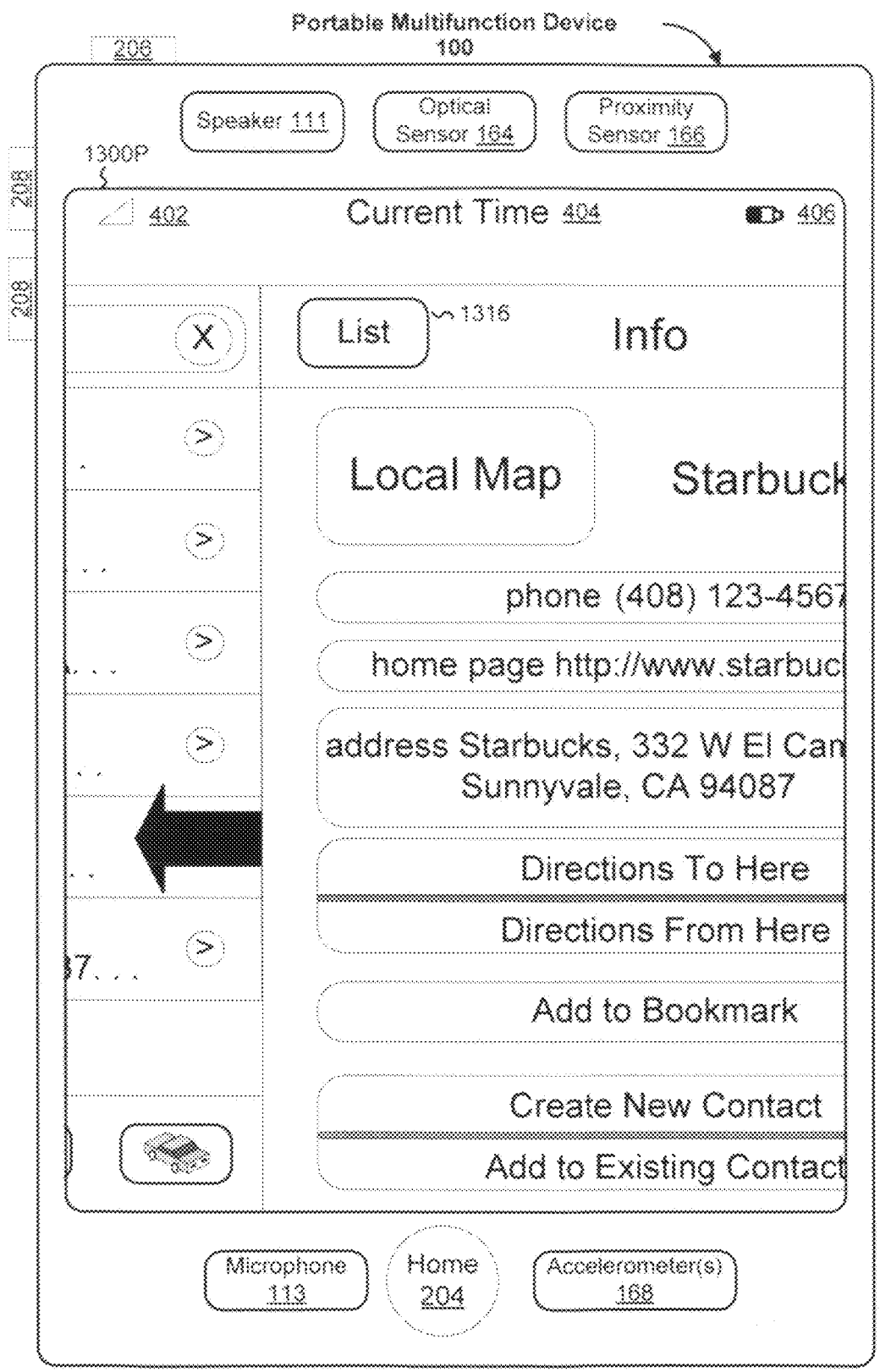
Figure 13Q:
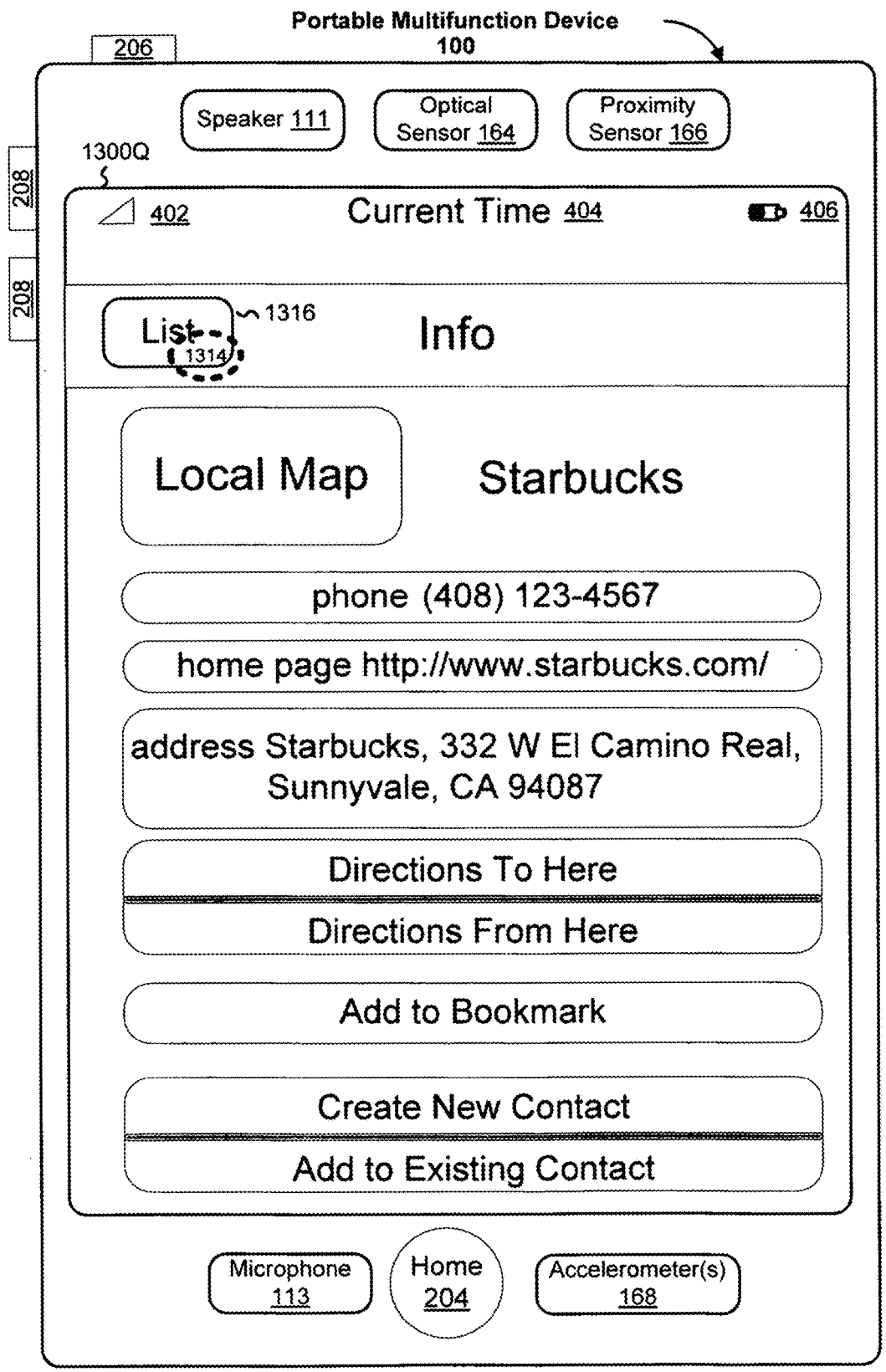
Figure 13R:
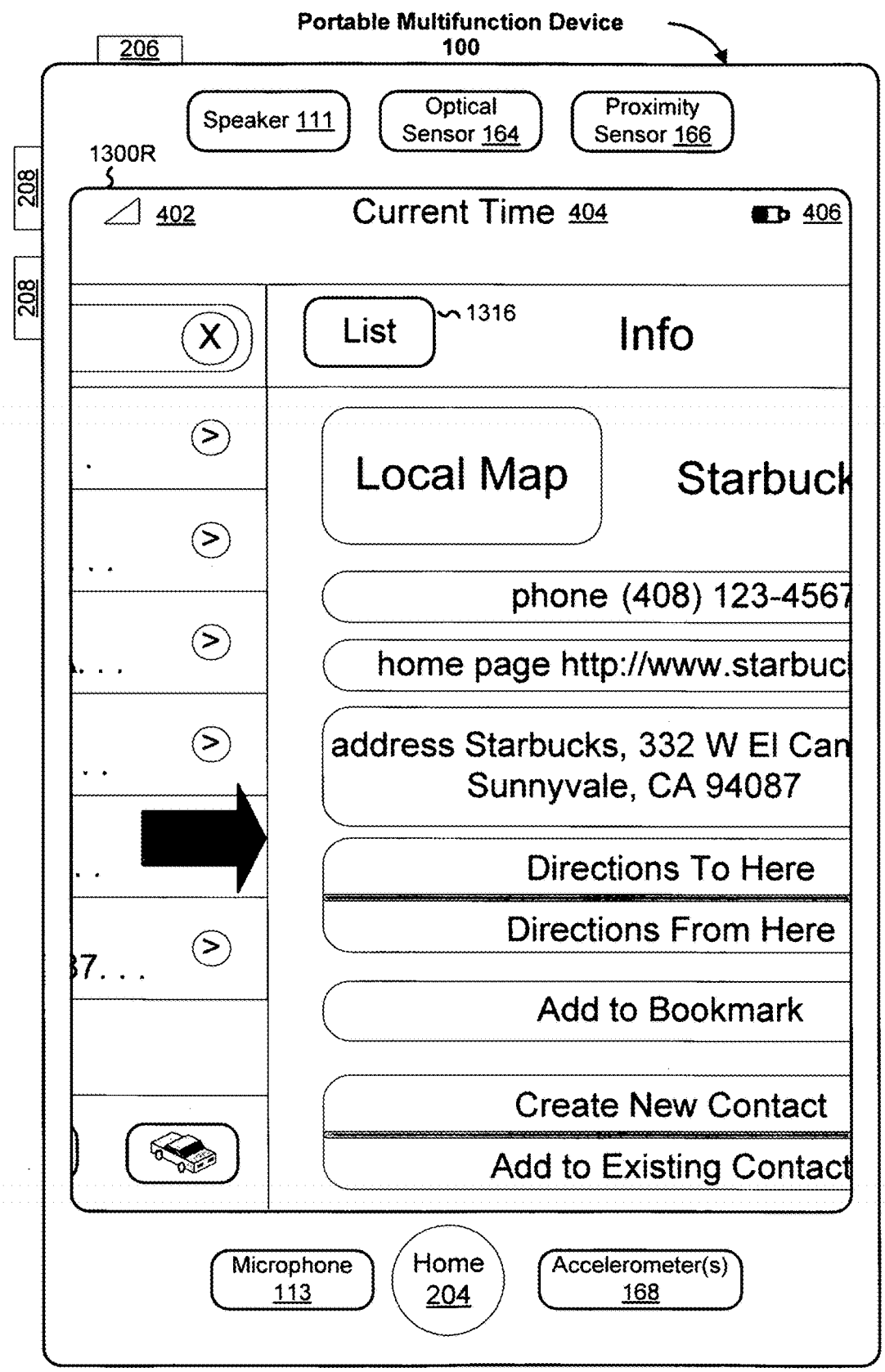
Figure 13S:
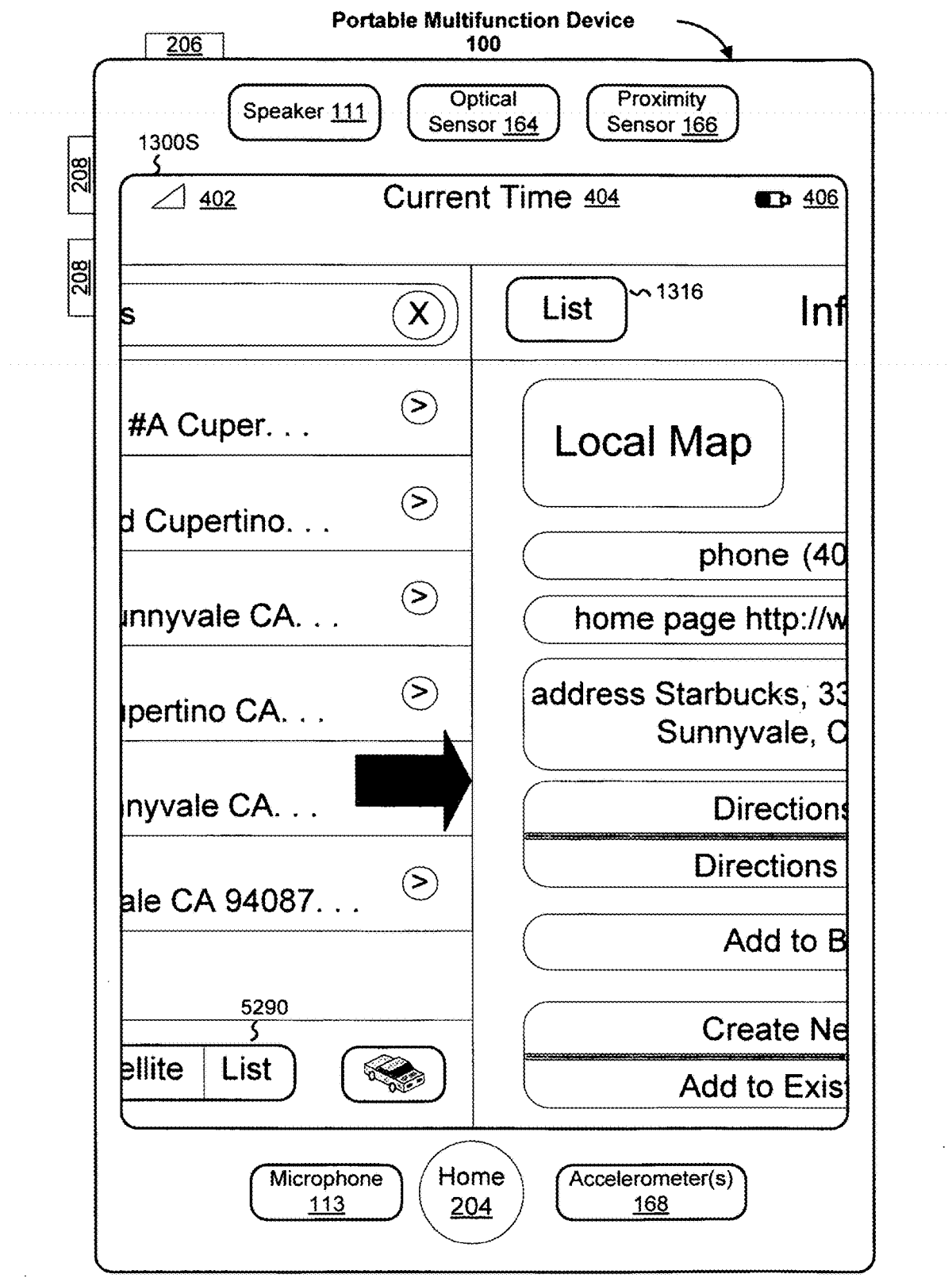
Figure 13T:
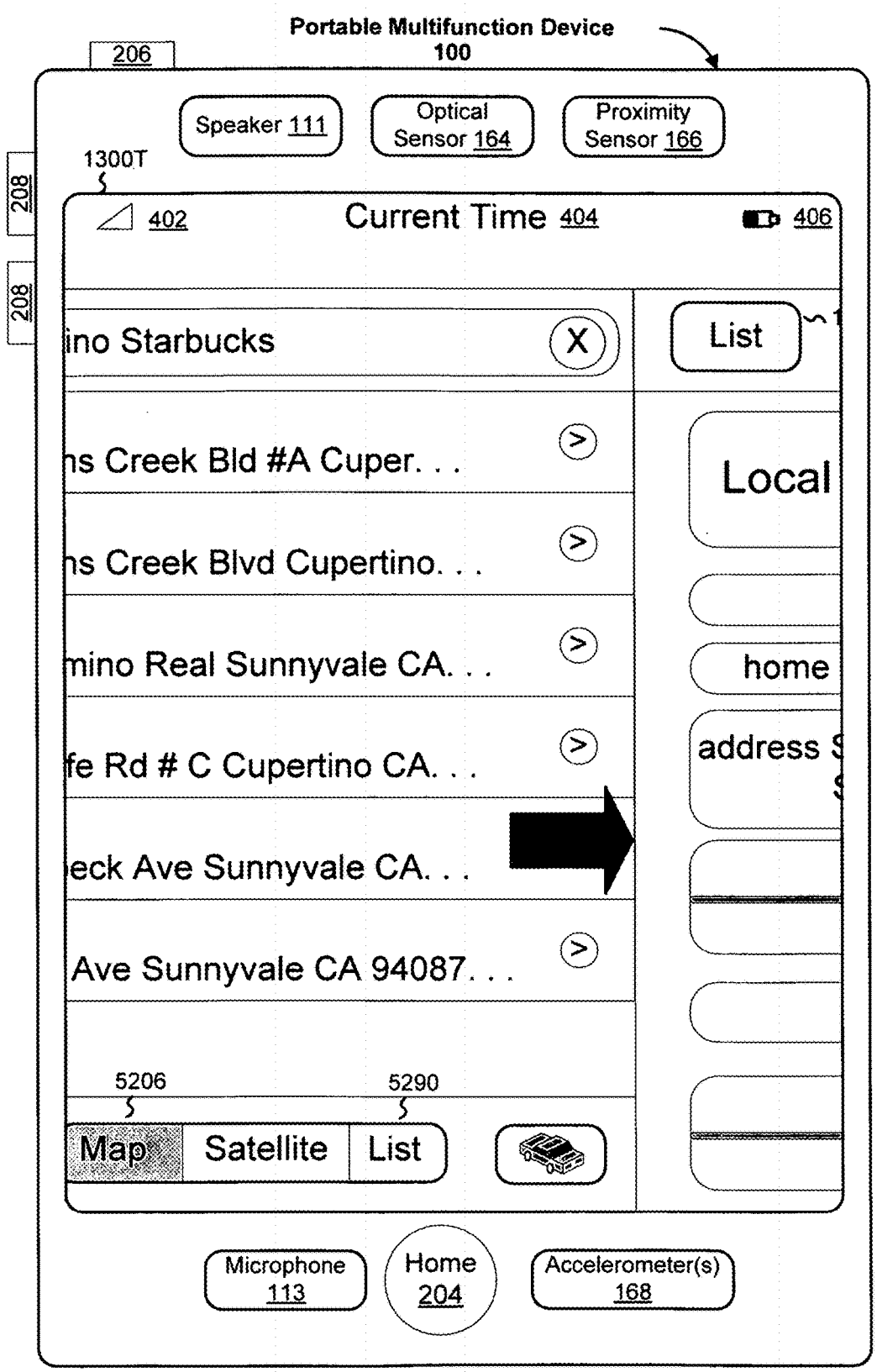
Figure 13U:
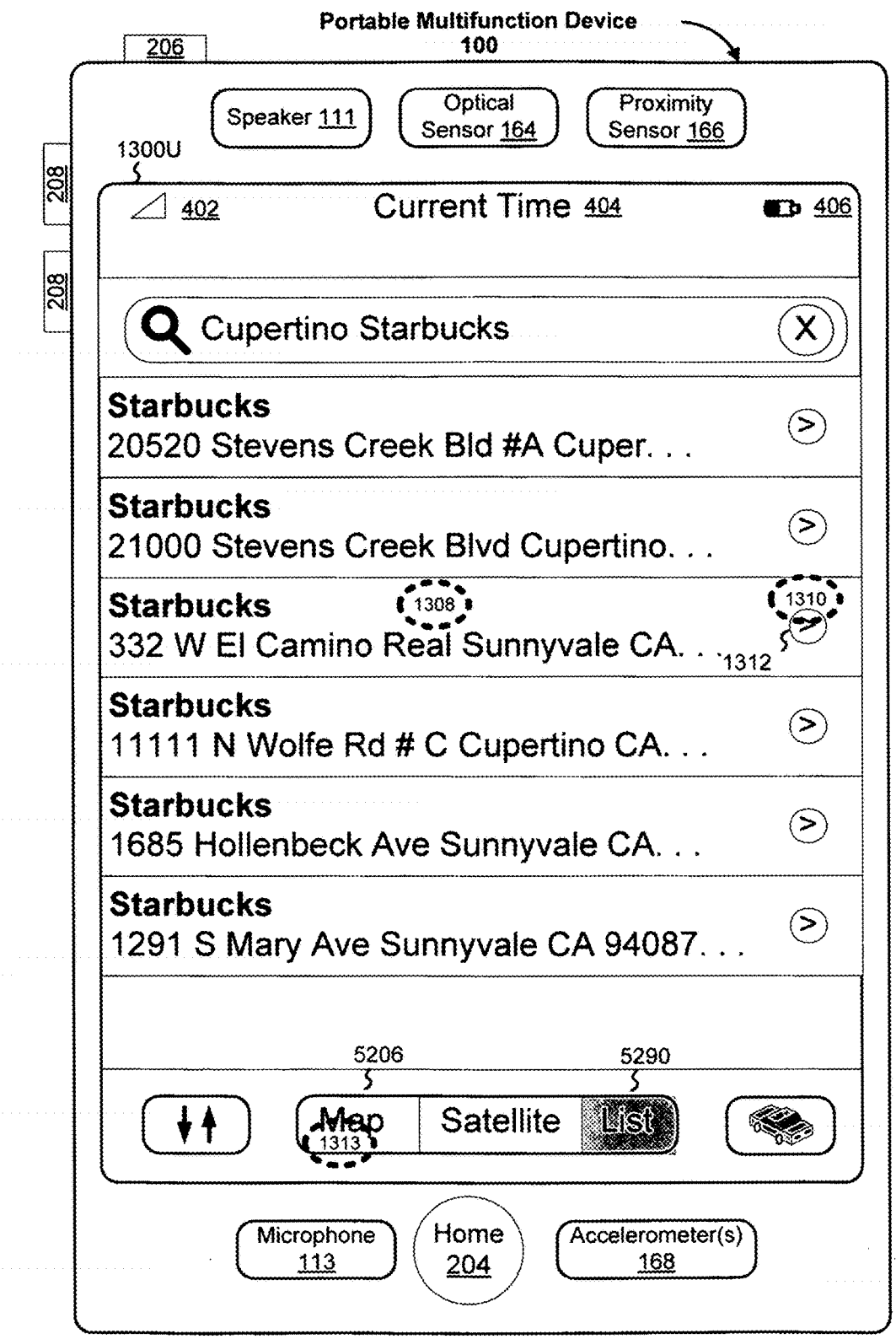

FIGS. 13A-13U illustrate transitions between user interfaces for a map application 154 in accordance with some embodiments. These animated transitions help a user to navigate within a map application in a simple, intuitive manner. FIGS. 13A-13U correspond to figures described in U.S. Provisional Patent Application No. 61/019,296, "Portable Multifunction Device, Method and Graphical User Interface for Providing Maps, Directions and Location-Based Information," filed Jan. 6, 2008, which is hereby incorporated by reference in its entirety.

In response to detecting a gesture 5284 (FIG. 13A) on the selection icon 5278, a sliding animation is displayed of a transition to UI 1300E (FIG. 13E), as illustrated in FIGS. 13A-13E. In response to detecting a gesture 1304 on the map icon 1302 in UI 1300E, a reverse sliding animation is displayed of a transition back to UI 1300A/1300I, as illustrated in FIGS. 13E-13I. In response to detecting a gesture 1306 (FIG. 13I) on the list icon 5290, an animation is displayed of flipping UI 1300I to reveal UI 1300K (FIG. 13K), as illustrated in FIG. 13J. In response to detecting a gesture 1308 on a list entry or a gesture 1313 on the map icon 5206 in UI 1300K, an animation is displayed of flipping UI 1300K to reveal 1300I/1300M (FIG. 13M), as illustrated in FIG. 13L. In some embodiments, the flipping animation in FIG. 13L has a rotational direction opposite to the flipping animation in FIG. 13J. For example, if one of the flipping animations is clockwise about a vertical axis on the display screen, then the other flipping animation is counter-clockwise about the axis.

In response to detecting a gesture 1310 on the selection icon 1312 (FIG. 13K), a sliding animation is displayed of a transition to UI 1300E/1300Q (FIG. 13Q), as illustrated in FIGS. 13N-13Q. In response to detecting a gesture 1314 on the list icon 1316 (FIG. 13Q), a sliding animation is displayed of a transition to UI 1300K/1300U (FIG. 13U), as illustrated in FIGS. 13Q-13U.

FIGS. 14A-14I illustrate transitions between user interfaces for a calendar application 148 in accordance with some embodiments. These animated transitions help a user to navigate within a calendar application in a simple, intuitive manner. FIGS. 14A-14I correspond to figures described in U.S. patent application Ser. No. 11/969,786, "System and Method for Viewing and Managing Calendar Entries," filed Jan. 4, 2008. In response to detecting a gesture 1402 (FIG. 14A) on an entry in a list of events in UI 1400A, a sliding animation is displayed of a transition to UI 1400E (FIG. 14E), which displays information 1408 regarding the event selected by the gesture 1402. The sliding animation is illustrated in FIGS. 14A-14E. In some embodiments, the animation includes sliding a header including a month icon 1404 and an edit icon 1406 onto the screen. In response to detecting a gesture 1410 on the month icon 1404, a reverse sliding animation is displayed of a transition to UI 1400A/1400I (FIG. 14I), as illustrated in FIGS. 14E-14I.

FIGS. 15A-15J illustrate transitions between user interfaces for unlocking a portable electronic device in accordance with some embodiments. These animated transitions help a user to navigate between a locked and unlocked state in a simple, intuitive manner. In UI 1500A (FIG. 15A), the unlock image 302 of UI 300 (FIG. 3) has been moved across the channel 306 with a finger gesture. In response, an animation of a transition to UI 1500E (FIG. 15E) is displayed, as illustrated in FIGS. 15A-15E. The UI 1500E is a passcode (or password) interface for entering a passcode to complete the unlock process. In the animation, a block of numeric soft keys 1504 slides onto the screen from the bottom of the screen while a block of user input fields 1502-1 through 1502-4 slide across the top of the block of numeric soft keys 1504 from the left side of the screen. The block of user input fields 1502-1 through 1502-4 thus rises with the block of numeric soft keys 1504 while sliding onto the screen.

FIGS. 15G-15J illustrate an animation of a transition to a home menu UI 1500J in response to entry of a correct passcode 1506. In this animation, UIs 15001 and 1500J correspond to UIs 1000G and 1000H (FIGS. 10G and 10H), described above.

FIG. 16A is a flow diagram illustrating a process 1600 for displaying user interfaces on a touch screen display on a portable multifunction device in accordance with some embodiments. In the process 1600, a first set of a first plurality of application launch icons is displayed (1602) in a first area (e.g., area 802, FIG. 8A or 10A) on the touch screen display. The first plurality of application launch icons includes a plurality of sets of application launch icons that are separately displayed in the first area of the touch screen display, as described above with regard to FIGS. 8A-8C.

A second plurality of application launch icons is displayed (1604) in a second area (e.g., tray 408, FIG. 8A or 10A) on the touch screen display. The second area is different from the first area.

In response to detecting a first finger gesture (e.g., swipe 808, FIG. 8A) on the touch screen display in the first area, display of the first set of the first plurality of application launch icons is replaced (1606) with display of a second set of the first plurality of application launch icons (e.g., icons for widgets 149-6-1 through 149-6-6, FIG. 8B) in the first area (e.g., area 802, FIG. 8B) on the touch screen display while maintaining the display of the second plurality of application launch icons in the second area (e.g., tray 408, FIG. 8B) on the touch screen display.

In response to detecting activation of any respective application launch icon in the plurality of application launch icons, a first animation is displayed (1608) of a transition from display of application launch icons to display of an application that corresponds to the activated application launch icon. For example, in response to detecting gesture 1002 on the icon for the stocks application 149-2, an animation is displayed as illustrated in FIGS. 10A-10E. The first animation expands an image of the application (e.g., image 1004, FIGS. 10B-10E).

In some embodiments, the first animation expands (1610) the image of the application from a point on the display screen. In some embodiments, the point is at or near the center of the touch screen display.

In some embodiments, the first animation further comprises fading out at least some of the application launch icons. In some embodiments, fading out at least some of the application launch icons comprises fading out at least some of the application launch icons with an ease-out transition.

In some embodiments, the first animation slides (1612) respective application launch icons off of the touch screen display via respective corners of the touch screen display, as illustrated in FIGS. 10B-10D.

In some embodiments, sliding respective application launch icons off of the touch screen display via respective corners of the touch screen display comprises fading out at least some the respective applications launch icons as the respective application launch icons slide towards respective corners of the touch screen display. In some embodiments, fading out at least some of the application launch icons occurs via an ease-out transition. For example, the four application launch icons closest to the center of area 802 (i.e., icons 149-2, 154, 149-3, and 153, FIG. 10A) may fade out via an ease-out transition in FIGS. 10A-10C.

In some embodiments, a finishing gesture is detected (1614). In some embodiments, the finishing gesture is a gesture (e.g., 1006, FIG. 10E) on a button (e.g., home button 204) or touchpad. In some embodiments, the finishing gesture is a gesture on an icon in the application.

In some embodiments, in response to detecting the finishing gesture, a second animation is displayed (1616) of a transition from display of the application to display of application launch icons. For example, in response to detecting gesture 1006 on the home button 204, an animation is displayed as illustrated in FIGS. 10E-10I. The second animation shrinks the displayed image (e.g., image 1004, FIGS. 10E-10H) of the application.

In some embodiments, the second animation shrinks (1618) the image of the application to a point on the display screen. In some embodiments, the point is at or near the center of the touch screen display.

In some embodiments, the second animation further comprises fading in at least some of the application launch icons. In some embodiments, fading in at least some of the application launch icons comprises fading in at least some of the application launch icons with an ease-in transition.

Figure 10G:
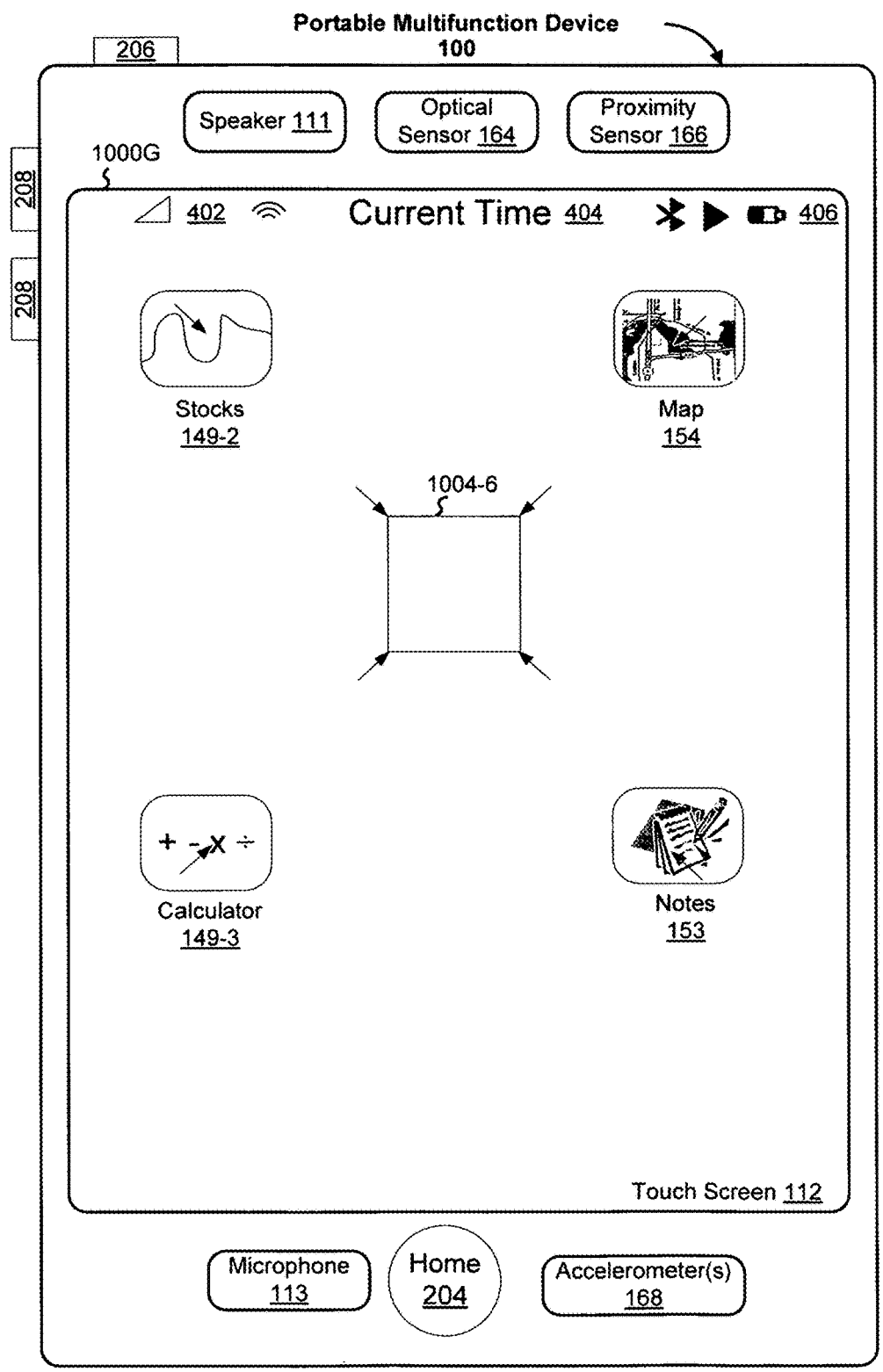
Figure 10H:
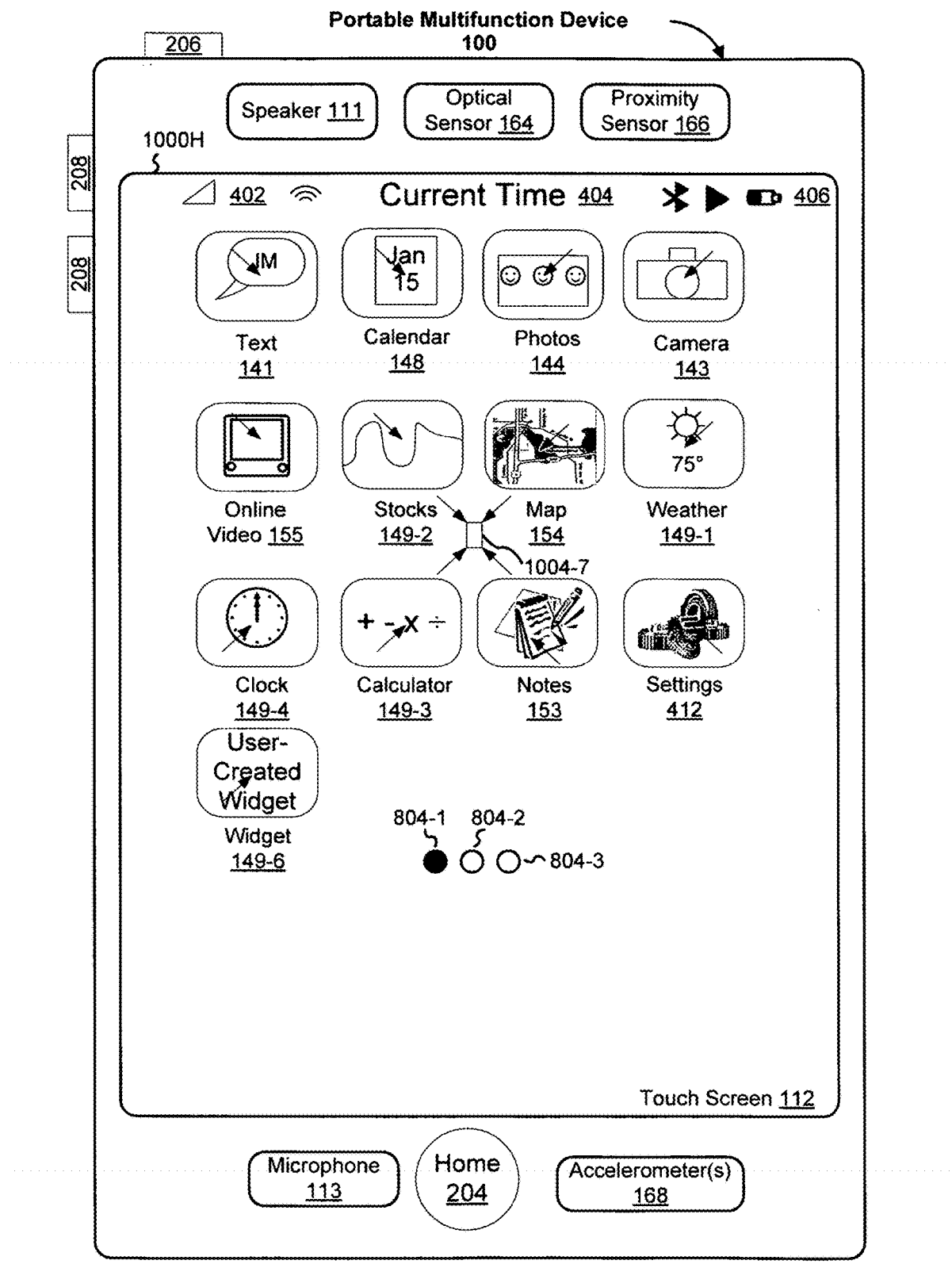
Figure 10I:
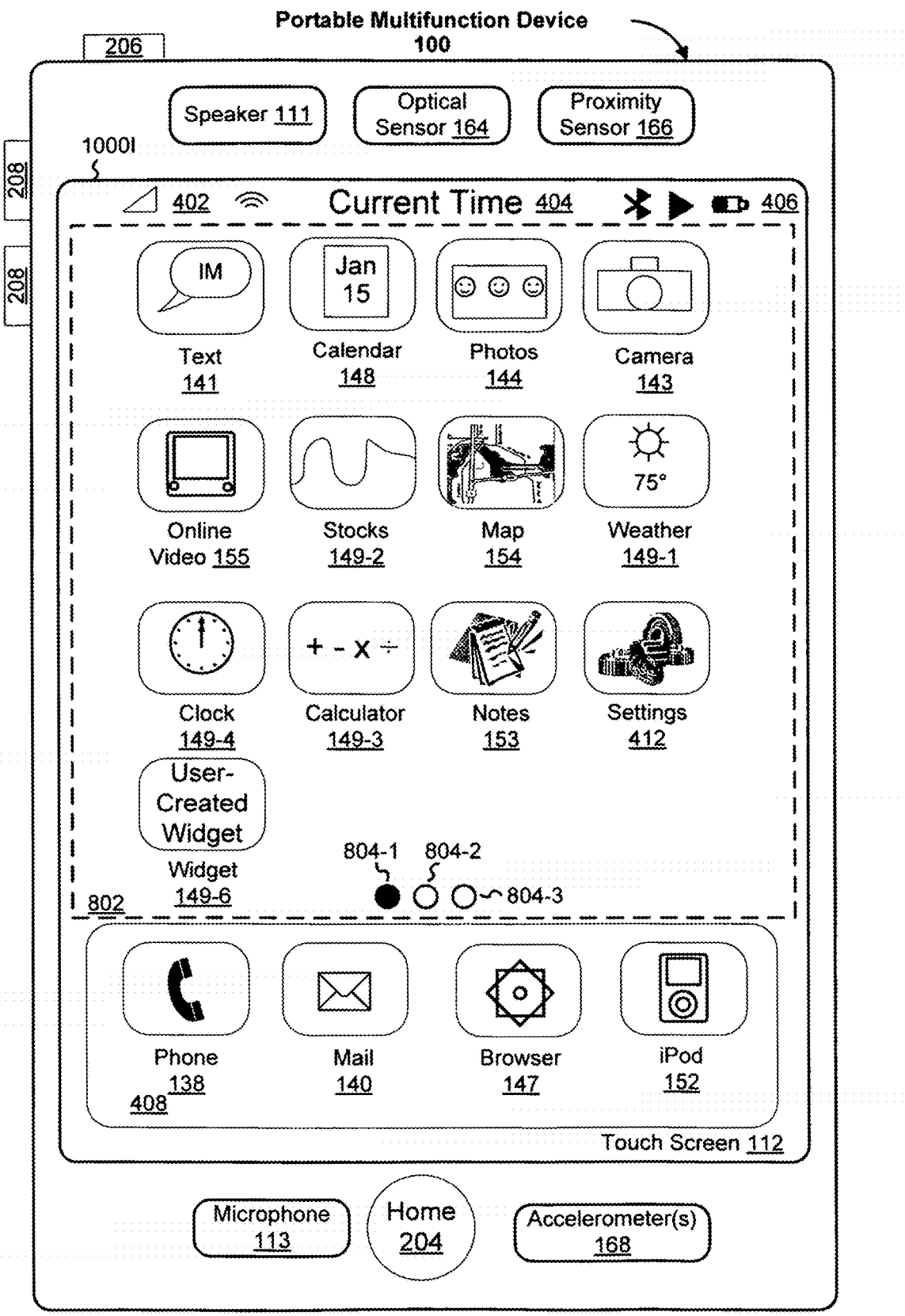

In some embodiments, the second animation slides (1620) respective application launch icons onto the touch screen display from respective corners of the touch screen display, as illustrated in FIGS. 10G-10H.

In some embodiments, sliding respective application launch icons onto the touch screen display from respective corners of the touch screen display comprises fading in at least some the respective applications launch icons as the respective application launch icons slide from respective corners of the touch screen display. In some embodiments, fading in at least some of the application launch icons occurs via an ease-in transition. For example, the four application launch icons that end up closest to the center of area 802 (i.e., icons 149-2, 154, 149-3, and 153, FIG. 10I) may fade in via an ease-in transition in FIGS. 10G-10I.

FIG. 16B is a flow diagram illustrating a process 1622 for displaying user interfaces on a touch screen display on a portable multifunction device in accordance with some embodiments. In the process 1622, a home menu (e.g., UI 1000A, FIG. 10A) comprising a plurality of application launch icons is displayed (1624) on the touch screen display.

Activation of any respective application launch icon is detected (1626). In some embodiments, a finger gesture (e.g., a tap gesture 1002, FIG. 10A) is detected (1628) on the respective application launch icon.

In response to detecting the activation, a first animation is displayed (1630) of a transition from display of the home menu to display of an application that corresponds to the activated application launch icon. For example, in response to detecting gesture 1002 on the icon for the stocks application 149-2, an animation is displayed as illustrated in FIGS. 10A-10E. The first animation expands an image of the application (e.g., image 1004, FIGS. 10B-10E).

In some embodiments, the first animation further comprises fading out at least some of the application launch icons in the home menu. In some embodiments, fading out at least some of the application launch icons comprises fading out at least some of the application launch icons with an ease-out transition.

In some embodiments, the first animation slides (1632) respective application launch icons off of the touch screen display via respective corners of the touch screen display, as illustrated in FIGS. 10B-10D.

In some embodiments, sliding respective application launch icons off of the touch screen display via respective corners of the touch screen display comprises fading out at least some the respective applications launch icons as the respective application launch icons slide towards respective corners of the touch screen display. In some embodiments, fading out at least some of the application launch icons occurs via an ease-out transition. For example, the four application launch icons closest to the center of area 802 (i.e., icons 149-2, 154, 149-3, and 153, FIG. 10A) may fade out via an ease-out transition in FIGS. 10A-10C.

In some embodiments, a finishing gesture is detected (1634). In some embodiments, the finishing gesture (e.g., 1006, FIG. 10E) is detected (1636) on a button (e.g., home button 204) or touchpad. In some embodiments, the finishing gesture is detected (1638) on an icon in the application.

In some embodiments, in response to detecting the finishing gesture, a second animation is displayed (1640) of a transition from display of the application to display of the home menu. For example, in response to detecting gesture 1006 on the home button 204, an animation is displayed as illustrated in FIGS. 10E-10I. The second animation shrinks the displayed image of the application (e.g., image 1004, FIGS. 10E-10H).

In some embodiments, the second animation further comprises fading in at least some of the application launch icons in the home menu. In some embodiments, fading in at least some of the application launch icons comprises fading in at least some of the application launch icons with an ease-in transition.

In some embodiments, the second animation slides (1642) respective application launch icons onto the touch screen display from respective corners of the touch screen display, as illustrated in FIGS. 10G-10H.

In some embodiments, sliding respective application launch icons onto the touch screen display from respective corners of the touch screen display comprises fading in at least some the respective applications launch icons as the respective application launch icons slide from respective corners of the touch screen display. In some embodiments, fading in at least some of the application launch icons occurs via an ease-in transition. For example, the four application launch icons that end up closest to the center of area 802 (i.e., icons 149-2, 154, 149-3, and 153, FIG. 10I) may fade in via an ease-in transition in FIGS. 10G-10I.

Figure 14A:
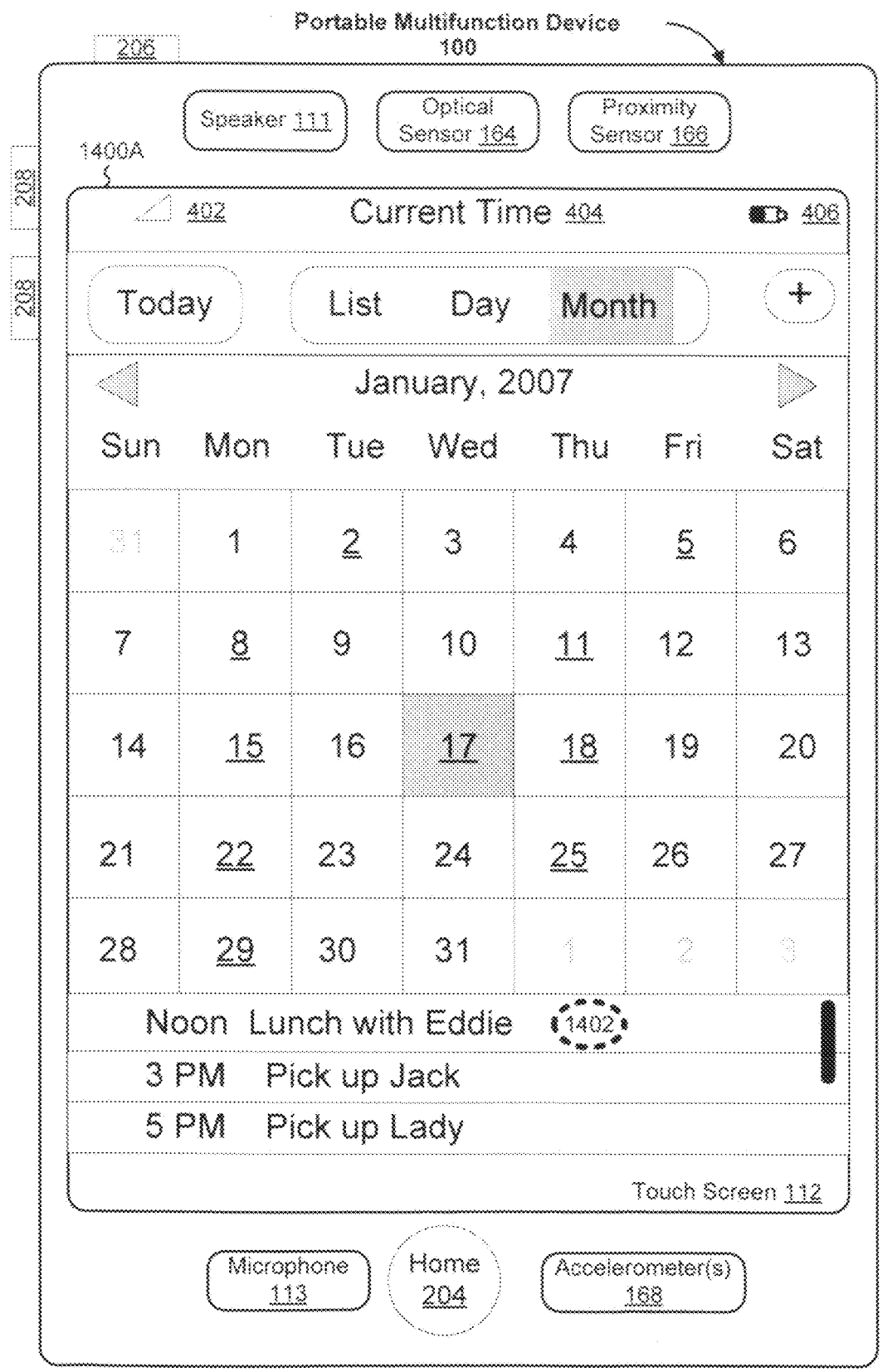
FIGS. 14A-14I illustrate transitions between user interfaces for a calendar application in accordance with some embodiments.
Figure 14B:
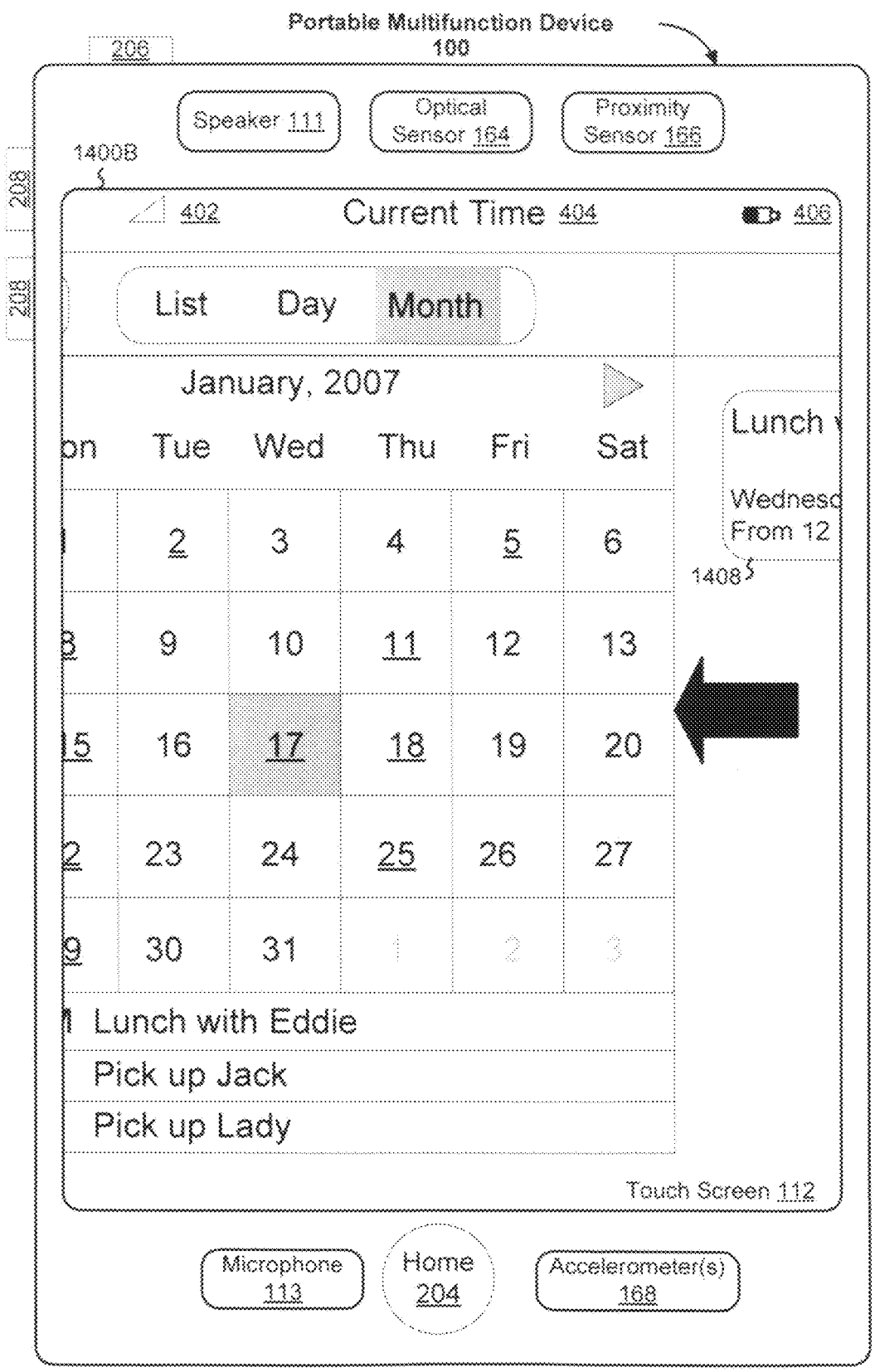
Figure 14C:
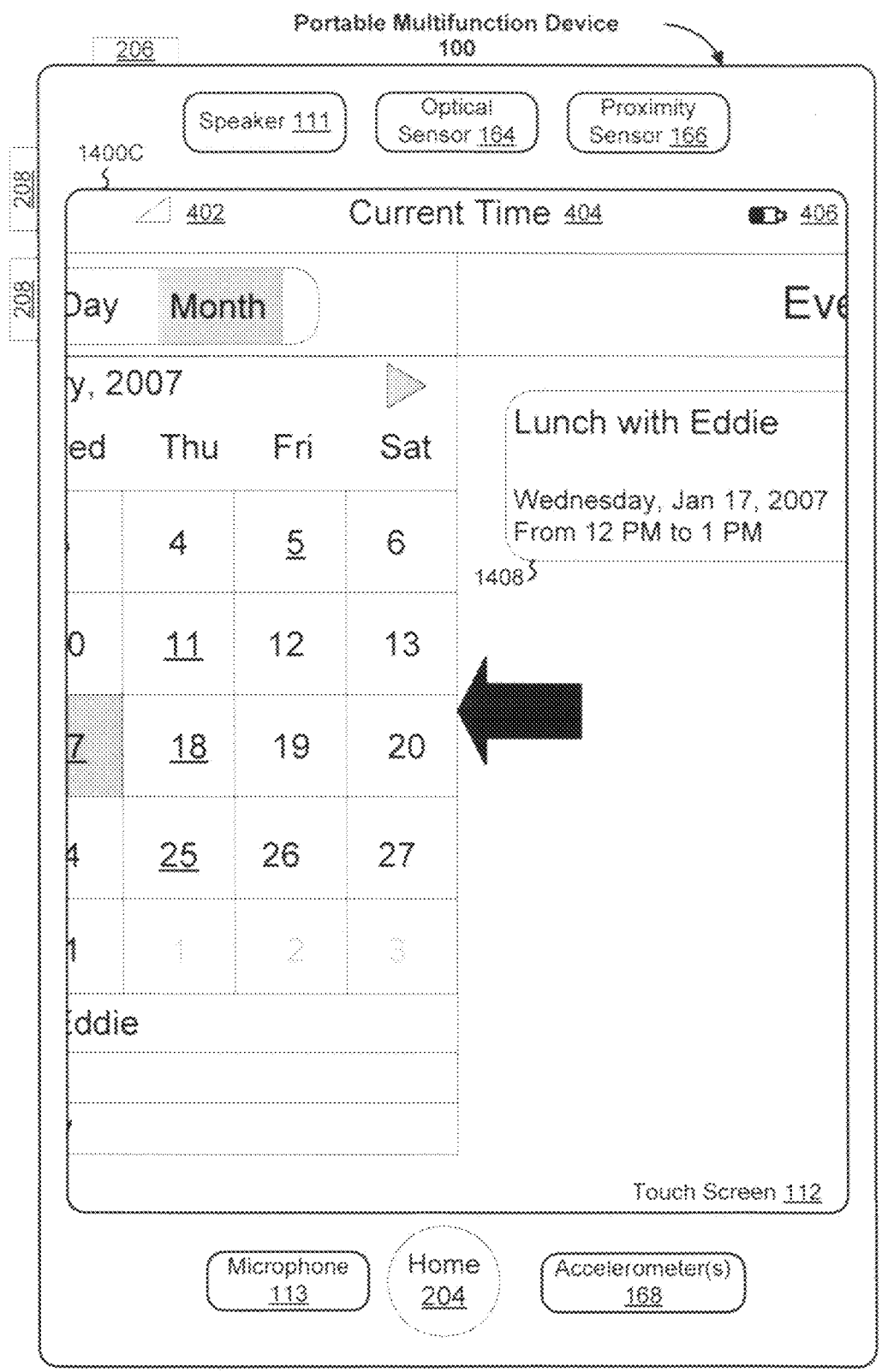
Figure 14D:
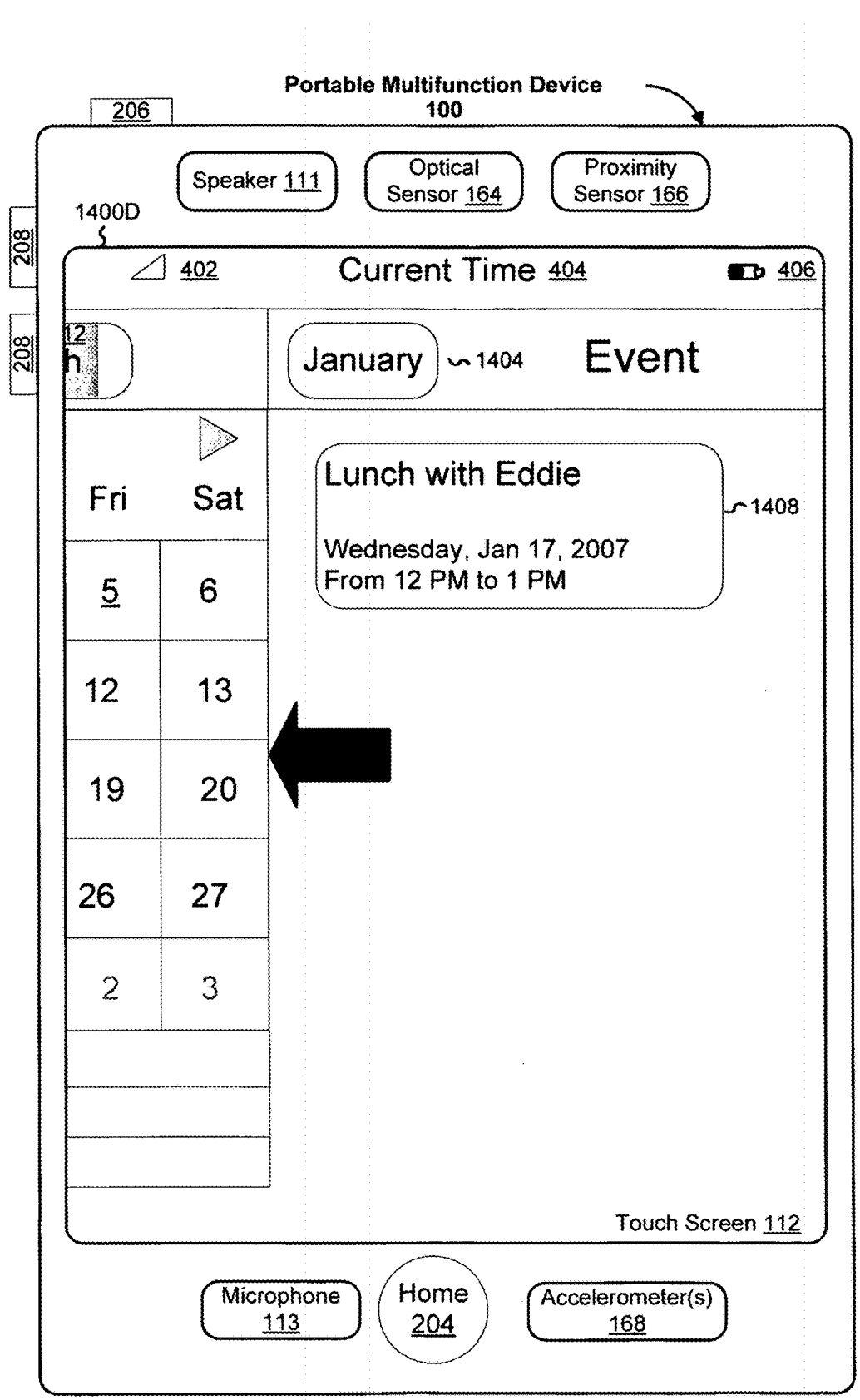
Figure 14E:
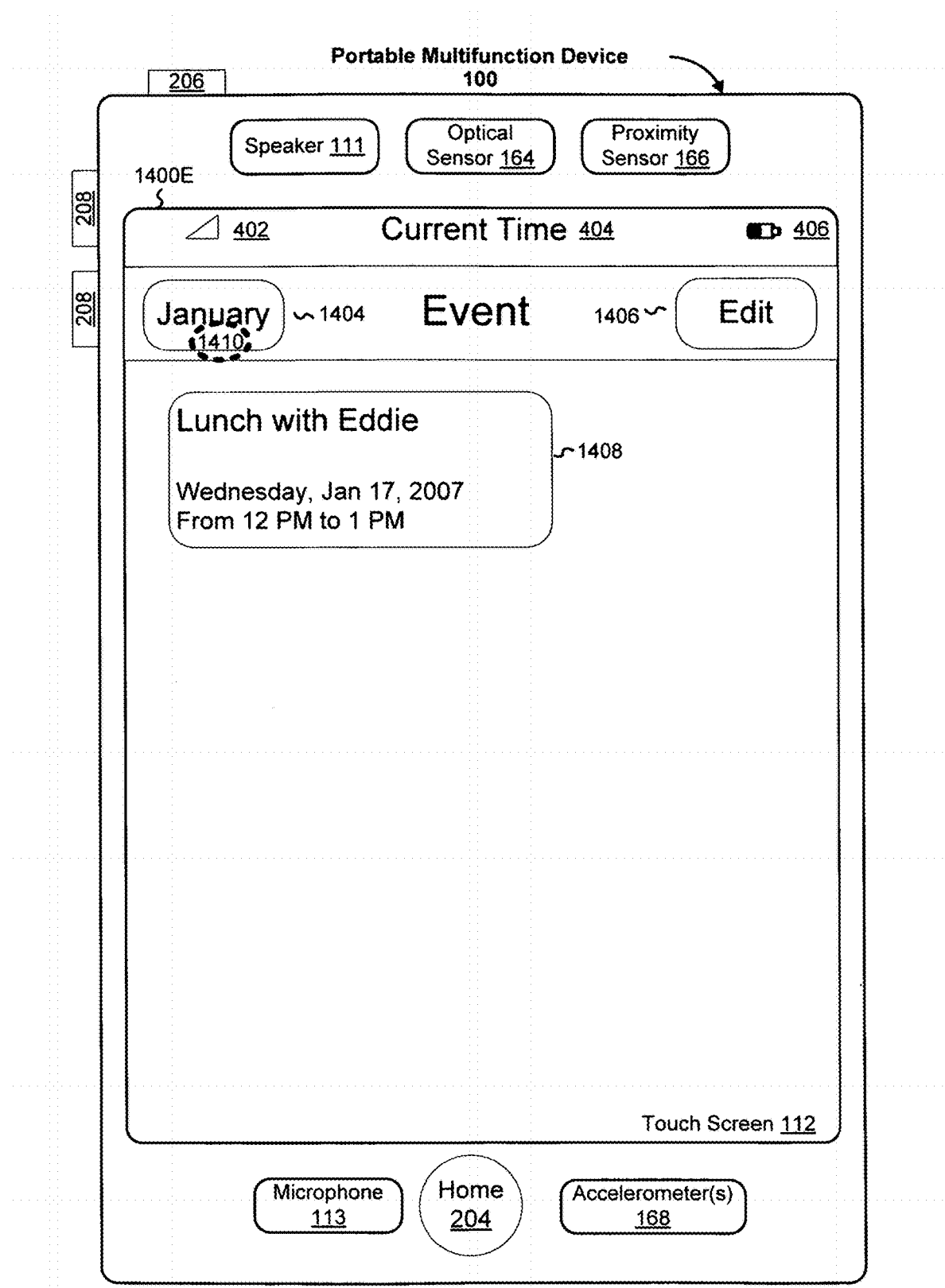
Figure 14F:
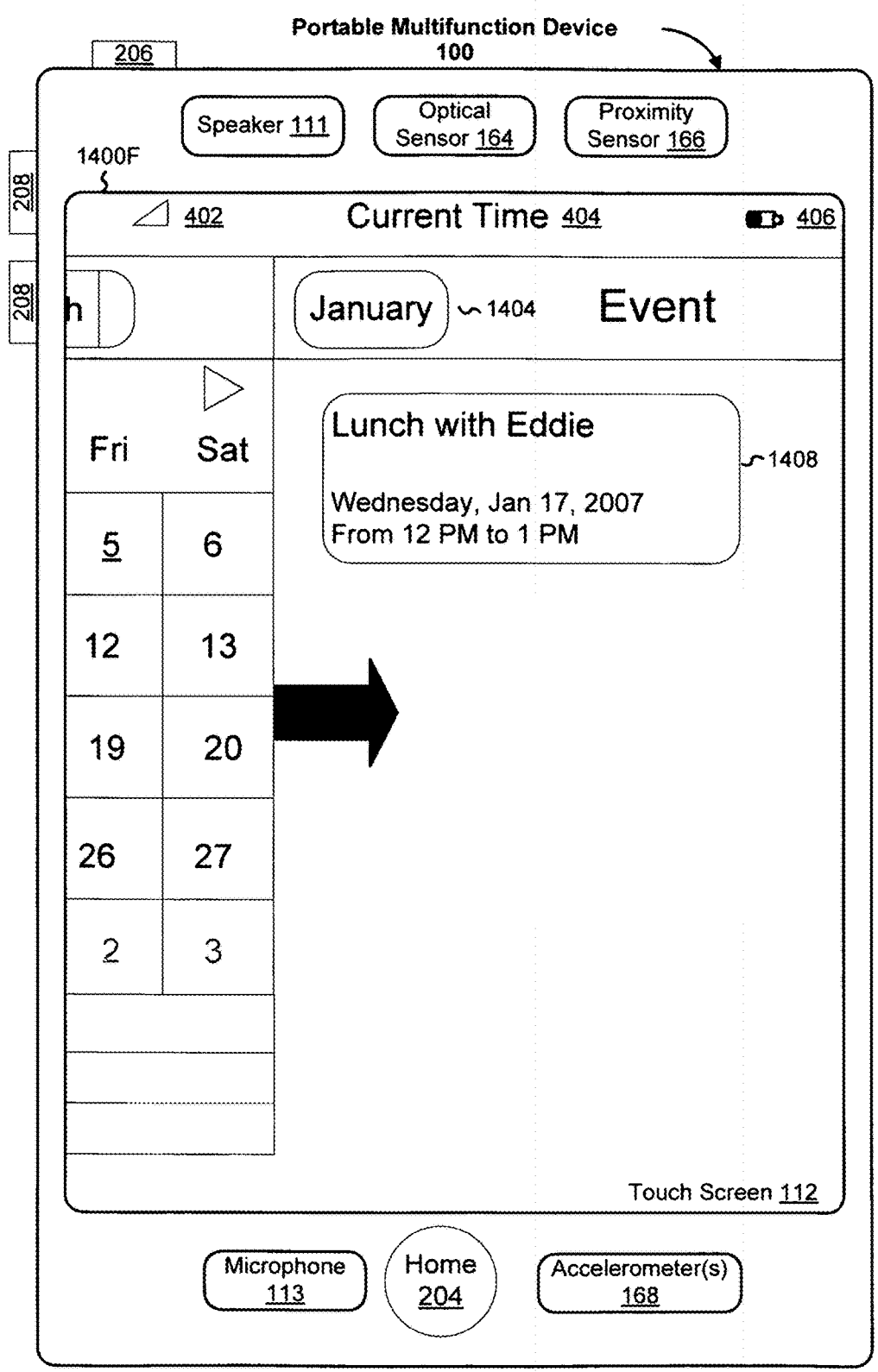
Figure 14G:
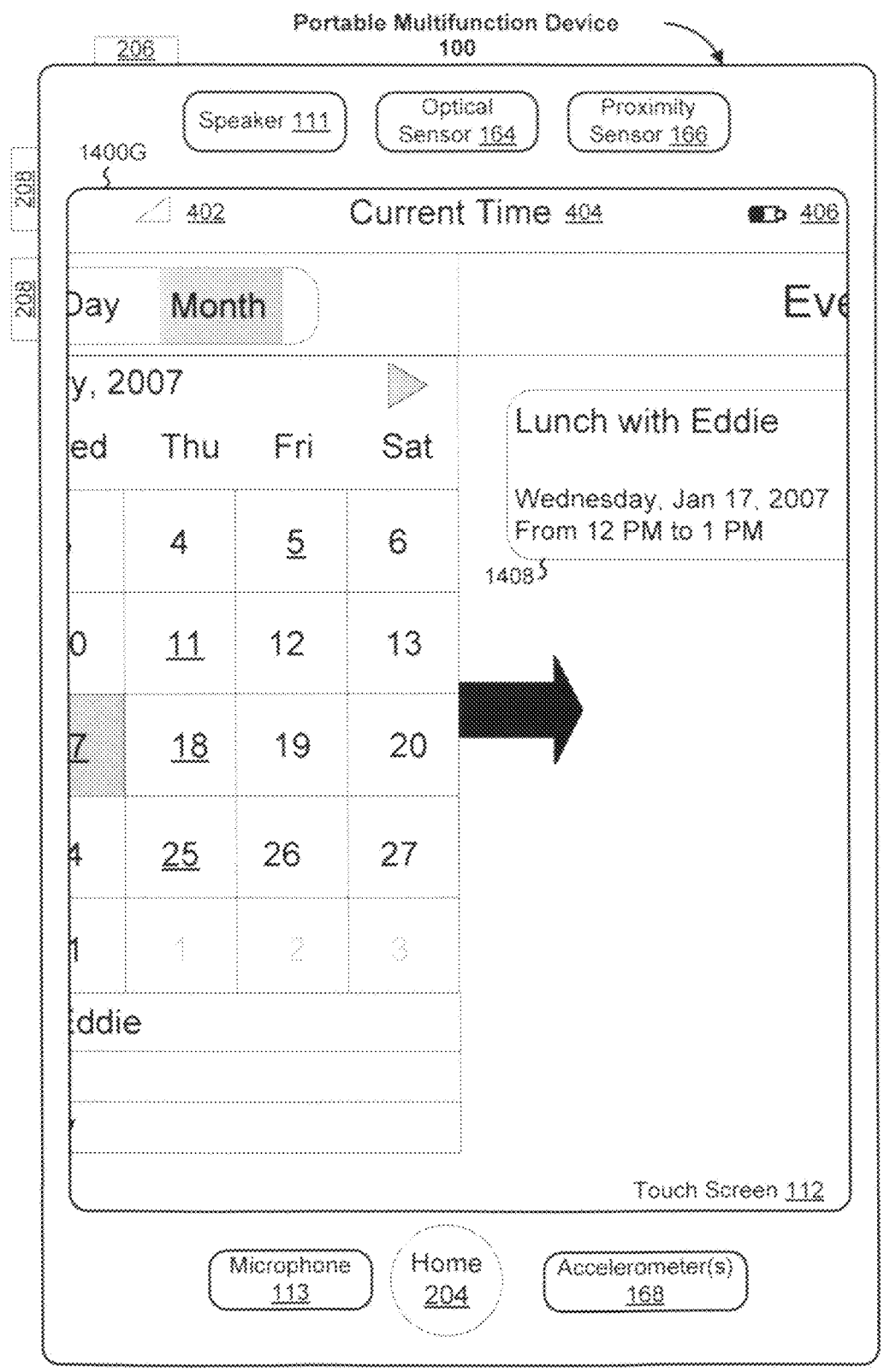
Figure 14H:
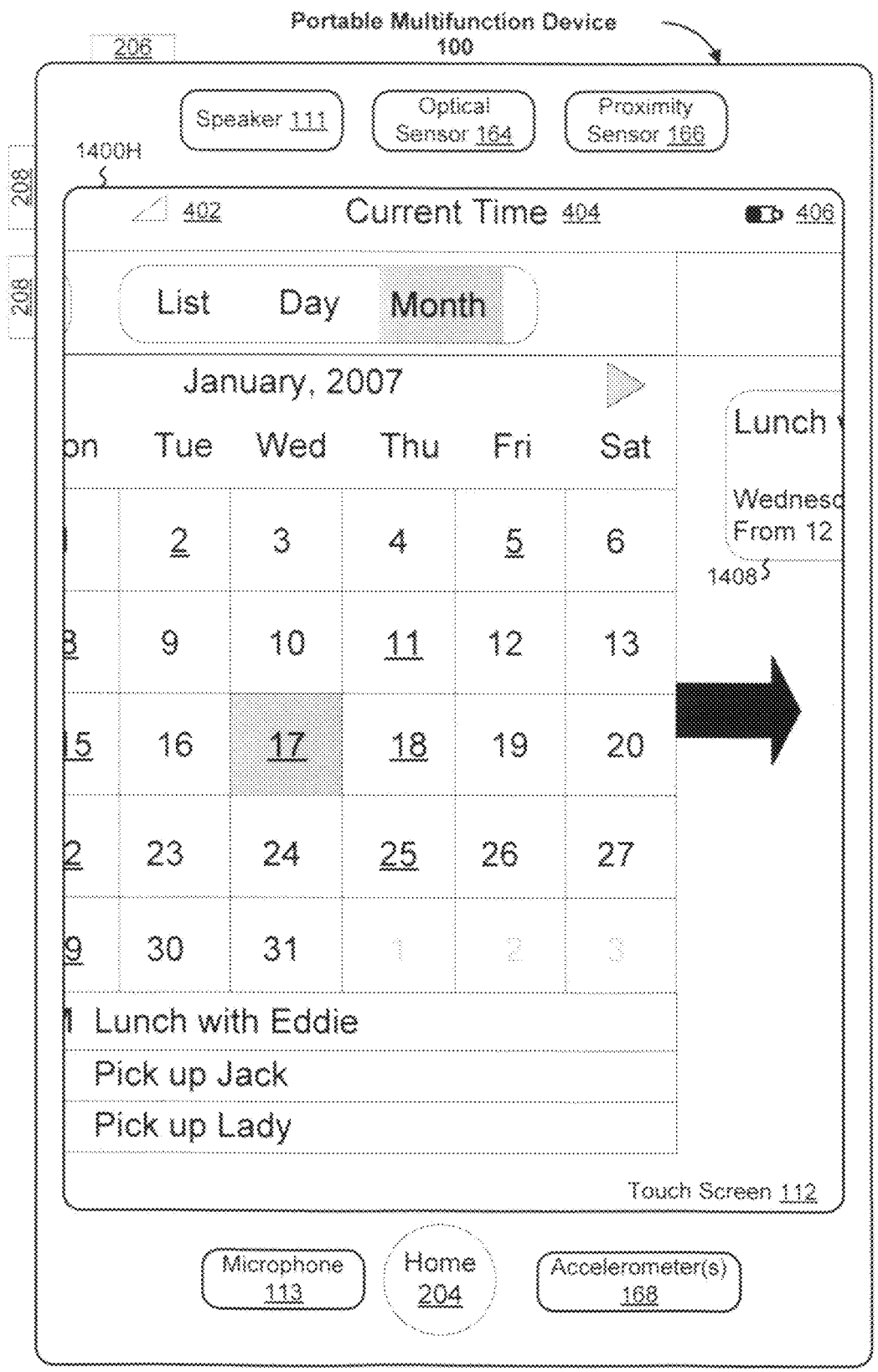
Figure 14I:
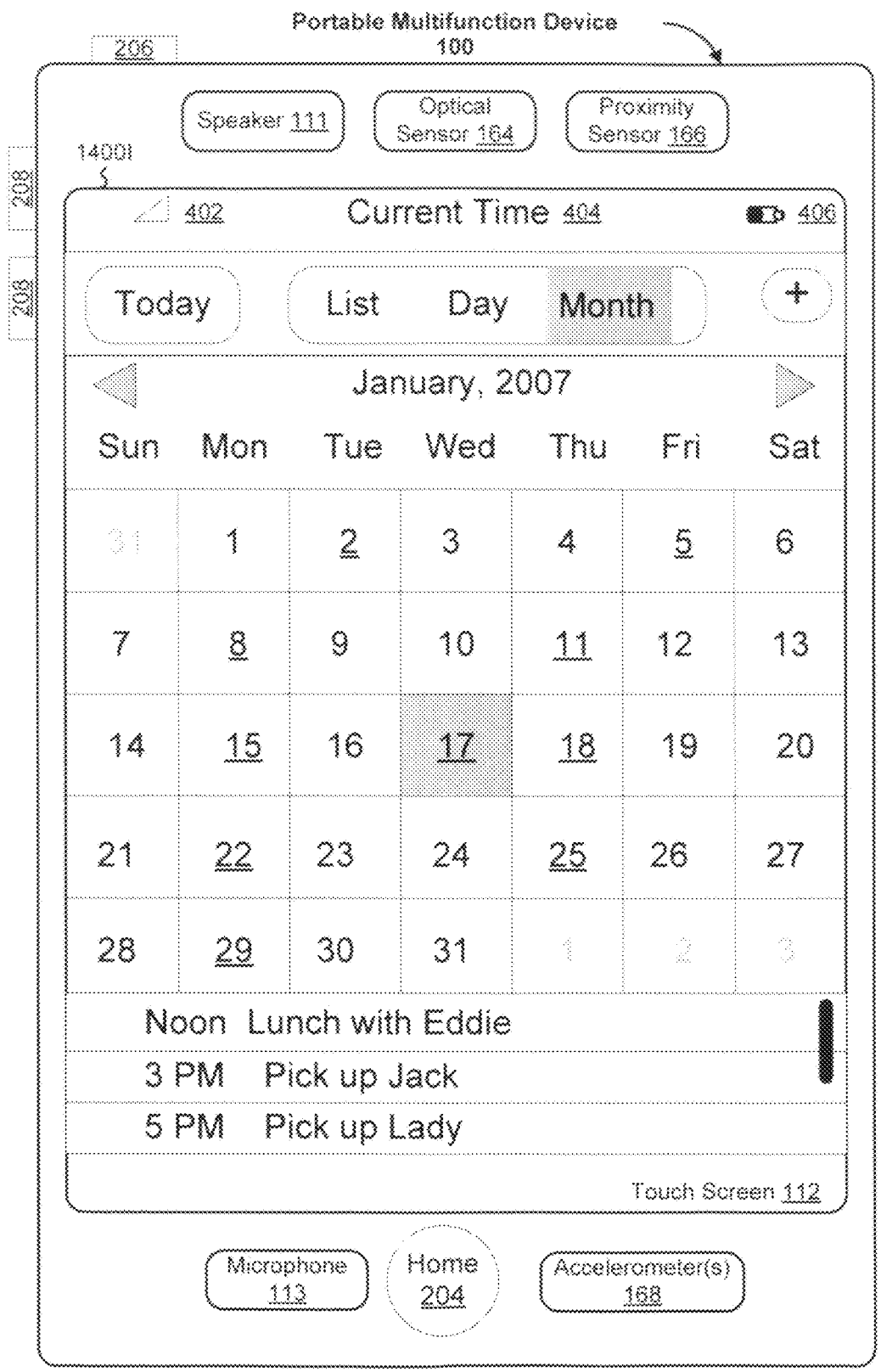
Figure 15A:
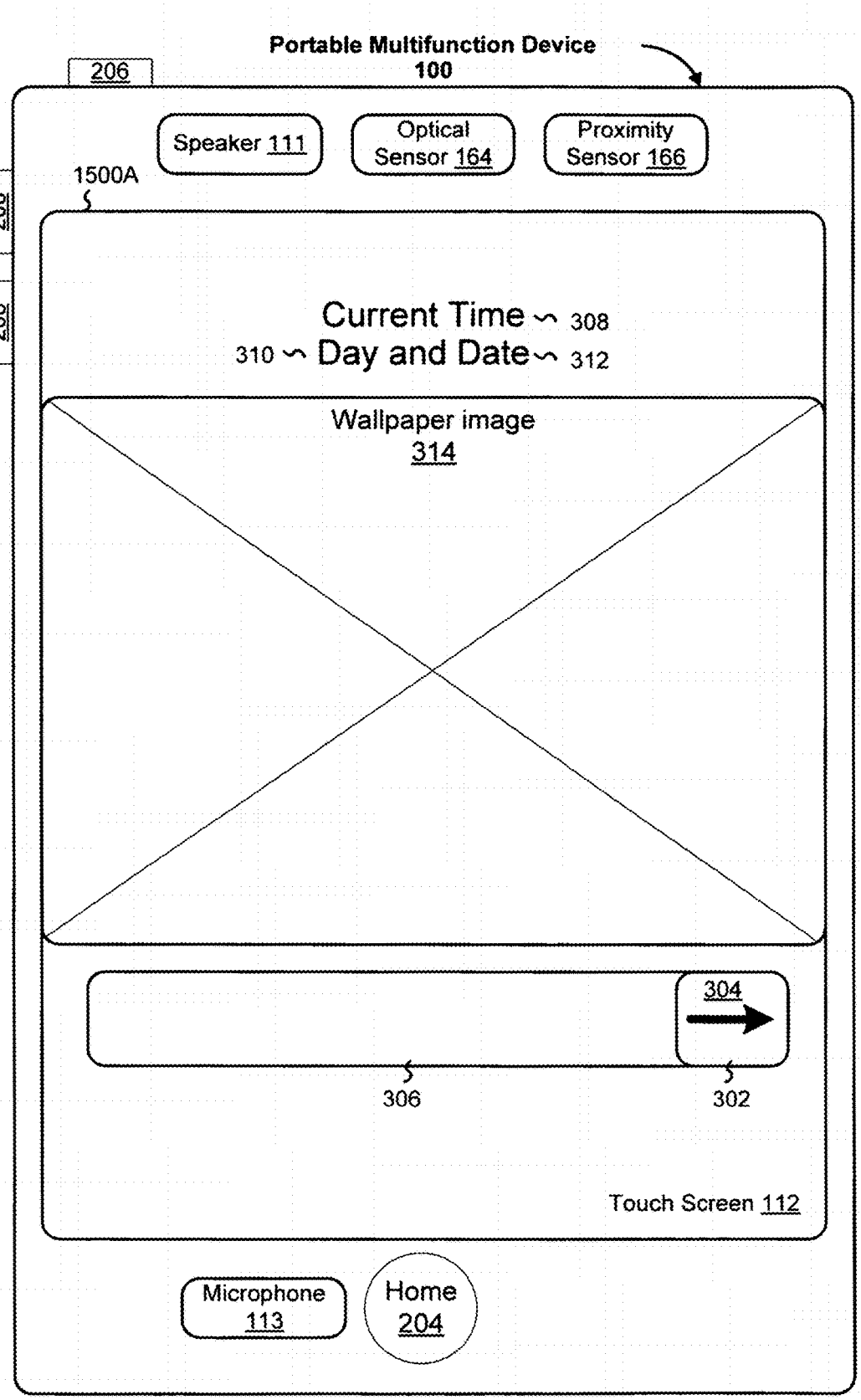
FIGS. 15A-15J illustrate transitions between user interfaces for unlocking a portable electronics device in accordance with some embodiments.
Figure 15B:
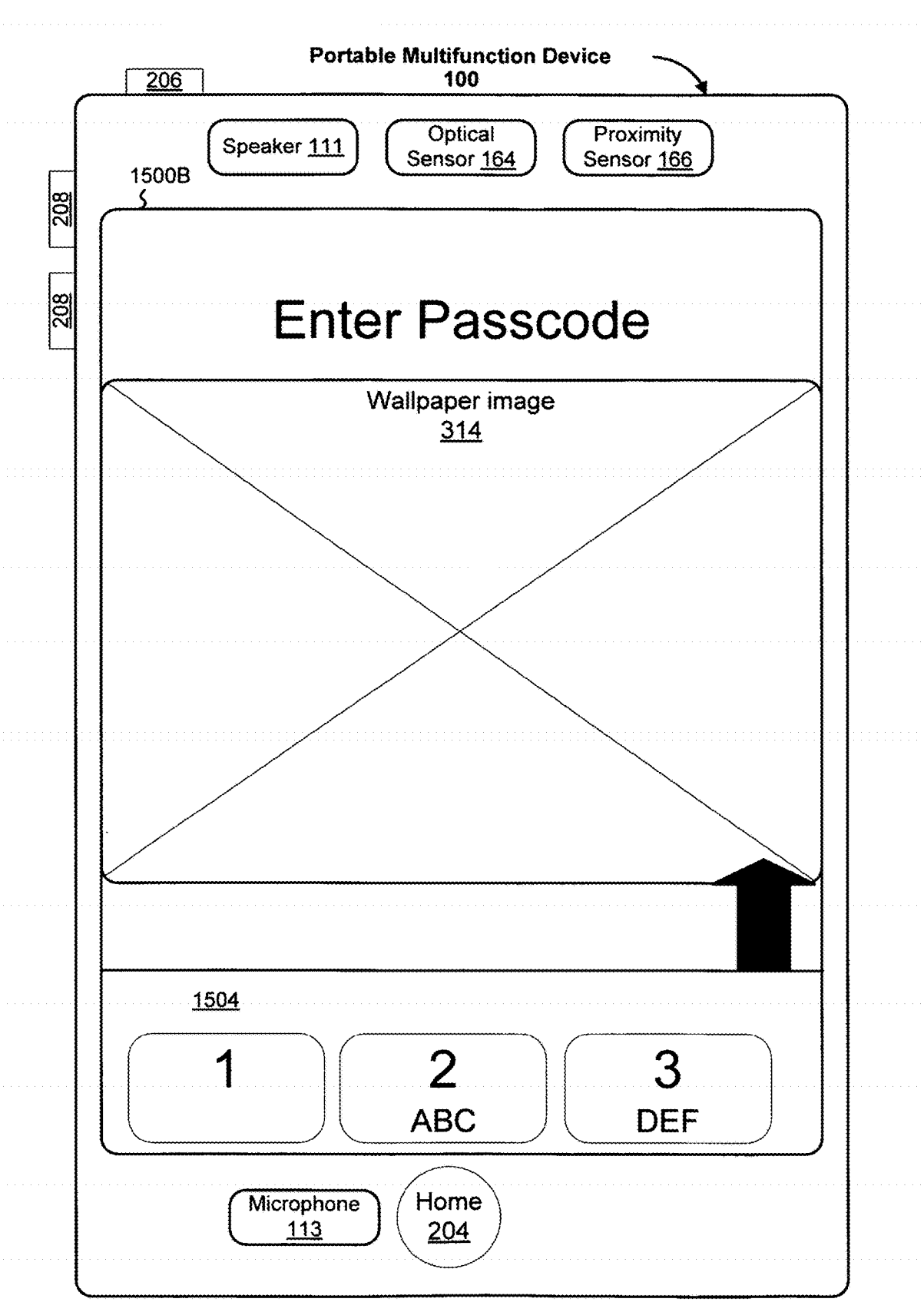
Figure 15C:
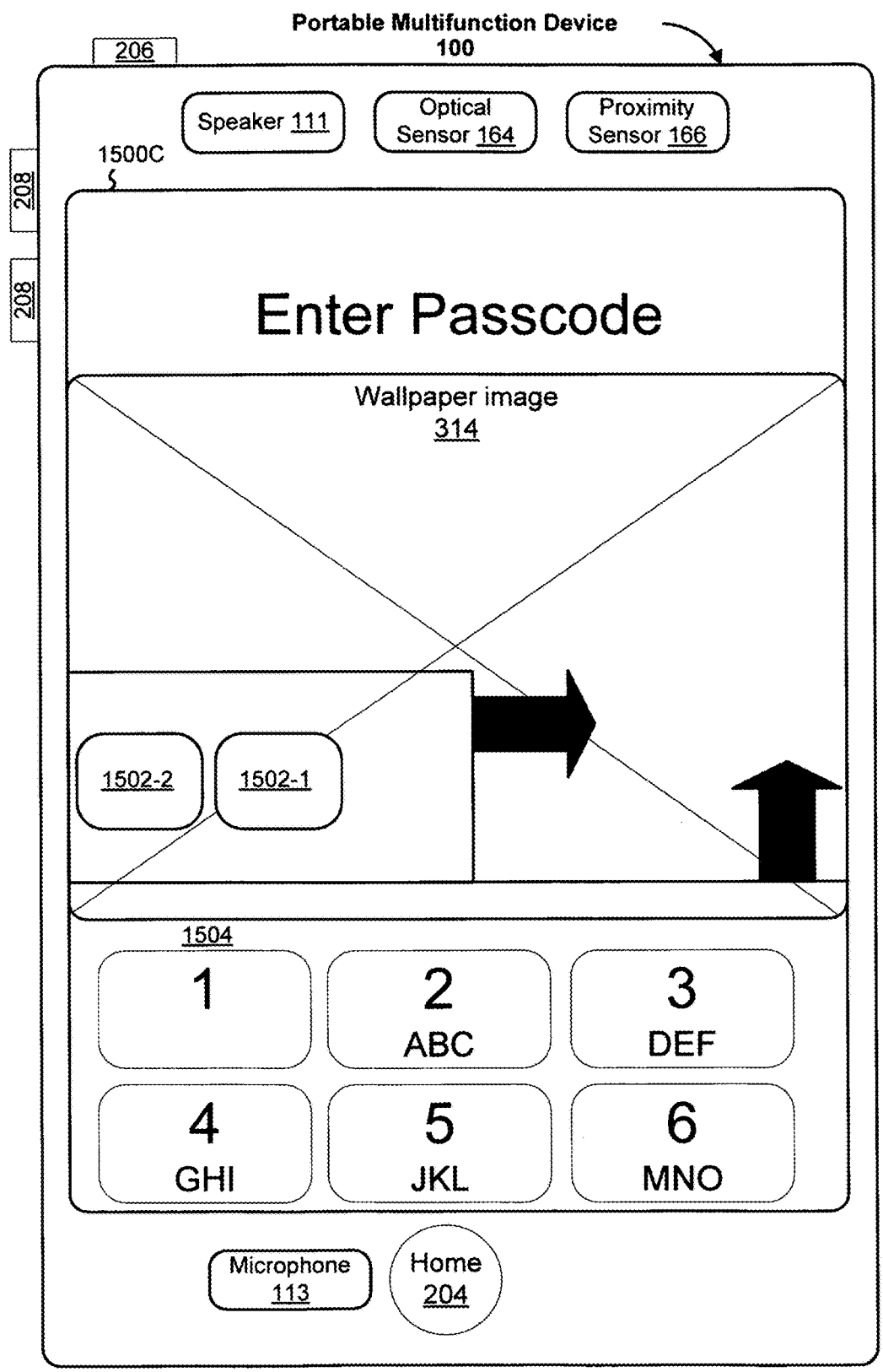
Figure 15D:
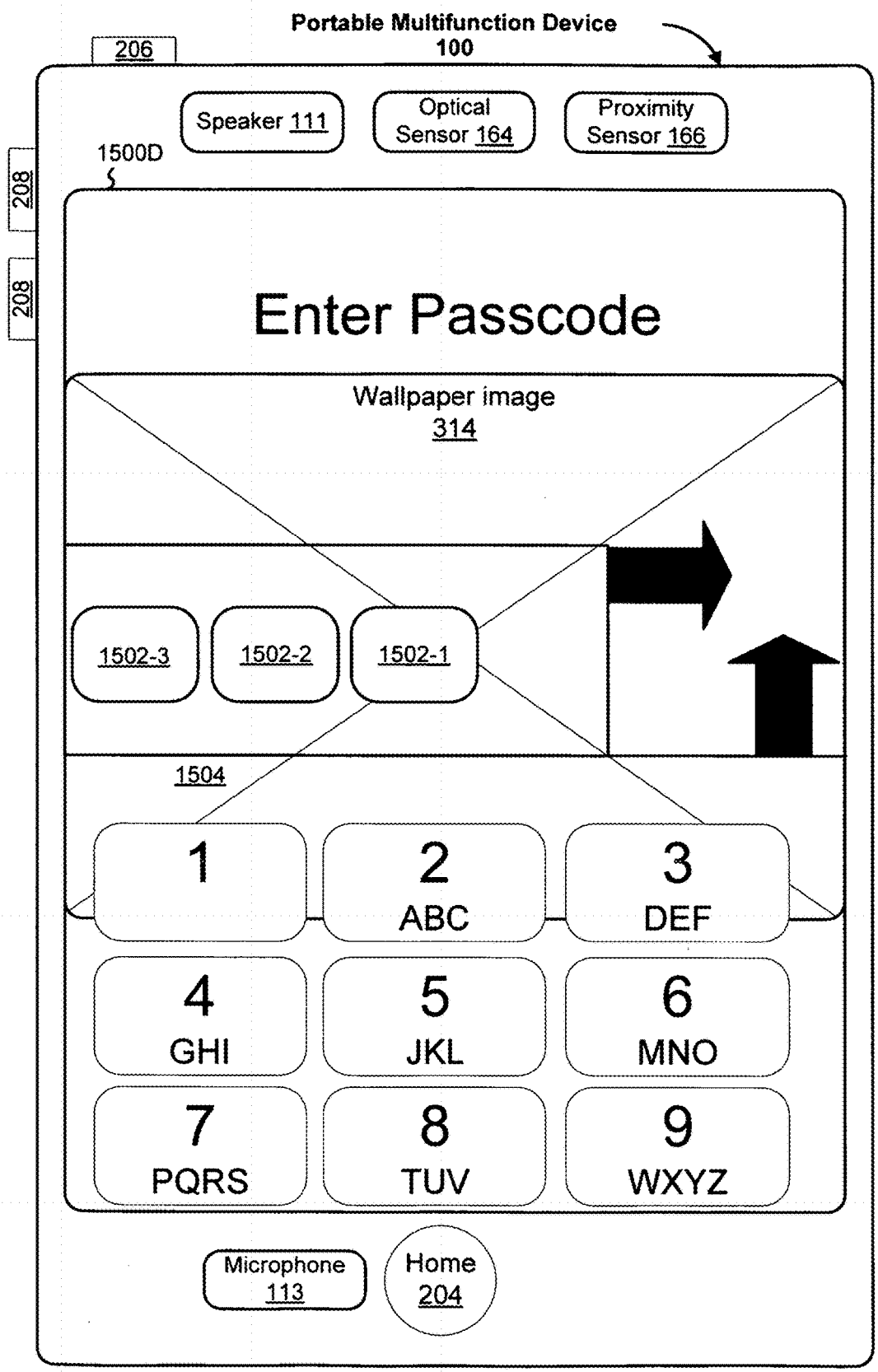
Figure 15E:
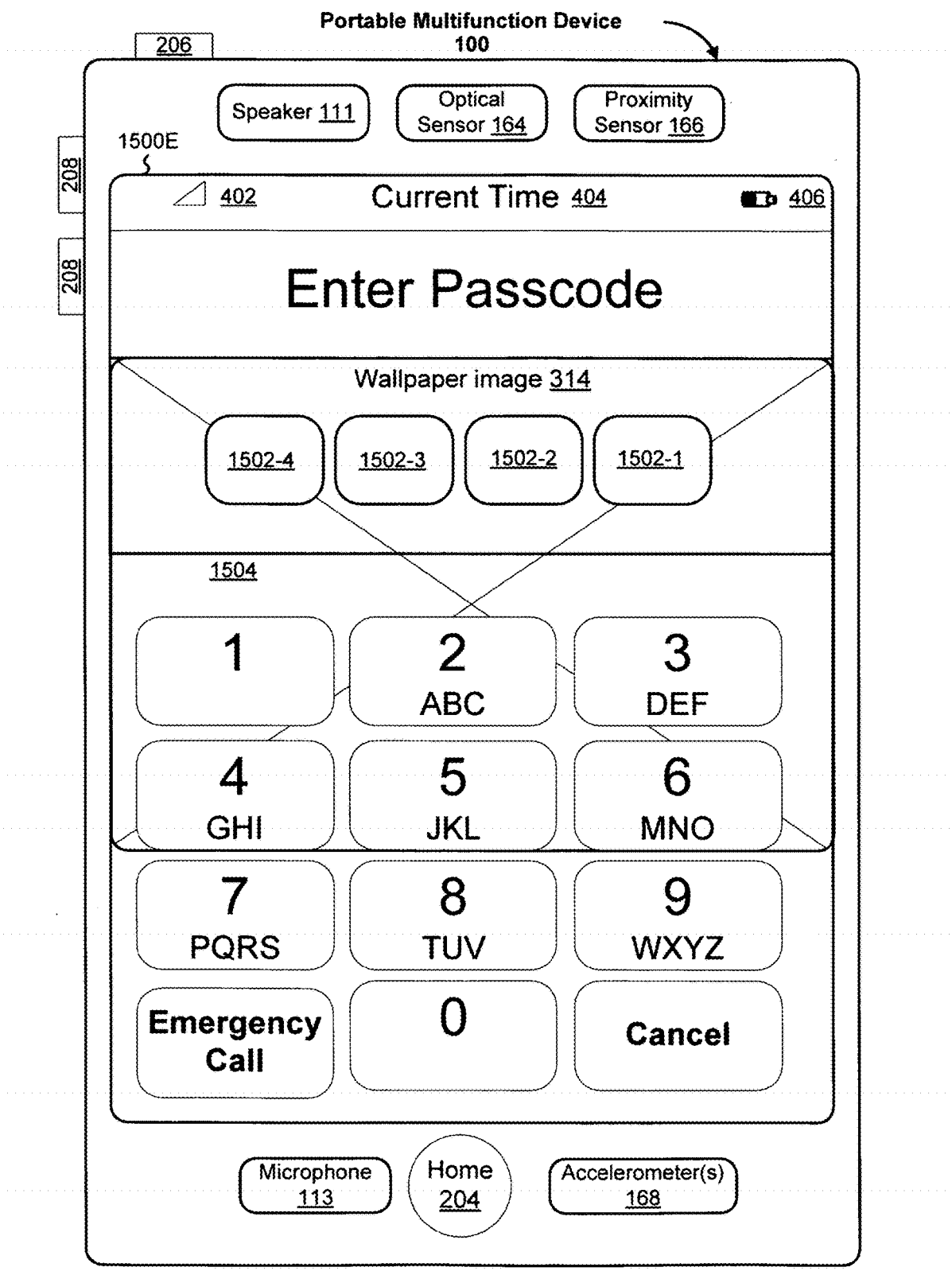
Figure 15F:
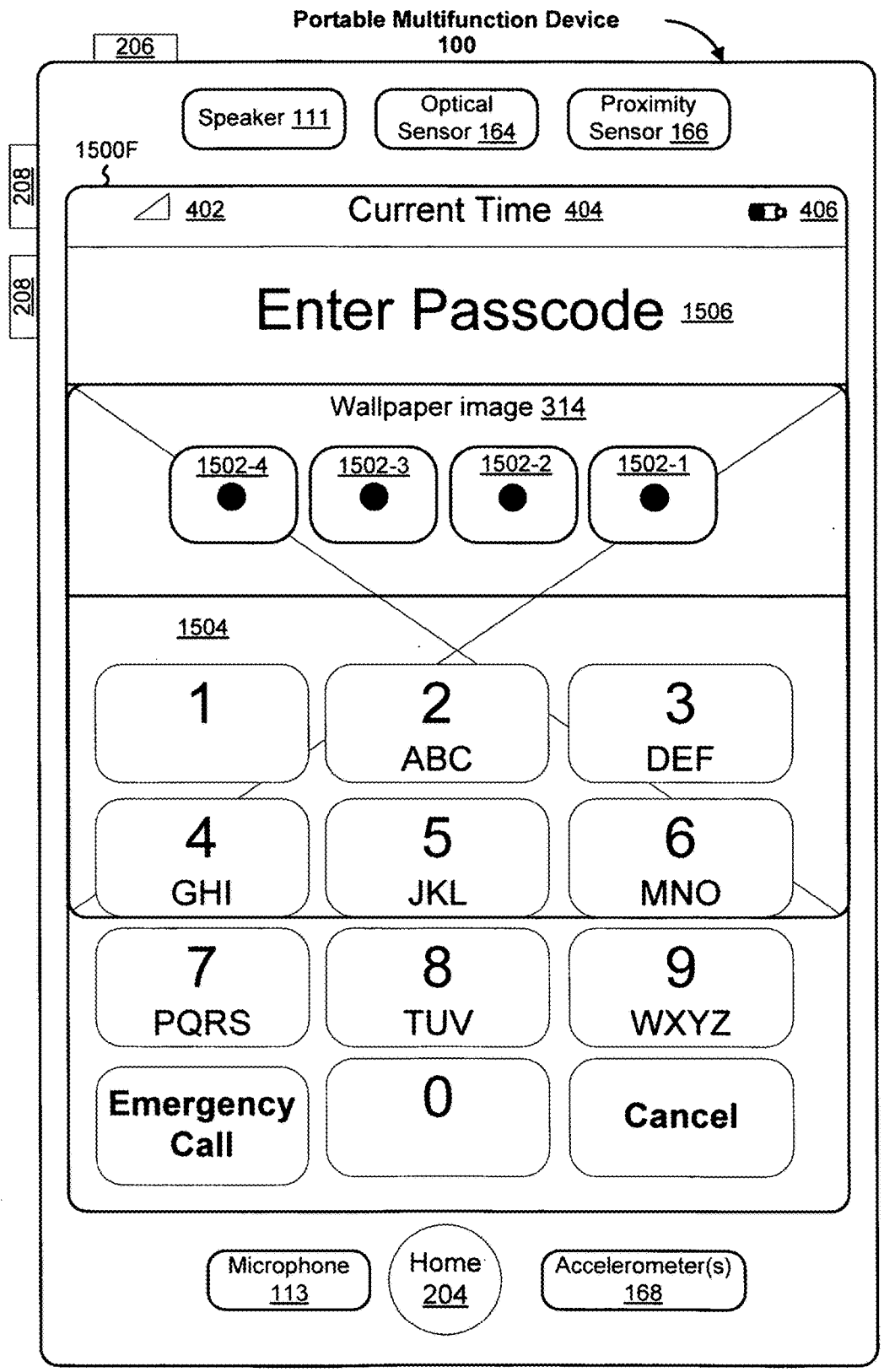
Figure 15G:
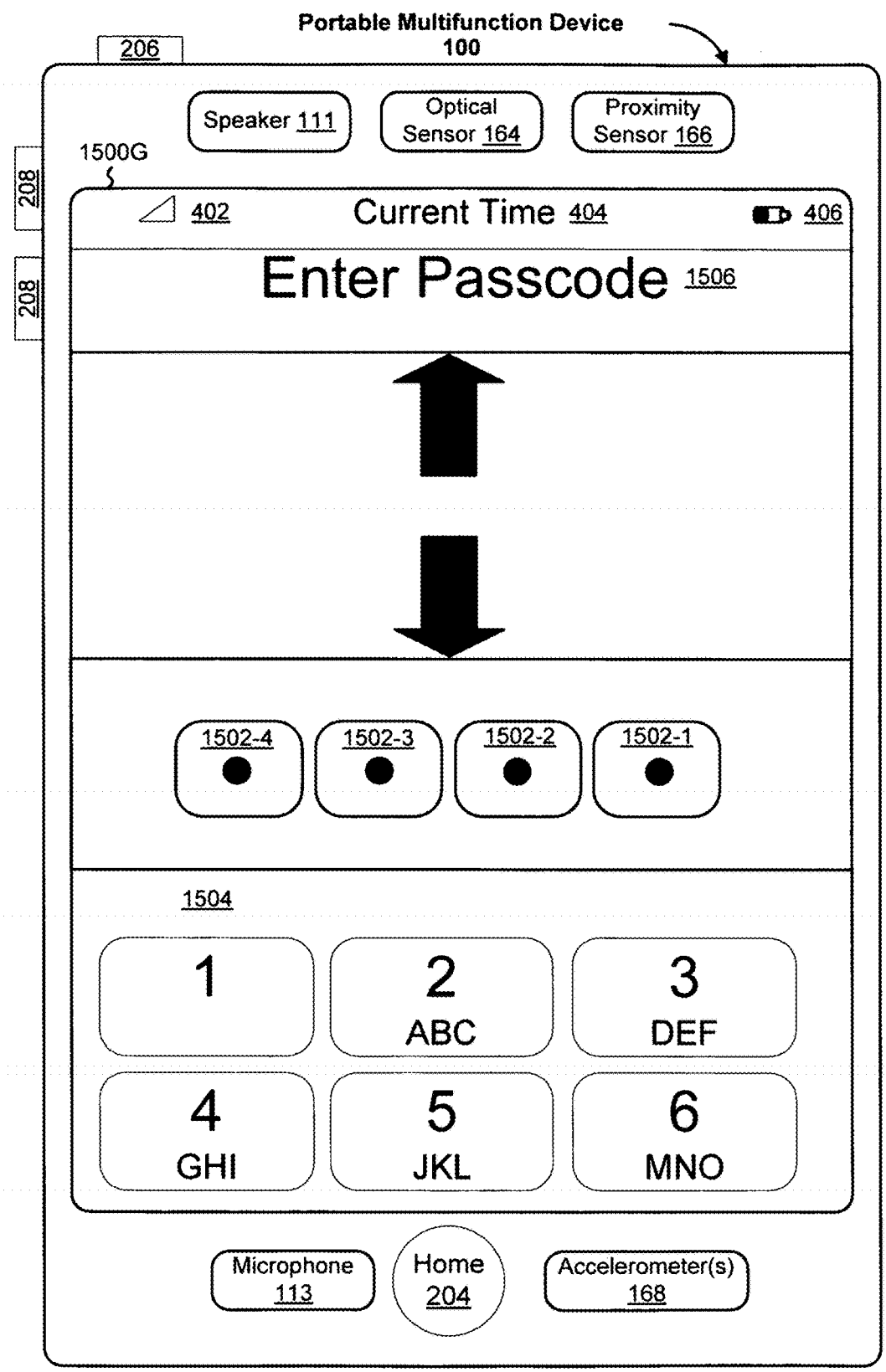
Figure 15H:
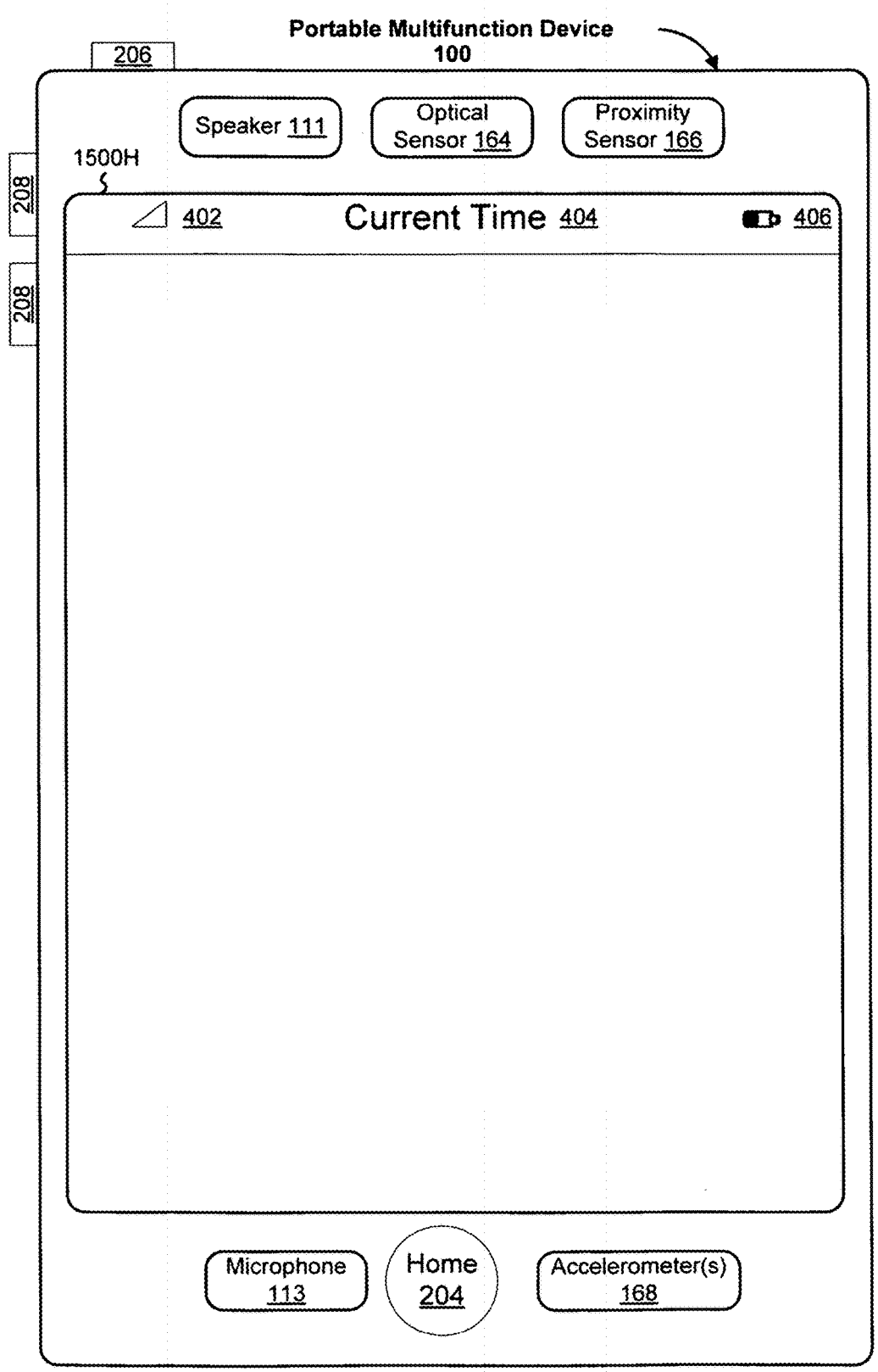
Figure 15I:
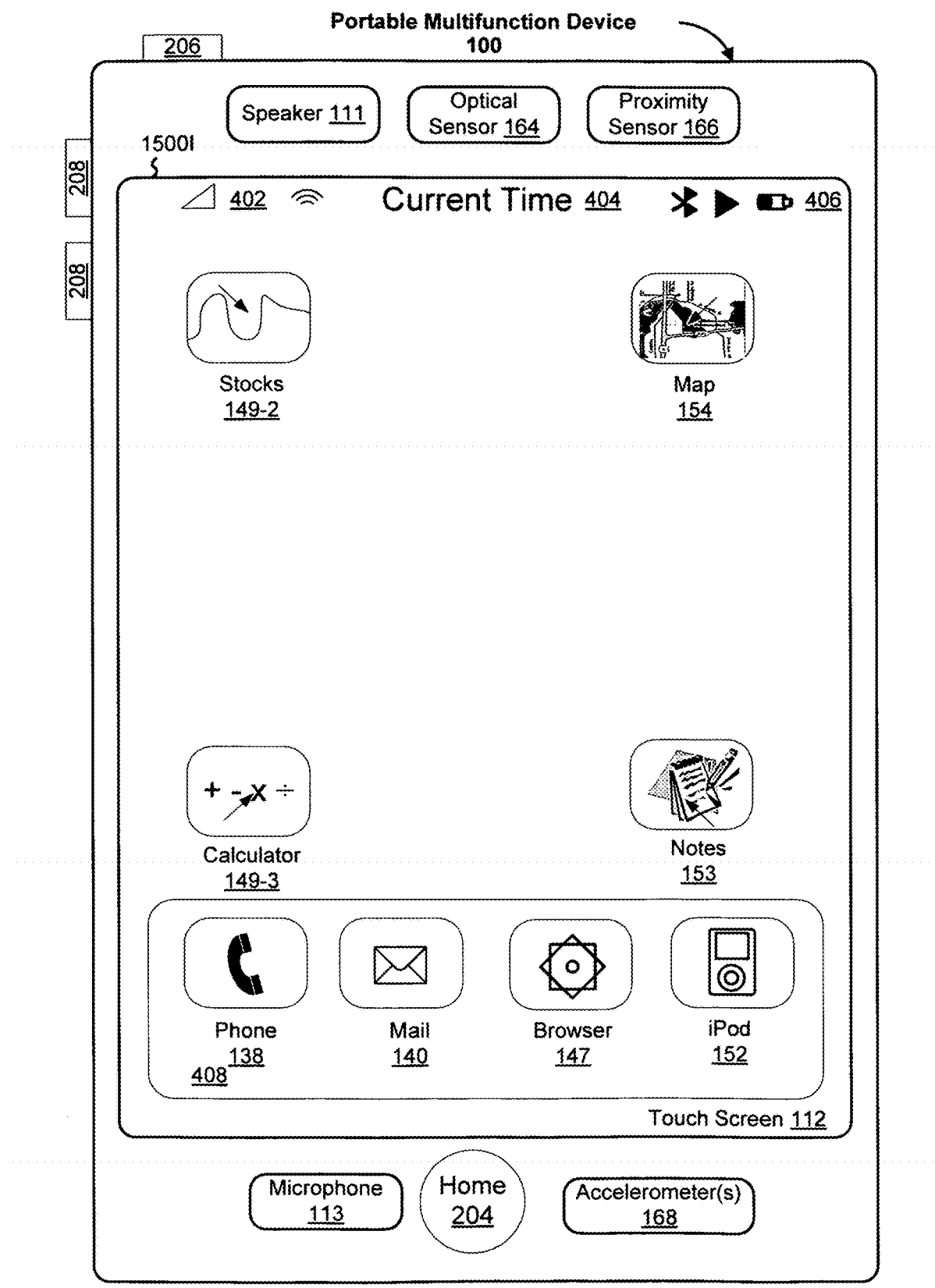
Figure 15J:
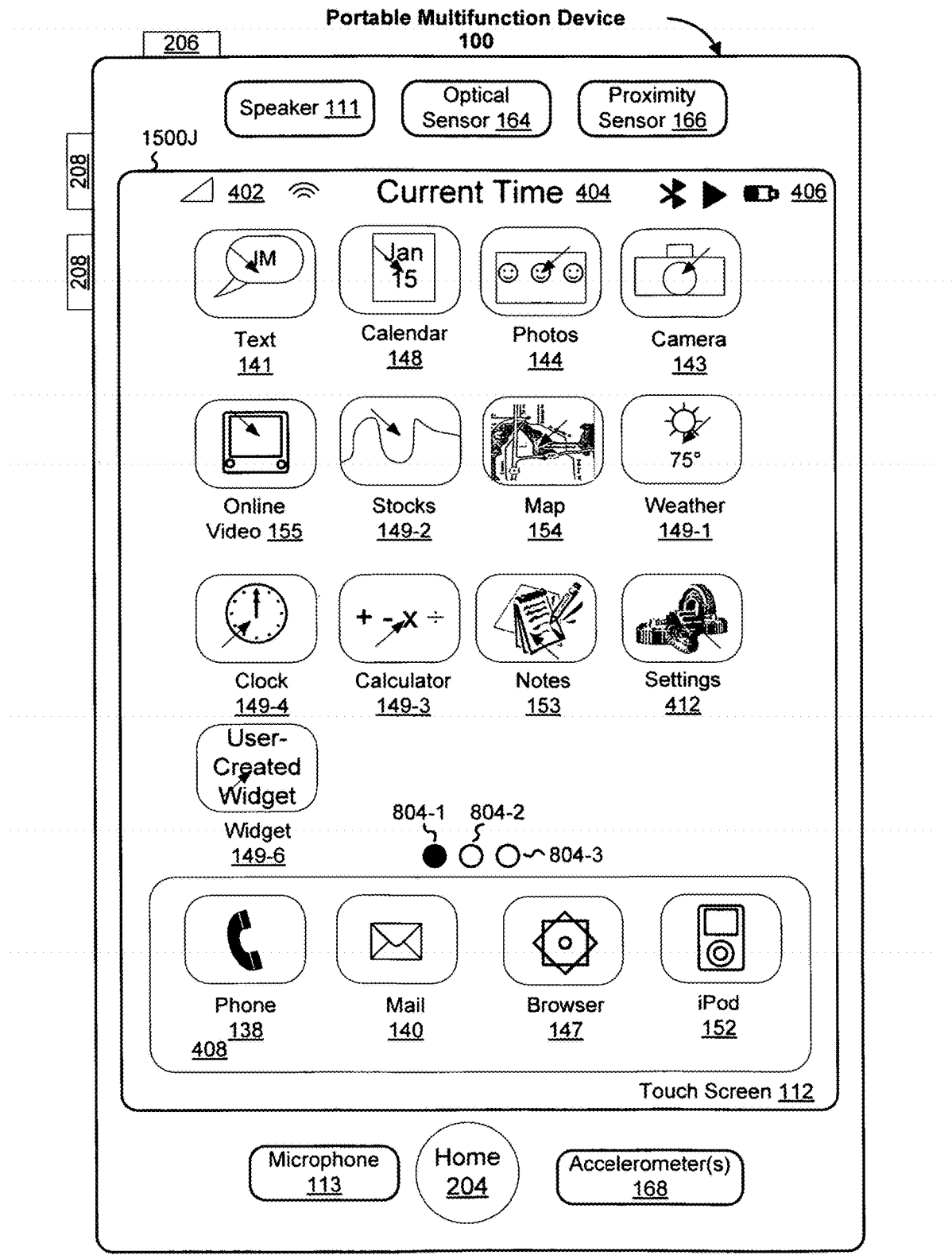

FIG. 16C is a flow diagram illustrating a process 1644 for displaying user interfaces on a touch screen display on a portable multifunction device in accordance with some embodiments. In the process 1644, a first user interface including a group of items is displayed (1646) on the touch screen display. For example, a group of instant messages 502 are displayed in UI 1100A (FIG. 11A), a group of photo albums 1222 are displayed in UI 1200A (FIG. 12A), a group of locations are displayed in UI 1300A (FIG. 13A) or UI 1300K (FIG. 13K), and a group of events are displayed in UI 1400A (FIG. 14A). In some embodiments, the group of items includes (1648) titles of the items (e.g., names 504, FIG. 1A; album names 1206, FIG. 12A).

A gesture (e.g., 518, FIG. 11A; 1220, FIG. 12A; 5284, FIG. 13A; 1312, FIG. 13K; or 1402, FIG. 14A) to select an item in the group is detected (1650). In some embodiments, a finger gesture (e.g., a tap gesture) on the item is detected (1652).

In response to detecting the gesture, a first animation is displayed (1654) of a transition from display of the first user interface to display of a second user interface corresponding to the selected item. The first animation slides the second user interface onto the touch screen display from a first side of the display. Examples of first animations are illustrated respectively in FIGS. 11A-11E, 12A-12E, 13E-13E, 13N-13Q (starting from 13K), and 14A-14E.

In some embodiments, the first animation slides (1656) the first user interface off of a second side of the touch screen display. In some embodiments, the second side is opposite (1658) to the first side.

In some embodiments, the first animation slides (1660) a header including the title (e.g., name 504-1, FIGS. 11C-11E; album name 1206-5, FIG. 12C-12E) of the selected item onto the touch screen display.

In some embodiments, a finishing gesture (e.g., 1106, FIG. 11E; 1224, FIG. 12E; 1304, FIG. 13E; 1314, FIG. 13Q; or 1410, FIG. 14E) is detected (1662) on an icon in the second user interface. In some embodiments, detecting the finishing gesture includes detecting (1664) a finger gesture (e.g., a tap gesture) on the icon.

In some embodiments, in response to detecting the finishing gesture, a second animation is displayed (1666) of a transition from display of the second user interface to display of the first user interface. The second animation slides the first user interface onto the touch screen display. Examples of second animations are illustrated respectively in FIGS. 13E-13I, 13Q-13U, and 14E-14I.

In some embodiments, the second animation slides (1668) the first user interface onto the touch screen display from a second side opposite to the first side. In some embodiments, the second animation slides the second user interface off of the touch screen display via the first side. In some embodiments, the second animation slides the first user interface onto the touch screen display from the first side.

Figure 16D:
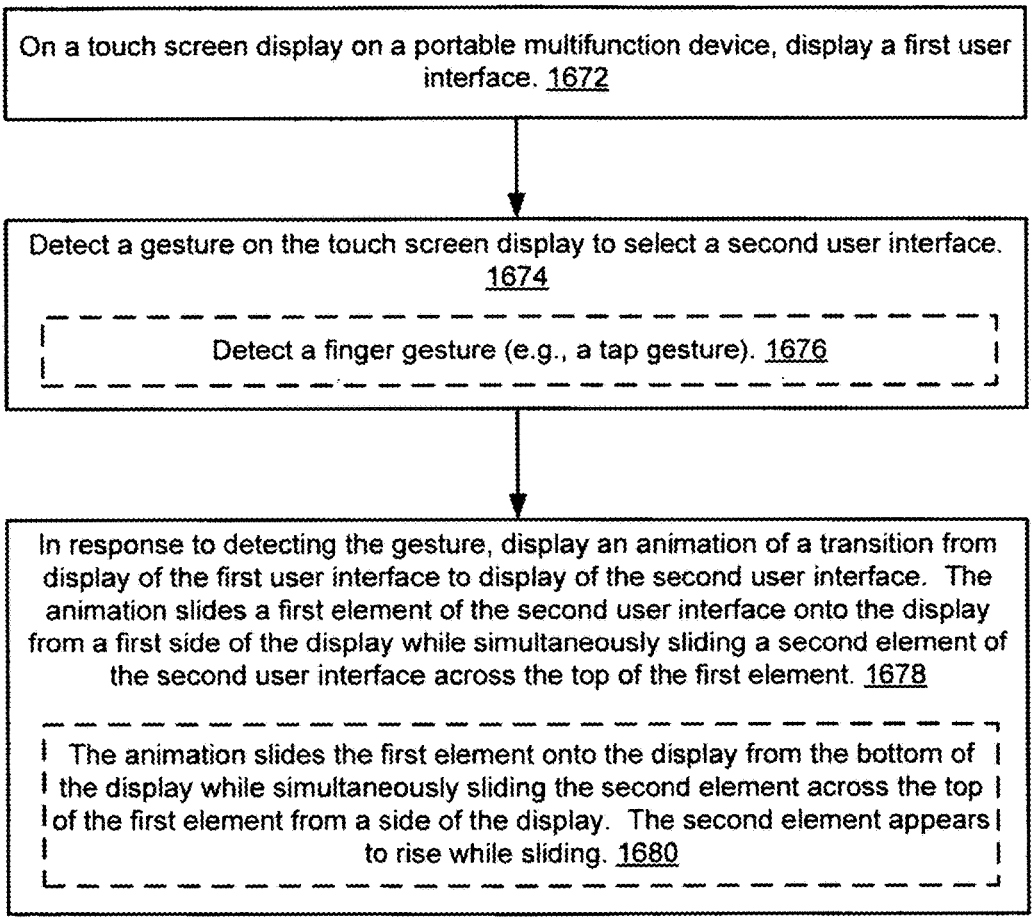

FIG. 16D is a flow diagram illustrating a process 1670 for displaying user interfaces on a touch screen display on a portable multifunction device in accordance with some embodiments. In the process 1670, a first user interface (e.g., UI 300, FIG. 3) is displayed (1672) on the touch screen display.

A gesture to select a second user interface (e.g., UI 1500E, FIG. 15E) is detected (1674) on the touch screen display. In some embodiments, a finger gesture (e.g., a tap gesture) is detected (1676). In some embodiments, a finger swipe gesture is detected (e.g., a swipe gesture on the unlock image 302, in response to which the unlock image 302 slides to the left side of the channel 306, as shown in UI 1500A, FIG. 15A).

In response to detecting the gesture, an animation is displayed (1678) of a transition from display of the first user interface to display of the second user interface. The animation slides a first element (e.g., the block of numeric soft keys 1504, FIGS. 15B-15E) of the second user interface onto the display from a first side of the display while simultaneously sliding a second element (e.g., the block of user input fields 1502-1 through 1502-4) of the second user interface across the top of the first element.

In some embodiments, the animation slides the first element onto the display from the bottom of the display while simultaneously sliding (1680) the second element across the top of the first element from a side of the display. The second element (e.g., the block of user input fields 1502-1 through 1502-4) appears to rise while sliding.

Figure 16E:
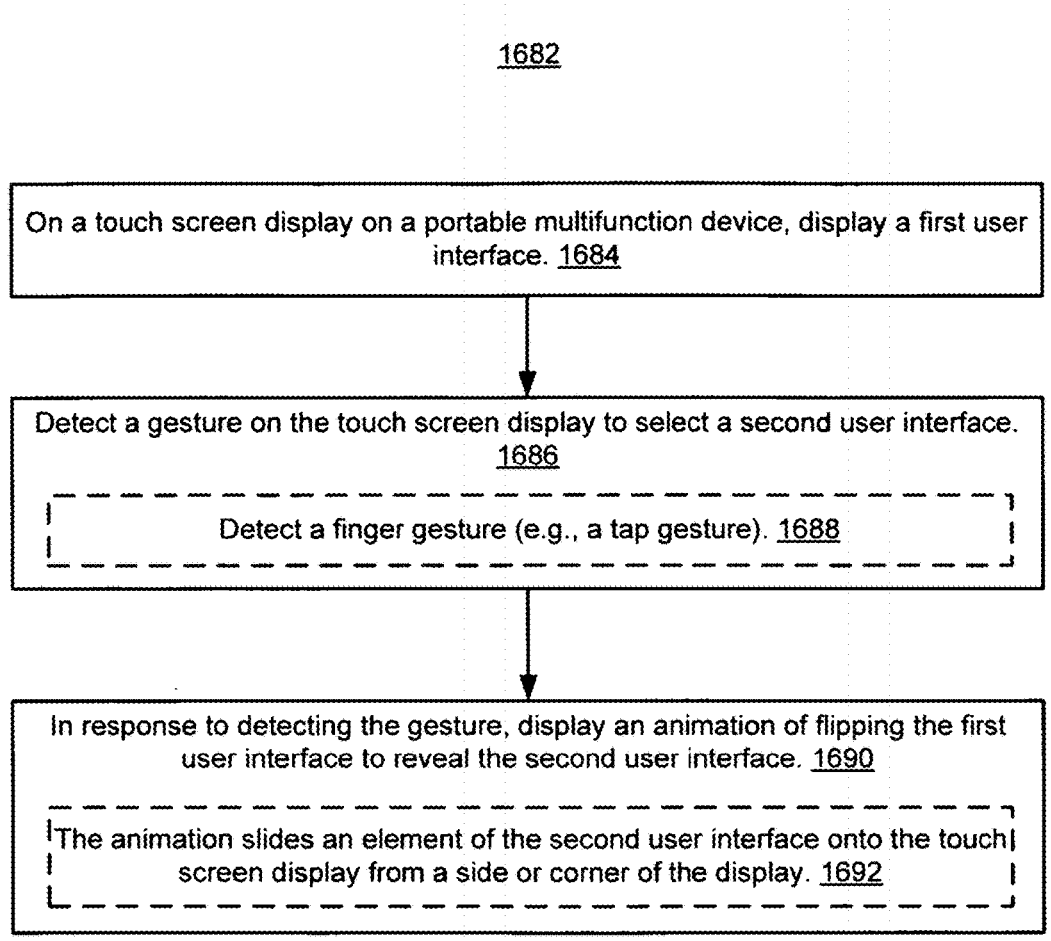

FIG. 16E is a flow diagram illustrating a process 1682 for displaying user interfaces on a touch screen display on a portable multifunction device in accordance with some embodiments. In the process 1682, a first user interface (e.g., UI 1300I, FIG. 13I, or UI 1300K, FIG. 13K) is displayed (1684) on the touch screen display.

A gesture to select a second user interface (e.g., gesture 1306, FIG. 13I) (e.g., gesture 1308 or 1313, FIG. 13K) is detected (1686) on the touch screen display. In some embodiments, a finger gesture (e.g., a tap gesture) is detected (1688).

In response to detecting the gesture, an animation is displayed (1690) of flipping the first user interface to reveal the second user interface. For example, FIG. 13J illustrates flipping UI 1300I in a counter-clockwise direction about a vertical axis on the touch screen display to reveal UI 1300K. FIG. 13L illustrates flipping UI 1300K in a clockwise direction about a vertical axis on the touch screen display to reveal UI 1300I/1300M (FIG. 13M).

In some embodiments, the animation slides (1692) an element of the second user interface onto the touch screen display from a side or corner of the display.

FIGS. 17A-17E illustrate transitions between user interfaces for a locked state and a music player application in accordance with some embodiments.

In some embodiments, UIs 1700A-1700E (FIGS. 17A-17E) include the following elements, or a subset or superset thereof:
  302, 304, 306, 308, 402, 404, and 406, as described above;
  Lock state indicator 1702;
  Music playing indicator 1704;
  Content title 1706 for the currently playing content (e.g., music or other audio);
  Cover art 1708 for the currently playing content;
  Back icon 1710 that when activated (e.g., by a finger tap on the icon) initiates display of a previous user interface in the music player application;
  Artist 1712 for the currently playing content;
  Album title 1714 for the currently playing content;
  Cover flip icon 1716 that when activated (e.g., by a finger tap on the icon) initiates flipping of the cover art 1708 and display of a list of content in the album;
  Loop icon 1718 that when activated (e.g., by a finger tap on the icon) initiates looping of the currently playing content;
  Progress bar 1720 that when activated (e.g., by a finger slide gesture on the icon) initiates adjustment of the playback position in the currently playing content;
  Shuffle icon 1722 that when activated (e.g., by a finger tap on the icon) initiates random playback of content in the current album;
  Previous icon 1724 that when activated (e.g., by a finger tap on the icon) initiates skipping to the beginning of the currently playing content;
  Pause icon 1726 that when activated (e.g., by a finger tap on the icon) initiates pausing of the currently playing content;
  Next icon 1728 that when activated (e.g., by a finger tap on the icon) initiates skipping to the next piece of content; and
  Volume control bar 1730 that when activated (e.g., by a finger slide gesture on the icon) initiates adjustment of the playback volume.

The user interfaces in FIGS. 17A-17E are used to illustrate the process described below with respect to FIG. 18.

Figure 18:
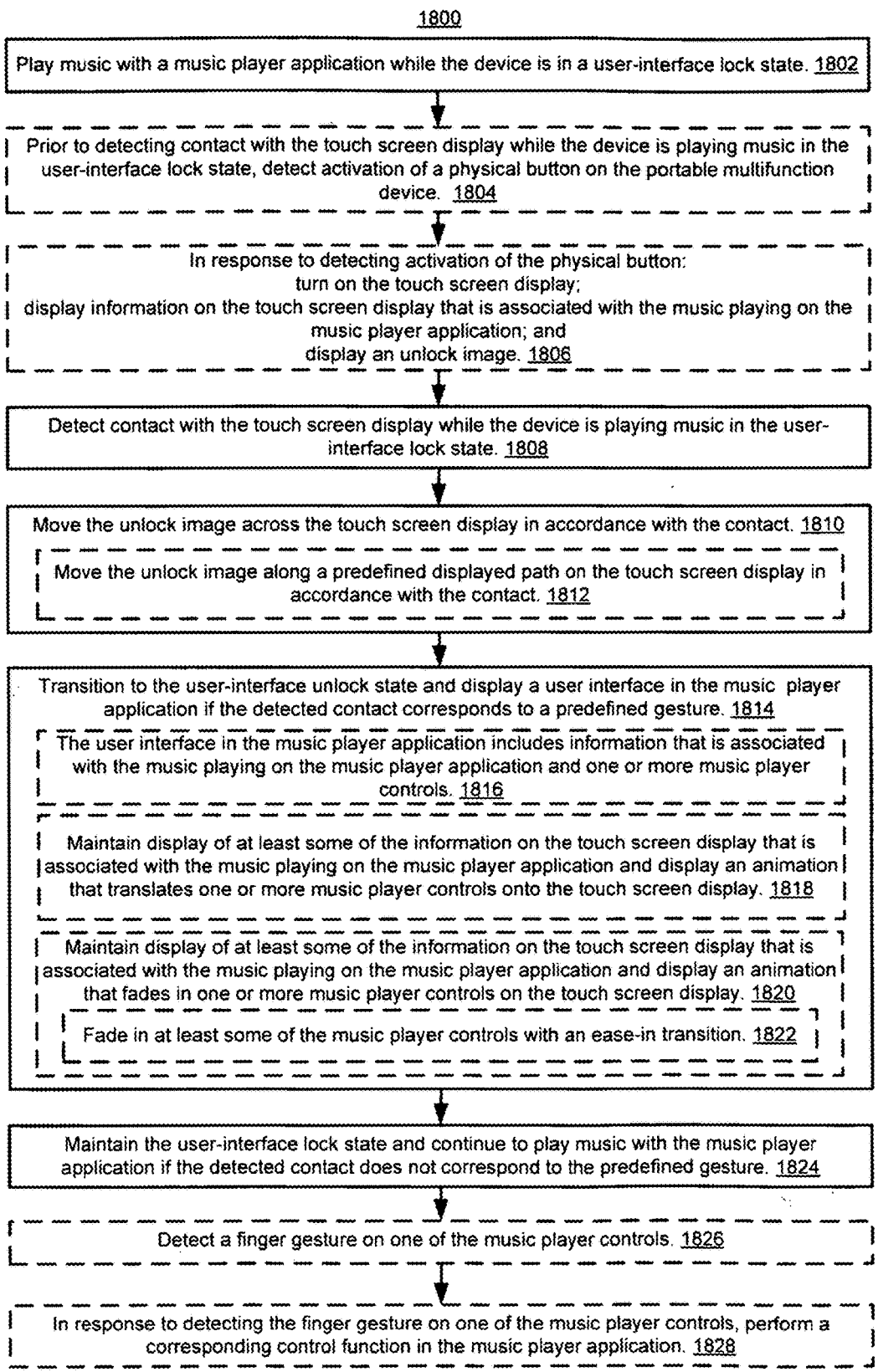
FIG. 18 is a flow diagram illustrating a process for transitioning from a locked state to a music player application on a touch screen display in accordance with some embodiments.

FIG. 18 is a flow diagram illustrating a process 1800 for transitioning from a locked state to a music player application on a touch screen display in accordance with some embodiments. The method 1800 is performed at a device with a touch screen display. In some embodiments, the method 1800 is performed at a portable multifunction device with a touch screen display (e.g., portable multifunction device 100).

The device plays (1802) music with a music player application (e.g., music player 146, FIG. 1A) while the device is in a user-interface lock state.

In some embodiments, prior to detecting contact with the touch screen display 112 while the device is playing music in the user-interface lock state, the device detects (1804) activation of a physical button on the portable multifunction device (e.g., home button 204 or push button 206). In response to detecting activation of the physical button, the device turns on the touch screen display; displays information on the touch screen display that is associated with the music playing on the music player application (e.g., title 1706, artist 1712, album 1714, and/or cover art 1708 corresponding to the album for the music playing on the music player application); and displays an unlock image 302 (1806) (e.g., FIG. 17A). As discussed above, the unlock image is a graphical, interactive user-interface object with which a user interacts in order to unlock the device (e.g., image 302, FIG. 17A).

The device detects (1808) contact with the touch screen display 112 while the device is playing music in the user-interface lock state.

Figure 17A:
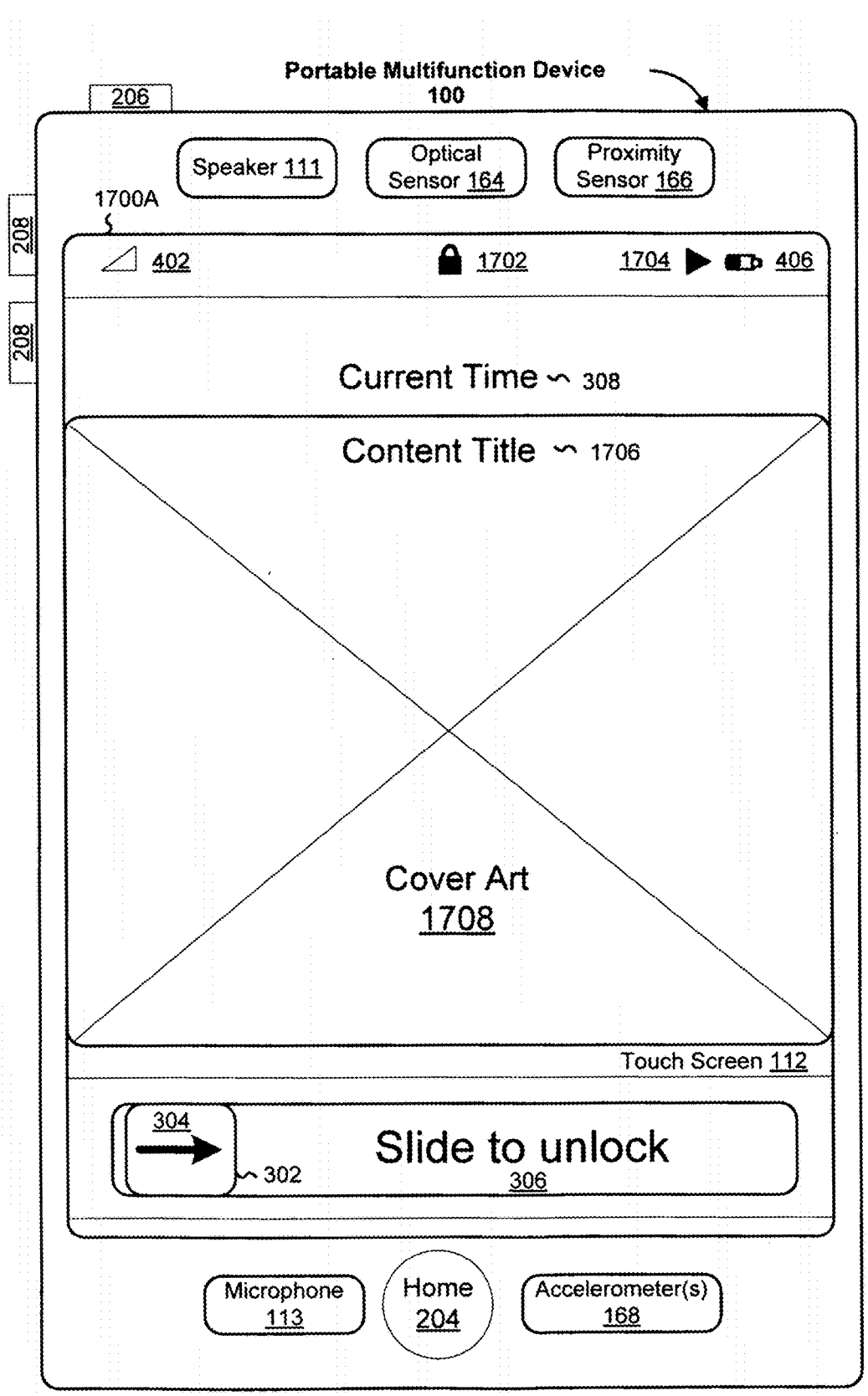
FIGS. 17A-17E illustrate transitions between user interfaces for a locked state and a music player application in accordance with some embodiments.
Figure 17B:
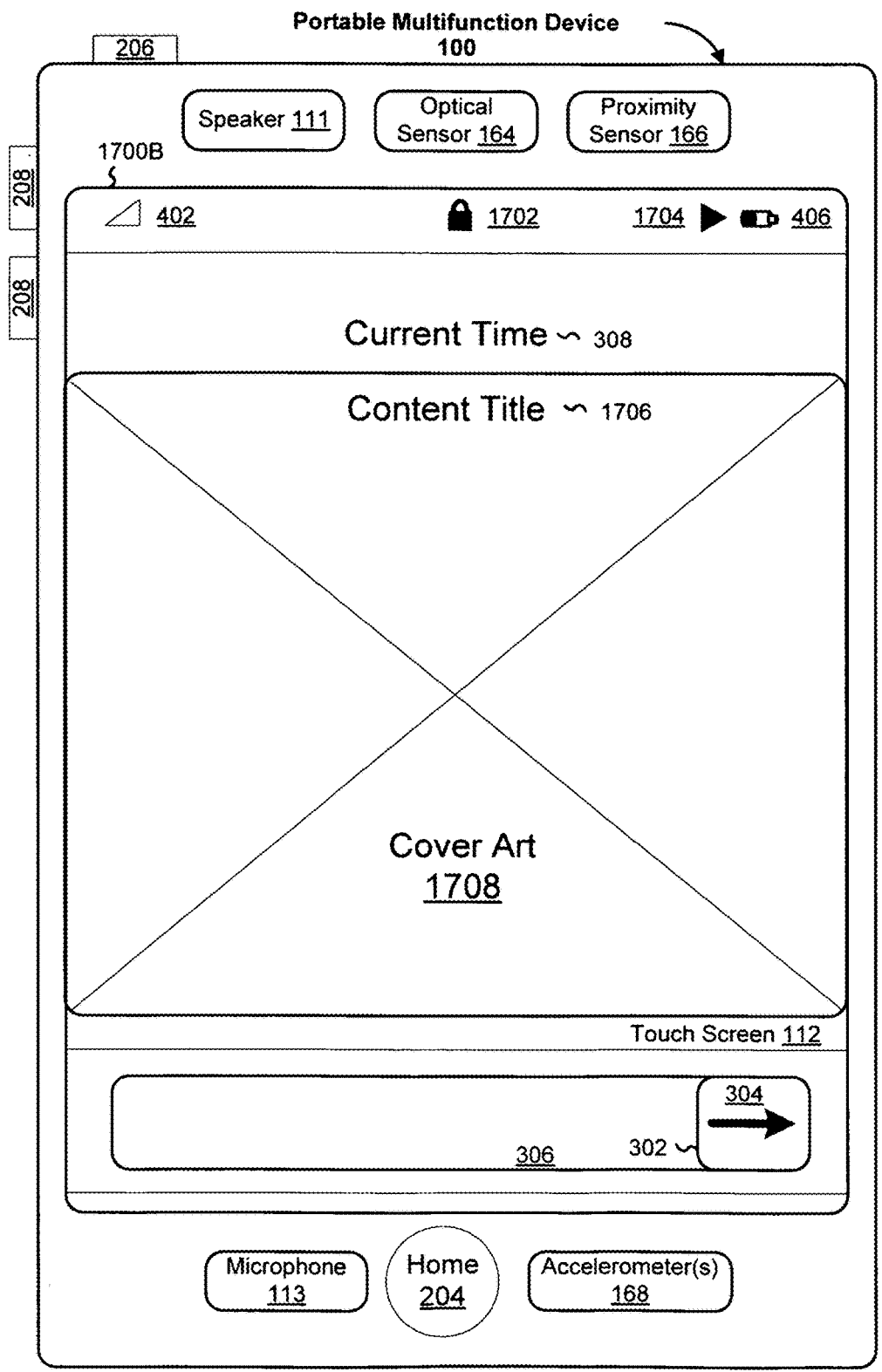

The device moves (1810) the unlock image 302 across the touch screen display in accordance with the contact. In some embodiments, the unlock image is moved (1812) along a predefined displayed path on the touch screen display in accordance with the contact (e.g., across channel 306, as shown in FIGS. 17A and 17B).

Figure 17C:
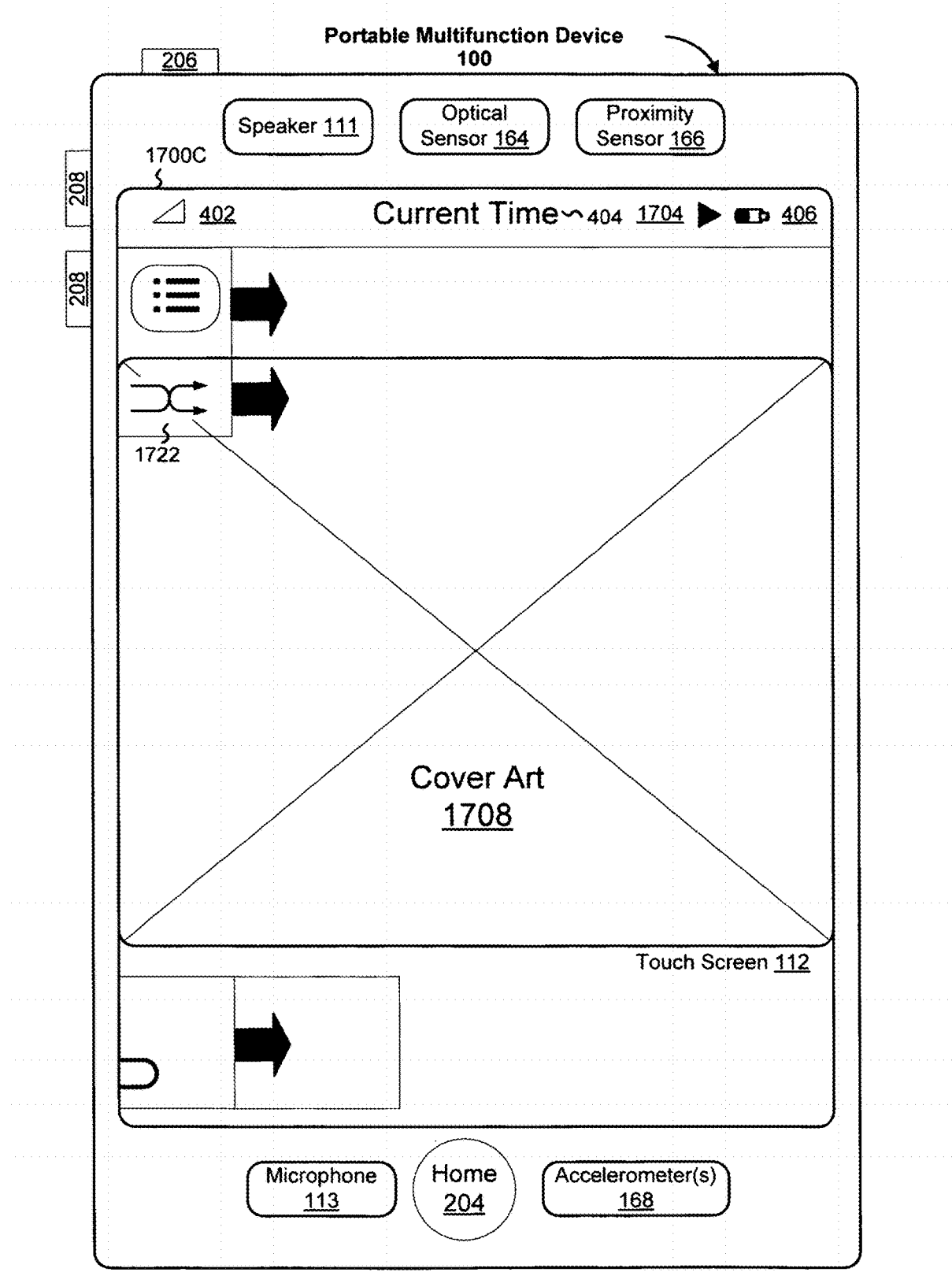
Figure 17D:
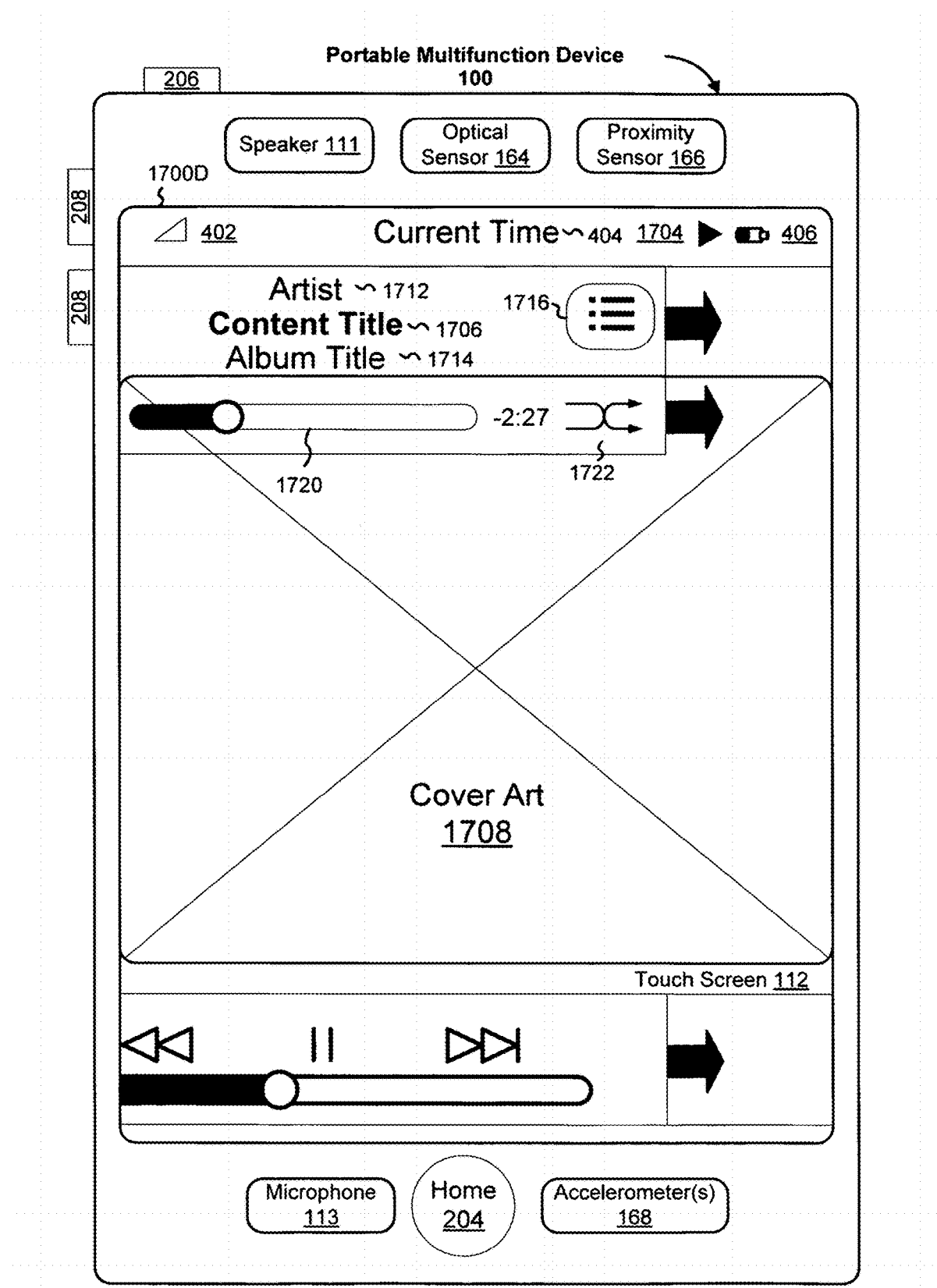
Figure 17E:
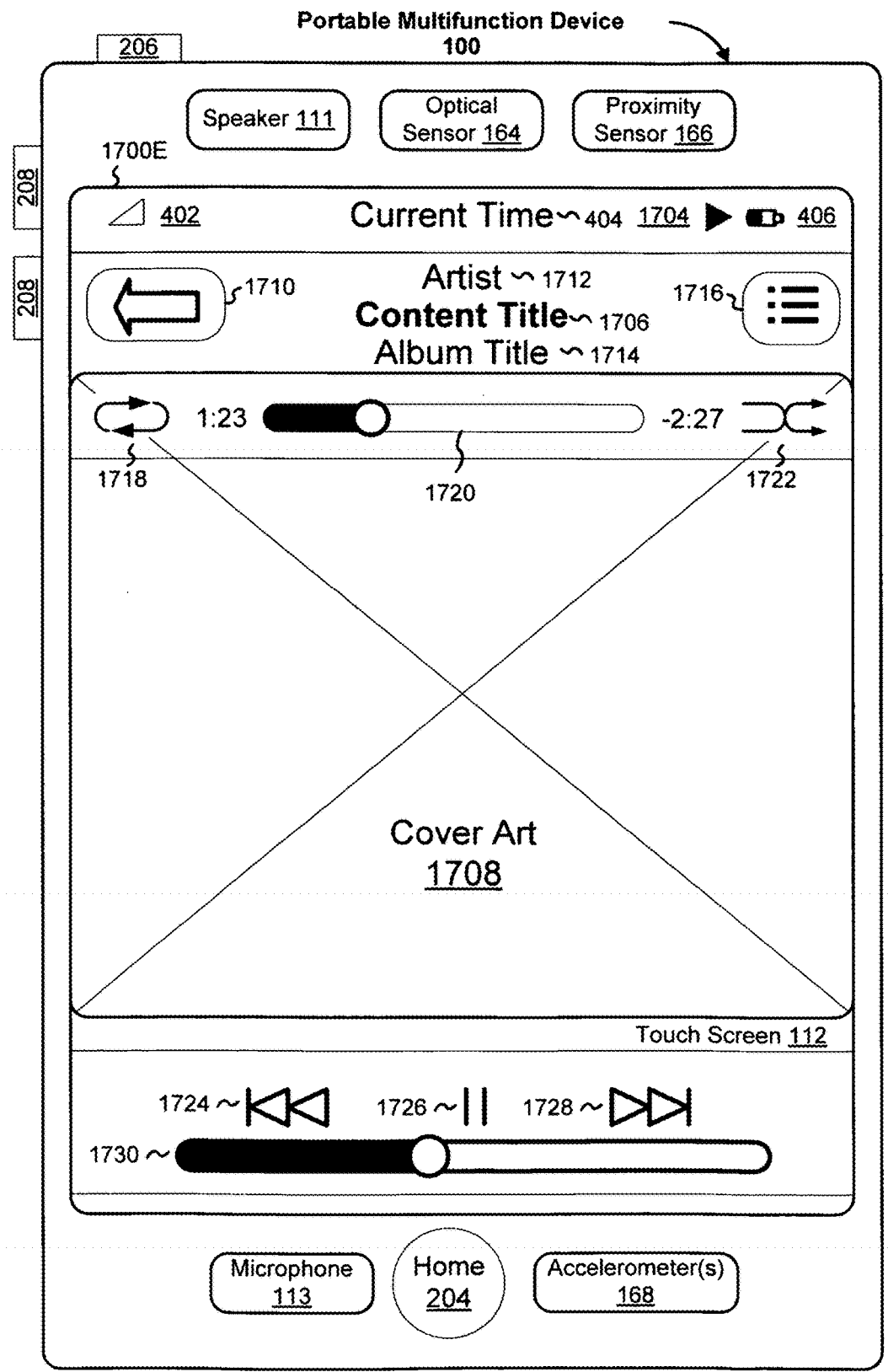

The device transitions (1814) to the user-interface unlock state and displays a user interface in the music player application if the detected contact corresponds to a predefined gesture (e.g., UI 1700E, FIG. 17E).

In some embodiments, the user interface in the music player application includes information that is associated with the music playing on the music player application (e.g., content title 1706, cover art 1708, artist 1712, and/or album title 1714, FIG. 17E) and one or more music player controls (1816) (e.g., loop icon 1718, progress bar 1720, shuffle icon 1722, previous icon 1724, pause icon 1726, next icon 1728, and/or volume control bar 1730, FIG. 17E).

In some embodiments, transitioning the device to the user-interface unlock state and displaying a user interface in the music player application includes: maintaining display of at least some of the information on the touch screen display that is associated with the music playing on the music player application (e.g., cover art 1708, FIGS. 17A and 17E); and displaying an animation that translates one or more music player controls onto the touch screen display (1818), as illustrated in FIGS. 17C-17E.

In some embodiments, transitioning the device to the user-interface unlock state and displaying a user interface in the music player application includes: maintaining display of at least some of the information on the touch screen display that is associated with the music playing on the music player application (e.g., cover art 1708, FIGS. 17A and 17E); and displaying an animation that fades in one or more music player controls on the touch screen display (1820). In some embodiments, displaying an animation that fades in one or more music player controls on the touch screen display comprises fading (1822) in at least some of the music player controls with an ease-in transition.

The device is maintained in the user-interface lock state and continues to play music with the music player application if the detected contact does not correspond to the predefined gesture (1824).

In some embodiments, the device detects (1826) a finger gesture on one of the music player controls. In response to detecting the finger gesture on one of the music player controls, the device performs (1828) a corresponding control function in the music player application.

A graphical user interface on a portable multifunction device with a touch screen display includes an unlock image 302. The unlock image is a graphical, interactive user-interface object with which a user interacts in order to unlock the device. Music is played with a music player application 146 while the device is in a user-interface lock state. Contact with the touch screen display is detected while the device is playing music in the user-interface lock state. The unlock image 302 is moved across the touch screen display in accordance with the contact. The device is transitioned to the user-interface unlock state and a user interface (e.g., UI 1700E, FIG. 17E) in the music player application is displayed if the detected contact corresponds to a predefined gesture (e.g., a finger slide gesture that moves the unlock image 302 across channel 306). The device is maintained in the user-interface lock state and music play is continued with the music player application if the detected contact does not correspond to the predefined gesture.

Processes 1600, 1622, 1644, 1670, 1682, and 1800 help a user to navigate between user interfaces in a multifunction device in a simple, intuitive manner.

In some embodiments, the aforementioned processes for transitioning between user interfaces are enabled when one or more proximity sensors and/or a proximity determination module or a set of proximity determination instructions of the device determine that the portable electronic device is not currently being held up against (or in very close proximity to) the user's ear or face.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
    at a portable multifunction device with a touch screen display:
        displaying a first user interface without concurrently displaying a second user interface that is distinct from the first user interface;
        detecting a gesture on the touch screen display to select the second user interface; and
        in response to detecting the gesture, displaying an animation of a transition from display of the first user interface to display of the second user interface, the animation comprising sliding a first element of the second user interface onto the display from a first side of the display while simultaneously sliding a second element of the second user interface that contacts the first element horizontally across the top of the first element, wherein the first element of the second user interface is distinct from the second element of the second user interface.

2. The computer-implemented method of claim 1, wherein the animation comprises sliding the first element onto the display from the bottom of the display while simultaneously sliding the second element that contacts the first element horizontally across the top of the first element from a side of the display, resulting in the first element appearing to rise while sliding.

3. The computer-implemented method of claim 1, further comprising determining, prior to displaying the animation, that the portable multifunction device is not being held in close proximity to a user's ear or face.

4. The method of claim 1, wherein the first element of the second user interface includes a block of soft keys, and the second element of the second user interface includes an input field.

5. The method of claim 1, wherein sliding the first element of the second user interface onto the display includes increasing a size of the first element in a first dimension while maintaining a size of the first element in a second dimension that is different from the first dimension; and
    sliding the first element of the second user interface onto the display includes increasing a size of the second element in the second dimension while maintaining a size of the second element in the first dimension that is different from the second dimension.

6. The method of claim 1, wherein during the animation, the first element of the second user interface has a constant horizontal width and the second element of the second user interface has a constant vertical height.

7. The method of claim 1, wherein the first element of the second user interface extends along an entirety of the first side and the second element of the second user interface extends along a portion of a second side.

8. The method of claim 1, wherein the animation further comprises sliding the second element of the second user interface from a second side of the display perpendicular to the first side of the display towards a third side of the display opposite the second side.

9. The method of claim 1, wherein the animation further comprises sliding the first element of the second user interface onto the display in a first direction from the first side of the display while concurrently sliding the second element of the second user interface in a second direction different from the first direction; and
    the first element slides in the first direction without sliding in the second direction.

10. A portable multifunction device, comprising:
    a touch screen display;
    one or more processors;
    memory; and
    one or more programs, wherein the one or more programs are stored in the memory and configured to be executed by the one or more processors, the one or more programs including instructions for:
        displaying a first user interface without concurrently displaying a second user interface that is distinct from the first user interface;
        detecting a gesture on the touch screen display to select the second user interface; and
        in response to detecting the gesture, displaying an animation of a transition from display of the first user interface to display of the second user interface, the animation comprising sliding a first element of the second user interface onto the display from a first side of the display while simultaneously sliding a second element of the second user interface that contacts the first element horizontally across the top of the first element, wherein the first element of the second user interface is distinct from the second element of the second user interface.

11. The device of claim 10, wherein the animation comprises sliding the first element onto the display from the bottom of the display while simultaneously sliding the second element that contacts the first element horizontally across the top of the first element from a side of the display, resulting in the first element appearing to rise while sliding.

12. The device of claim 10, including instructions for determining, prior to displaying the animation, that the portable multifunction device is not being held in close proximity to a user's ear or face.

13. The device of claim 10, wherein the first element of the second user interface includes a block of soft keys, and the second element of the second user interface includes an input field.

14. The device of claim 10, wherein sliding the first element of the second user interface onto the display includes increasing a size of the first element in a first dimension while maintaining a size of the first element in a second dimension that is different from the first dimension; and
   sliding the first element of the second user interface onto the display includes increasing a size of the second element in the second dimension while maintaining a size of the second element in the first dimension that is different from the second dimension.

15. The device of claim 10, wherein during the animation, the first element of the second user interface has a constant horizontal width and the second element of the second user interface has a constant vertical height.

16. The device of claim 10, wherein the first element of the second user interface extends along an entirety of the first side and the second element of the second user interface extends along a portion of a second side.

17. The device of claim 10, wherein the animation further comprises sliding the second element of the second user interface from a second side of the display perpendicular to the first side of the display towards a third side of the display opposite the second side.

18. The device of claim 10, wherein the animation further comprises sliding the first element of the second user interface onto the display in a first direction from the first side of the display while concurrently sliding the second element of the second user interface in a second direction different from the first direction; and
   the first element slides in the first direction without sliding in the second direction.

19. A non-transitory computer readable storage medium having stored therein instructions, which when executed by a portable multifunction device with a touch screen display, cause the device to:
   display a first user interface without concurrently displaying a second user interface that is distinct from the first user interface;
   detect a gesture on the touch screen display to select the second user interface; and
   in response to detecting the gesture, display an animation of a transition from display of the first user interface to display of the second user interface, the animation comprising sliding a first element of the second user interface onto the display from a first side of the display while simultaneously sliding a second element of the second user interface that contacts the first element horizontally across the top of the first element, wherein the first element of the second user interface is distinct from the second element of the second user interface.

20. The computer readable storage medium of claim 19, wherein the animation comprises sliding the first element onto the display from the bottom of the display while simultaneously sliding the second element that contacts the first element horizontally across the top of the first element from a side of the display, resulting in the first element appearing to rise while sliding.

21. The computer readable storage medium of claim 19, further comprising instructions, which when executed by the portable multifunction device with the touch screen display, cause the device to determine, prior to displaying the animation, that the portable multifunction device is not being held in close proximity to a user's ear or face.

22. The computer readable storage medium of claim 19, wherein the first element of the second user interface includes a block of soft keys, and the second element of the second user interface includes an input field.

23. The computer readable storage medium of claim 19, wherein sliding the first element of the second user interface onto the display includes increasing a size of the first element in a first dimension while maintaining a size of the first element in a second dimension that is different from the first dimension; and
   sliding the first element of the second user interface onto the display includes increasing a size of the second element in the second dimension while maintaining a size of the second element in the first dimension that is different from the second dimension.

24. The computer readable storage medium of claim 19, wherein during the animation, the first element of the second user interface has a constant horizontal width and the second element of the second user interface has a constant vertical height.

25. The computer readable storage medium of claim 19, wherein the first element of the second user interface extends along an entirety of the first side and the second element of the second user interface extends along a portion of a second side.

26. The computer readable storage medium of claim 19, wherein the animation further comprises sliding the second element of the second user interface from a second side of the display perpendicular to the first side of the display towards a third side of the display opposite the second side.

27. The computer readable storage medium of claim 19, wherein the animation further comprises sliding the first element of the second user interface onto the display in a first direction from the first side of the display while concurrently sliding the second element of the second user interface in a second direction different from the first direction; and
   the first element slides in the first direction without sliding in the second direction.

* * * * *